US009628623B2

(12) United States Patent
Vymenets et al.

(10) Patent No.: US 9,628,623 B2
(45) Date of Patent: Apr. 18, 2017

(54) GRAPHICAL USER INTERFACE FOR MONITORING AND VISUALIZING CONTACT CENTER ROUTING STRATEGIES

(71) Applicant: GENESYS TELECOMMUNICATIONS LABORATORIES, INC., Daly City, CA (US)

(72) Inventors: Leonid Vymenets, Ontario (CA); David Beilis, Toronto (CA); Michael Davies, Ontario (CA); Aaron Surty, Ontario (CA); Vyacheslav Zhakov, Burlingame, CA (US); Adrian Lee-Kwen, Ontario (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 17 days.

(21) Appl. No.: 14/086,936

(22) Filed: Nov. 21, 2013

(65) Prior Publication Data

US 2014/0233719 A1 Aug. 21, 2014

Related U.S. Application Data

(63) Continuation-in-part of application No. 13/753,443, filed on Jan. 29, 2013.

(Continued)

(51) Int. Cl.

*H04M 3/00* (2006.01)
*H04M 3/51* (2006.01)

(Continued)

(52) U.S. Cl.

CPC .......... *H04M 3/5175* (2013.01); *G06F 3/048* (2013.01); *G06Q 10/06* (2013.01); *H04M 3/5183* (2013.01); *H04M 3/523* (2013.01)

(58) Field of Classification Search

CPC ............ H04M 3/5175; H04M 3/5233; H04M 3/5191; H04M 3/5183; H04M 3/5232; H04M 3/523

(Continued)

(56) References Cited

U.S. PATENT DOCUMENTS

| | | |
|---|---|---|
| 5,185,780 A | 2/1993 | Leggett |
| 5,465,286 A | 11/1995 | Clare et al. |

(Continued)

FOREIGN PATENT DOCUMENTS

| | | |
|---|---|---|
| EP | 2893677 A1 | 7/2015 |
| JP | 2006-508450 | 3/2006 |

(Continued)

OTHER PUBLICATIONS

"OpenScape Contact Center Enterprise V7.0 R3 Empowered to Drive First-Contact Resolution", Siemens Enterprise, Communications GmbH & Co. KG, Dec. 2008, Reference No. A31002-S2270-D101-5-7629, 10 pages.

(Continued)

*Primary Examiner* — Rasha Al Aubaidi

(74) *Attorney, Agent, or Firm* — Lewis Roca Rothgerber Christie LLP

(57) ABSTRACT

A system and method for monitoring and visualizing contact center routing strategies via a graphical user interface. The graphical user interface displays a routing diagram depicting a contact center routing strategy. The routing diagram includes a plurality of blocks each associated with logic for managing an interaction with the contact center. A processor monitors contact center performance as interactions with the (Continued)

contact center are managed according to the routing strategy. The processor identifies one of the plurality of blocks affected by the contact center performance, and further identifies a threshold associated with the identified block. The processor determines whether the contact center performance satisfies the threshold, and modifies a visual appearance of the identified block based on the determination.

21 Claims, 86 Drawing Sheets

Related U.S. Application Data

(60) Provisional application No. 61/729,312, filed on Nov. 21, 2012, provisional application No. 61/785,882, filed on Mar. 14, 2013.

(51) Int. Cl.
*H04M 3/523* (2006.01)
*G06F 3/048* (2013.01)
*G06Q 10/06* (2012.01)

(58) Field of Classification Search
USPC ........................................ 379/265.01–265.14
See application file for complete search history.

(56) References Cited

U.S. PATENT DOCUMENTS

| | | | |
|---|---|---|---|
| 5,608,789 | A | 3/1997 | Fisher et al. |
| 6,058,163 | A | 5/2000 | Pattison et al. |
| 6,584,191 | B1 | 6/2003 | McPartlan et al. |
| 6,611,498 | B1 | 8/2003 | Baker et al. |
| 6,654,803 | B1 | 11/2003 | Rochford et al. |
| 6,697,858 | B1 | 2/2004 | Ezerzer et al. |
| 6,947,988 | B1 | 9/2005 | Saleh |
| 7,568,038 | B1 | 7/2009 | Ezerzer et al. |
| 7,900,206 | B1 | 3/2011 | Joshi et al. |
| 7,907,598 | B2 | 3/2011 | Anisimov et al. |
| 8,085,693 | B2 | 12/2011 | Ristock |
| 8,117,538 | B2 | 2/2012 | Anisimov et al. |
| 8,391,465 | B1 | 3/2013 | Porter |
| 8,463,939 | B1 | 6/2013 | Galvin |
| 8,670,550 | B2 | 3/2014 | Flockhart et al. |
| 8,989,367 | B2 | 3/2015 | Ristock et al. |
| 9,325,844 | B2 | 4/2016 | Ristock et al. |
| 2002/0175943 | A1 | 11/2002 | Hunt et al. |
| 2003/0093533 | A1 | 5/2003 | Ezerzer et al. |
| 2003/0154184 | A1 | 8/2003 | Chee et al. |
| 2004/0102982 | A1 | 5/2004 | Reid et al. |
| 2004/0240659 | A1 | 12/2004 | Gagle et al. |
| 2004/0264672 | A1 | 12/2004 | Paek et al. |
| 2004/0267897 | A1 | 12/2004 | Hill et al. |
| 2006/0209797 | A1 | 9/2006 | Anisimov et al. |
| 2006/0212547 | A1 | 9/2006 | Deleu et al. |
| 2006/0253789 | A1 | 11/2006 | Cobb et al. |
| 2006/0271418 | A1 | 11/2006 | Hackbarth et al. |
| 2007/0061183 | A1 | 3/2007 | Seetharaman et al. |
| 2007/0280465 | A1 | 12/2007 | Greve |
| 2008/0037761 | A1 | 2/2008 | Cordell et al. |
| 2008/0059278 | A1 | 3/2008 | Medina et al. |
| 2008/0075268 | A1 | 3/2008 | Medina et al. |
| 2008/0144803 | A1 | 6/2008 | Jaiswal et al. |
| 2008/0189634 | A1 | 8/2008 | Tevanian |
| 2009/0110165 | A1 | 4/2009 | Aboshi et al. |
| 2009/0310513 | A1 | 12/2009 | Sen et al. |
| 2010/0014511 | A1 | 1/2010 | Ezerzer et al. |
| 2010/0150335 | A1 | 6/2010 | Dowdy |
| 2010/0157979 | A1 | 6/2010 | Anisimov et al. |
| 2010/0198647 | A1 | 8/2010 | Bowers, Jr. et al. |
| 2010/0215169 | A1 | 8/2010 | Ristock |
| 2010/0228376 | A1 | 9/2010 | Stafford et al. |
| 2010/0257025 | A1 | 10/2010 | Brocklebank |
| 2010/0281393 | A1 | 11/2010 | Fujioka |
| 2010/0310056 | A1 | 12/2010 | Perlmutter |
| 2010/0332477 | A1 | 12/2010 | Jeffs et al. |
| 2011/0182418 | A1 | 7/2011 | Anisimov et al. |
| 2011/0255675 | A1 | 10/2011 | Jasper et al. |
| 2011/0280390 | A1 | 11/2011 | Lawson et al. |
| 2011/0286444 | A1 | 11/2011 | Petrovykh |
| 2012/0069978 | A1 | 3/2012 | Evans, Jr. et al. |
| 2012/0084751 | A1 | 4/2012 | Makagon et al. |
| 2012/0087486 | A1 | 4/2012 | Guerrero et al. |
| 2012/0150574 | A1 | 6/2012 | Reid et al. |
| 2014/0072115 | A1 | 3/2014 | Makagon et al. |
| 2014/0075009 | A1 | 3/2014 | Kovalenko et al. |
| 2014/0079207 | A1 | 3/2014 | Zhakov et al. |
| 2014/0086401 | A1 | 3/2014 | Ristock et al. |
| 2014/0112465 | A1 | 4/2014 | Sartini |
| 2014/0177819 | A1 | 6/2014 | Vymenets et al. |
| 2014/0181676 | A1 | 6/2014 | Samborskyy et al. |
| 2014/0211933 | A1 | 7/2014 | Vymenets et al. |
| 2015/0117629 | A1 | 4/2015 | Ristock et al. |

FOREIGN PATENT DOCUMENTS

| | | | |
|---|---|---|---|
| KR | 10-2010-0109517 | A | 10/2010 |
| WO | 2004002121 | A1 | 12/2003 |
| WO | WO2004049220 | A2 | 6/2004 |
| WO | WO2014043416 | A1 | 3/2014 |
| WO | WO2014043419 | A1 | 3/2014 |
| WO | WO2014081986 | A1 | 5/2014 |

OTHER PUBLICATIONS

Anisimov, Nikolay et al., Comprehensive XML for Contact Center, IADIS International Conference WWW/Internet 2006, 6 pages.
Anisimov, Nikolay et al., Extending VoiceXML and Call Control XML to Cover Contact Center Functionalities, Genesys Telecommunication Laboratories (an Alcatel Company), 6 pages.
Anisimov, Nikolay et al., XML Based Framework for Contact Center Applications; WEBIST 2007—International Conference on Web Information Systems and Technologies, 2007, 8 pages.
Anisimov, Nikolay et al., XML-Based Multimodal Interaction Framework for Contact Center Applications, WWW 2007 / Poster Paper, May 8-12, 2007, 2 pages.
International Search Report for PCT/US2013/071353, dated and mailed on Mar. 14, 2014, 4 pages.
International Search Report for PCTUS2013/059553, dated Dec. 26, 2013 and mailed Dec. 27, 2013, 4 pages.
International Search Report for PCTUS2013/059557, dated Dec. 30, 2013, and mailed Dec. 31, 2013, 3 pages.
Written Opinion of the International Searching Authority, dated Dec. 26, 2013 and mailed Dec. 27, 2013, corresponding to PCTUS2013/059553, 6 pages.
Written Opinion of the International Searching Authority, dated Dec. 30, 2013, and mailed Dec. 31, 2013, corresponding to PCTUS2013/059557, 7 pages.
Genesys Compact Edition 1.0 Deployment Guide, Genesys Telecommunications Laboratories, Inc., 2006-2010, 61 pages.
Genesys Express 8.0 Deployment Guide, Genesys Telecommunications Laboratories, Inc., 2003-2012, 114 pages.
Genesys Express 8.0 Reference Manual, Genesys Telecommunications Laboratories, Inc., 2003-2012, 86 pages.
Genesys Express 8.0 User's Guide, Genesys Telecommunications Laboratories, Inc., 2003-2012, 106 pages.
European Supplementary Partial Search Report for Application No. 13836676, dated Apr. 8, 2016, 6 pages.
Avaya Inc., Avaya Contact Center Control Manager, XP055277061, Retrieved from the Internet on Jun. 1, 2016: URL: http://downloads.avaya.com/css/P8/documents/100153470, Nov. 1, 2011, 76 pages.
Cisco Systems: Tested Call Flows, XP-002757191, URL:http://www.cisco.com/c/en/us/td/docs/voice_ip_comm/us_system/UC6-0-1/cc_system_arch/ch4_flow.pdf [retrieved on Apr. 29, 2016], dated Aug. 23, 2011, 78 pages.

(56) References Cited

OTHER PUBLICATIONS

Extended European Search Report for EP 13836871,7, dated May 18, 2016, 8 pages.
Korean Office Action and English Translation for KR Application No. 10-2015-7009310, dated May 31, 2016, 6 pages.
Supplementary European Search Report for European Application No. 13857216.9, dated Jun. 8, 2016, 7 pages.
Cisco Syserns, Inc., Scripting and Media Routing Guide Cisco Unified ICM/Contact Center Enterprise & Hosted Release 9,0(1), Jun. 29, 2012, pp. 157-161.
Extended European Search Report for Application No. EP13857216, dated Oct. 24, 2016, 18 pages.
Korean Office action with English Translation for Application No. 10-2015-7009310, dated Dec. 26, 2016, 12 pages.

Appl. No. 14/086,936
Dated May 6, 2014
Response to Missing Parts Dated December 6, 2014
Replacement Sheet 82/86

Figure 68C:
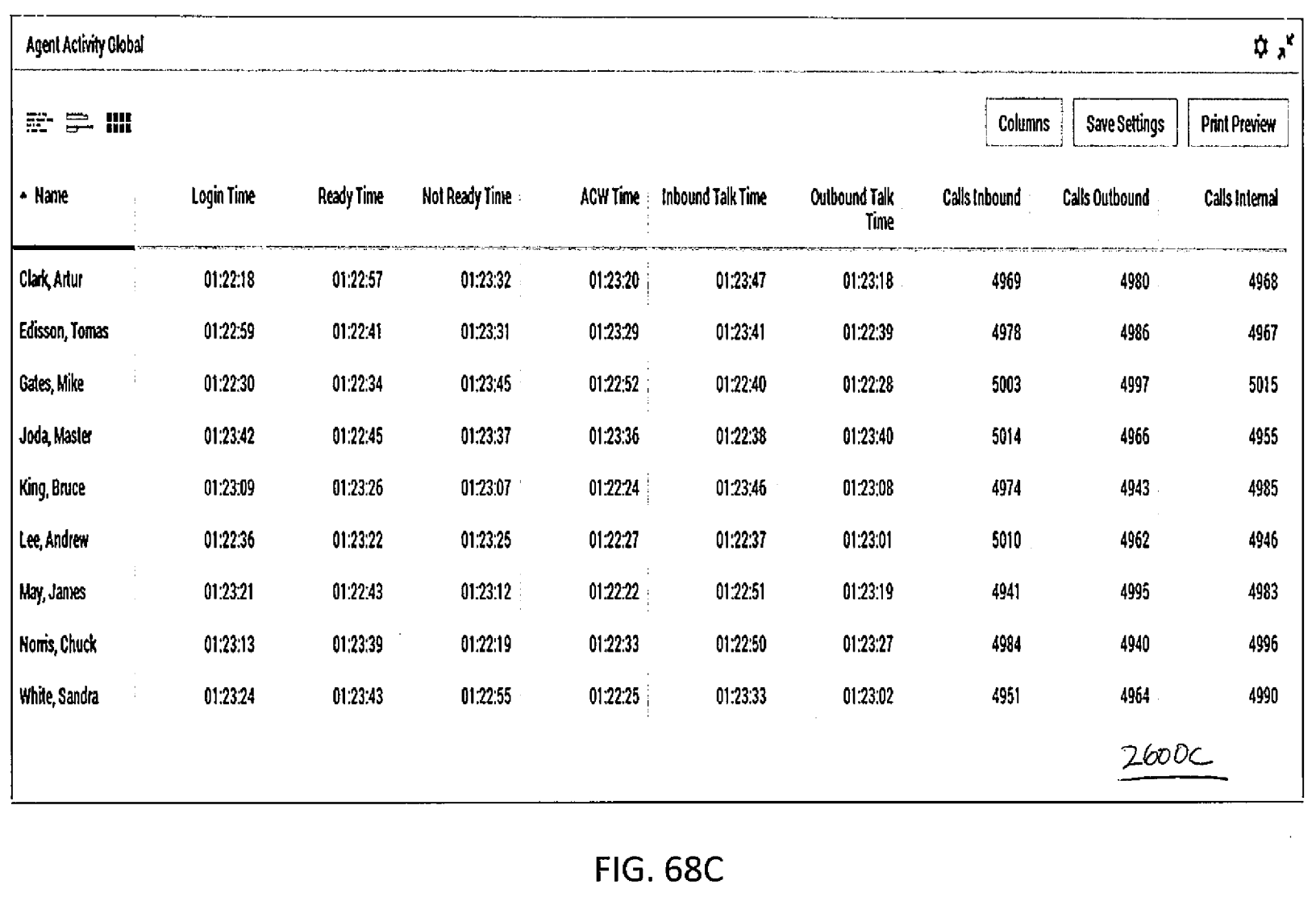

Agent Activity Global

Columns | Save Settings | Print Preview

| Name | Login Time | Ready Time | Not Ready Time | ACW Time | Inbound Talk Time | Outbound Talk Time | Calls Inbound | Calls Outbound | Calls Internal |
|---|---|---|---|---|---|---|---|---|---|
| Clark, Artur | 01:22:18 | 01:22:57 | 01:23:32 | 01:23:20 | 01:23:47 | 01:23:18 | 4969 | 4980 | 4968 |
| Edisson, Tomas | 01:22:59 | 01:22:41 | 01:23:31 | 01:23:29 | 01:23:41 | 01:22:39 | 4978 | 4986 | 4967 |
| Gates, Mike | 01:22:30 | 01:22:34 | 01:23:45 | 01:22:52 | 01:22:40 | 01:22:28 | 5003 | 4997 | 5015 |
| Joda, Master | 01:23:42 | 01:22:45 | 01:23:37 | 01:23:36 | 01:22:38 | 01:23:40 | 5014 | 4966 | 4955 |
| King, Bruce | 01:23:09 | 01:23:26 | 01:23:07 | 01:22:24 | 01:23:46 | 01:23:08 | 4974 | 4943 | 4985 |
| Lee, Andrew | 01:22:36 | 01:23:22 | 01:23:25 | 01:22:27 | 01:22:37 | 01:23:01 | 5010 | 4962 | 4946 |
| May, James | 01:23:21 | 01:22:43 | 01:23:12 | 01:22:22 | 01:22:51 | 01:23:19 | 4941 | 4995 | 4983 |
| Norris, Chuck | 01:23:13 | 01:23:39 | 01:22:19 | 01:22:33 | 01:22:50 | 01:23:27 | 4984 | 4940 | 4996 |
| White, Sandra | 01:23:24 | 01:23:43 | 01:22:55 | 01:22:25 | 01:23:33 | 01:23:02 | 4951 | 4964 | 4990 |

GRAPHICAL USER INTERFACE FOR MONITORING AND VISUALIZING CONTACT CENTER ROUTING STRATEGIES

CROSS-REFERENCE TO RELATED APPLICATIONS

This application claims the benefit of U.S. Provisional Application No. 61/729,312, filed Nov. 21, 2012, and U.S. Provisional Application No. 61/785,882, filed on Mar. 14, 2013, and is also a continuation-in-part of U.S. application Ser. No. 13/753,443, filed on Jan. 29, 2013, the entire content of all of which are incorporated herein by reference.

This application is also related to U.S. patent application Ser. No. 14/086,944, filed on Nov. 21, 2013, U.S. patent application Ser. No. 14/086,934, filed on Nov. 21, 2013, and U.S. patent application Ser. No. 14/086,933, filed on Nov. 21, 2013, all of which are filed on even date herewith, the content of all of which are incorporated herein by reference.

BACKGROUND

It is desirable to aid companies to deploy their contact center operations as efficiently and successfully as possible. However, one of the items that may take time to implement for a new contact center is the business logic employed for routing calls. Traditionally, a contact center's routing strategy is coded for the contact center based on the particular contact center's needs. The software is then debugged and deployed at the contact center's premises after months and months of coding, debugging, and testing by skilled programmers. Any change in this routing strategy requires reprogramming and re-deployment of the source code, adding further delays in the deployment of contact center operations.

Before any programming of the routing strategy can be done, the contact center must generally identify what the best practices are for this particular type of contact center, what types of services are to be provided, what are the needs of the contact center, and the business logic that will work best for the contact center. The identification of the business logic itself, aside from its programming, may be a daunting task to entities that are not familiar with call centers and their setup. Much research may be needed before identifying the business logic that will be used, adding further delays to a successful deployment of a contact center.

Accordingly, what is desired is a system and method for deploying contact centers efficiently without requiring skilled technicians or customized coding of routing strategies that are difficult to generate, deploy, and modify.

Additionally, once a contact center is deployed, it may be useful for a contact center administrator to monitor the contact center, for example, to observe the performance of the contact center agents, services levels, call flows, and the like, particularly in real-time. Accordingly, what is also desired is a system and method for monitoring contact centers efficiently in real-time, without having to switch from one user interface to another based on the user's particular job requirements.

SUMMARY

Embodiments of the present invention are directed to a system and method for monitoring and visualizing contact center routing strategies via a graphical user interface. A processor executes instructions stored in memory that cause the processor to display a routing diagram depicting a contact center routing strategy. The routing diagram includes a plurality of blocks each associated with logic for managing an interaction with the contact center. The processor monitors contact center performance as interactions with the contact center are managed according to the routing strategy. The processor identifies one of the plurality of blocks affected by the contact center performance, and further identifies a threshold associated with the identified block. The processor determines whether the contact center performance satisfies the threshold, and modifies a visual appearance of the identified block based on the determination.

According to one embodiment, the processor receives a user command to edit the routing diagram; identifies a modification to the routing diagram, modifies the routing diagram and the routing strategy in response to the modification, and stores the modified routing diagram and the routing strategy as new versions of respectively the routing diagram and the routing strategy.

According to one embodiment, the threshold is dynamically adjusted via a slider, and the processor dynamically modifies the visual appearance of the identified block based on the dynamic adjustment of the slider.

According to one embodiment, the monitored contact center performance is at least one of interaction flow, abandonment rate, average handling time, or average waiting time.

According to one embodiment, the block affected by the contact center performance is associated with a particular contact center agent group.

According to one embodiment, the threshold is based on forecast performance.

According to one embodiment, modifying the visual appearance of the identified block includes modifying a color in which the identified block is displayed.

According to one embodiment, the modifying the visual appearance is for alerting a user of the contact center performance.

According to one embodiment, the processor identifies a user input device paused over one of the plurality of blocks of the routing diagram, and displays additional information on the block as a pop-up window. The pop-up window disappears when the user input device is detected to no longer be paused over the block.

According to one embodiment, the additional information is dynamic information that changes based on the contact center performance.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 68A-68C are screenshots of different types of maximized widgets according to one embodiment of the invention.

DETAILED DESCRIPTION

Figure 1:
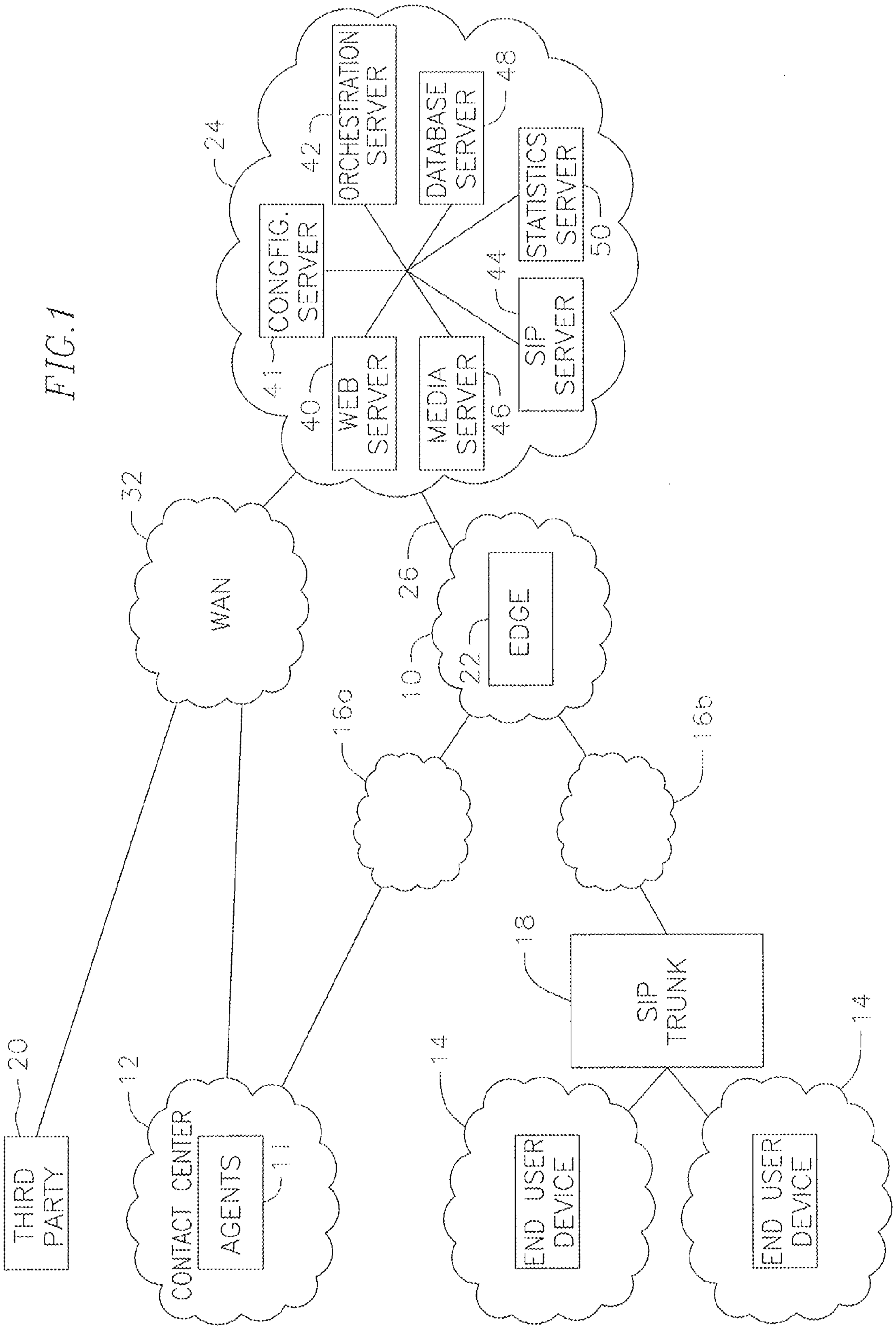
FIG. 1 is a schematic block diagram of a system for dynamic configuration, reconfiguration, and monitoring of contact centers according to one embodiment of the invention.

In general terms, embodiments of the present invention are directed to a system and method for providing contact center services for different business enterprises that allow such enterprises to rapidly configure and deploy their contact center operations without the need of high skilled IT personnel or extensive pre-acquired knowledge of best practices for call center operations or setup. According to one embodiment, the system provides a library of different routing logic templates that span across a multitude of different routing strategies from which a particular business entity may, during a configuration process, pick and choose depending on their needs. The templates may be used as building blocks for rapidly configuring and deploying the contact center. The templates may give access to other sub-templates based on the level of customization or complexity that is desired to meet the business objectives of the contact center. In this manner, even non-IT personnel may quickly configure and deploy a contact center operation that meets the contact center's needs. As the contact center's needs change, different routing logic or configuration parameters may be selected and deployed for the contact center without requiring reprogramming or redeployment of customized software that may otherwise be generated for the contact center.

One or more aspects of embodiments of the present invention provide an intuitive and integrated interface that enables business enterprises to efficiently and effectively monitor (in real-time and historically) and operate a contact center. According to one embodiment, a contact center dashboard is provided integrating the controls and displays for monitoring, operating, and configuring a contact center. Through the contact center dashboard, administrators may monitor the status (or health) of the contact center and (re)configure the contact center (including routing strategies and agent accounts or groups), and agents may perform their assigned tasks and monitor the contact center and their performance.

According to one embodiment, the configuration of routing logic for a contact center using templates includes displaying a plurality of routing templates for user selection. According to one embodiment, each of the routing templates is associated with metadata defining one or more parameters of the corresponding routing template. A contact center administrator selects one of the displayed templates and further identifies an entry point (e.g. a telephone number) to the contact center to which the selected routing template applies. The parameters defined for the selected template are displayed, according to one example, for prompting user input. The administrator provides input values for the displayed parameters. According to one embodiment, the user input values are saved in association with the corresponding parameters and further in association with the identified entry point. The saved user input values are then retrieved for routing a particular interaction arriving at the entry point. An interaction is used generally to refer to telephony calls, Embodiments of the present invention are also directed to providing an intuitive graphical user interface which simplifies the process of composing a routing strategy for the contact center and provides an intuitive configuration experience for the contact center administrator. In this regard, the interface may provide a set of basic building blocks that even non-IT personnel may manipulate to build the contact center's routing strategy. By selecting and organizing the building blocks via the interface, the contact center administrator is provided with a pictorial view of the logic behind the routing strategy (routing strategy diagram) so as to allow the administrator to easily discern how an interaction will flow according to the routing strategy, which aids the configuration process.

According to embodiments of the present invention, the routing strategy diagram may be invoked for real-time monitoring of efficacy (or lack of efficacy) of the corresponding routing strategy. For example, real-time call conditions may be monitored and portions of the routing strategy diagram that are affected by the monitored call conditions may be visually highlighted. Statistical analysis may also be performed based on the detected call conditions. The use of the routing strategy diagram for monitoring interaction flows allows details and conditions of the contact center to be efficiently communicated to, and understood by, the contact center administrator. The existing routing strategy may be reconfigured in response to the monitoring and statistical information without the need of highly skilled IT personnel or extensive pre-acquired knowledge of best practices for call center operations or set up.

FIG. 1 is a schematic block diagram of a system for dynamic configuration, reconfiguration, and monitoring of contact centers (or tenants) 12 according to one embodiment of the invention. The system includes a communications network 10 (e.g., a transit network) that, according to one embodiment, is dedicated to facilitate interactions (e.g., calls or chats) between agents 11 of various contact centers 12, and end users 14 (or callers or customers). The interactions may include, for example, telephone calls, VoIP communication, chats, emails, text messaging, WebRTC communication, or any other real-time or non-real time media communication conventional in the art. The VoIP communication may be controlled by any signaling protocol configured to control communication sessions over the Internet, such as, for example, session initiation protocol (SIP), H.323, and the like.

According to one embodiment, the dedicated communications network 10 includes an edge device 22 such as, for example, a session border controller (SBC), for controlling signaling and media streams involved in setting up, conducting, and tearing down voice conversations or other media communications. Any session border controller conventional in the art may be used to implement the edge device 22. In this regard, the session border controller includes a processor executing software instructions and interacting with other system components to control voice or other media communications. The session border controller also includes an addressable memory for storing software instructions to be executed by the processor. The memory is implemented using a standard memory device, such as a random access memory (RAM).

The dedicated communications network 10 is coupled to one or more private networks 16*a*, 16*b* (collectively referenced as 16). The private networks 16 may be managed by one or more telecommunications companies that provide quality of service guarantees for VoIP calls traversing the private networks according to provider policies and limits of service ordered by its customers. According to one embodiment, the private networks 16 implement MPLS (Multi-Protocol Label Switching) for transmitting the VoIP communication. Although MPLS is used as an example, a person of skill in the art should recognize that any other mechanism in addition or in lieu of MPLS may be used for ensuring quality of service guarantees, bit rates, and bandwidth for calls traversing the private networks. Due to the quality of service guarantees provided by the private networks 16, consistent call quality and security can generally be expected for those calls while traversing the private networks.

End users 14 utilize end user devices (e.g. VoIP phones, computers, smart phones, etc.) to access the private network 16*b* for VoIP communication via SIP trunk equipment 18. Although the SIP trunk equipment 18 is used according to one embodiment for accessing the private network 16*b*, a person of skill in the art should recognize that any other device for allowing the end user devices to access to the private network 16*b* for VoIP communication or other types of communication (e.g. email, chat, web-based communication, etc.) may be used in addition or in lieu of the SIP trunk. According to one embodiment, access to the private network 16*b* may also be via WebRTC, Skype, or via other networking systems (e.g. IP Multimedia Subsystem (IMS), public land mobile network (PLMN), or the like).

According to one embodiment, the remote computing environment 24 is a cloud computing environment that allows the sharing of resources and the provision of services over a network. In other embodiments, the remote computing environment provides resources used by a managed services provider (MSP) to provide services to various contact centers. Although the computing environment 24 is referred to as a remote computing environment, a person of skill in the art should recognize that the computing environment may be co-located or merged with the dedicated communications network 10. In that case, the computing environment 24 is not remote to the dedicated communications network. In other embodiments, the computing environment 24 is co-located or merged with or any other network environment conventional in the art.

According to one embodiment, instead of hosting all contact center applications at servers located in the dedicated communications network, all or a portion of the applications are hosted by a server system in the remote computing environment 24. The contact center applications may then be provided to multiple tenants 12 as a software as a service (SaaS). Of course, the applications may also be hosted in other locations, including the dedicated communications network 10 or any other network conventional in the art, without departing from the spirit and scope of the present invention. The contact center applications include but are not limited to applications that provide VoIP signaling, voice treatments (e.g. interactive voice response applications), multi-party calls (e.g. conference calls), and the like.

In the embodiment where cloud servers are utilized, the system in FIG. 1 may be implemented as a hybrid cloud system where infrastructure and applications for handling calls to and from a contact center are distributed between the dedicated communications network 10 (controlled by a private enterprise) and cloud servers in the remote computing environment 24 (controlled by a public service provider/operator). In some embodiments, the system of FIG. 1 may be implemented in such a way that the infrastructure and applications are both controlled by a public service provider/operator. Also, in some embodiments, one or more of the contact center applications on the cloud servers dedicated to particular tenants are not shared across various tenants. Of course a mix of shared and dedicated contact center applications may be deployed.

A person of skill in the art should recognize that the system may also be implemented using solely a public or private cloud environment. Also, instead of engaging in VoIP communication with applications in the remote computing environment via the private networks 16 and the dedicated communications network 10, the VoIP communication or other types communication (e.g. email, chat, web-based communication, etc.) may be conducted over a wide area network 32 such as, for example, the public Internet. In other embodiments, no cloud technology is used at all.

When a contact center receives an inbound call or engages in an outbound call campaign, all or a portion of the call is serviced by one or more contact center applications in the remote computing environment 24. According to one embodiment, the contact center applications for a particular tenant may be transitioned/moved from one remote computing environment 24 to another, in the same or different region, in a seamless manner. The assignment of the applications to tenants may be dynamically controlled based on demand and availability of the applications. The contact center applications may also be shared amongst different contact centers.

According to one embodiment, tenants 12 engage in communication with the remote computing environment 24 over the wide area network 32 such as, for example, the Internet. According to one embodiment, all tenant user interfaces including a contact center configuration UI, a home dashboard UI, a routing dashboard UI, a contact center monitoring UI, agent desktop UI, and/or a tenant administrative UI may be hosted by a third party web platform 20 over the Internet. According to one embodiment, a specialized application running on the third party platform utilizes third party APIs to manage the tenant user interfaces and integrate with the third party infrastructure (e.g. third party databases). The application communicates with a web server 40 over the Internet for engaging in administrative tasks such as, for example, dynamically configuring and deploying a contact center, and/or for conducting other activities typical for a contact center agent 11. A person of skill in the art would recognize that the web server 40 may be implemented as a stand-alone server or included in the remote computing environment 24.

According to one embodiment, the remote computing environment also includes, without limitation, a configuration server 41, an orchestration server 42, a SIP server 44, and a media server 46. According to one embodiment, the servers 40-46 are implemented as software components deployed on a single instance of a virtual server/machine. The single instance of the virtual server/machine may be implemented via standard hardware components such as, for example, one or more processors, disks, memories, and the like. Of course, as a person of skill in the art should understand, each contact center may also be allocated by several virtual machines, each of them providing an execution environment for certain applications. More than one virtual machine may also be used for backup purposes (e.g. high availability and disaster recovery purposes). The one or more virtual machines are deployed on physical servers, which may be dedicated to specific contact centers or shared among various contact centers. Although the servers 40-46 are assumed to be separate functional units, a person of skill in the art should recognize that the functionality of two or more servers may be combined or integrated into a single server, or further subdivided into additional server components without departing from the spirit of the invention. In addition, a person of skill in the art should recognize that the remote computing environment is scalable and may include a considerable number of virtual machines sharing a set of database servers 48 managing a set of mass storage devices. Thus, the particular implementation of the server system in the remote computing environment 24 is solely for illustration purposes, and does not preclude other arrangements or components that will be evident to a person of skill in the art.

According to one embodiment, the SIP server 44 is configured to receive call signaling messages (e.g. SIP INVITE messages) from the edge device 22, media server 46, and the like, for controlling the setting up or termination of a call.

The media server 46 is configured to identify parameters (e.g. available media ports on the media server) for establishing voice conversations between agents 11 and customers 14 (or contacts or end users), and provide those parameters to the SIP server for delivering to the edge device, customers 14, and agents 11. The media server 46 is also configured to deliver media to customers 14 and/or agents 11 via the edge device 22. For example, the media server 46 may be invoked to provide initial greeting messages to a calling customer 14, and for obtaining basic customer information (e.g. identification information, reason for the call, etc.). Also, if the customer 14 or agent 11 is placed on hold, the media server 46 may be invoked to play music for the holding customer or agent 11. In another example, if a conversation between a customer 14 and agent 11 is to be recorded, the call may traverse the media server so that the customer 14 and agent 11 engage in a three way conversation with the media server 46, and the media server 46 may record the conversation and store it in one or more database servers 48.

The orchestration server 42 is configured to work with the SIP and media servers 46 for orchestrating the handling of calls based on a routing strategy associated with a particular contact center. Depending on the type of routing strategy configured for the contact center, and the specific values of parameters set for the routing strategy, different options, voice treatments, and routing is performed for the call. Although the orchestration server 42 is depicted as being separate from the media server 46, a person of skill in the art should recognize that the functionalities of the orchestration server may be merged into the media server 46.

The configuration server 41 includes a configuration engine for automatically configuring and/or reconfiguring a contact center. For example, the configuration server 41 may be configured to automatically allocate or reallocate particular resources in the remote computing environment 24 based on detected needs of the contact center.

According to one embodiment, one or more database servers 48 store various user-selectable templates for guiding a contact center administrator in configuring and deploying a contact center. For example, the templates may be routing templates where each template provides a routing logic for routing calls. The templates together span a multitude of industry verticals for which a contact center may be desired (e.g. finance, retail, medical, etc.). As the administrator picks and chooses the desired template(s) and provides values for the parameters identified by the template(s), those values are stored in the mass storage device in association with the selected template(s) and an identifier for the particular contact center (e.g. contact center telephone number). The database servers 48 further store for each customer contact center, a profile record which identifies profile and configuration information for the customer contact center. The database server 48 may be included in the remote computing environment 24.

The remote computing environment 24 may further include a statistics server 50. The statistics server 50, according to one embodiment, may gather, store, and/or analyze data regarding the contact center, agents 11 and end users 14. For example, the data of the statistics server 50 may include data regarding agent availability, agent skills, average call time, average hold time, total talk time, after work time, average speed of answer, service level, maximum abandonment rate, patience rate, and the like.

According to one embodiment of the invention, various third party developer devices 21 are also coupled to the remote computing environment 24 over the Internet. The third party developer devices may be invoked to generate new business logic and upload a template and associated metadata defining the routing logic to the remote computing environment. Once uploaded, the new templates may be made available for use by different contact centers. In this manner, different entities may be involved in extending the routing capabilities offered by existing templates.

Figure 2:
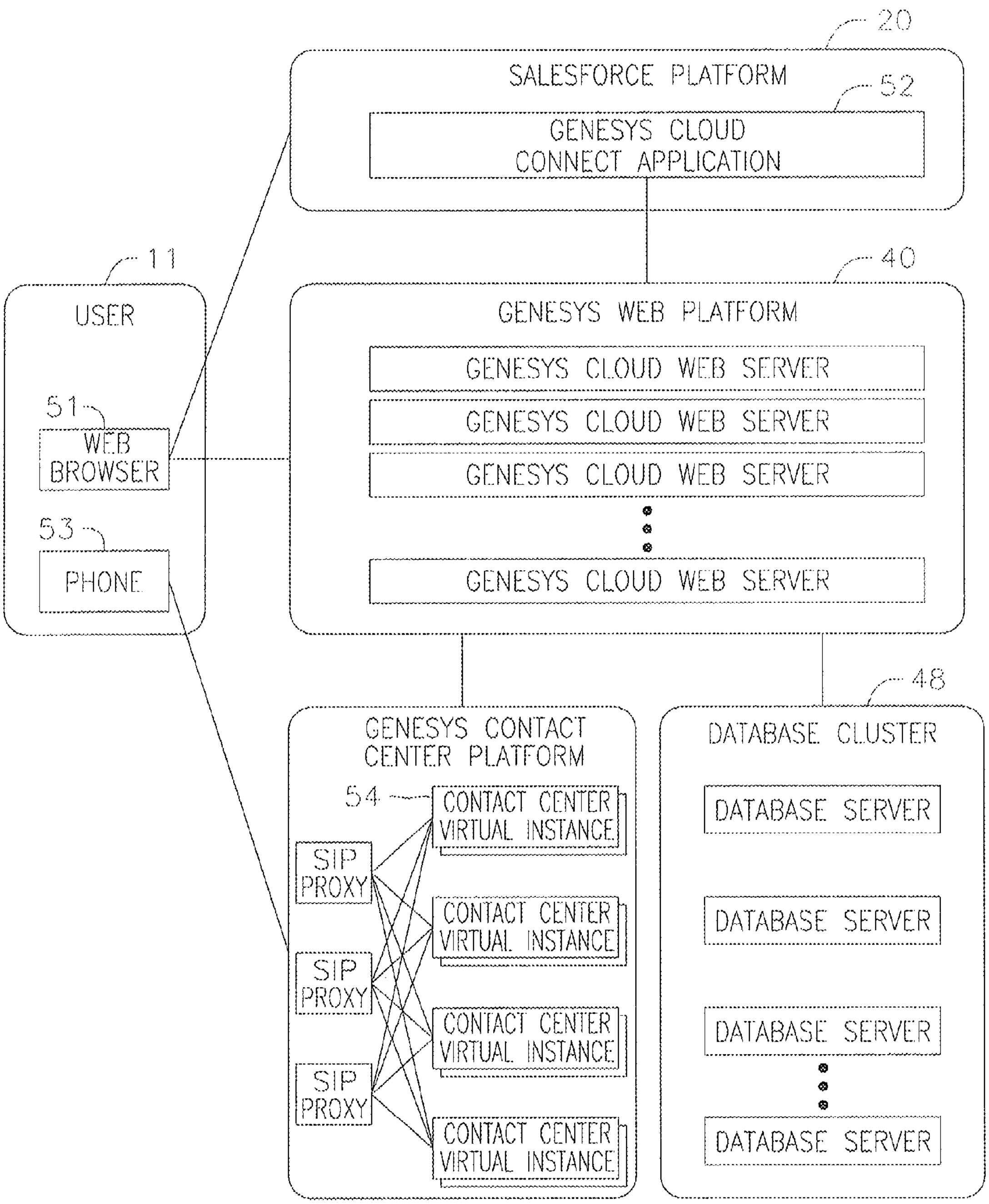
FIG. 2 is a more detailed schematic block diagram of portions of the system of FIG. 1 according to one embodiment of the invention.

FIG. 2 is a more detailed schematic block diagram of portions of the system of FIG. 1 according to one embodiment of the invention. As illustrated in FIG. 2, the agent 11 or administrator for a contact center 12 (hereinafter collectively referred to as contact center worker) has access to a computer having a web browser 51, and a phone 53 capable of VoIP communication. The web browser may be invoked to access the third party web platform 20 for remotely conducting administrative tasks for the contact center and/or other call center agent activities. The third party web platform 20 hosts a specialized application 52 stored in a memory and, which is configured to be executed by a microprocessor. The specialized application 52 running on the third party platform 20 may be dedicated to contact center management activities.

According to one embodiment of the invention, the contact center worker accesses the specialized application 52 by logging into a web portal provided by the third party platform 20. The web portal identifies the user as a contact center worker based on the user's login information, and automatically invokes the specialized application 52 to render the graphical user interface appropriate for contact center management activities. Thus a single login into the web portal acts also as a login to the specialized application 52 to seamlessly invoke the application and provide an appropriate UI that is integrated into the web portal to give the look and feel of a single integrated application that is providing the contact center management functionalities.

According to one embodiment of the invention, the specialized application 52 migrates data from the third party web platform (or another database) to the specialized application 52 for modifying or extending such data and making it appropriate for use in a contact center setting. For example, user profile information stored by the third party web platform may be migrated and integrated into the specialized application to extend the user's profile by adding information that is relevant for a contact center setting. For example, the user's profile may be extended to add, for example, the user's role (e.g. contact center agent and/or contact center administrator), and the user's skills (e.g. language skills).

Referring again to FIG. 2, the specialized application 52 accesses the web server 40 in the remote computing environment 24 for engaging in administrative tasks such as, for example, dynamically configuring and deploying a contact center, real-time reconfiguration of a contact center, real-time monitoring of a contact center, and/or for conducting other activities typical for a call center agent. The contact center worker may also access the web server 40 over the Internet directly without invoking the specialized application 52. The specialized application may also be hosted by the web server 40 or in any other application server in the remote computing environment, local contact center premise, and/or a combination thereof, as will be apparent to a person of skill in the art. Also, the various functionalities of the specialized application may be separated into submodules of the same or different application, for the same or different application server, processor, and/or the like, as will be apparent to a person of skill in the art.

The web server 40 is coupled to one or more servers which are deployed in a virtual machine 54 allocated for a particular contact center. A separate virtual machine may be allocated for each contact center. The servers deployed in the virtual machines may be, without limitation, the orchestration, SIP, media servers, data server, and statistics server 42-50 described with reference to FIG. 1, which are invoked for providing contact center services such as, for example, inbound voice routing, email routing, social media routing, and for administrative functions such as, for example, real time reporting, historical reporting, contact center configuration, and the like. According to one embodiment, the virtual machines share the database servers 48 for storing data relevant to contact center operations.

According to one embodiment, the configuration server 41 in the remote computing environment 24 runs a configuration script for automatically instantiating a virtual machine for a contact center in the remote computing environment 24 according to desired parameters specified by a worker. One of such parameters may be, for example, the size/capacity of the contact center. According to one embodiment, the configuration engine dynamically allocates a virtual machine having a size that corresponds to the size specified by the user. For example, in response to a user indicating that a contact center capable of supporting 100 agents is desired, the configuration script dynamically instantiates a virtual machine capable of supporting 100 agents. If, however, the contact center grows, and the contact center needs support for 1000 agents instead of a 100, the configuration engine is configured to dynamically instantiate a bigger virtual machine capable of supporting 1000 agents. In this regard, the configuration script is invoked to automatically reload the contact center data from the current virtual machine to the new virtual machine. The configuration script also automatically updates any relevant servers such that incoming traffic is directed to the correct virtual machine. Thus, according to an embodiment of the invention, a contact center may be configured and deployed automatically in the remote computing environment, and reconfigured and redeployed automatically if necessary, for example, to scale up or down the capabilities of the contact center, all without requiring physical installations of hardware and software at the tenant premises, and without downtime associated with such physical installations which negatively affect contact center operations.

Additionally, the configuration engine may dynamically reconfigure a contact center's logic relating to the routing or flow of interactions, and/or other logic operations. For example, in response to a contact center worker requesting that the contact center be capable of routing calls based on a language selection of English or Spanish by a caller, the configuration script dynamically configures the contact center's routing strategy to allow it to prompt the caller to select English or Spanish, and to direct the call to an agent queue based on the selection. Thus, according to an embodiment of the invention, a contact center may be reconfigured and redeployed automatically based on different types of requirements by automatically reconfiguring the virtual machine associated with the contact center.

According to another embodiment of the present invention, the remote computing environment 24 may run a monitoring script so that a contact worker may monitor real-time activity, review historical data, and/or simulate conditions of the contact center. Here, the contact center worker may login into the web portal to seamlessly invoke a monitoring application that may be integrated with the contact center management UI to give the look and feel of a single integrated application that is providing the contact center configuration and monitoring functionalities. The contact center management UI may visually depict contact center data, such as contact center logic, current contact flows, abandonment rate, average call time, and the like, such that the data may be easily and readily apparent to the contact center worker. The contact center data may be provided from, for example, the statistics server 50.

According to another embodiment, a contact center monitoring script and UI may be provided independently of the contact center configuration script and UI.

FIGS. 3-39 are screen shots of various example screens illustrating aspects of the graphical user interface (UI) of the specialized application 52 according to one or more embodiments of the present invention. A person of ordinary skill in the art should recognize that the graphical user interface may be provided by, for example, the third-party web platform 20, the web server 40, or one or more servers of the remote computing environment 24, but is not limited thereto. For example, the graphical user interface may be provided by an application server on contact center premises or hosted remotely in the remote computing environment. The graphical user interface may be accessed via an internet browser, a standalone application, or any other suitable means. For simplicity purposes, however, embodiments of the present invention are described in terms of the specialized application 52 as rendering the graphical user interface. The graphical user interface may be adapted to run on a personal computer, phone, tablet, or any other suitable device. Interaction with the graphical user interface may be via a mouse, keyboard, touch input, etc.

According to one embodiment, the specialized application 52 may recommend routing strategies to contact center workers according to, e.g., industry best practices. The graphical user interface may also be used for intuitively guiding a contact center worker step-by-step in configuring a routing strategy according to the specific contact center's business needs. According to one aspect of the present invention, the graphical user interface may be used for monitoring and/or simulating the operation of the contact center.

I. Configuration and Monitoring UI

Figure 3:
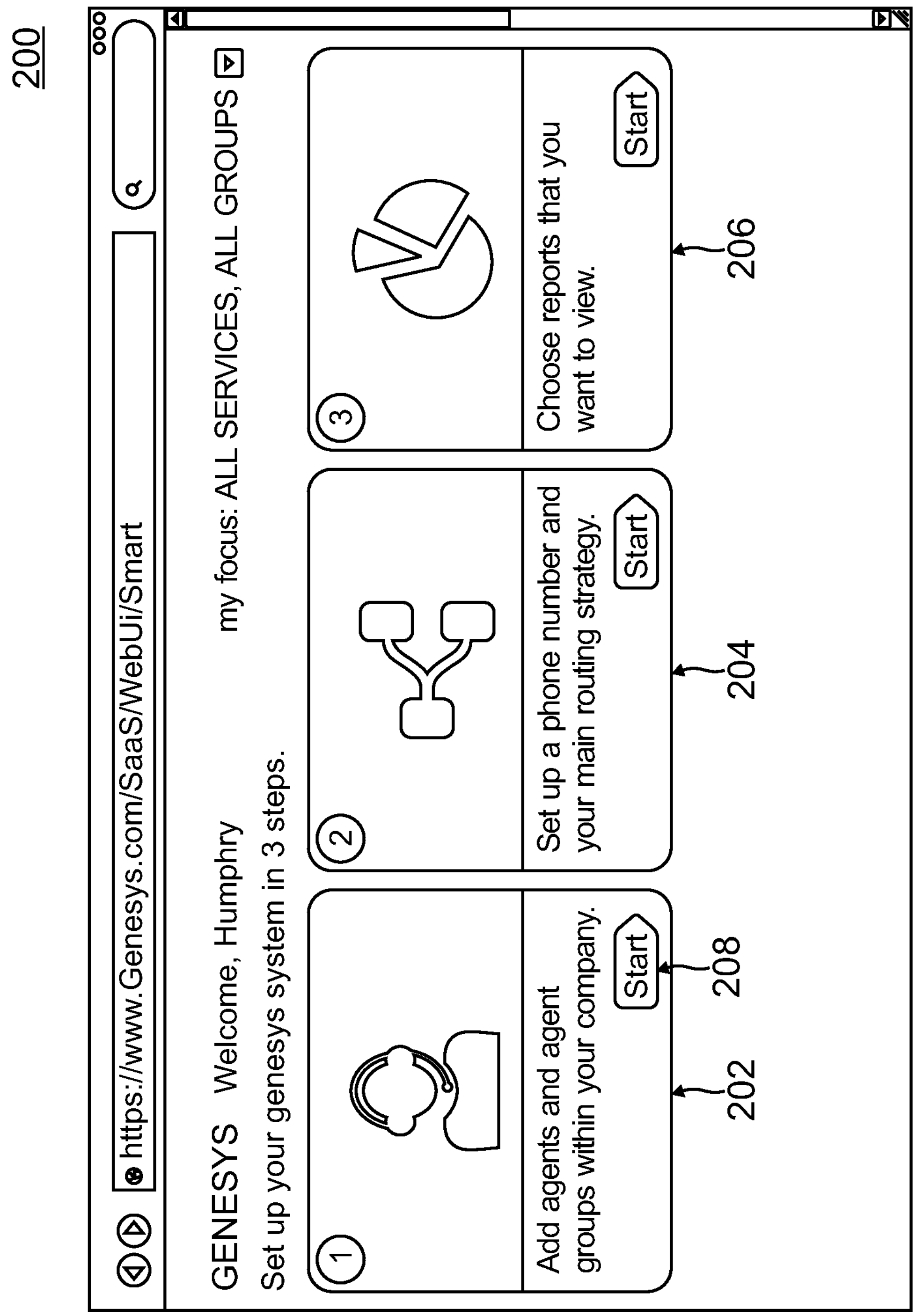
FIG. 3 is a screen shot of a UI page for guiding a contact center worker in configuring a contact center according to one embodiment of the invention.
Figure 4:
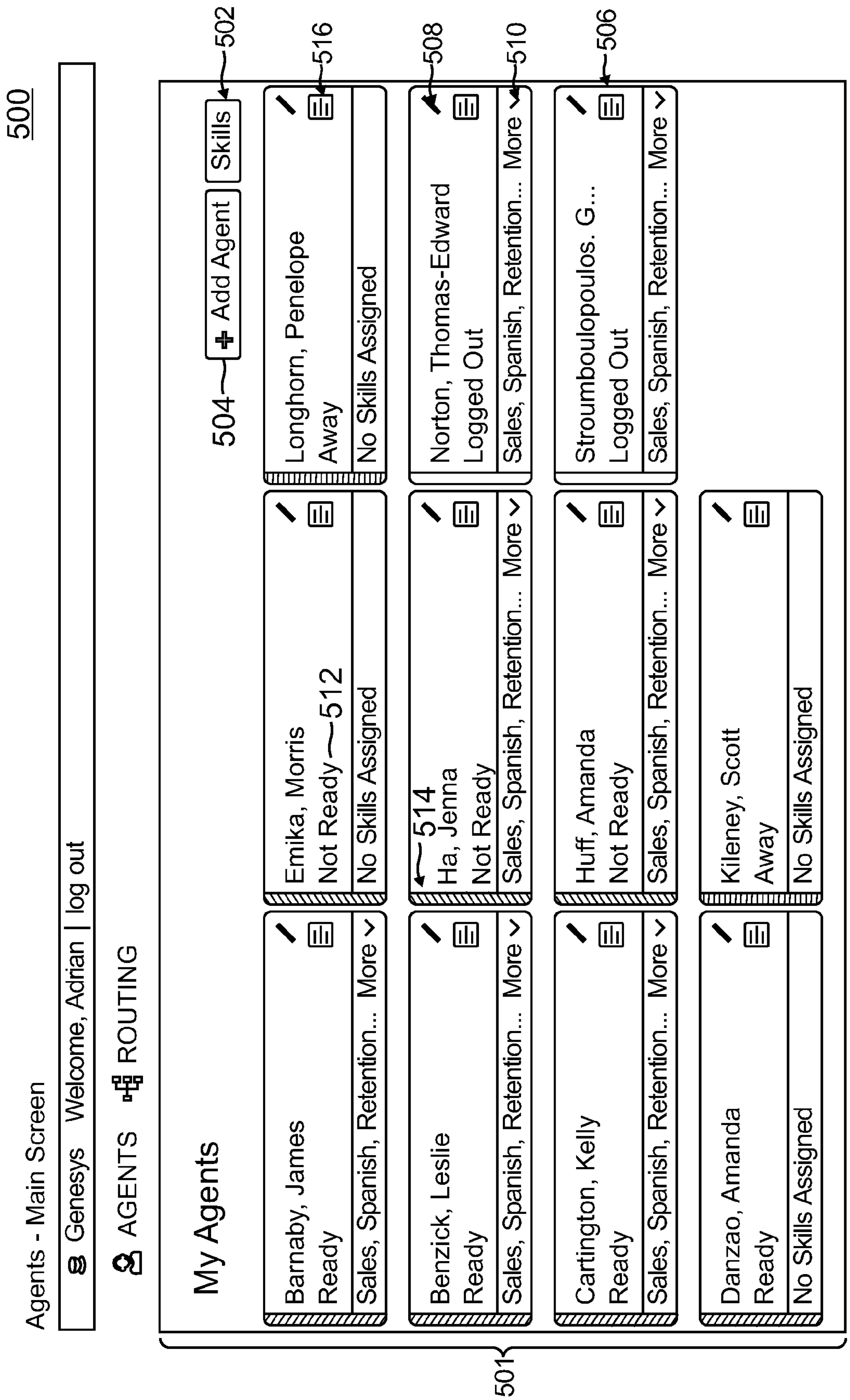
FIGS. 4-8 are a screen shots of a UI page rendered upon selection of an agent management option according to one embodiment of the invention.

FIG. 3 is a screen shot of a UI page 200 for guiding a contact center worker in configuring a contact center according to one embodiment. The UI page 200 may be one of the first pages a contact center worker is presented with after logging in. For example, the UI page 200 may be a start page upon first use of the specialized application 52. Here, when a contact center worker logs in for setting up the contact center, the specialized application 52 renders a UI page with various configuration and/or management options. Such options may include, for example, an agent management option 202, a routing configuration option 204, and a report management option 206.

When the contact center worker selects the agent management option 202, for example by selecting (e.g., clicking) the start button 208, an agent management UI page is generated to enter agent information, such as, agent groups, agent skills, agent profiles, and the like. According to one embodiment, by selecting the agent management option 202, the contact center worker invokes the configuration script of the specialized application 52. In one embodiment, the agent information is stored on the database server 48 for later use, including for use when configuring a routing strategy, viewing reports, or monitoring a call center. While the agent management option 202 has been described in relation to an initial setup operation, the agent management option may also be selected for editing or updating agent information, for example, to add or update agent profiles, groups, or skills. According to one embodiment, the contact center worker is directed to complete the agent management option 202 before selecting the routing configuration option 204 or the report management option 206. An embodiment of the agent management option 202 is described in greater detail below with reference to FIGS. 4-8.

When a contact center worker selects the routing configuration option 204, a routing UI page is generated to receive data, for example, routing logic information and contact center parameters. According to one embodiment, by selecting the routing configuration option 204, the contact center worker invokes the configuration script of the specialized application 52. The routing configuration option 204 may be selected after the agent management option 202 has been completed by the user to configure a contact center (e.g., a first setup); however, the present invention is not limited thereto, and the routing configuration option 204 may be invoked after the first setup to reconfigure an existing contact center (e.g., real-time reconfiguration) and/or monitor the contact center. An embodiment of the routing configuration option 204 is described in greater detail below with reference to FIGS. 9-22.

When a contact center worker selects the report management option 206, a report UI page is generated to view reports regarding the contact center. The report UI may be generated according to a report script of the specialized application 52. In one embodiment, the report UI displays contact center information in such a way that the contact center information may be readily and clearly communicated to a contact center worker. Contact center information may include, total abandoned calls, call abandon rate, number of calls per agent skill group, call volume, productivity, call rate, and the like. The data associated with the contact center information may be provided by the remote computing environment 24. For example, the data may be stored in the database server 48 and analyzed by the statistics server 50. An embodiment of the report management option 206 is described in greater detail below with reference to FIGS. 23-24.

A. Agent Management UI

Hereinafter, an agent management option 202 and an agent management graphical user interface are described in connection with FIGS. 4-8. FIGS. 4-8 are a screen shots of an agent UI page 500 rendered upon selection of the agent management option 202 according to one embodiment of the invention. The agent UI page 500 may prompt the contact center worker for information relating to agents, agent groups, agent skills, etc. that is relevant to a contact center (e.g., the contact center being configured or already configured). According to one embodiment, the agent UI page 500 may display information (e.g., user entered, historical, and/or real time information) associated with agents of a contact center.

The agent UI page 500 may display the contents of an agent library (or listing) 501 for effectively and efficiently communicating information regarding agents associated with a contact center to a contact center worker. According to one embodiment, the agent library 501 may display the agent information using icons, however, embodiments are not limited thereto, for example the agent information may be displayed via graphs, lists, etc. Agent information may include, but is not limited to, agent names, agent contact information, agent skills, agent rolls, agent status, and contact center metrics (e.g., average call time, productivity, etc.).

The agent UI page 500 may prompt the contact center worker to enter agent skills for association with agents and/or agent groups of the contact center. According to one embodiment, agent skills are attributes (or tags) to be associated with the agents/agent groups of the contact center. The agent skill information is stored, for example, in a mass storage device accessible to the configuration server 41. Agent skills are attributes relevant to, for example, processing interaction events (e.g., calls), contact center organization, contact center management, etc. Examples of agent skills include, language proficiency (e.g., English, Spanish, French, etc.), account association (e.g., a particular client/service/good, banking, retail, customer service, etc.), position/training (e.g., supervisor, manager, administrator, associate, trainee, novice, expert, etc.), or assigned task (e.g., client intake, collection, sales, retention, etc.). The preceding agent skills have been recited merely as examples; agent skills are not so limited and may include any conceivable attribute relevant to a contact center.

According to one embodiment, the contact center worker enters the agent skills by selecting (e.g., clicking) a skills button 502. After selecting the skills button 502, the contact center worker is prompted (e.g., via a pop-up window) to enter and/or select agent skills to be associated with the contact center. Once entered, agent skills are available for association with the agents (then existing or otherwise). In addition to being associated with agents, agent skills may be used in configuring the routing strategy. In one embodiment, different agent skills may be associated with different branches of the routing strategy. For example, a particular agent skill may be associated with a branch of a routing strategy, and interaction events may be routed to the agents tagged with the particular agent skill (e.g., an agent group). Agent skills may also be used in connection with contact center reporting. For example, reports may be organized (or filtered) according to agents tagged with a particular agent skill.

Agent skills may be removed (e.g., deleted). According to one embodiment, removing an agent skill from the system results in changes throughout the contact center configuration (e.g., there is a symbiotic or dynamic interrelationship throughout the system). For example, when an agent skill is removed, the agent skill is disassociated with the agents and/or the routing strategies that were previously associated with that agent skill. According to an embodiment, the specialized application 52 may dynamically reconfigure the routing strategy in real time to account for the removed agent skill and/or alert the contact center worker to account for the change.

The contact center worker may add new agents for association with contact center (e.g., for association with the contact center routing strategy). For example, the contact center worker may select the add agent button 504 to invoke an add agent script of the specialized application 52. The add agent script, according to one embodiment, prompts the contact center worker for information regarding a new agent, associates the new agent's information with the contact center, and saves the new agent's information for use in configuring and monitoring the contact center.

Figure 5A:
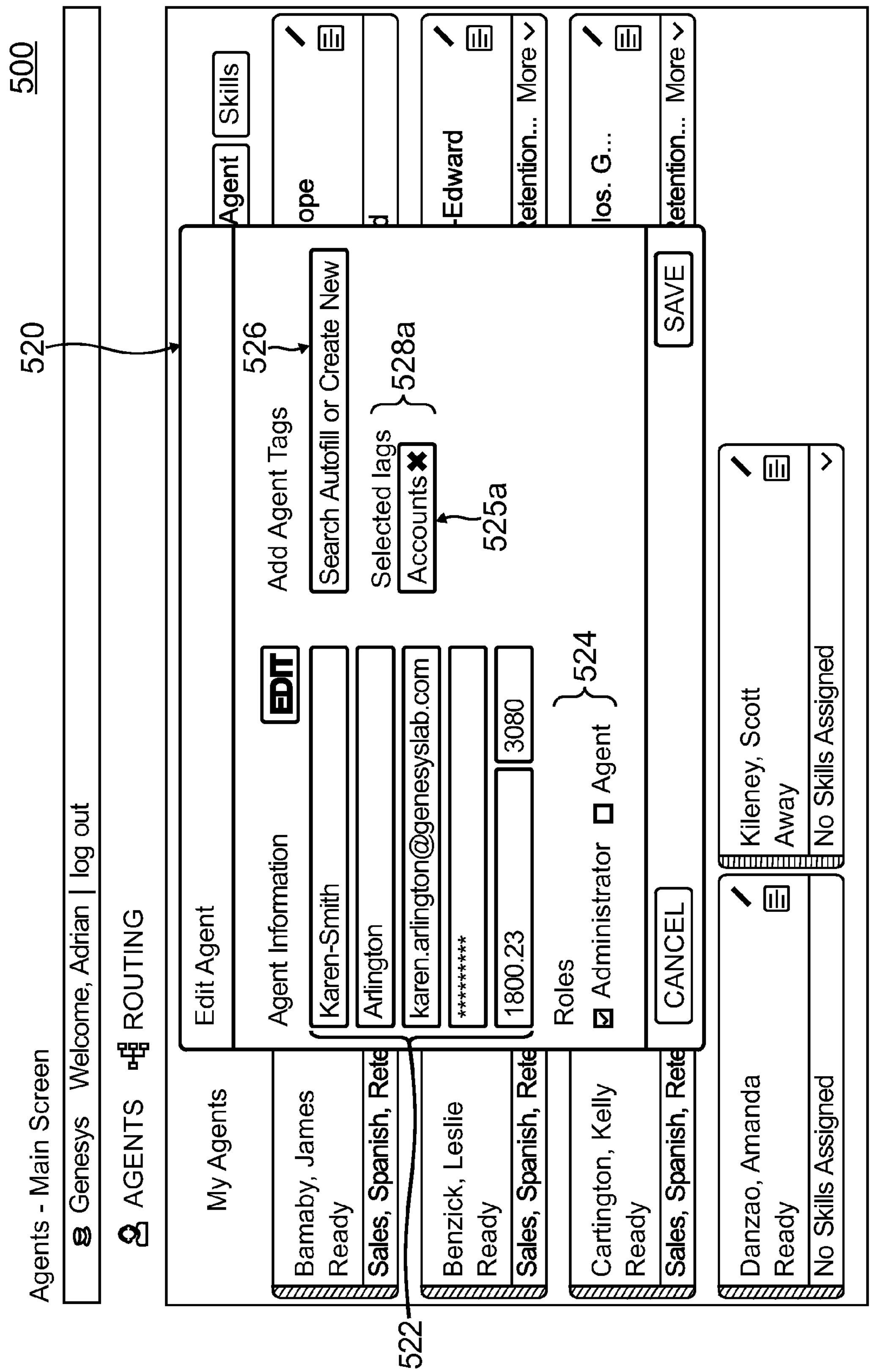

Referring to FIG. 5A, according to one embodiment, when a contact center worker selects the add agent button 504 the add agent script renders a new agent pop-up window 520 for the contact center worker to enter the new agent's information. The new agent pop-up window 520 may display agent information entry fields 522 for entry of the new agent's information. The agent information entry fields 522 may include, for example, name, email, phone, extension, and password entry fields, but are not limited thereto. The contact center worker may assign a role to the new agent via the role field 524. For example, the contact center worker may assign the new agent the role of administrator or agent.

As described above, agents may be associated with agent skills (or tags). Accordingly, when creating a new agent, the contact center worker may assign skills to the new agent. For example, as shown in FIG. 5A, skills may be associated with the agent using the add agent tags field 526. According to one or more embodiments, the add agent tags field 526 may allow a contact center worker to search agent skills (or agent tags) through a drop down menu, a text search box (e.g., a text search box with autofill), or any other suitable method. According to one embodiment, the agent skills are the skills previously associated with the contact center; however, embodiments of the present invention are not limited thereto. For example new agent skills may be entered via the agent tags field 526 or a predefined set of skills may be available by default. Once an agent skill is found (or created), the contact center worker may tag the new agent with that skill.

Figure 5B:
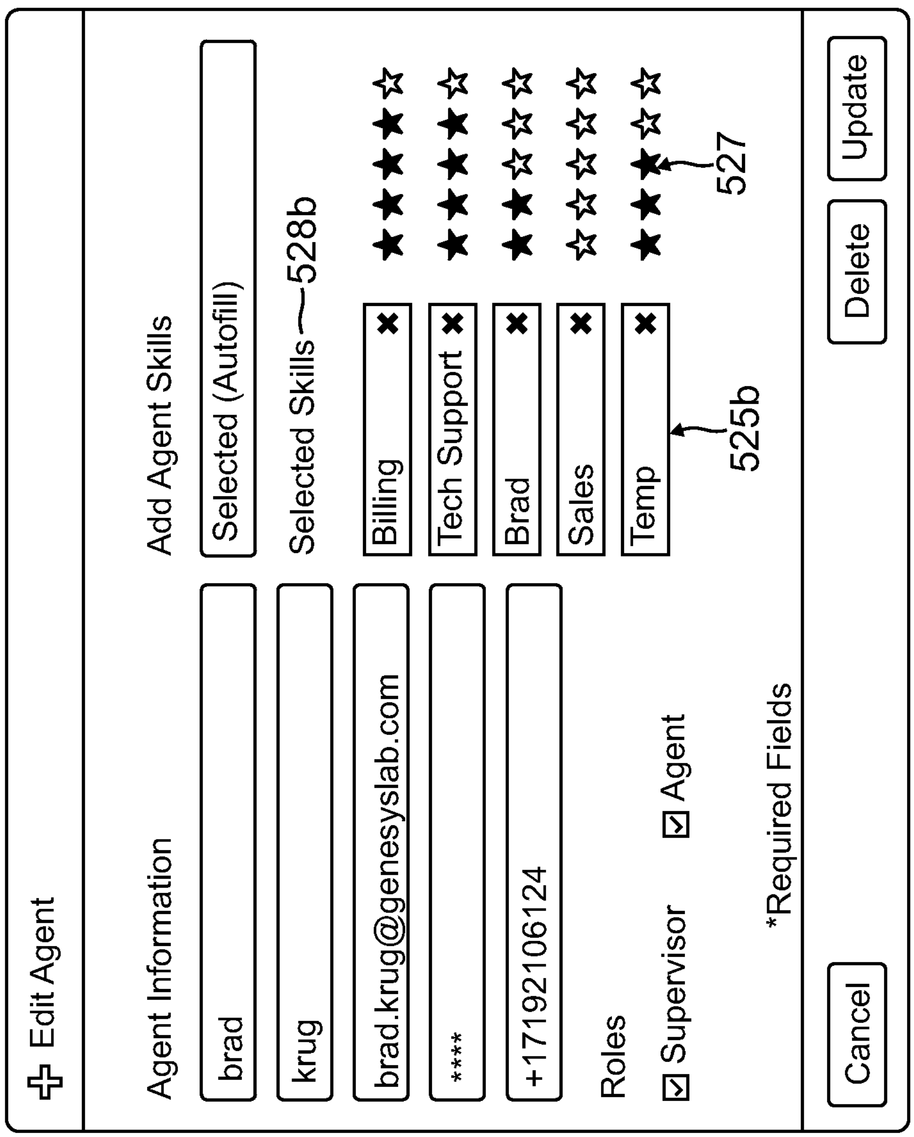
Figure 6:
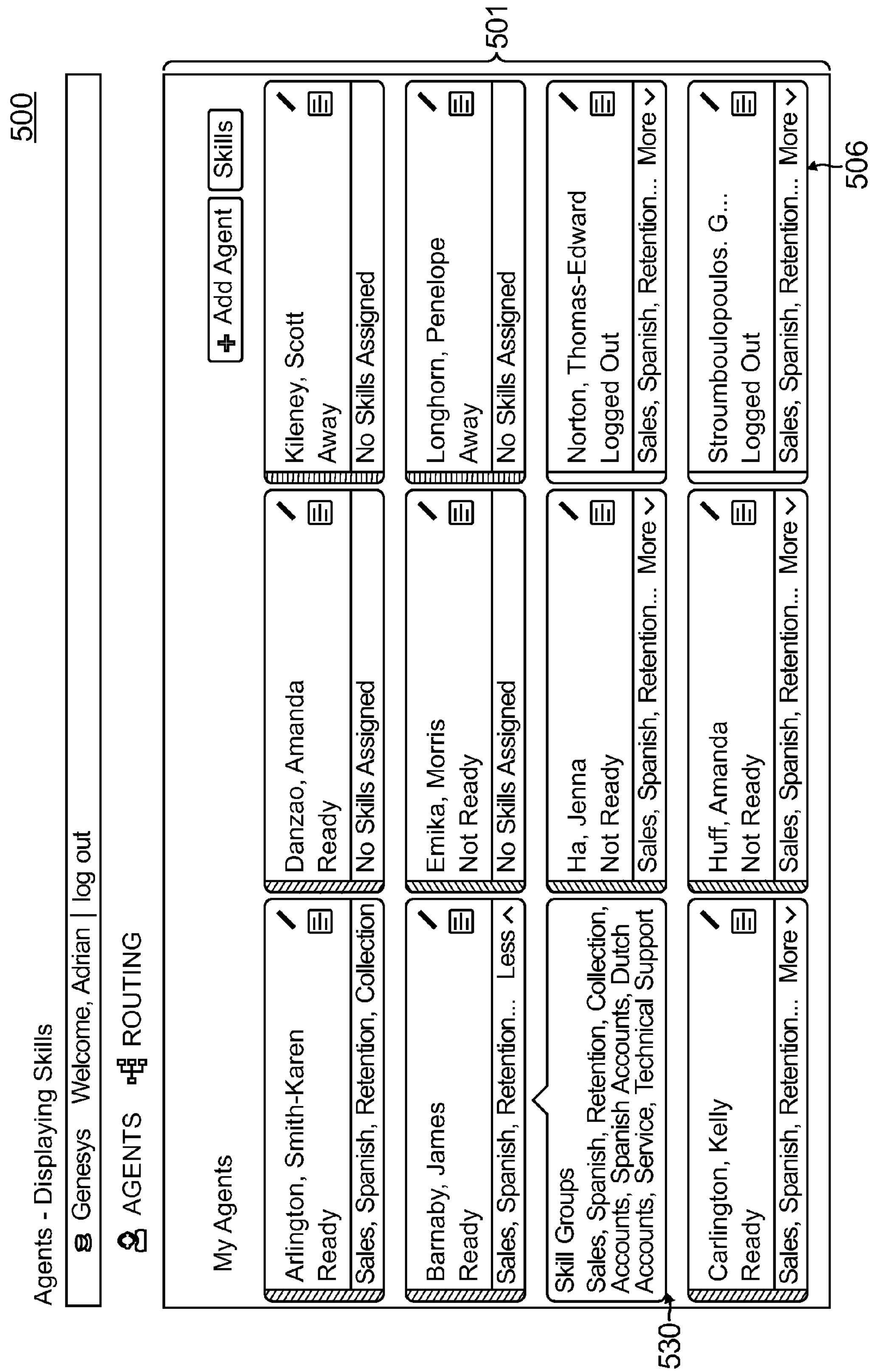

The new agent pop-up window 520 may display the skills that the new agent is tagged with. For example, the tagged skills (or saved skills) 525*a* may be displayed in the selected tags area 528*a*. According to one embodiment, the tagged skill 525*a* may be removed (or disassociated) from the agent information via the tags area 528*a*, for example, by clicking an 'x' icon. As depicted in the embodiment of FIG. 5B, the tags area 528*a* may be replaced with a selected skills area 528*b* which may not only depict tagged skills 525*b*, but also a skill level 527 for each tagged skill. The skill level may be depicted via stars, bars, numbers, text, and/or any other mechanism conventional in the art.

After the new agent is configured, the contact center worker may save the new agent. Referring to the embodiment of FIG. 4, saved agents are displayed in the agent library 501 by agent blocks 506. Once saved, the agent may be used in conjunction with operating the contact center (e.g. for handling interaction events or assigned a role in the routing strategy). According to one embodiment, the information associated with the agent is used during the configuration and operation of the routing strategy of a contact center. For example, the agent's phone number may be used for call routing, or the tagged skills may be used to organize agents into agent groups for processing particular interaction events.

Saved agents may be reconfigured (e.g., their associated information may be edited). According to one embodiment, changes made to the agent information propagate (e.g., dynamically) throughout the contact center's configuration. For example, changing an agent's telephone number may reconfigure (e.g., automatically reconfigure) the contact center to route calls to the changed number, or removing an agent tag may remove (e.g., automatically remove) the agent from an agent group associated with a particular branch of a routing strategy.

According to one embodiment, the contact center worker may edit a particular agent's information by selecting the edit icon 508 of the agent block 506 associated with the particular agent. When the edit icon 508 is selected, an agent edit script of the specialized application 52 may be invoked. The agent edit script may render a pop-up window for editing the information of the agent associated with the particular agent block 506. According to one embodiment, editing the agent's information is performed in manner substantially similar to the operation of adding an agent described above.

The agent blocks 506, according to one embodiment, display information relating to the agents. For example, the agent blocks 506 may display a status of the agent, skills tagged to the agent, contact center metrics, or any other information relevant to the configuration or monitoring of the agents or the contact center.

The status of the agents may be displayed via a status text 512, a color stripe 514, or by any other suitable means. According to one embodiment, the status relates to the status of an agent in an operating contact center (e.g., displays log-in, away, busy, or work load status); however, embodiments are not so limited, and the agent blocks 506 may display the configuration status of an agent (e.g., ready, not ready, or an error).

As described above, the agent blocks 506 may display the skills tagged to an agent. In some instances, however, agents may be tagged with too many skills to efficiently display all of the tagged skills in the each of the agent blocks 506. Accordingly, in one embodiment, the contact center worker may select an icon 510 to request that the agent management UI page 500 display all of the tagged skills for an agent block 506. According to the embodiment of FIG. 6, the specialized application 52 renders a skill group pop-up window 530 to display all of the tagged skills associated with a particular agent block when a contact center worker selects the icon 510.

A contact center worker may view reports associated with a particular worker via the agent management UI page 500. For example, a contact center worker may select the report icon 506 of a particular agent block 506 (or hover over the particular agent block 506 with a cursor) to invoke a report script of the specialized application 52 to render a report relating to the agent associated with the particular agent block 506.

Figure 7:
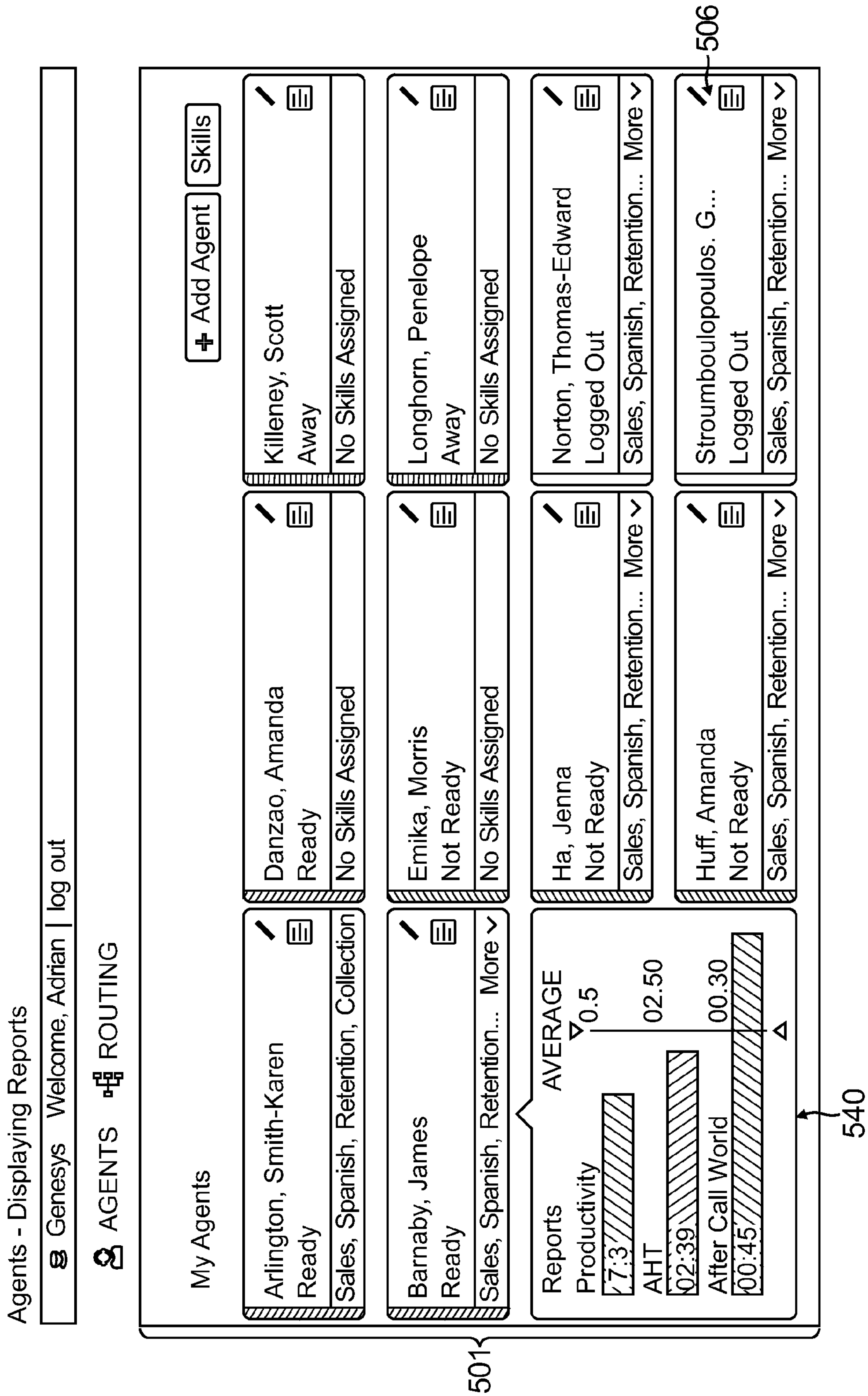

Referring to FIG. 7, according to one embodiment, the report may be displayed in a report pop-up window 540. The report pop-up window 540 may display information relating to the performance of an agent (e.g., a real time report of an agent for an operating contact center; or the historical performance of an agent in the present or another contact center) or may allow the contact center worker to monitor an interaction event presently or previously handled by an agent (e.g., listen in on a call or play back a call). For example, the report may display the productivity, average handling time, after call work time, current call time, call disposition, or any other relevant metric for an agent of a contact center. In one embodiment, the report displays the particular agent's report along with a comparison to the average of all agents, a goal, or a standard.

Information displayed in the report pop-up window 540 may be customizable. For example, a contact center worker may configure which metrics are displayed and in what manner they are displayed. The report pop-up window 540 may be set to display the same set of information for each agent or may be customized for each agent (e.g., customized to display metrics more suitable to a particular agent or type of agent).

According to one embodiment, the report pop-up window displays real-time bubbled-up data of a particular set of metrics that are relevant to enabling efficient (e.g., at-a-glance) communication of the status of the contact center or its agents to the contact center worker. To view more information, or more detailed information, the contact center worker may select the pop-up window 540.

Figure 8:
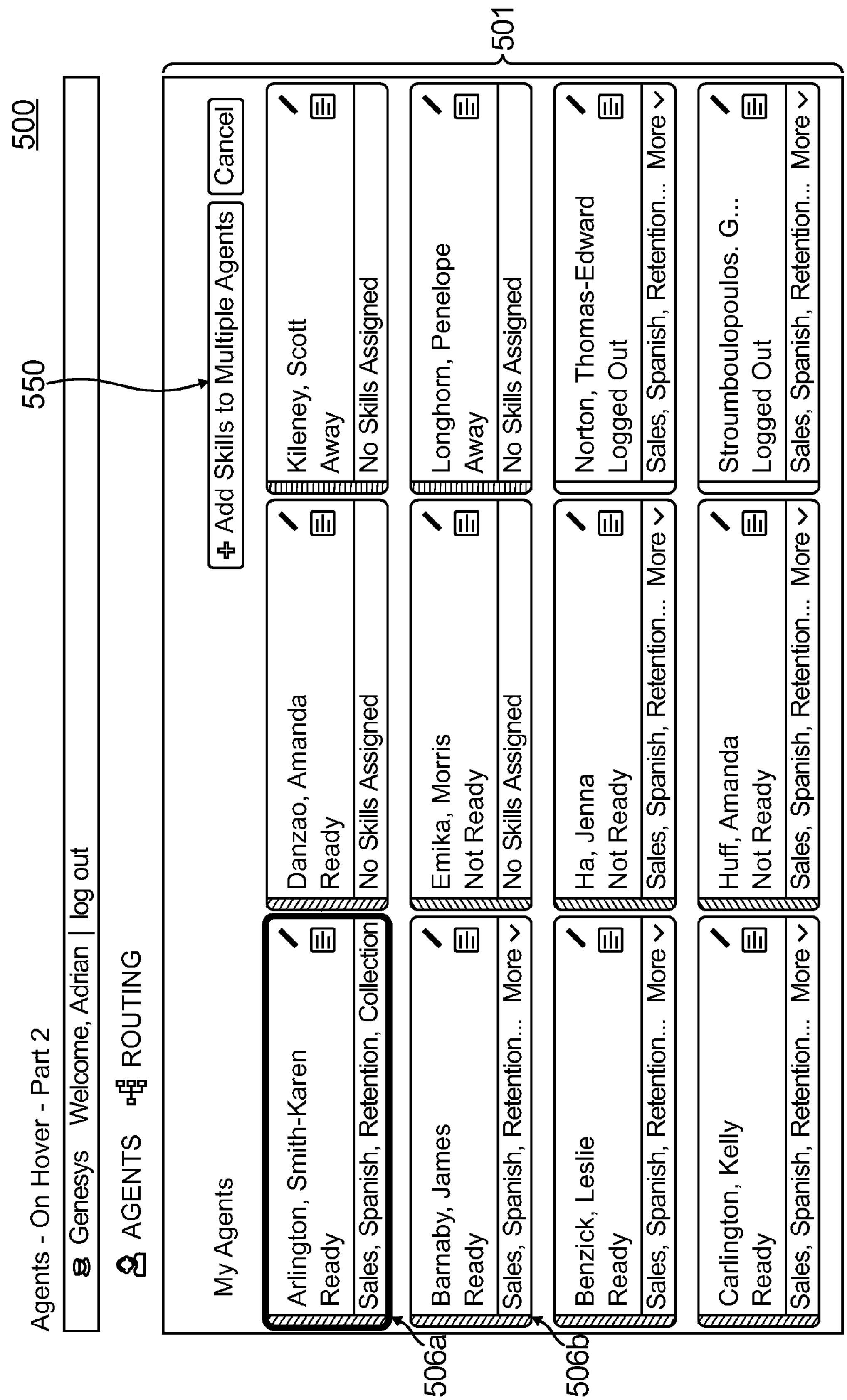

In one embodiment, agents may be configured in aggregate. Referring to FIG. 8, a plurality of agent blocks 506 may be selected for aggregate configuration. The agent management UI page 500 may display the selected agent blocks 506A differently from the non-selected agent blocks 506B to provide a visual aid for aggregate configuration. For example, the opacity of the selected agent blocks 506A versus the non-selected agent blocks 506B may be different to indicate which of the blocks are selected.

According to one embodiment, the contact center worker may add skills to multiple agents by selecting multiple agent blocks, for example, by selecting the add skills to multiple agents option 550. After selecting the add skills to multiple agents option 550, the contact center user may be prompted to select (or enter, create, etc.) skills to tag to the selected agent blocks 506A. Here, the selected skills are associated with each of the agents associated with the selected agent blocks 506A.

As a person of ordinary skill in the art would recognize, embodiments of the present invention are not limited to utilization of the agent management option 204 and agent management UI in an initial configuration of a contact center; instead, the agent management option 204 agent management UI may be utilized at any suitable time, including during operation of the contact center. As such, embodiments of the present invention provide real-time management and configuration of the agents and the contact center (including the routing strategy).

B. Routing Configuration UI

Hereinafter, a routing configuration option 204 and a routing configuration graphical user interface according to one embodiment of the invention are described in connection with FIGS. 9-22.

Figure 9:
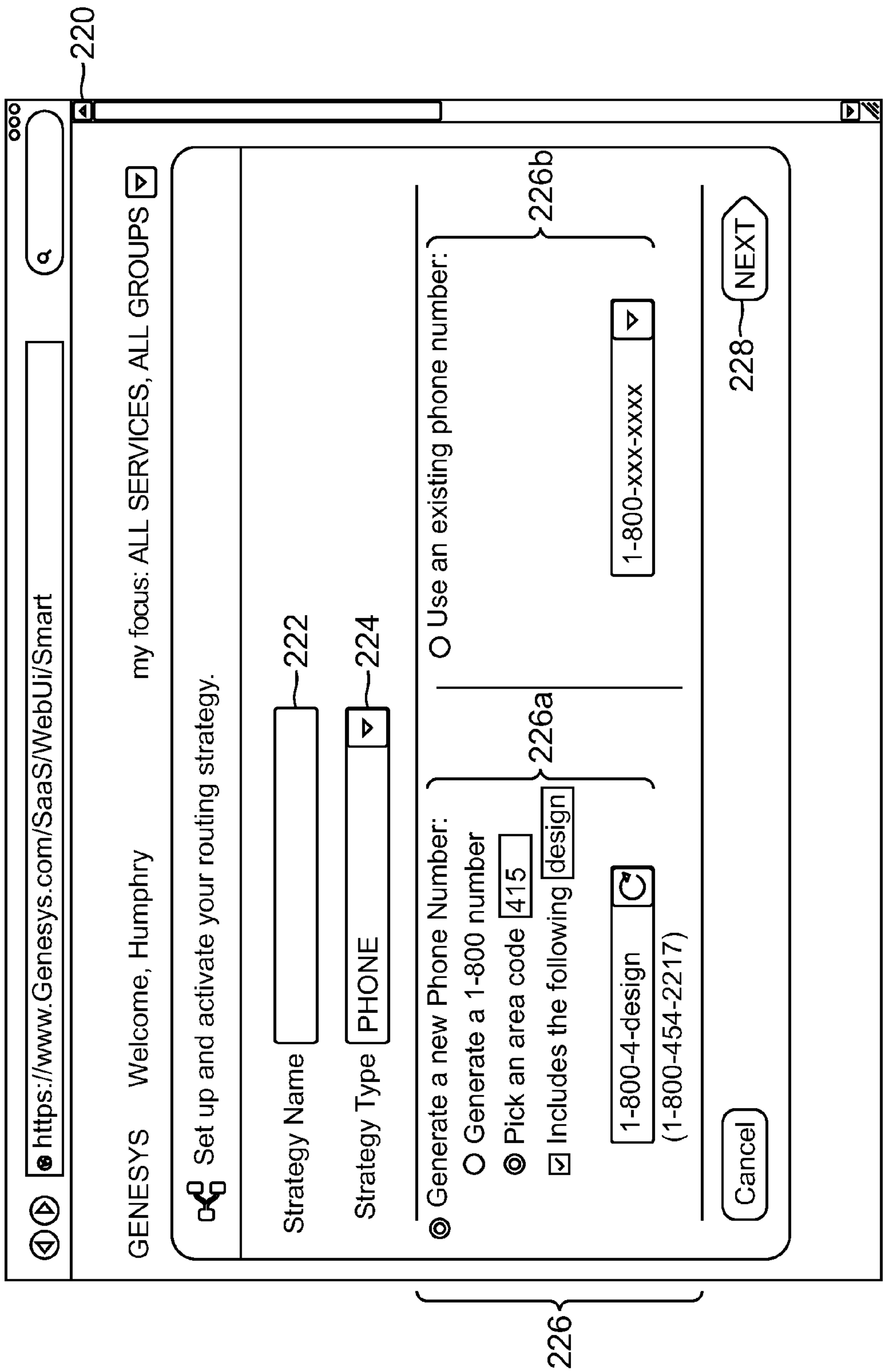
FIG. 9 is a screen shot of a UI page rendered upon selection of a routing configuration option according to one embodiment of the invention.

FIG. 9 is a screen shot of a UI page 220 rendered upon selection of the routing configuration option 204. According to one embodiment the UI page 220 prompts the user for initial routing configuration information, such as a routing name, a routing strategy type, and a contact center phone number. For example, the UI page 220 may display a strategy name entry field 222, a strategy type entry field 224, and a phone number entry field 226 to receive the initial routing configuration information from the contact center worker.

The strategy name entered by the contact center worker, may be used to identify a particular routing strategy and to differentiate the particular routing strategy from other routing strategies. For example, the user may name a first strategy "Main Line" to associate this routing strategy with the main customer service line and to differentiate the routing strategy from that of a preferred customer service line, which may be named "Preferred Line." Additionally, the contact center worker, may select a strategy type (e.g., select from a drop down menu 224). According to one embodiment, the strategy type identifies communications medium (e.g. phone, text chat, voice chat, and the like), for which the routing strategy is being generated. According to one embodiment, the selection of the strategy type changes the default routing templates available for selection. For example, if the phone strategy type is selected, templates associated with call center best practices for telephony routing may be presented to the contact center worker for selection in a subsequent step.

The UI page 220 may display a phone number entry field 226 for the contact center worker to associate a particular phone number with the routing strategy. The phone number is also referred to as a routing point. Routing strategies are configured for specific routing points. In the exemplary embodiment of FIG. 9, the phone number entry field 226 includes a phone number generation field 226A and an existing phone number entry field 226B. Here, the contact center worker may elect to enter a predetermined phone number via the existing phone number entry field 226B, or have a new phone number generated via the phone number generation field 226A. According to one embodiment, the phone number entry field 226 may not be presented when the phone strategy is not selected.

The phone number generation field 226A, according to one embodiment, has entry fields for receiving parameters for the phone number generation. For example, the phone number generation field 226A may have an entry field for selecting a 1-800 number, entering an area code, entering a phrase, and the like. After the parameters are entered, the specialized application 52 may generate a phone number according to the parameters (numbers which are unavailable may be excluded). For example, if a contact center worker enters the area code "415" and the phrase "design," the specialized application 52 may generate the phone number "1-415-4-DESIGN". The generated number may then be associated with the particular routing strategy.

After the initial routing configuration information has been entered, the contact center worker may advance to the routing strategy configuration by, for example, selecting a "NEXT" button 228.

Figure 10:
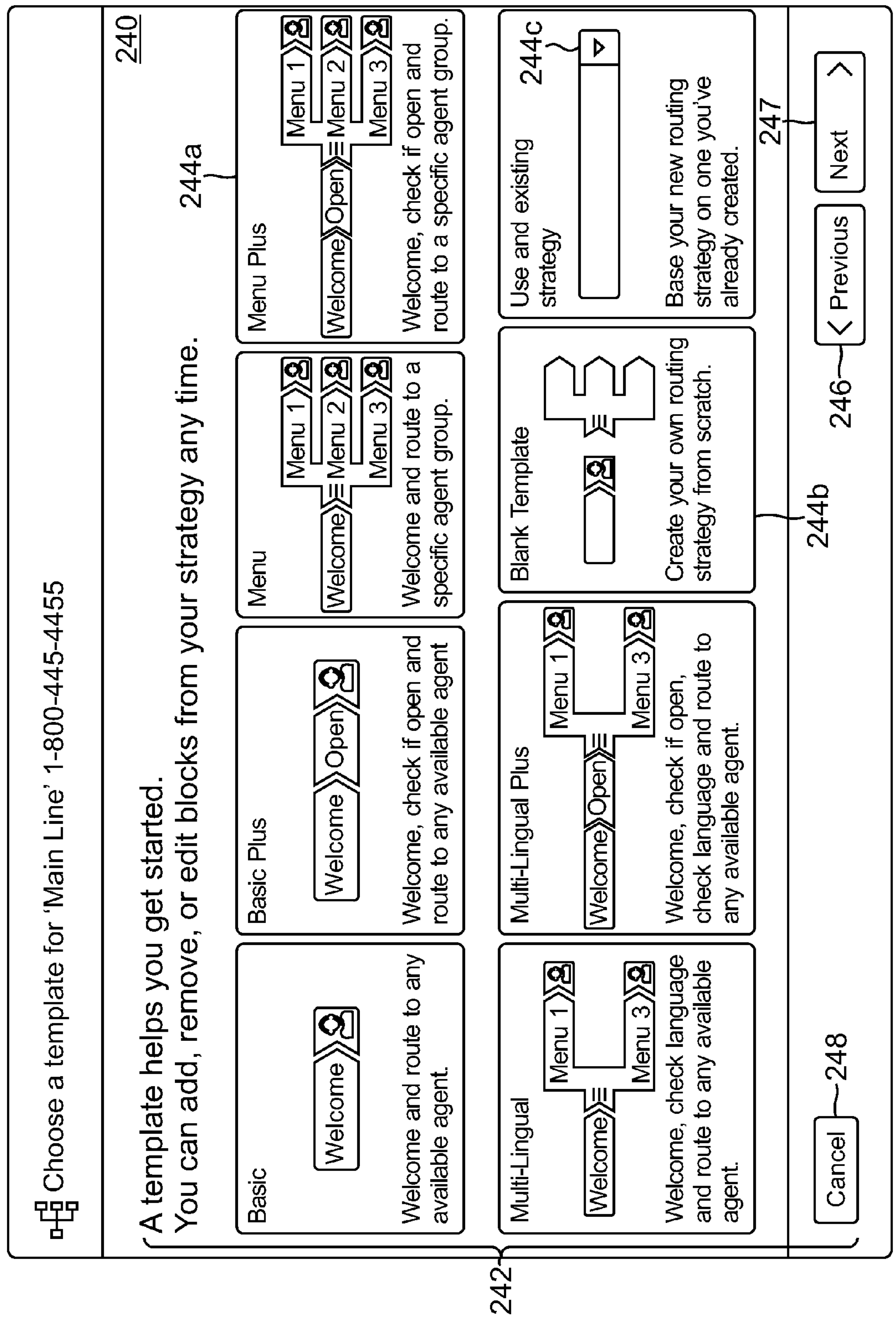
FIG. 10 is a screen shot of a UI page for selecting a routing template for a particular routing strategy identified in FIG. 9 according to one embodiment of the invention.

FIG. 10 is a screen shot of a UI page 240 for selecting a routing template for the particular routing strategy identified in FIG. 9. The UI page 240, according to one embodiment, displays a routing template selection menu 242 that includes a plurality of predefined routing templates for selection by the contact center worker. According to one embodiment, the template selection menu 242 displays predefined routing templates 244A, a blank canvas template 244B, and an existing template 244C (collectively referred to as 244). Each of the predefined routing templates is associated with a predefined routing strategy that is defined via computer program instructions (e.g. SCXML code).

The predefined templates 244A may be standard templates that are preloaded in the specialized application 52. According to one embodiment, the predefined templates 244A correspond to industry best practice routing design. The predefined templates 244A may include a basic template, a basic plus template, a menu template, a menu plus template, a multi-lingual template, and a multi-lingual plus template, but are not limited thereto. Additional predefined templates 244A may be available for selection through a template library; the template library may be an online template library. According to an embodiment of the present invention, the predefined templates may be change-protected, configurable, or a hybrid thereof. For example, a template may include a change-protected parent routing strategy with configurable individual sub-branches included within the parent strategy.

According to one embodiment, the basic template corresponds to a routing strategy including a welcome operation and a route to agent operation; the basic plus template corresponds to a routing strategy including a welcome operation, an hours operation, and a route to agent operation. The menu template corresponds to a routing strategy including a welcome operation, a menu operation, and a route to agent operation. The menu plus template corresponds to a routing strategy including a welcome operation, an hours operation, a menu operation, and a route to agent operation. A multi-lingual template corresponds to a routing strategy including a welcome operation, a language selection operation, and a route to agent operation. The multi-lingual plus template corresponds to a routing strategy including a welcome operation, an hours operation, a language selection operation, and a route to agent operation. Of course, embodiments of the present invention are not limited to these types of operations. Other routing strategy operations will be evident to a person of skill in the art.

According to one embodiment, each predefined template 244A provides a visual representation of the general routing strategy that it represents to clearly and readily communicate that strategy to the contact center worker (e.g., communicate at-a-glance). The contact center worker may select a particular routing template 244 by clicking on the visual representation of the particular routing strategy.

According to one embodiment, the blank canvas template 244B does not correspond to a predefined reporting strategy, but instead, represents an option for the contact center worker to define a custom routing strategy. When the contact center worker selects the blank canvas template 244B, the specialized application 52 may execute a routing strategy editing script. Additionally, when the contact center worker selects the existing template 244C, another UI page or a pop-up menu may be displayed so that the contact center worker can select from previously created routing strategies.

To go back to a previous routing strategy configuration page (e.g., the UI page 220 to change the initial routing configuration information), the contact center worker may select a "PREY" (or previous) button 246. However, to proceed with configuring the routing strategy, a "NEXT" button 247 may be selected. According to one embodiment, when the "NEXT" button 247 is selected, the routing strategy editing script is initialized. If, however, the contact center worker wants to cancel the configuration of the routing strategy, a "CANCEL" button 248 may be selected.

Figure 11:
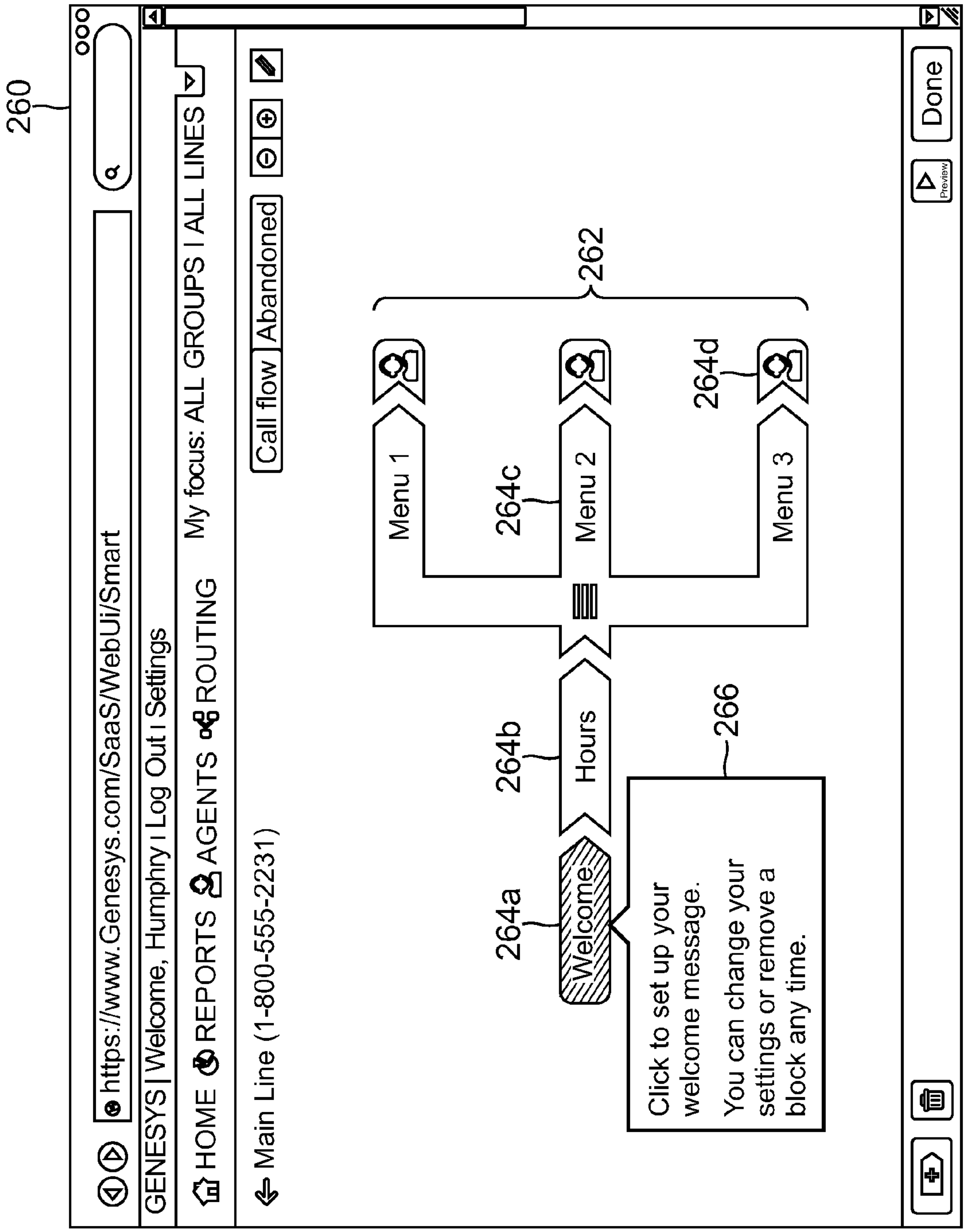
FIG. 11 is a screen shot of a UI page rendered in response to selection of a particular routing template in the UI page of FIG. 10 according to one embodiment of the present invention.

FIG. 11 is a screen shot of a UI page 260 rendered in response to selection of a particular routing template in the UI page 240 (e.g. the menu plus routing template 244A) according to one embodiment of the present invention. The UI page 260 may be generated according to the routing strategy editing script of the specialized application 52.

According to one embodiment, the UI page 260 displays a routing strategy diagram 262 including various configurable blocks 264A-D (collectively referred to as blocks 264). According to an embodiment of the present invention, the blocks 264 visually represent the configurable operations of the routing strategy (or routing logic steps). According to one embodiment, the blocks are laid out intuitively by depicting the flow of an interaction that is to be handled by the routing strategy. In this regard, the routing strategy diagram 262 is configured to give a birds-eye view of the routing strategy to enable a contact center worker (who may not be an expert in contact center routing strategy) to intuitively understand the flow of contact interactions (e.g., phone calls, emails, chat sessions, etc.) through the contact center.

According to one embodiment, the routing strategy diagram 262 resembles a logic tree (or decision tree) without loops or merging of branches. In this regard, the routing strategy diagram may be a simplified flow diagram to provide at-a-glance understanding of the routing strategy. For example, as illustrated in FIG. 11, the blocks 264 may be coupled to each other to indicate how the contact events flow through the contact center and/or to indicate specific treatment of the events via the discrete blocks. Each block may be associated with routing logic that dictates how an interaction is to be managed. The routing logic may require input parameters (e.g. identification of a specific media file to play). Once provided, such input parameters may be stored as separate metadata associated with the routing strategy to be retrieved at run-time when the routing strategy is executed. Alternatively, the parameters may be stored in the routing strategy as static parameters. According to some embodiments, the routing strategy diagram includes loops and/or merged branches.

According to one embodiment, the blocks 264 may include start blocks 264A, intermediate blocks 264B, branch blocks 264C, end blocks 264D, and the like. However, a person of ordinary skill in the art should realize that embodiments of the present invention are not limited to the blocks or template block structures defined herein, but may include numerous other blocks or block structures suitable for use in a contact center routing strategy. For example, embodiments of the present invention may include merging blocks or loop blocks, or may include block structures of a predefined or arbitrary length.

A start block 264A may represent a first operation executed by the corresponding routing strategy when a new contact interaction begins (e.g., when a new call is received). An example of a start block 264A is a welcome block. According to one embodiment, the start block 264A is coupled to at least one other block 264, which represents a next operation to be executed in the particular routing strategy of the call center. For example, in the embodiment illustrated in FIG. 11, the welcome block is coupled to an hours block. Additionally, as shown in FIG. 11, the start block 264A (or any other block 264) may indicate the direction of the routing flow (e.g., by an arrow).

The intermediate block 264B may represent an intermediate operation of the contact center routing strategy, e.g., an operation executed in-between the start block 264A and the end block 264D. Examples of an intermediate block 264B include, without limitation, an hour block, a message block, a hold block, and the like. According to one embodiment, the intermediate block 264B is coupled to at least two other blocks 264 (e.g., the previous and subsequent blocks in the routing strategy). For example, in the embodiment of FIG. 11, the hours block is coupled between the welcome block and the menu block.

A branch block 264C may represent a branch operation of the contact center routing strategy. The branch operation, according to one embodiment, includes a decision operation (or a path selection operation), where an end user 14 (or other entity), is presented with at least two options for selection, and the routing path changes according to the option that is selected by a customer. Examples of a branch block 264C include, without limitation, a menu block, a language block, a department selection block, a support selection block, a skill selection block, and the like. According to one embodiment, and as shown in FIG. 11, the branch block 264C is visually represented by a branch and is coupled to a previous block and at least two subsequent blocks in the routing strategy. For example, in the embodiment of FIG. 11, an input to the menu block is coupled to the hours block. The menu block has three branches (Menu 1, Menu 2, and Menu 3), and the output of each branch is coupled to a route to an agent block.

An end block 264D represents an operation that terminates a particular interaction flow. Examples of end blocks 264D include, without limitation, a route to agent block, a route transfer block, a route to message block, a voicemail block, an end interaction block, and the like. According to one embodiment, the end block 264D is coupled to at least one previous block. For example, in the embodiment of FIG. 11, the route-to-agent blocks are each coupled to one of the outputs of the menu block.

As described above, each of the blocks 264 represent a particular operation of the routing strategy, and when coupled together in a particular order to form the routing strategy diagram 262, they visually represent and efficiently communicate (e.g. at-a-glance) the routing strategy (or interaction flow) that is used for this particular route point. Not only does this visual representation aid the contact center worker in understanding the final (e.g., implemented) routing strategy of the contact center, but also, it aids in the configuration and build process of a particular routing strategy.

While, according to one embodiment, a routing template 244 selected from the UI page 240 may be preconfigured with default parameters to enable out-of-the-box setup of a contact center, aspects of the present invention provide for further configuration and customization of the routing strategy. This may be communicated to the contact center worker by, for example, displaying a pop-up window 266 inviting the contact center worker to configure parameters of the blocks 264 or add/remove/move blocks 264.

According to one embodiment, the contact center worker may configure (e.g., input parameters of) a particular block 264 by selecting (e.g., clicking on) the particular block in the routing strategy diagram 262. By visually displaying the routing strategy as an association of blocks 262, the contact center user may easily determine where the block is in relation to the overall routing strategy, which aids in the block configuration process.

According to one embodiment, another UI page is rendered upon selection of one of the blocks 264 enabling the contact center worker to input the parameters associated with the selected block 264. The parameters serve as input to the corresponding portion of the routing strategy which, according to one embodiment, is implemented via SCXML code. Examples of configuring particular blocks 264, according to one embodiment, are described hereafter in connection with FIGS. 12-16.

Figure 12:
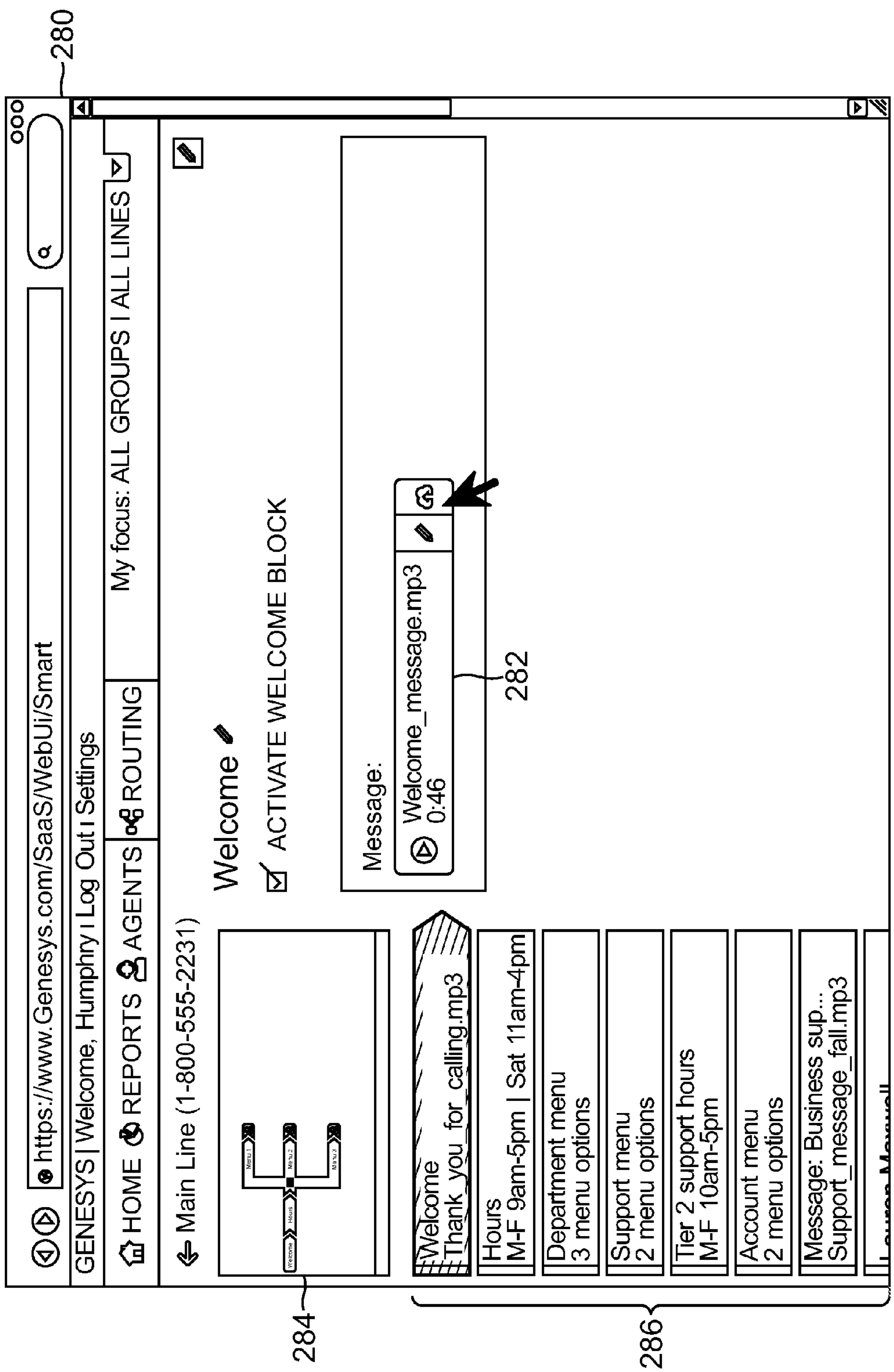
FIG. 12 is a screen shot of a UI page rendered upon selection of a welcome block in the UI page of FIG. 11 according to one embodiment of the invention.

FIG. 12 is a screen shot of a UI page 280 rendered upon selection of the welcome block of FIG. 11 according to one embodiment of the invention. The UI page 280 displays the parameters associated with the welcome block prompts the contact center worker to configure the parameters by providing appropriate configuration data (e.g. numeric values, links to media files, etc.). For example, in the embodiment shown in FIG. 12, the contact center worker may configure the welcome message that is played to a customer calling into the contact center. The welcome message may be configured via a message configuration field 282. According to one embodiment, the message configuration field includes a playback function, a text-to-speech function, and a message selection function. The playback function, when selected, plays back the message currently associated with the welcome block (e.g., a greeting and an identification of the company). The text-to-speech function, when selected, may enable entry of text that is used to generate the message via a text-to-speech operation. The message selection function may enable the contact center worker to select an existing message file or to create a new message.

Figure 13:
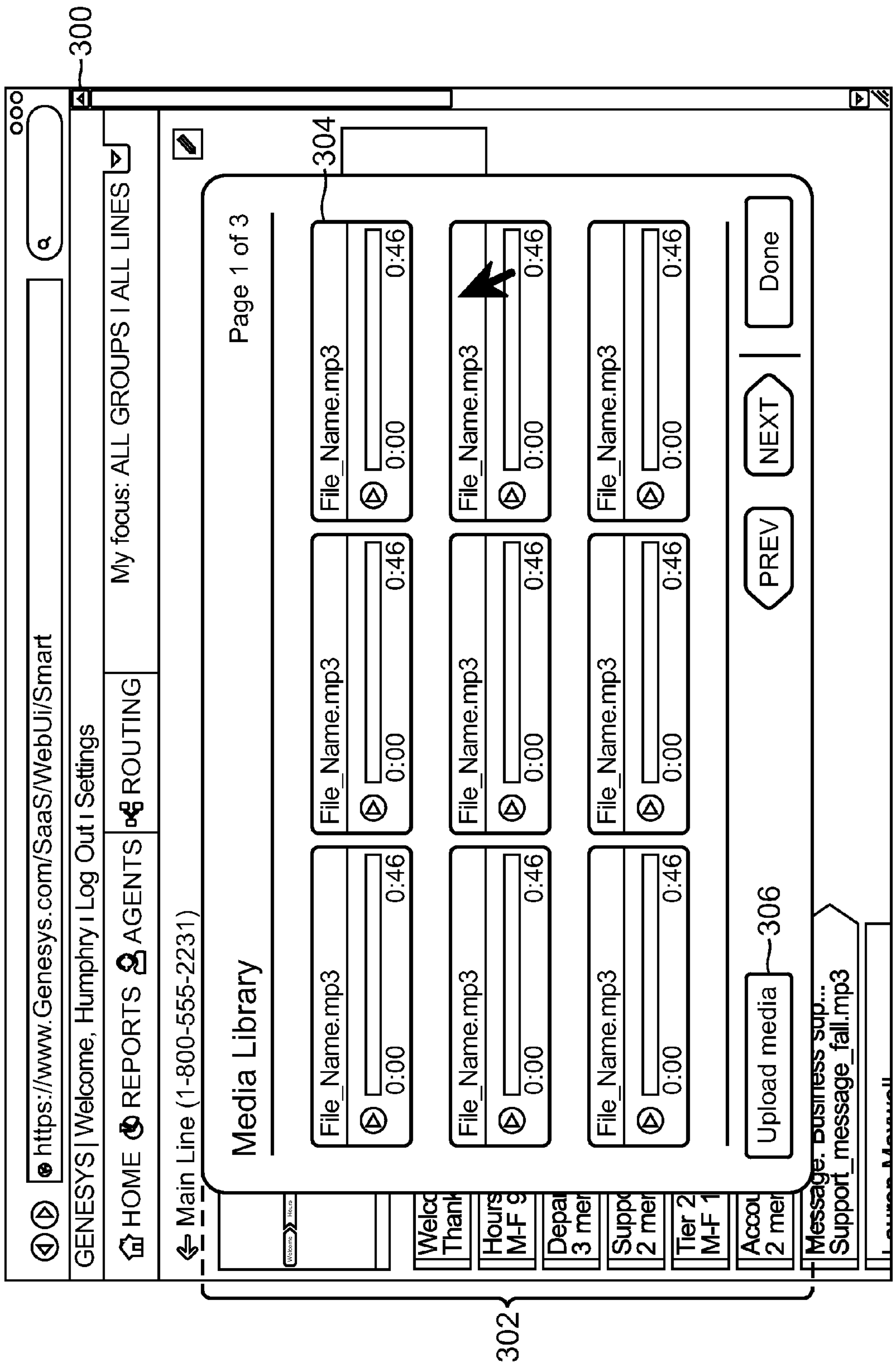
FIG. 13 is a screen shot of a UI page rendered upon selection of a message selection function in the UI page of FIG. 12 according to one embodiment of the invention.

According to one embodiment, when the message selection function is selected, a UI page 300 is rendered for the selection of the message, as shown in FIG. 13. The UI page 300 may display a media library 302 including a plurality of media files 304 for selection as the welcome message. Additionally, the contact center worker may have the option of uploading another media file to the media library 302 (for current or later selection). According to one embodiment, the media files 304 of the media library 302 are saved to and retrieved from the media server 46.

Referring again to FIG. 12, once the parameters for the selected block (e.g. the welcome block) are configured, the contact center worker may proceed to configure another block. The contact center user may select the next block for configuration by, for example, returning to the UI page 260 displaying the flow diagram 262 (e.g., by selecting a thumbnail display of the flow diagram 284) and clicking on a block 264, or by selecting a block from the block configuration tab 286. The block configuration tab 286 may highlight the currently selected block.

Figure 14:
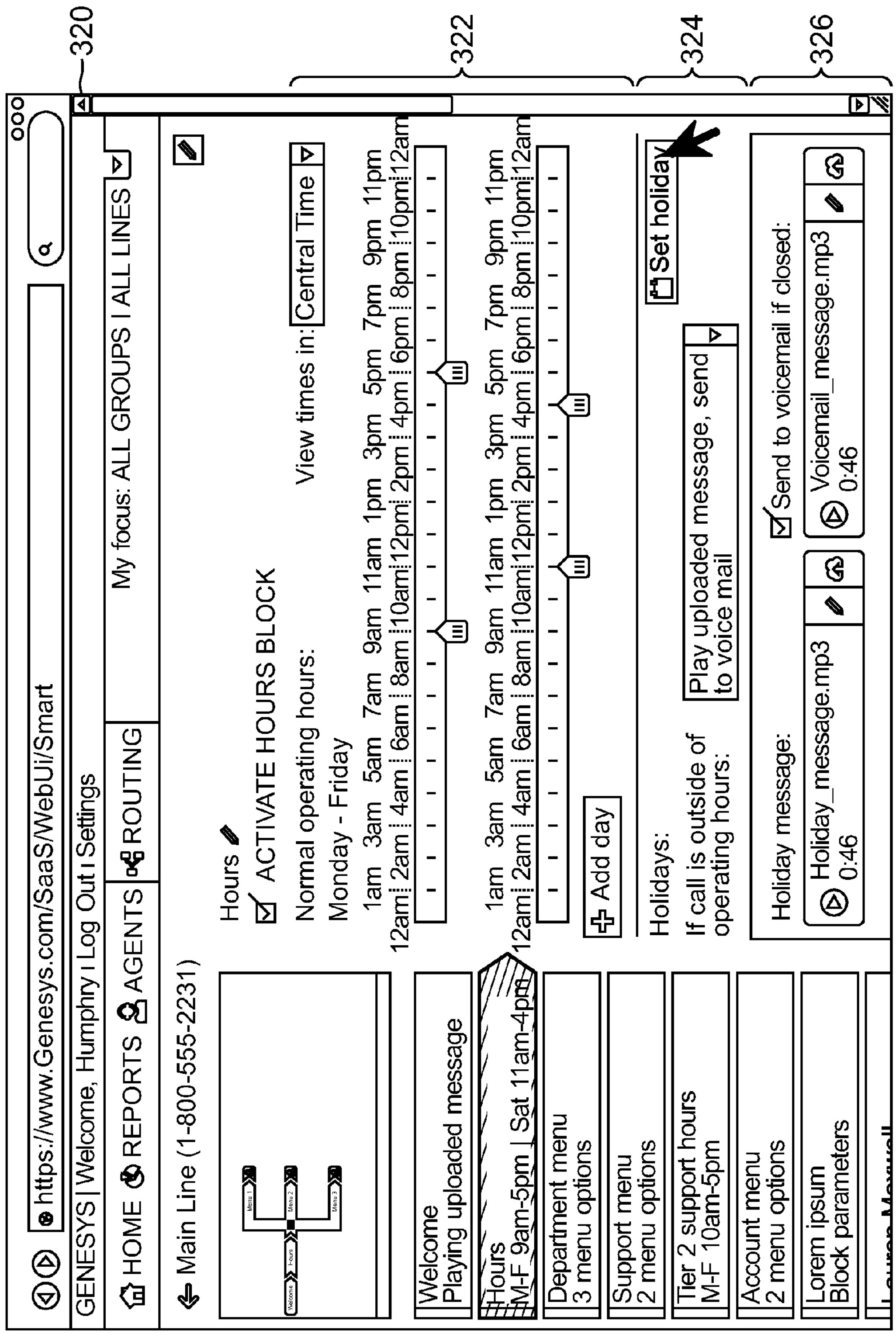
FIG. 14 is a screen shot of a UI page rendered upon selection of an hours block according to one embodiment of the invention.

FIG. 14 is a screen shot of a UI page 320 rendered upon selection of the hours block, according to one embodiment of the invention. The UI page 320 displays the parameters associated with the hours block that are available for configuration. According to one embodiment, the hours block represents an hours of operation function, which performs different operations according to a time and date of the interaction. For example, if an end user 14 calls during the normal operating hours, the hours block is associated with logic which checks that it is normal operating hours, and invokes the routing logic associated with the next block(s) of the routing flow. The next block(s) may cause the call to be routed, for example, to a media server which may provide different menu options for the user to select. If the end user 14 calls on a holiday, the routing logic checks that it is indeed a holiday and may forward the call to the media server to play a specific message (e.g. a holiday message), or request that the user leave a message for a later call back. To this end, the hours block may have a normal hours input field 322, a holiday input field 324, and a message input field 326.

According to one embodiment, the normal hours input field 322 includes sliders which allow the contact center worker to select a time frame of the normal hours of operation. Different sliding bars may be associated with different days of the week. The holiday input field 324 may enable a contact center worker to enter holidays, for example, by selecting days on a calendar. The message input field 326 may allow a contact center worker to configure a message to be played when an interaction occurs outside the normal hours of operation or on a holiday. The messages may be selected from the media library 302.

Figure 15:
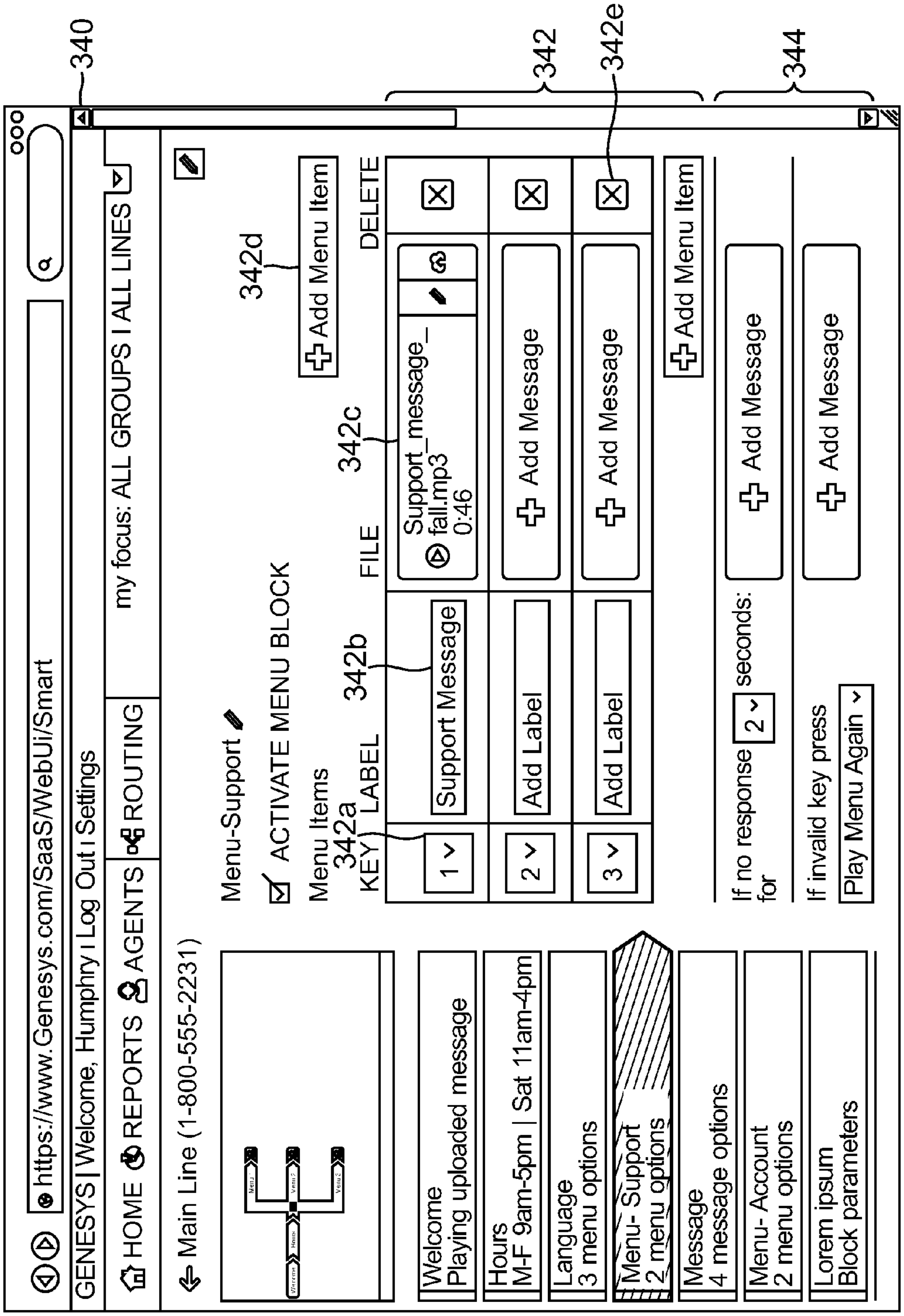
FIG. 15 is a screen shot of a UI page rendered upon selection of a menu block for configuration, according to one embodiment of the invention.

FIG. 15 is a screen shot of a UI page 340 rendered upon selection of the menu block for configuration, according to one embodiment. The UI page 340 may allow for the creation of menu items and menu operations. The UI page 340 of FIG. 15 includes a menu creation field 342 and a contingency field 344.

The menu creation field 342 may include a key sub-field 342A, a label sub-field 342B, a file sub-field 342C, an add menu item button 342D, and a delete menu item button 342E. The key sub-field 342A is for defining the association of a menu item with a key entry (e.g., on a touch-tone phone). The label sub-field 342B is for naming each menu item. The file sub-field 342 is for the selection of a media file associated with the menu item (e.g., a message describing the menu item). The media file may be selected from the media library 302 or entered as text-to-speech. The add menu item button 342D and the delete menu item button 342E enable the addition or deletion of menu item fields. According to one embodiment, by adding or deleting menu items, the menu block shown in the routing strategy diagram 262 includes more or fewer branches.

According to one embodiment, the contingency field 344 enables configuration of contingency events if for example, no menu item or an invalid menu item is selected.

While the above description is in relation to a menu block, a person skilled in the art should recognize that aspects of the menu block are relevant to other branch blocks 264C, for example, a language block (for selecting a language), a business division block (for selecting which division of a business the interaction is related to), an account block (for selecting which account the interaction is related to), and the like.

Figure 16:
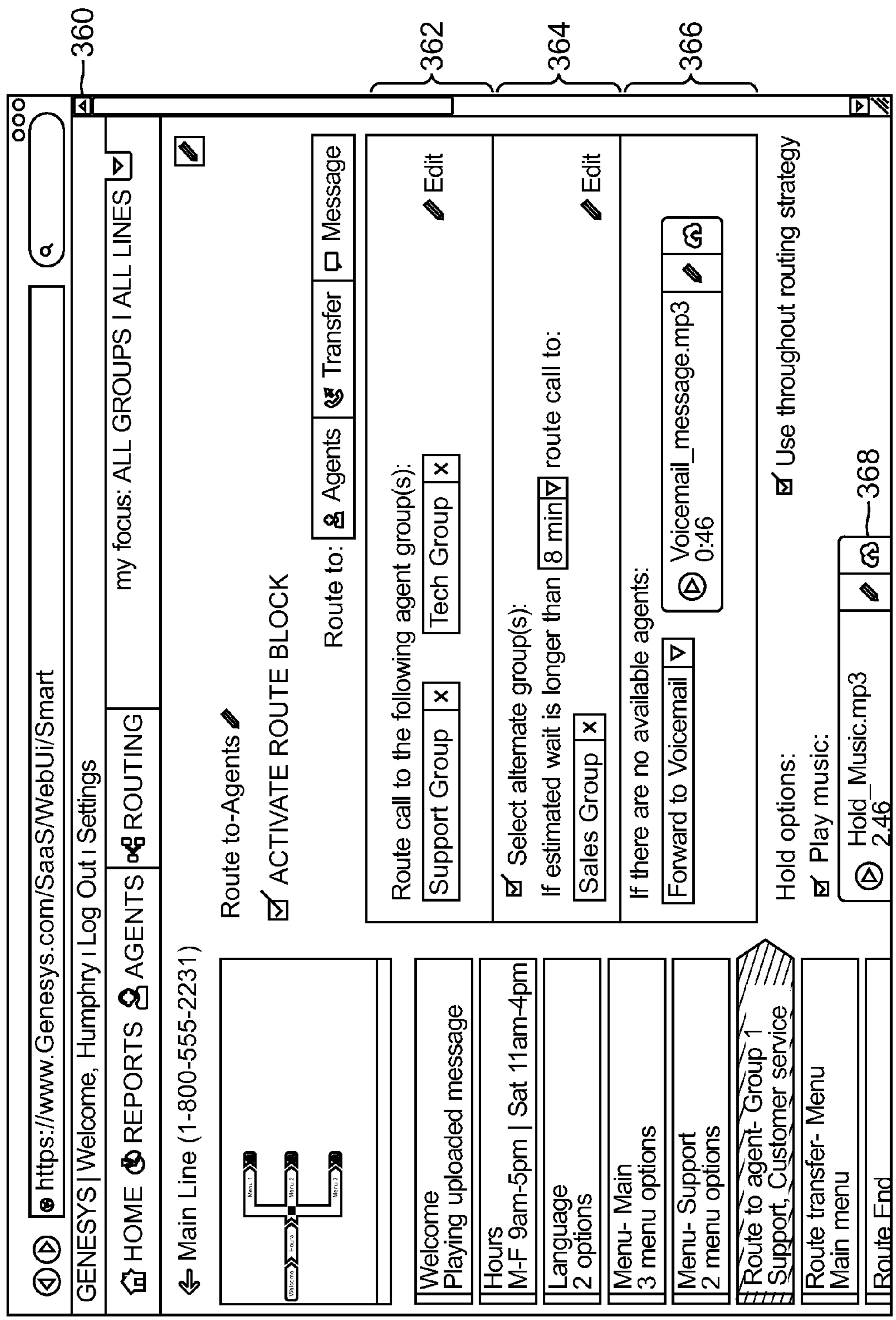
FIG. 16 is a screen shot of a UI page rendered upon selection of a route to agent block according to one embodiment of the invention.
Figure 17:
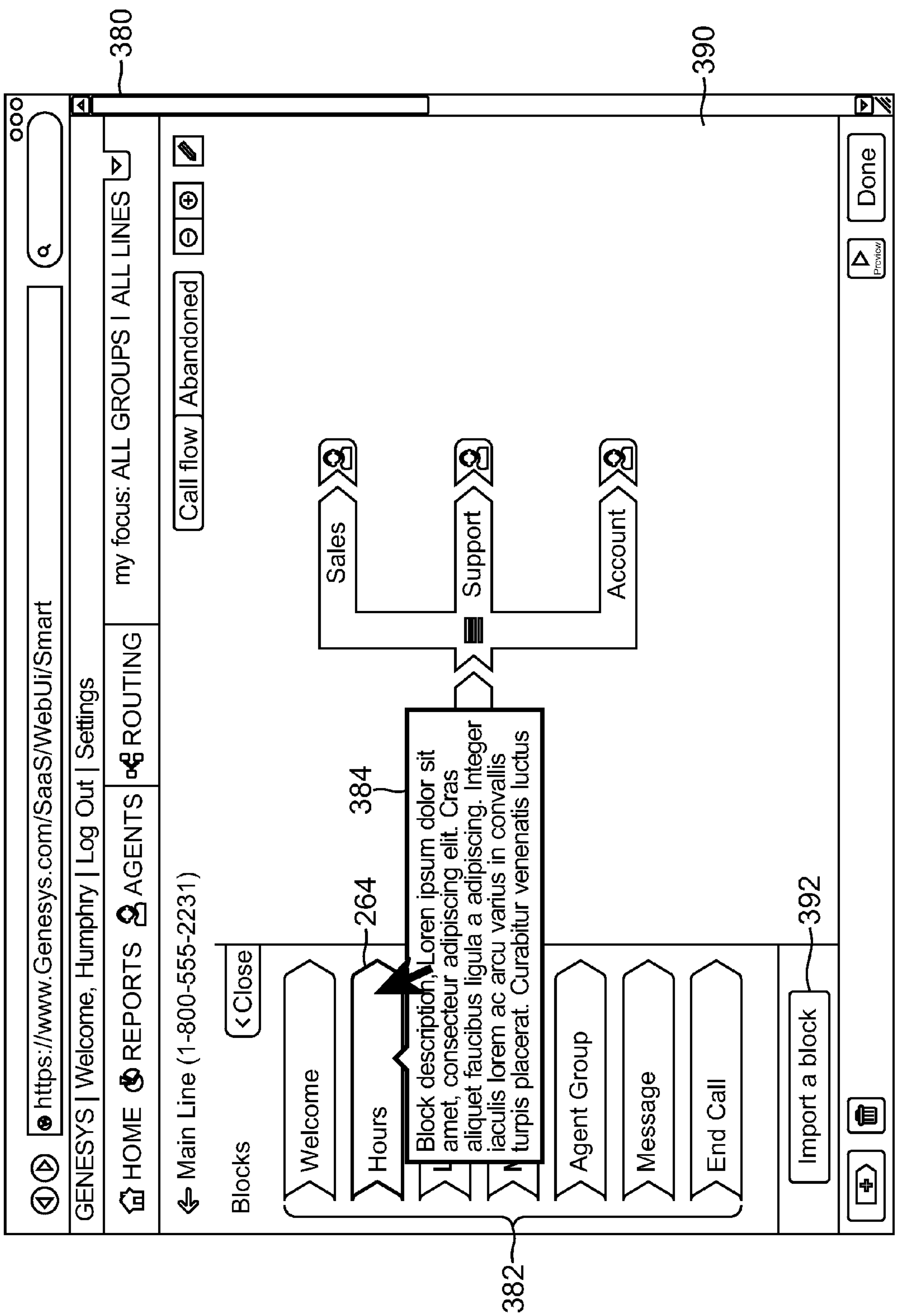
FIGS. 17-20 are screen shots of a UI page rendered by a specialized application for composing a routing strategy according to one embodiment of the invention.

FIG. 16 is a screen shot of a UI page 360 rendered upon selection of a route to agent block according to one embodiment. The UI page 360 in FIG. 16 includes a main agent group field 362, an alternative agent group field 364, a contingency field 366, and a hold option field 368. According to one embodiment, the main agent group field 362 identifies one or more agent groups (or skill groups) to which the interaction is to be routed. The groups (e.g., skill groups) available for selection may correspond to the groups created in the agent configuration operation 202. For example, if "tech group" is selected, the routing strategy causes the interaction to be routed to an agent having a "tech" skill set.

According to one embodiment, a group associated with the alternative agent group field 364 is a backup or alternative agent group. According to one embodiment, the preferred agent group is the agent group that the routing logic first attempts to route the interaction (e.g., a call) to, and the alternative agent group is the backup group to route to if a definable condition (e.g., estimated wait time longer than a set amount) occurs.

The contact center worker may configure a contingency option with the contingency field 366 to define an operation to be executed if no agents are available (e.g., forward to voicemail, route transfer, etc.). The contact center worker may also configure hold music (e.g., by selection from the media library 302).

While the above description relates to a route to agent block, a person of ordinary skill in the art should recognize that aspects of configuring the route to agent block are applicable to other end blocks 264D, for example, a route transfer block (for sending the interaction to another routing strategy), a route to voicemail block (for sending a call to a voicemail box), and the like. In the example of a route transfer block, a user may select a particular routing strategy, agents associated with a particular menu item provided in a main menu, telephone number, and the like. The user may also identify the message and/or music that is to be played while the call is being transferred.

In addition to configuring the parameters of the blocks 264 of the routing strategy, according to one embodiment, the routing strategy itself may be configured (or built e.g., from the blank template 244B). Additionally, because the routing strategy may be displayed in the simplified birds-eye-view, the contact center worker is aided by being able to intuitively understand the flow of interactions through the contact center when configuring (or designing) the routing strategy.

FIGS. 17-20 are screen shots of a UI page 380 rendered by the specialized application 52 for composing a routing strategy for managing inbound interactions to the contact center according to one embodiment. A contact center worker may compose the routing strategy from scratch, or based on a preset template. In this regard, the UI page 380 may display a block toolbar area 382. In the illustrated embodiment, the block toolbar area 382 includes a plurality of blocks 264 available for use in defining the routing strategy for the contact center and building the routing strategy diagram 262 (FIG. 11). The blocks 264 in the block toolbar area 382 may correspond to basic building blocks of routing strategies according to best practices. According to the embodiment of FIG. 17, when a contact center worker hovers a cursor over a block 264 in the block toolbar area 382, a description of the block is displayed, for example, in a pop-up window.

Figure 18:
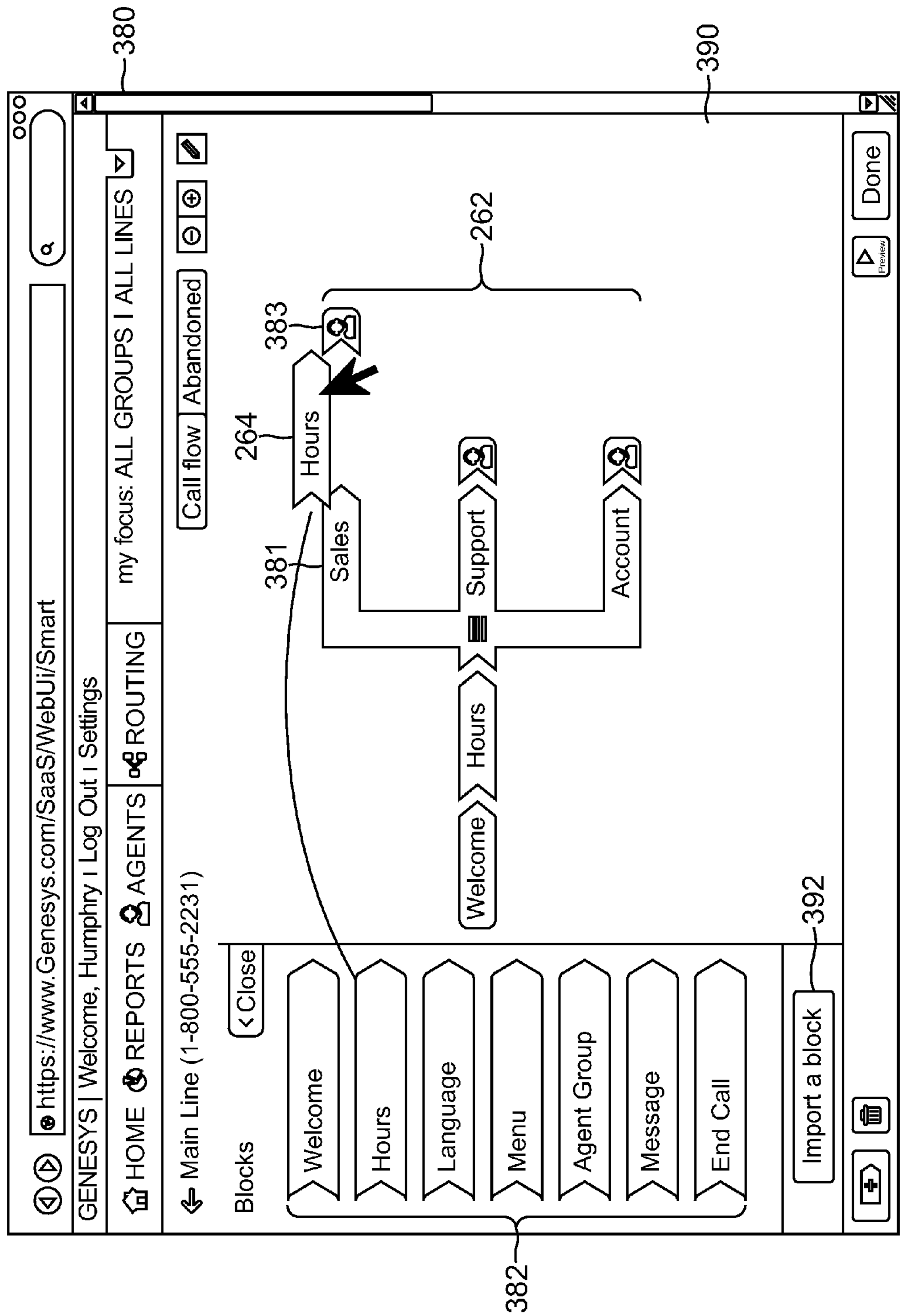

An aspect of the present invention provides for visual configuration of a routing strategy using the routing strategy diagram 262 and blocks 264. According to one embodiment, the flow and logic of the routing strategy is defined by the blocks, and the location of those blocks relative to one another. In composing a routing strategy from scratch, an administrator selects an appropriate block from the block toolbar area 382 that is to provide a desired treatment for an interaction, and further identifies a location on a workspace area 390 where the selected block should be inserted relative to other blocks that may already be positioned in the workspace area. The identification of the location where the selected block should be inserted may be done via any conventional mechanism in the art, such as, for example, a click and drag mechanism. According to one embodiment, a user may import a block from an external source upon actuating an "import" option 392 (FIG. 18). The imported block appears in the block toolbar area 382 and is available for being selected by the administrator in building a routing strategy.

FIG. 18 is a screen shot of a UI depicting the building of a routing strategy via a drag-and-drop mechanism according to one embodiment of the invention. In the embodiment of FIG. 18, a contact center worker drags and drops a block 264 from the block toolbar area 382 into a particular location in the routing strategy diagram 262 displayed in the workspace area 390. In response to dropping the block at a particular location relative to other pre-existing blocks in the workspace area, the specialized application is configured to rearrange/reorganize the pre-existing blocks to allow the placement of the selected block 264 in the identified location where the block was dropped. A selected block may be dropped before, after, or in-between existing blocks. A selected block may also be dropped on top of an existing block to indicate that the existing block is to be replaced. The routing strategy is modified based on the placement of the block 264. For example, in the embodiment of FIG. 18, by placing another hours block 264 in-between the sales branch 381 of the menu block and the route to agent block 383, the routing strategy is modified (relative to the routing strategy without such a block) to execute a logic of checking hours of operation after taking the sales branch of the menu selection. In addition to adding blocks 264 from the block toolbar 382, blocks 264 currently in the routing strategy diagram 262 may be moved or removed according to any conventional mechanism in the art.

Additionally, the specialized application 52 may include automated graphical layout optimization. For example, after the contact center worker creates a routing strategy in the workspace area 390, the specialized application 52 may rearrange/reorganize the blocks 264 in the workspace are 390 so that the blocks are optimally arranged for the configured routing strategy. The automated graphical optimization may arrange the routing strategy into sub-sections that may be zoomed in or out or expanded or collapsed.

According to an embodiment of the present invention, the specialized application 52 may indicate issues (or errors) during the building of a routing strategy (e.g., at initial setup or reconfiguration). Issues in the routing strategy may arise, for example, when there are orphaned blocks, improperly coupled blocks, parameter issues, anticipated operational issues, and/or the like. Additionally, the specialized application 52 may detect coverage gaps (i.e., a subsequent block does not include the full range of outputs from a previous block), superfluous branches (i.e., branches that are supposed to process values that are outside of output scope from previous block), or endless loops. In this regard, the specialized application is configured to apply one or more rules in allowing the addition, deletion, and/or reordering of blocks in the workspace area.

Figure 19:
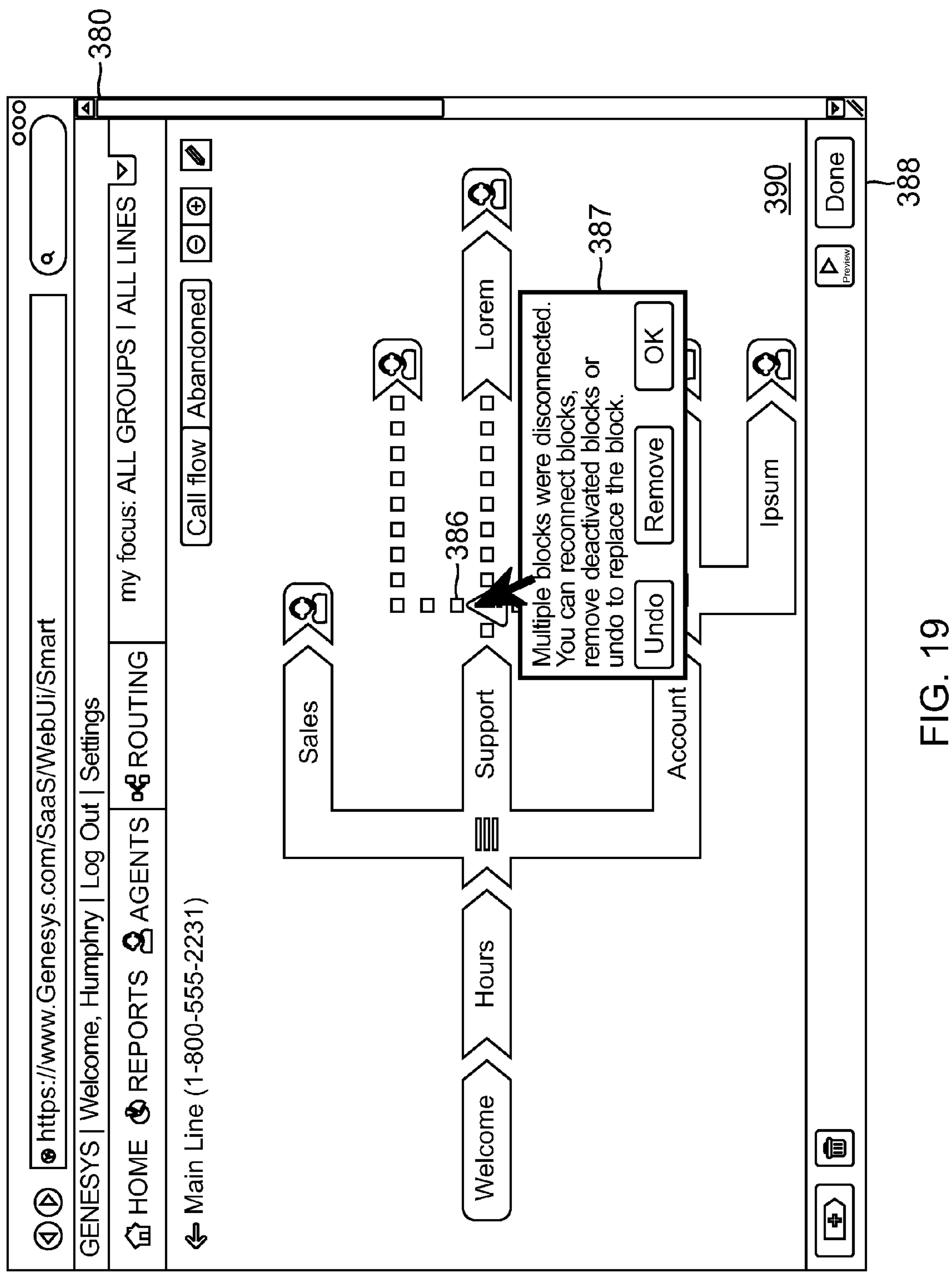

FIG. 19 is a screen shot of a UI for efficiently communicating the existence of an error via the routing strategy diagram 262 according to one embodiment of the invention. For example, a block 264 of the routing strategy may be displayed in a particular color (e.g., red or yellow) when there is a connection error, a parameter error, or an operation error associated with the block 264. The identification of the error may be based upon the application of the one or more rules by the specialized application. As another example, an icon 386 may be displayed indicating an error in the routing strategy, and a pop-up window 387 may be displayed describing the error. For example, as shown in FIG. 19, the icon 386 and the pop-up window 387 display an alert that there are orphaned blocks (e.g., disconnected blocks).

Additionally, according to one embodiment, the specialized application 52 may suggest a solution to the indicated error. For example, the pop-up window 387 may suggest removing an orphaned block.

After the routing strategy is configured, the routing strategy may be saved by selecting, for example, the "Done" button 388. According to one embodiment, actuation of the "Done" option causes the specialized application to generate a routing strategy based on the blocks in the workspace area and the location of those blocks relative to each other. According to one embodiment, each block causes a portion of the routing strategy to be generated. This may be done, for example, by using a JSON (JavaScript Object notation) for each block which provides a definition for generating the SCXML code. According to one embodiment, all or some of the parameters defined for a particular block are stored in a separate metadata file associated with the routing strategy. The separate metadata file is retrieved at run-time when the routing strategy is executed in response to an interaction with the contact center. All or some of the parameters may also be stored in the routing strategy as static parameters.

In addition to generating and storing the routing strategy, the layout of the blocks in the workspace area is also stored as a routing diagram for later retrieval and display. By displaying the layout of the blocks as a routing diagram, a user may easily visualize the routing strategy that it represents.

Figure 20:
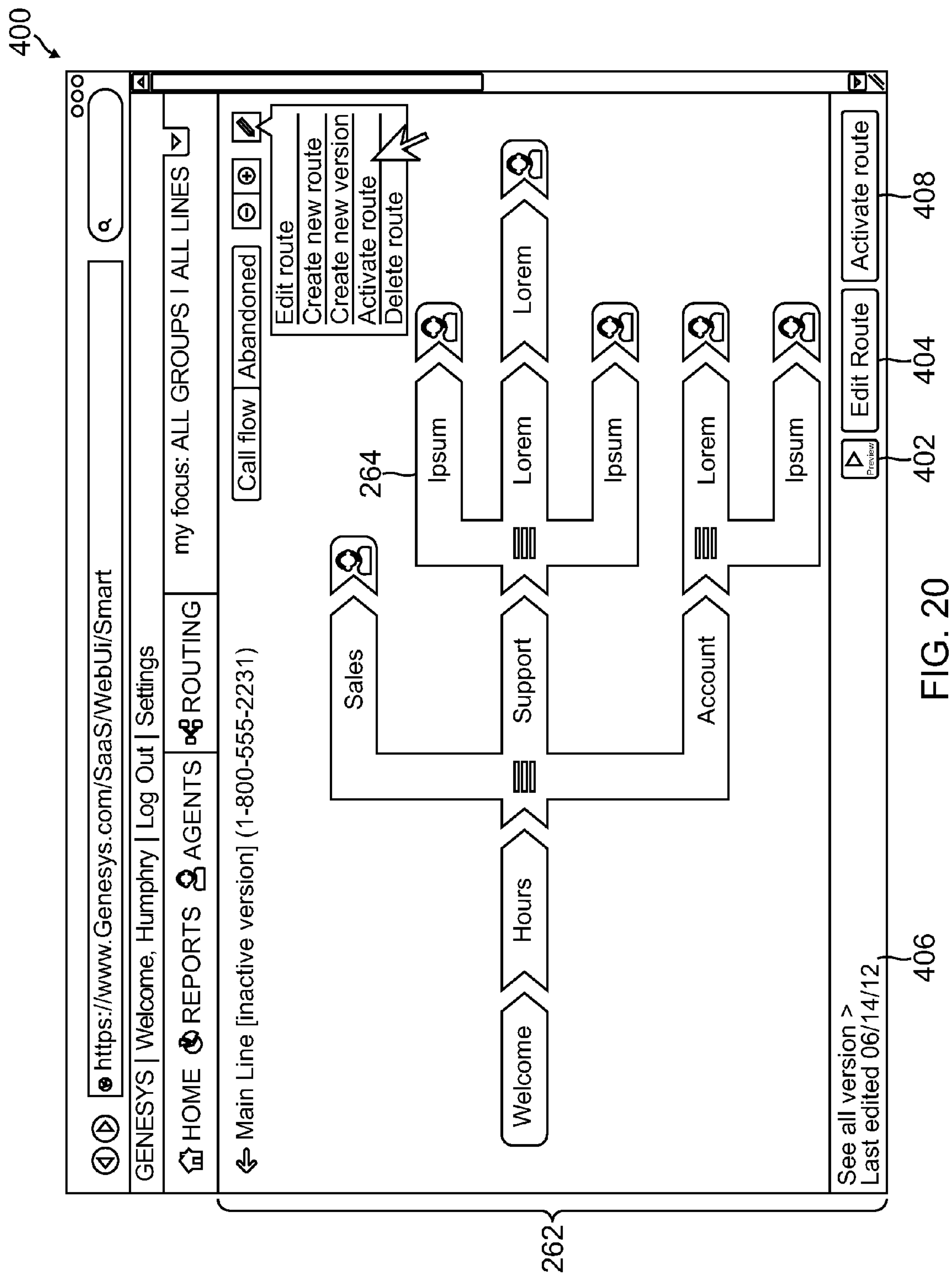

FIG. 20 is a screen shot of a UI page 400 rendered by the specialized application after the routing strategy is configured and saved according to one embodiment of the invention. The UI page 400 displays the configured routing strategy 262 including the blocks 264 as the birds-eye-view of the interaction flow. Additionally, the UI page 400 may include a "Preview" button 402 to preview the operation of the routing strategy and a link 406 to see all versions of the routing strategy.

Figure 21:
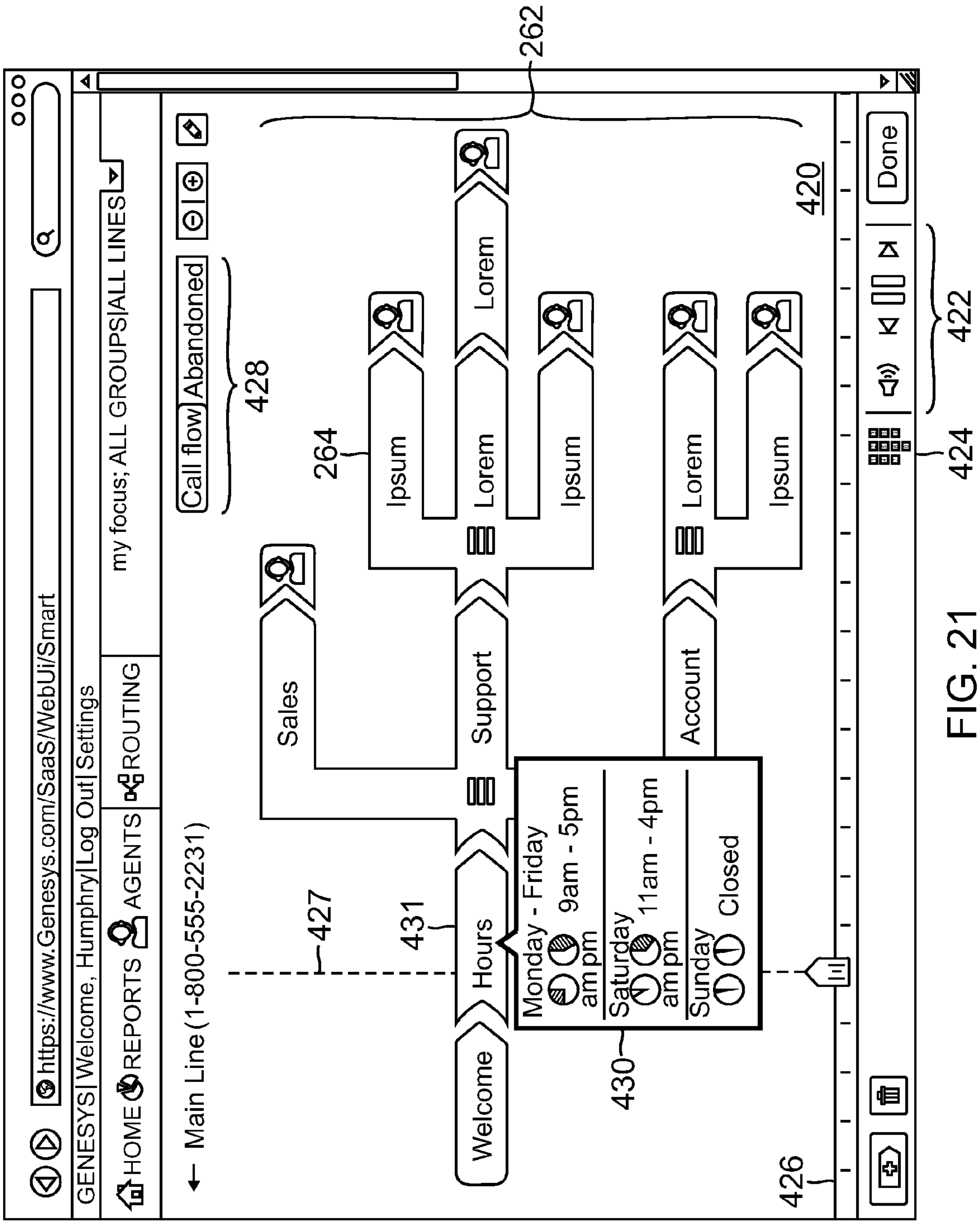
FIG. 21 is a screen shot of a UI page rendered when a preview button is selected according to an embodiment of the invention.

FIG. 21 is a screen shot of a UI page 420 rendered by the specialized application when the preview button 402 is selected according to an embodiment of the invention. According to one embodiment, the UI page 420 is rendered according to a simulation script of the specialized application 52.

The simulation script (or what-if testing logic) according to one embodiment, is a script which simulates the activity of a routing strategy of a contact center according to contact center data, which may include historical data, mathematical models, agent attributes, operation parameters, and the like. The contact center data may be captured from past interaction traffic, detailed reporting, application logs, industry practices, and the like. According to one embodiment, the contact center data is received from the database server 48 and/or the statistics server 50.

When running the simulation script, the contact center worker may enter contact center conditions (e.g., select a scenario, enter own conditions, or import actual or historical conditions) to simulate. The contact center conditions may include, for example, agent schedules, agent proficiencies, call volume, call frequency, call types, call/after work/down times (average/variants), and the like. According to one embodiment, the simulation is run according to the entered contact center conditions and the configured routing strategy.

The simulation may be controlled via a simulation control panel 422. The simulation control panel 422 may include options to control the simulation by playing, pausing, fast forwarding, rewinding, speeding up, slowing down, and the like. Additionally, an input panel 424 may be provided for the contact center worker to provide simulation input. For example, the input panel 424 may be a key pad for the contact center user to input a key during a simulated call.

The UI page 420 may include a timeline 426 for indicating the playback of the simulation. The timeline 426 may include a slide tool 427 which indicates a current playback time. As the simulation progresses, the slide tool 427 sweeps over the various blocks/nodes 264 that represent the routing strategy so that a user may visualize what part of the routing strategy has been invoked, and simulate the customer experience provided by the routing strategy. As the slide tool progresses in time, the coloring of the blocks may change to separate blocks that have been simulated from blocks that have not been simulated.

According to another embodiment, UI page 420 for the simulation script may include a simulation mode selector 428. The simulation mode selector may include an input for selecting a simulation mode, for example, an interaction flow (e.g., a call flow), an abandonment analysis, or a full simulation.

According to one embodiment, when the call flow mode is selected, the preview UI simulates the flow of a single call through the routing strategy. Here, the input panel 424 may simulate the key pad of the end-users phone, and the timeline 426 may indicate the location on the routing strategy diagram 262 currently being simulated. Additionally, in the call flow mode, the simulator may play back the messages, and record simulated voicemails as if there was an actual call.

When the full simulation mode is selected, the simulator script, according to one embodiment, simulates the function of the entire contact center (i.e., simulates multiple concurrent agents and end users). Here, the timeline 426 may represent the time of day, and conditions may vary according to the time of day.

According to one aspect of the present invention, the simulation indicates conditions (e.g., errors, issues, rates, volume, amounts, etc.) of the simulated contact center according to the current routing strategy. The simulator may indicate a condition by a visual cue (color, animation, change of icon, flashing) or audible cue (beep, alert, or announcement). Here, the cues may be customized to represent a variety of conditions.

As shown in the embodiment of FIG. 21, the simulation may indicate conditions of the simulated contact center via the colors of the blocks 264 in the routing strategy diagram 262. For example, the cues may represent an abandonment rate. In this case, a green color may indicate a low rate of abandonment associated with the block, yellow may indicate a moderate rate, and red may indicate a high rate. The thresholds for these levels may be set by the contact center worker. Other types of conditions that may be displayed by the simulation include, but are not limited to, a heat flow (e.g., of call volume), average/maximum call time, average/maximum wait time, average/minimum speed of answer, average/maximum occupancy rate, performance, quality of service, and the like.

As described above, the conditions of the contact center are associated with individual blocks (e.g., via the visual cues). Accordingly, a contact center worker may identify areas of the particular routing logic that may need attention. For example, if the sales branch was simulated as having a high call abandonment rate, the contact center worker may be alerted (e.g., via the visual cues) that the routing strategy associated with that branch needs attention (e.g., reconfiguration). To this end, the simulation script may employ contact center models, statistical analyses, queue system theory, and the like (e.g., employing the Erlang A, B, or C formulas as is well known in the art). Additionally, the simulation may take into account actual configuration information related to a particular call center, such as number of agents, agent skills (including defined and assigned skills), agent proficiency, call center capacity, agent capacity, workforce schedule, and the like.

According to another aspect of the present invention, the simulation script may offer suggested solutions to anticipated issues. For example, if a call abandonment rate in the sales branch is high, the simulator may suggest associating an auxiliary agent group with that branch or that the calls be routed to voicemail sooner. These suggestions may be based on best practices, historical data, contact center models, queue system theory, and the like. According to an embodiment of the present invention, there may be provided a list of previous issue root causes (e.g., sorted by frequency); this list may be personalized to a particular user/administrator based on the issues which arise in their configurations. The simulation script may be initiated by a contact center user, or may be triggered by recent changes in the configuration or workforce schedule (e.g., changing from a previously correctly working configuration or workforce schedule).

In addition to the cues automatically generated, the contact center worker may selectively observe additional information regarding the routing strategy. For example, as shown in FIG. 21, the contact center worker may hover a cursor over a particular block, such as, for example, an hours node 431, to display a tool-tip 430, which displays relevant information associated with the block (bubbled-up data). Additionally, the particular block 431 may be selected, which may generate a new UI page providing detailed information associated with the particular block (drill-down). In the example of the hours node 431, the tool-tip 430 provides the configured contact center hours.

Referring again to FIG. 20, after simulating the contact center routing strategy, the contact center worker may return to editing the routing strategy by selecting the "Edit Route" button 404. Additionally, according to the embodiment of FIG. 20, other versions of the routing strategy may be viewed or selected by selecting the "See all versions" link 406.

Figure 22:
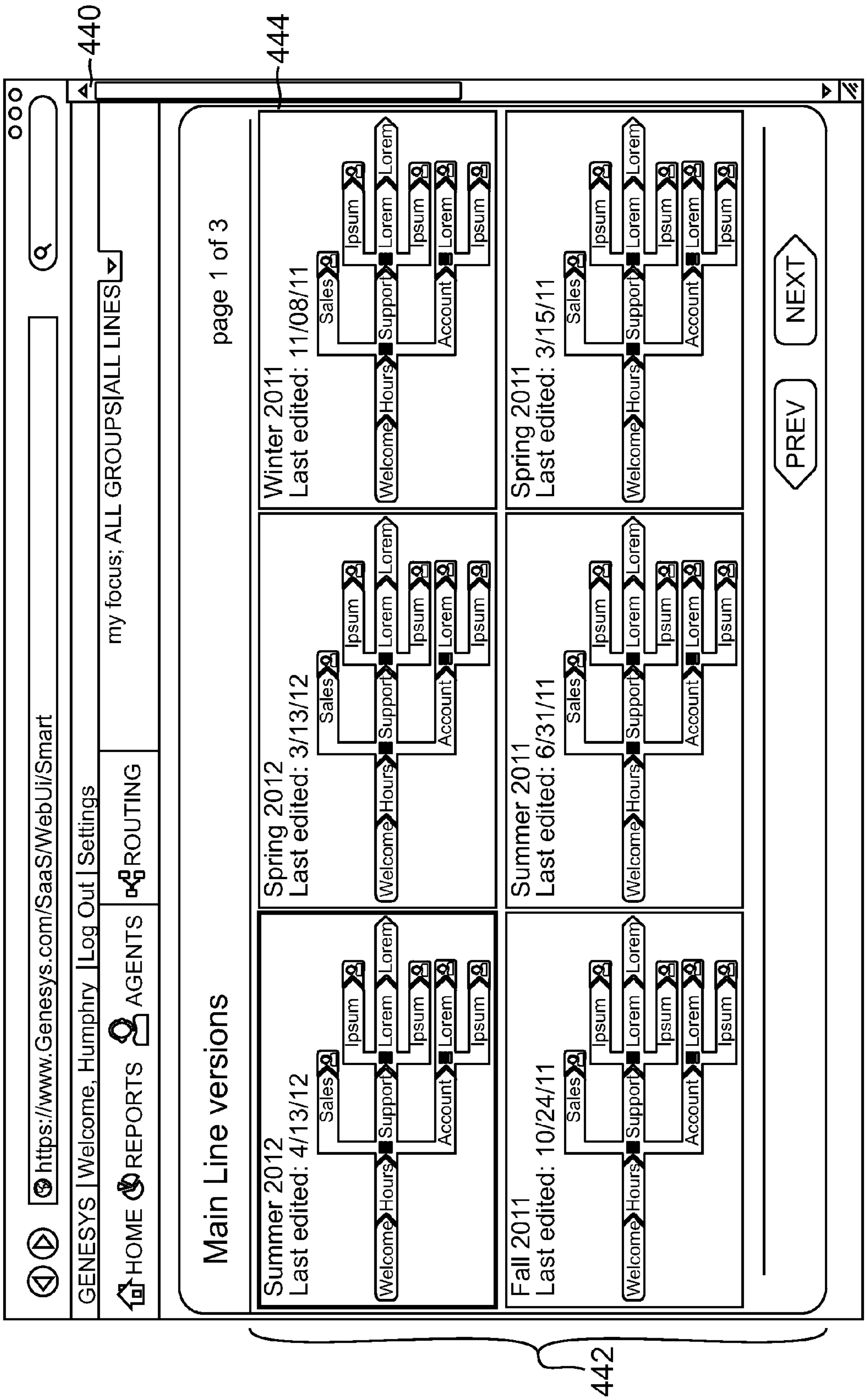
FIG. 22 is a screen shot of a UI page rendered upon selection of a "See all versions" link according to one embodiment of the invention.

FIG. 22 is a screen shot of a UI page 400 rendered upon selection of the "See all versions" link 406. The UI page 400 displays a version menu 442 listing different versions 444 of the routing strategy. By selecting a version 444 from the version menu 442, according to one embodiment, the selected version 444 of the routing strategy becomes the current routing strategy ready for activation or editing.

Referring again to FIG. 20, once a routing strategy is configured according to the requirements of the contact center worker, the contact center worker may activate the routing strategy currently selected by, for example, selecting an "Activate route" button 408.

According to one embodiment, when the selected routing strategy is activated, the configuration server 41 in the remote computing environment 24 runs a configuration script for configuring a virtual machine for a contact center in the remote computing environment 24 according to the selected parameters of the routing strategy.

C. Report Management UI

Figure 23:
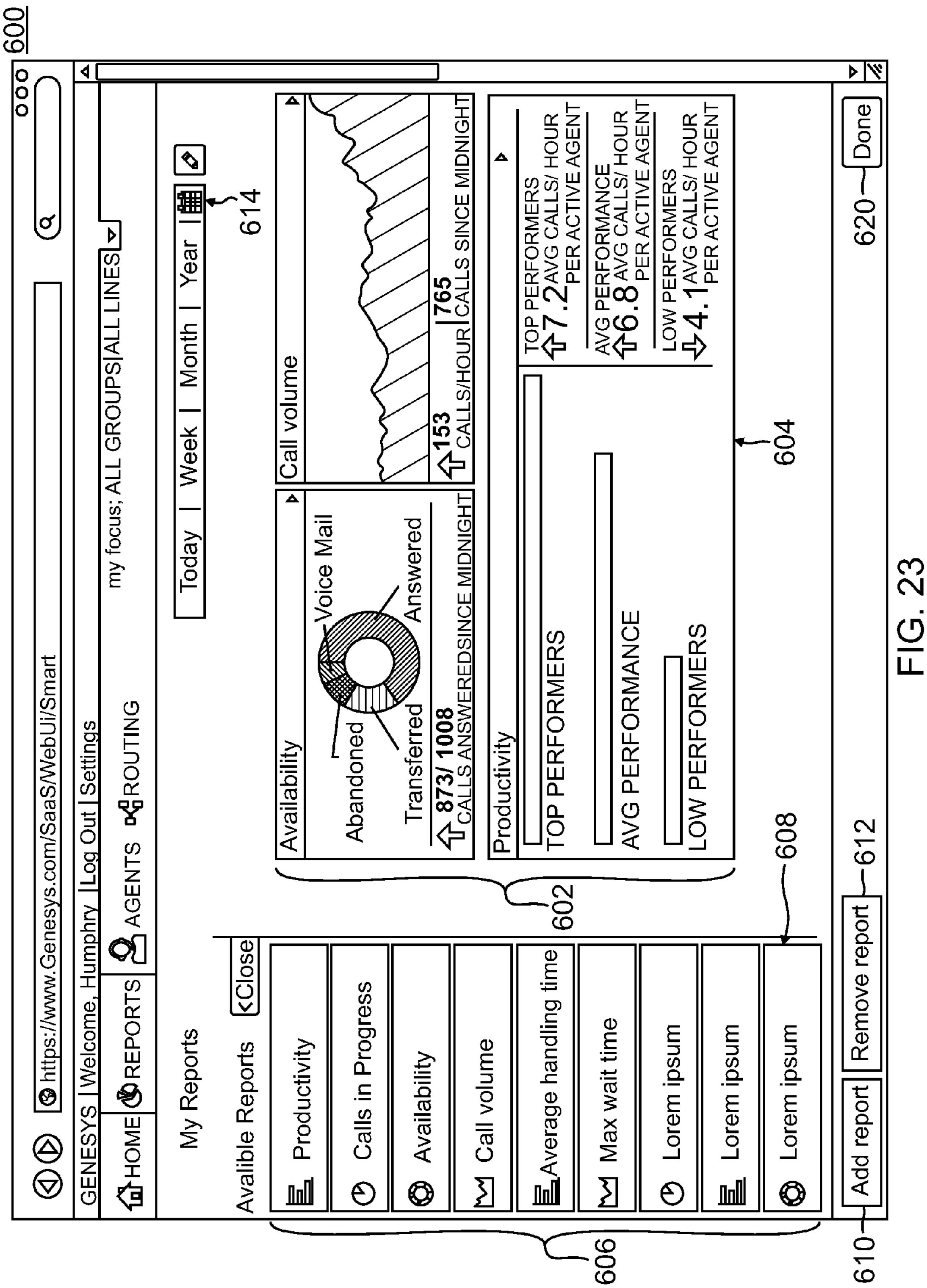
FIGS. 23-24C are screen shots of a UI page rendered upon selection of a report management option according to one embodiment of the invention.
Figure 24A:
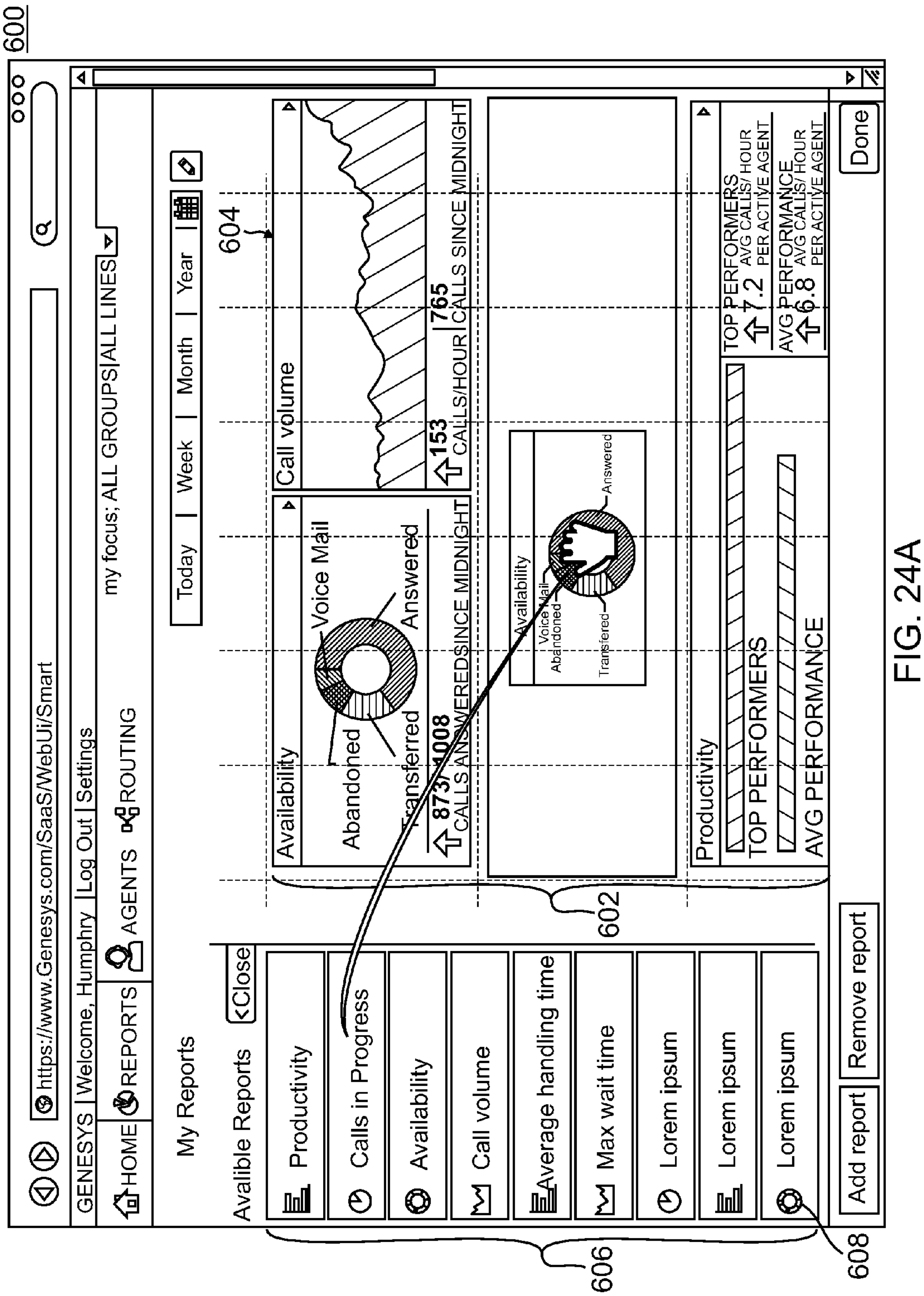

Hereinafter, a report management option 206 and report management UI are described in connection with FIGS. 23-24C. FIGS. 23-24C are screen shots of a UI page rendered upon selection of a report management option according to one embodiment of the invention. Referring again to FIG. 3, a contact center worker may select the report management option 206 from the UI page 200. Section of the report management option 206 may invoke a report management script of the specialized application 52. The report management script, according to one embodiment, renders a report management UI 600 for managing (e.g., setting up or configuring) a reporting dashboard for monitoring and/or analyzing a contact center.

According to one embodiment, the report management UI 600 displays a report workspace 602 for arranging report widgets 604. The report workspace 602 may represent a display area for a report dashboard (described below), and the particular configuration and arrangement of the report widgets 604 in the workspace 602 may correspond to the rendered configuration and arrangement of the report dashboard.

Report widgets 604, according to one embodiment, are visualizations for particular contact center metrics. A report widget 602 may be a display window for displaying contact center metrics (e.g., real-time or historical metrics) to a contact center worker via, for example, charts, graphs, trends, listings, color/shape alerts, text, numbers, or any other suitable representation of information for communicating (e.g., efficiently and effectively communicating or communicating at-a-glance) the metric to the contact center worker.

For example, a report widget 604 may be an availability report widget having a color-coded circle chart that is proportionally segmented into the number of contacts that were answered, transferred, went to voicemail, or were abandoned, respectively. The availability report widget may have text displaying the ratio of calls answered versus the number of calls received within a particular time, and may display whether that ratio is rising or falling with a color coded arrow. Another report widget 604 may be a call volume report widget having a color coded graph illustrating the number of calls per hour for a predetermined period of time, and may have a text display showing the real-time numbers of call per hour and a running total of calls received during a predetermined period of time (e.g., since midnight). The call volume report widget may include a color-coded arrow indicating the trend of the calls per hour. Another report widget may be a productivity widget having a color-coded bar chart displaying the number of agents that are top performers, average performers, and low performers. The performance widget may include text displaying the average call time per active agent (e.g., real-time or historical) for each category (e.g., top, average, low performers) of agents, the text may be accompanied by a color-coded arrow indicating the trend of the average call time. A person of ordinary skill in the art would recognize that the report widgets are not limited to the above, and may include report widgets for any suitable contact center metric (e.g., calls in progress, average handling time, max wait time, etc.) in any suitable configuration.

As described above, the contact center worker may configure the report workspace 602 by selecting, arranging, and configuring the report widgets 604 in the report workspace 602. According to one embodiment, the contact center worker selects the report widgets 604 from an available reports menu 606 listing available reports 608. The available reports menu 606 may include a variety of reports.

According to one embodiment, a contact center worker may add reports to the available reports menu 606. For example, the contact center worker may select the add report option 610, which invokes an add report script of the specialized application 52 for adding reports. The add report script, according to one embodiment, enables the contact center worker to download a report (e.g., a predefined report from a server over a network). The add script, according to one embodiment, may invoke a report building tool that enables creation of a new report (e.g., from a building block of elements and available metrics). For example, the report building tool may allow the contact center worker to select particular contact center metrics from a menu and configure those metrics for display via particular information visualization methods (e.g., charts or graphs). Once added, the new report may be included in the available reports menu 606 as one of the available reports 608.

Available reports 608 may be removed from the available reports menu 606. According to one embodiment, when an available report 608 is removed from the available reports menu 606, that removed report is not available for use in configuring the report workspace 602. An available report 608 may be removed by selecting the remove report option 612, which invokes a remove report script of the specialized application 52 to remove the report from the available reports menu 606.

According to one embodiment, the contact center worker may configure the report workspace 602 by selecting an available report 608 from the available reports menu 606. For example, as shown in FIG. 24A, the contact center worker may drag and drop an available report 608 into the report workspace 602 as a new report widget 604. The placement of the new report widget 604 in the report workspace 602 may be relational; for example, the particular location where the new report widget is dropped corresponds to where in the report workspace (and according to one or more embodiments, the corresponding report dashboard) the new report widget 604 will be located. Further, if other report widgets 604 are in the report workspace 602, the report management script may auto-rearrange their placement within the report workspace, depending on the placement of the new report widget.

According to one embodiment, if a contact center worker hovers over an available report 608, a preview window will pop up previewing the display of the report. According to one embodiment, if the contact center has been configured, the information in the preview window is real time or historical information of the configured contact center.

A time widget 614 may be included in the report workspace 602. The time widget 614 may have several options relating to the time period of the data displayed. For example, the time widget 614 may have a day, week, month, year, and calendar option. According to one embodiment, the selection of one of these option changes the data being displayed in the report widgets 604. For example, selecting the week option may change the display of the availability window to display data relating to calls received in the current week instead of call received since midnight, or may display a new set of report widgets 604 that are more relevant for the selected time period. Selecting the calendar option of the time widget 614, may allow for data to be displayed relating to a historical time period. For example, a day or a date range may be selected and the data displayed in the report widgets 604 may be changed to correspond to the particular day or date range selected.

The size of the report widgets 604 may be configurable. For example, a contact center worker may stretch or shrink a window of a report widget 604 to change the area of the report workspace the particular report widget occupies.

The type and manner of display of information by the report widgets 604 in the report workspace 602 is configurable according to one embodiment. For example, a contact center worker may select a report widget 604 in the report workspace 602 for configuration, which invokes a report configuration script of the specialized application 52 enabling customization of the appearance and type of data presented.

According to one embodiment, the report widgets 604 display bubbled-up information of a larger set of information related to the particular report widget. For example, the bubbled up information may be the information that is particularly relevant to a type of report to enable efficient communication of the underlying information. Here, by displaying only the more relevant sub-set of the larger set of information, a contact center worker may focus on the more relevant information without getting lost in the larger set of information. According to one embodiment, the larger set of information may be viewed by selecting the widget. Via the report management UI 600, selecting a widget to display the corresponding larger set of information may enable the contact center worker to customize the display and arrangement of the that larger set of information (e.g., for display in the report dashboard).

According to one embodiment, the reports (configured via the report management option 206 and the report management UI 600) correspond to a particular service line of the contact center; however, embodiments of the present invention are not limited thereto and the reports may correspond to all of the service lines or a sub-set of service lines of the contact center.

Figure 24B:
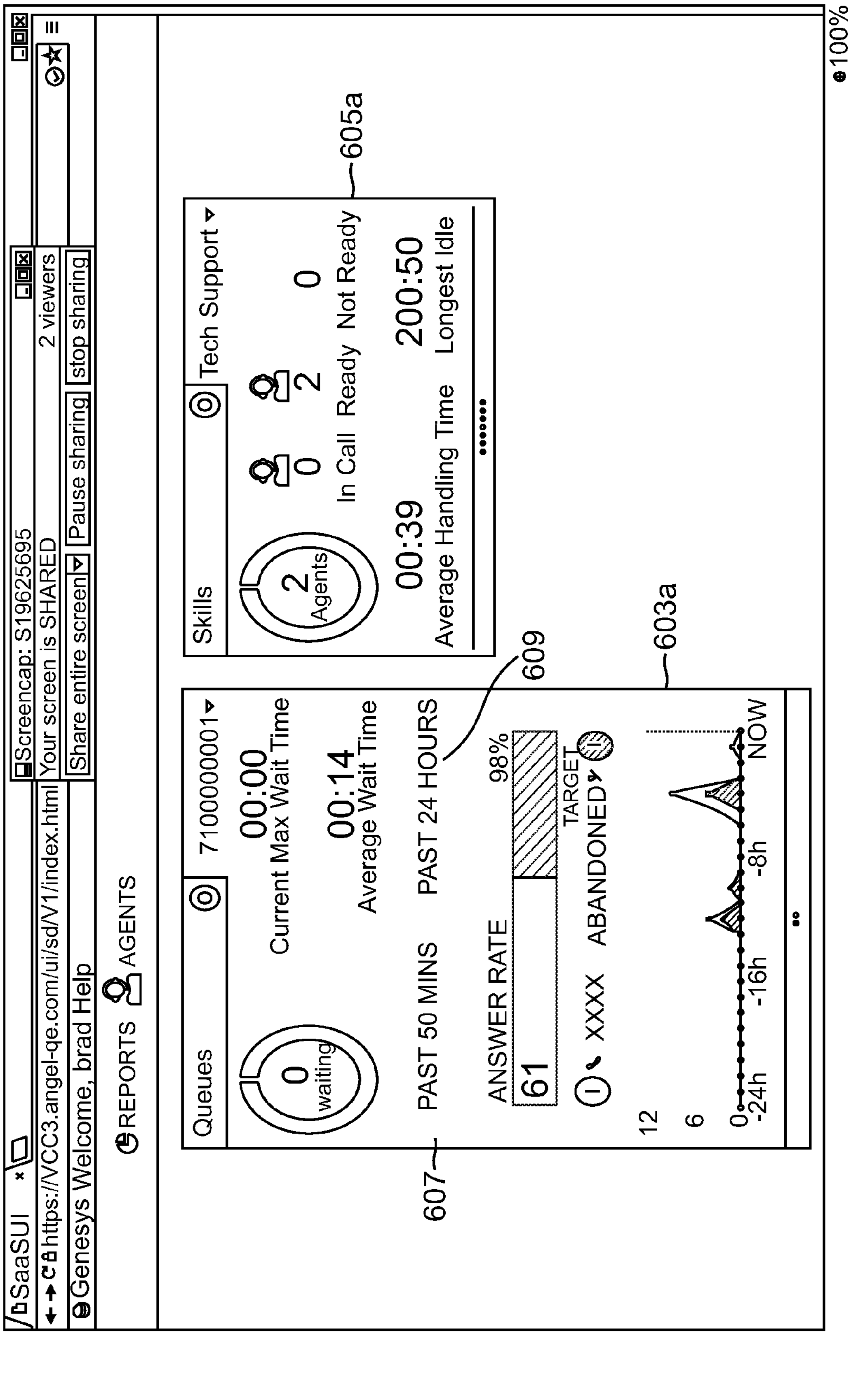
Figure 24C:
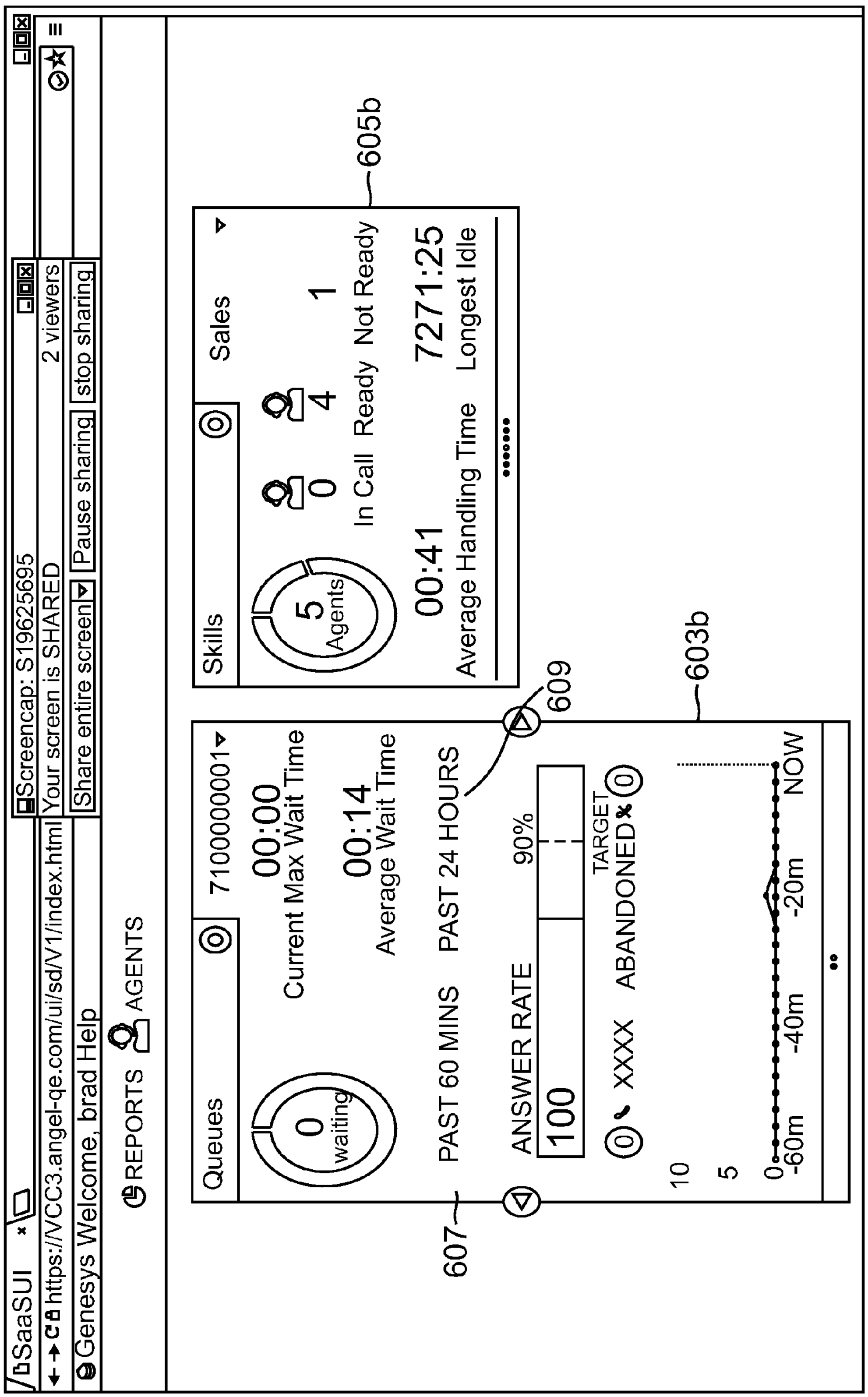

FIGS. 24B-24C are screenshots of other types of reports that may be configured for a contact center worker. Such reports may include queue reports 603*a*, 603*b* and agent skill reports 605*a*, 605*b*. The queue reports may display certain statistics for a queue associated with a routing point (e.g. particular telephone number). Those queue-related statistics may include, for example, number of calls waiting, current maximum wait time, average wait time, answer rate, number of calls answered, and number of calls abandoned. Statistics relating to the answer rate, number of calls answered, and number of calls abandoned may be viewed for different time periods, such as for the past 60 minutes upon selecting tab 607, as is depicted in FIG. 24C, or for the past 24 hours upon selecting tab 609, as is depicted in FIG. 24B.

The agent skill reports 605*a*, 605*b* may display certain statistics for certain agent groups such as, for example, a sales group (such as FIG. 24C) or a tech support group (such as FIG. 24B). Those statistics include, but are not limited to a total number of agents, agents handling calls, agents ready, agents not ready, average handling time, and longest idle time.

II. Configuration and Monitoring Dashboard

Hereinafter, a dashboard UI according to one or more embodiments of the present invention is described in connection with FIGS. 25-50.

According to one aspect of the invention, a contact center worker may monitor and reconfigure a currently operating contact center via a dashboard UI. The dashboard UI may be rendered by the specialized application 52.

Figure 25:
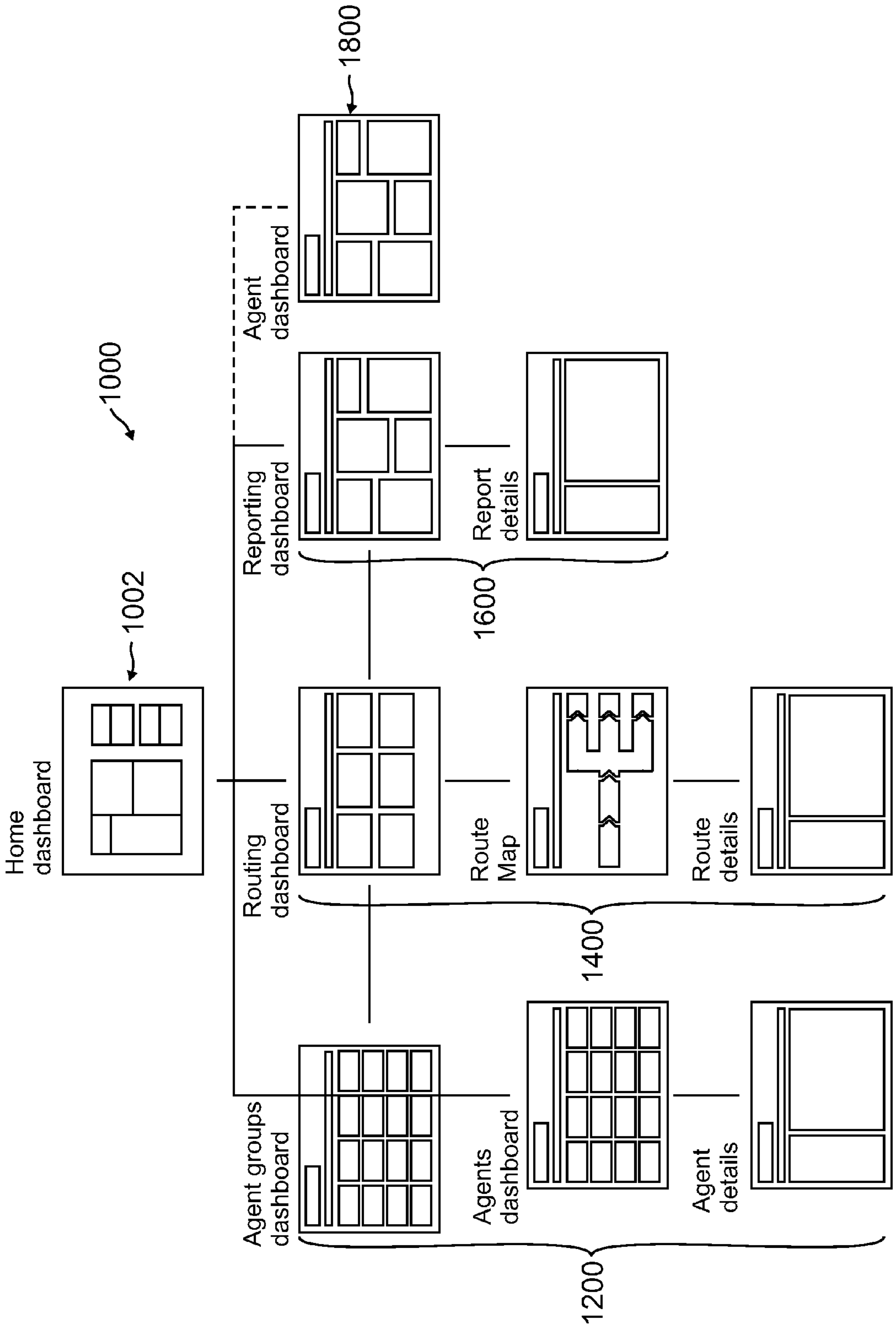
FIG. 25 is a diagram of an exemplary dashboard UI according to one embodiment of the invention.

FIG. 25 is a diagram of an exemplary dashboard UI 1000 according to one embodiment of the invention. The dashboard UI 1000 may include a plurality of UI pages for monitoring and/or configuring a contact center. The UI pages may include, but are not limited to, a home dashboard UI 1002, an agents dashboard UI 1200, a routing dashboard UI 1400, a reporting dashboard UI 1600, and an agent control dashboard UI 1800. The agents dashboard UI 1200 may include, but is not limited to, an agent groups dashboard, an agents dashboard, an agent details dashboard; the routing dashboard UI 1400 may include, but is not limited to, a routing selection dashboard, a route map dashboard, and a route details dashboard; and the reporting dashboard UI 1600 may include, but is not limited to, a main reporting dashboard, and a report details dashboard.

Figure 26:
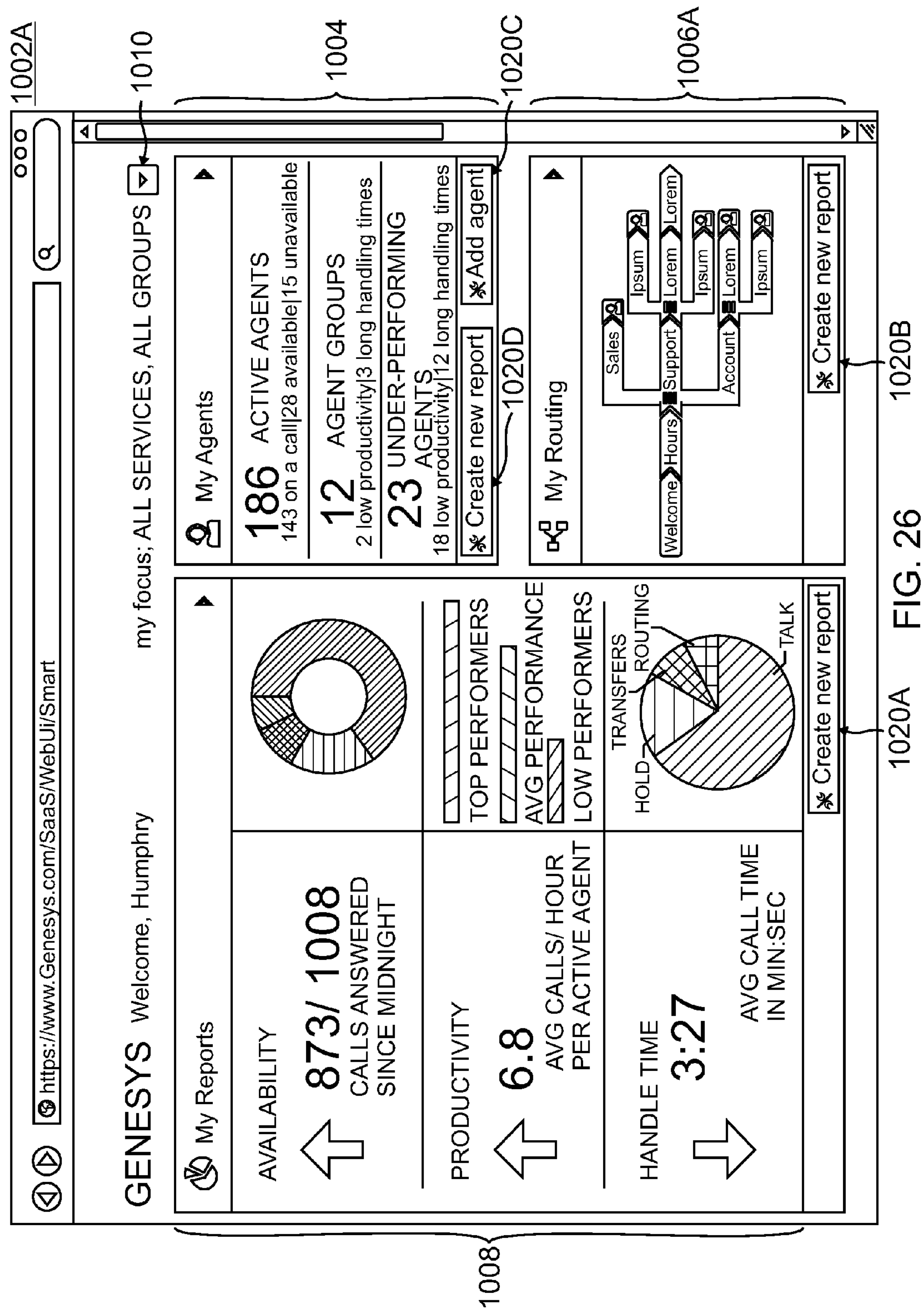
FIG. 26 is a screen shot of a UI page rendered as the home dashboard according to one embodiment of the invention.

FIG. 26 is a screen shot of a home dashboard UI 1002A according to one embodiment. The home dashboard UI 1002A includes relevant information to the operation of a contact center that is displayed in a highly accessible and efficient manner to effectively communicate the current condition (e.g., health, capacity, etc.) of a contact center at a glance. For example, as shown in the embodiment of FIG. 26, the home dashboard may include a report window 1008, an agent report window 1004, and a routing strategy window 1006A.

The report window 1008 may include charts, graphs, or other suitable information communication mediums indicating relevant contact center information (e.g., contact center interaction information) such as, number of call, calls in progress, calls waiting, maximum wait time, average wait time, abandonment rate, and the like. The report window 1008 may be configurable, for example, the interaction report window may be configured to display information spanning the day or another period of time. According to one embodiment, the report window 1008 is configured via the report management option 206 and the report management UI described above.

The agent report window 1004 may include, charts, graphs, or other displays indicating relevant information about the agents 11, including, number of agents, agents in call, agents performing after work, agents ready, agents not ready, average call handling time, average after call work time, longest idle time, and the like. The agent report window 1004 may also be configurable; for example, the contact center worker may select a particular skill group to display in the agent report window 1004.

The routing strategy window 1006A may include a routing strategy diagram (e.g., a routing strategy diagram substantially similar to the routing strategy diagram 262). According to one embodiment, the routing strategy diagram is a birds-eye-view of interaction flows through the routing strategy with visual cues to communicate the current or historical state (e.g., health, heat flow) of the call center at-a-glance.

Figure 27:
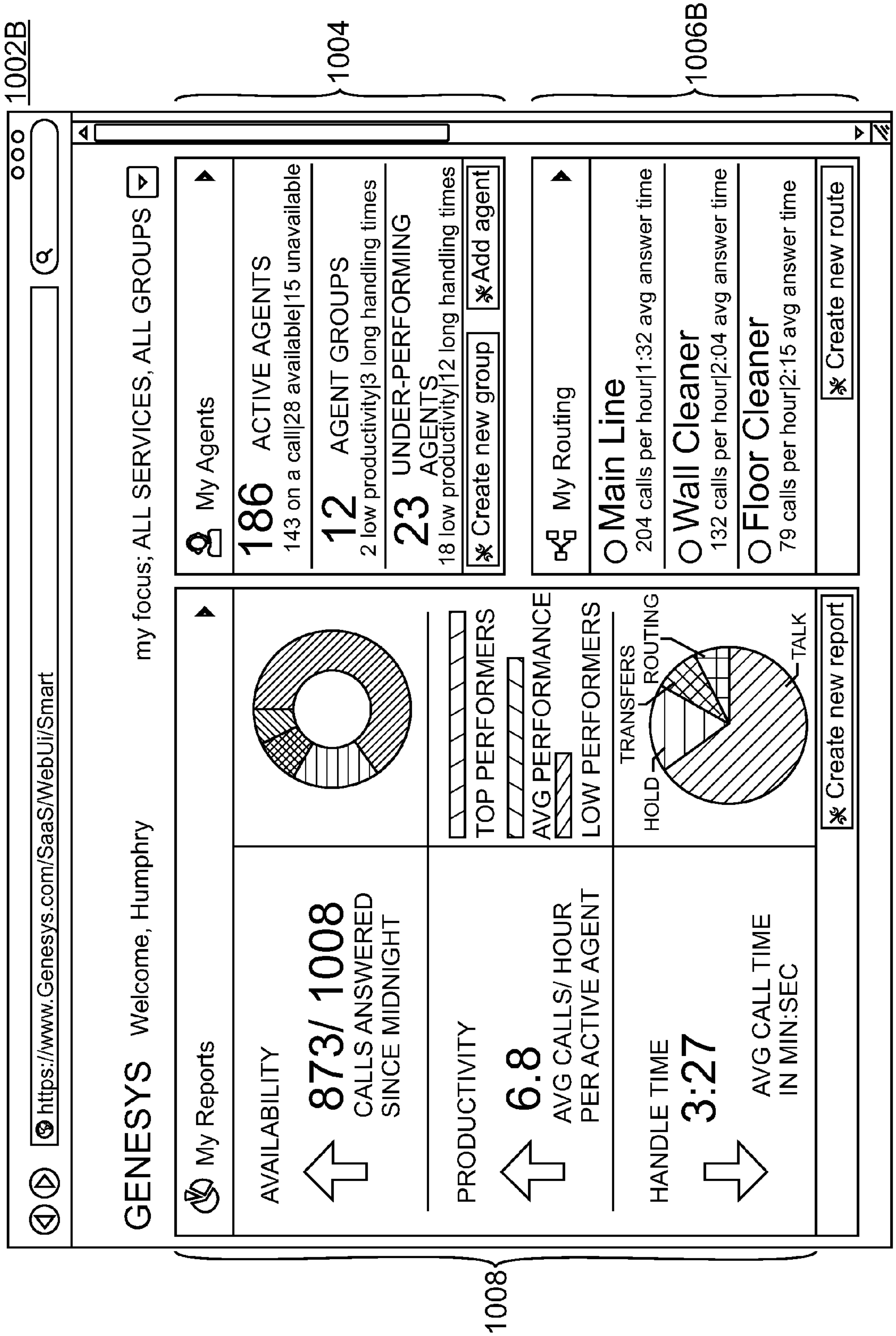
FIG. 27 is a screen shot of a UI page rendered as the home dashboard according to one embodiment of the invention.

According to one embodiment, the contact center may have a plurality of routing strategies. Referring to FIG. 27, the home dashboard UI 1002B for the contact center having a plurality of routing strategies may include a routing window 1006B indicating the plurality of routing strategies of the contact center. For example, the routing window 1006B may indicate that the corresponding contact center has individual routing strategies for a main line, a wall cleaner line, and a floor cleaner line. According to one embodiment, the routing window 1006B indicates the status of each routing strategy, for example, via color coding, or a text display of metrics relating to the particular routing strategy (e.g., number of calls per hour, or average answer time). The home dashboard UI 1002B, may include a report window 1008 and an agent window 1004 similar to those of the home dashboard UI 1002A.

Figure 28:
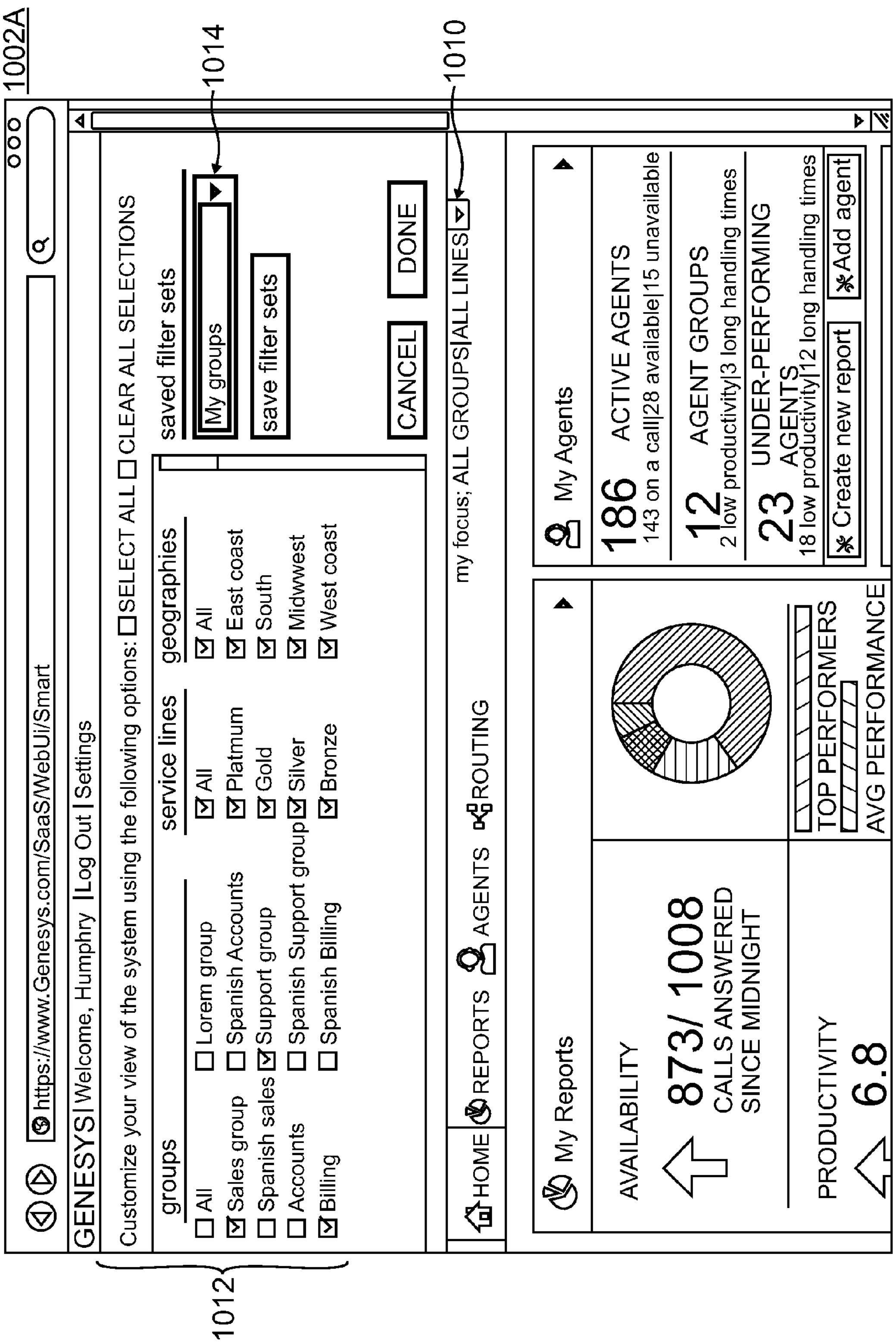
FIG. 28 is a screen shot of a UI page rendered when a customization option is selected for the home dashboard according to one embodiment of the invention.

According to one or more embodiments, the home dashboard UI 1002A is customizable. Referring to FIGS. 26 and 28, the contact center worker may select the focus option 1010 to customize (e.g., customize in real time) the configuration of the home dashboard UI 1002A. According to one embodiment, when a contact center worker selects the focus option 1010, a drop down menu 1012 is rendered (e.g., rendered by a customization script of the specialized application 52). The drop down menu 1012 may include a variety of options for configuring the home dashboard UI 1002A. For example, the drop down menu 1012 may include a sub-menu for selecting which agent groups (e.g., all, sales, Spanish, accounts, billings, etc.) are displayed, a sub-menu for selecting which service lines (e.g., all, platinum, gold, silver, or bronze) are displayed, and/or a sub-menu for filtering on the corresponding geographic location (e.g., all, east coast, south, midwest, or west coast) related to the interactions of the contact center.

Different configurations may be saved and recalled. According to one embodiment, the contact center worker may save and recall a configuration via the save option 1014. The save option 1014 enables naming, saving, and selection of dashboard UI configurations.

According to one embodiment, the dashboard UI 1002A provides options for configuring the contact center. For example, a create new report option 1020A may be selected to customize the report window or may invoke the reports management option 206, the create new route option 1020B may invoke the routing configuration option 204, the add agent option may invoke the add agent script of the agent management option 202, and the create new group option may invoke the add agent skill script of the agent management option 202. The options for configuring the contact center, according to one embodiment, enables real time configuration of the contact center.

Each of the report window 1008, agent window 1004, and the routing window 1006A may be selected by the contact center worker to display more information. For example, the contact center worker may hover a cursor over a portion of a window to display a tool-tip window containing some of the more relevant information associated with the selected portion. Additionally, one of the windows 1004-1008 may be selected to provide another UI page with more detailed information. For example, according to one embodiment, selecting the agent window 1004 renders the agents dashboard UI 1200, selecting the routing window 1006A renders the routing dashboard UI 1400, and selecting the report window 1008 renders the reporting dashboard UI 1600.

A. Agents Dashboard UI

Hereinafter, the agents dashboard UI 1200, according to one embodiment, is described in connection with FIGS. 29-34. The agents dashboard 1200 may be invoked by selecting the agent window 1004 of the home dashboard UI 1002. For example, when the agent window 1004 is selected, the specialized application 52 renders the agents dashboard UI 1200. According to one embodiment, the initially rendered UI page of the agents dashboard UI 1200 is the agent groups dashboard UI 1200A.

Figure 29:
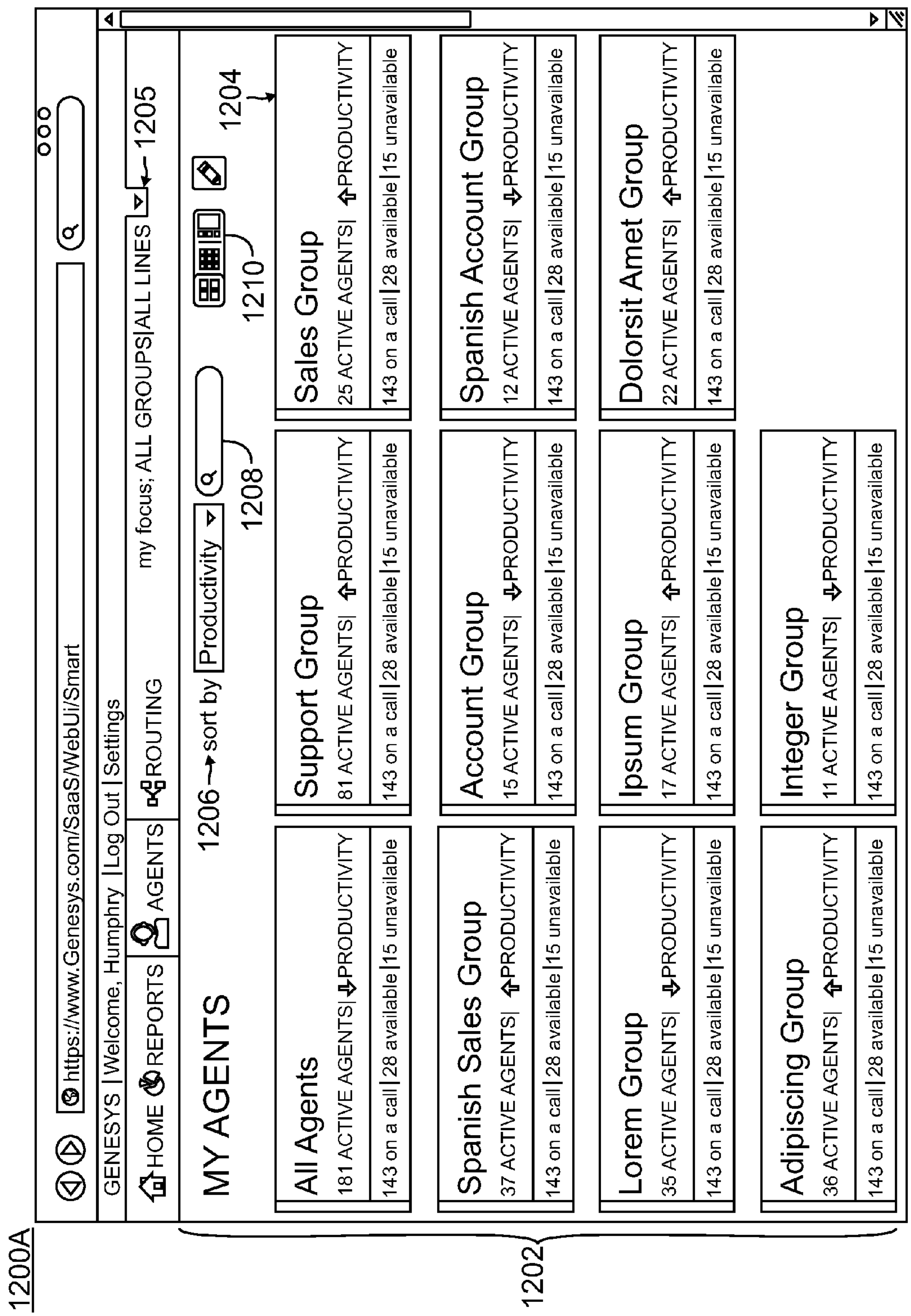
FIGS. 29-30 are screen shots of a UI page rendered when an agent groups dashboard is selected from the home dashboard according to one embodiment of the invention.
Figure 30:
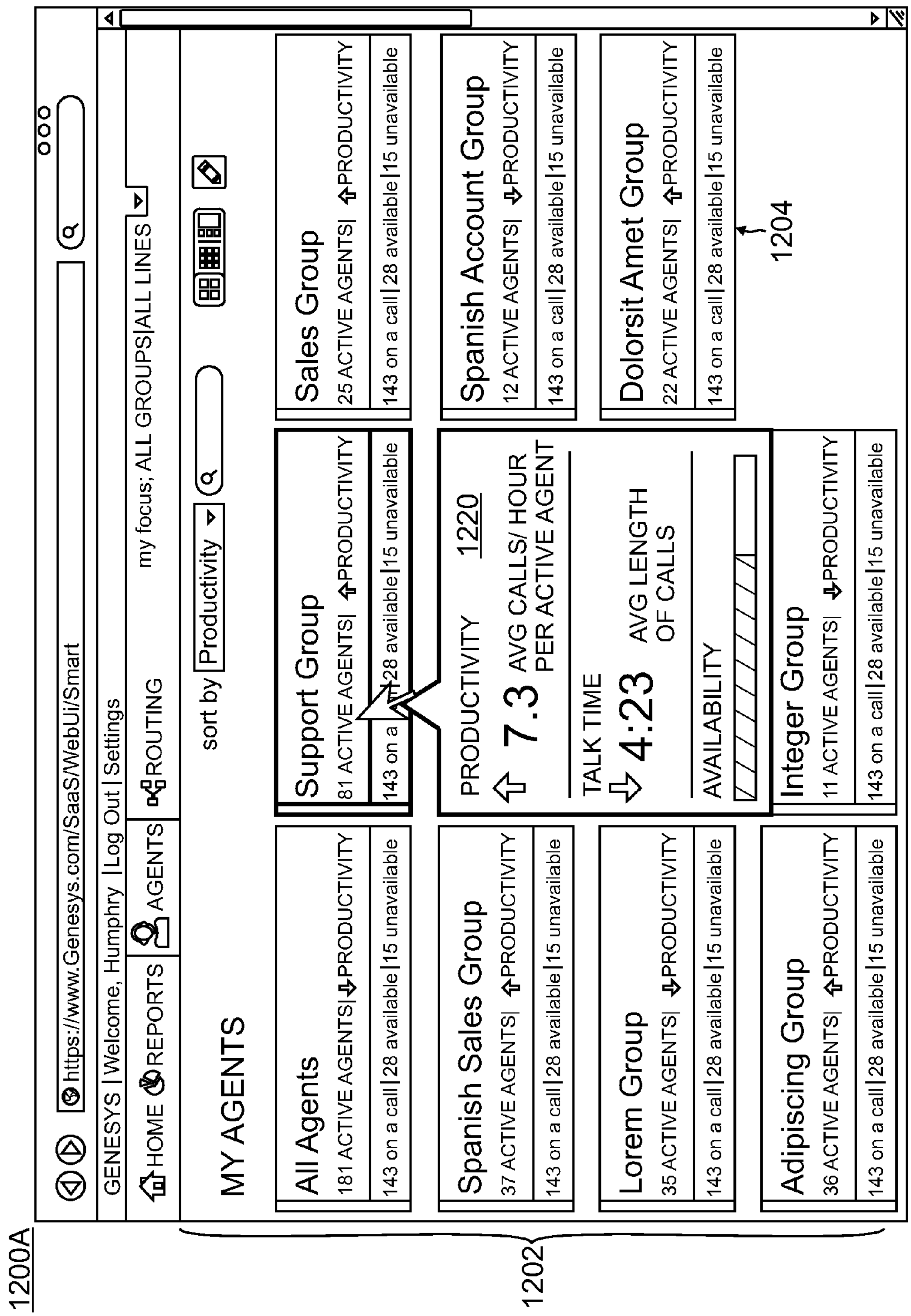

FIGS. 29-30 are screen shots of an agent group dashboard UI 1200A according to one embodiment of the invention. The agent group dashboard UI 1200A may include an agent groups library 1202 having agent group widgets 1204. According to one embodiment, the agent group widgets 1204 respectively represent the agent groups associated with a contact center or portion of a contact center.

The agent group widgets 1204 displayed in the agent groups library 1202 may be customized. For example, the agent groups widgets 1204 may be filtered by group type or line association (e.g., by selecting the filter option 1205). Agent group widgets may be arranged according to a particular metric by selecting the sort option 1206. A particular agent group may be found, for example, by typing a search in the search field 1208. The number of agent group widgets 1204 displayed in a widow may be customized by selecting the view option 1210.

Each agent group widget 1204 may display information corresponding to the associated agent group. For example, the agent group widget 1204 may display the agent group name, the status of the agent group, relevant metrics, and/or number of agents in the agent group. The displayed information may be presented in various ways; for example, status may be displayed via a color-coded banner, a metric may be displayed with a text dialog, and trends may be displayed with arrows. A person of ordinary skill in the art would recognize that the agent group widgets 1204 are not limited to these examples, and that the agent group widgets 1204 may display any suitable information relevant to agent groups of a contact center.

According to one or more embodiments, the type and manner of information displayed on the agent group widgets 1204 are chosen to effectively and efficiently communicate the status of the particular agent group associated with the agent group widget 1204 to a contact center worker. To this end, the agent widgets 1204 are customizable. For example, the agent group widgets 1204 may be customized to display a more relevant sub-set of information associated with an agent group.

While the agent group widgets 1204, according to one embodiment, are configured to display a particular sub-set of information, additional information may be displayed in various ways. For example, as shown in FIG. 30, a pop-up window 1220 may be rendered to display additional information associated with a particular agent group. According to one embodiment, a contact center worker hovers a cursor over a particular agent group widget 1204, which invokes an agent group pop-up script of the specialized application 52 to render the pop-up window 1220 (or tool-top) to display further information associated with the particular agent group. Additionally, the full set of information related to the particular agent group may be displayed, for example, in another UI page.

According to one embodiment, the agent groups represented by the agent group widgets 1204 correspond to a sub-set of the agents associated with the contact center. For example, the agent groups may be categorized by an agent skill, and the agents tagged with the particular agent skill are associated with the corresponding agent group. In one or more embodiments, the agents associated with a particular agent group (or groups) may be displayed via an agents dashboard UI 1200B. The agents dashboard UI 1200B may be invoked via the agent groups dashboard UI 1200A, for example, by selecting the corresponding agent group widget 1204 from the agent group library 1202.

Figure 31:
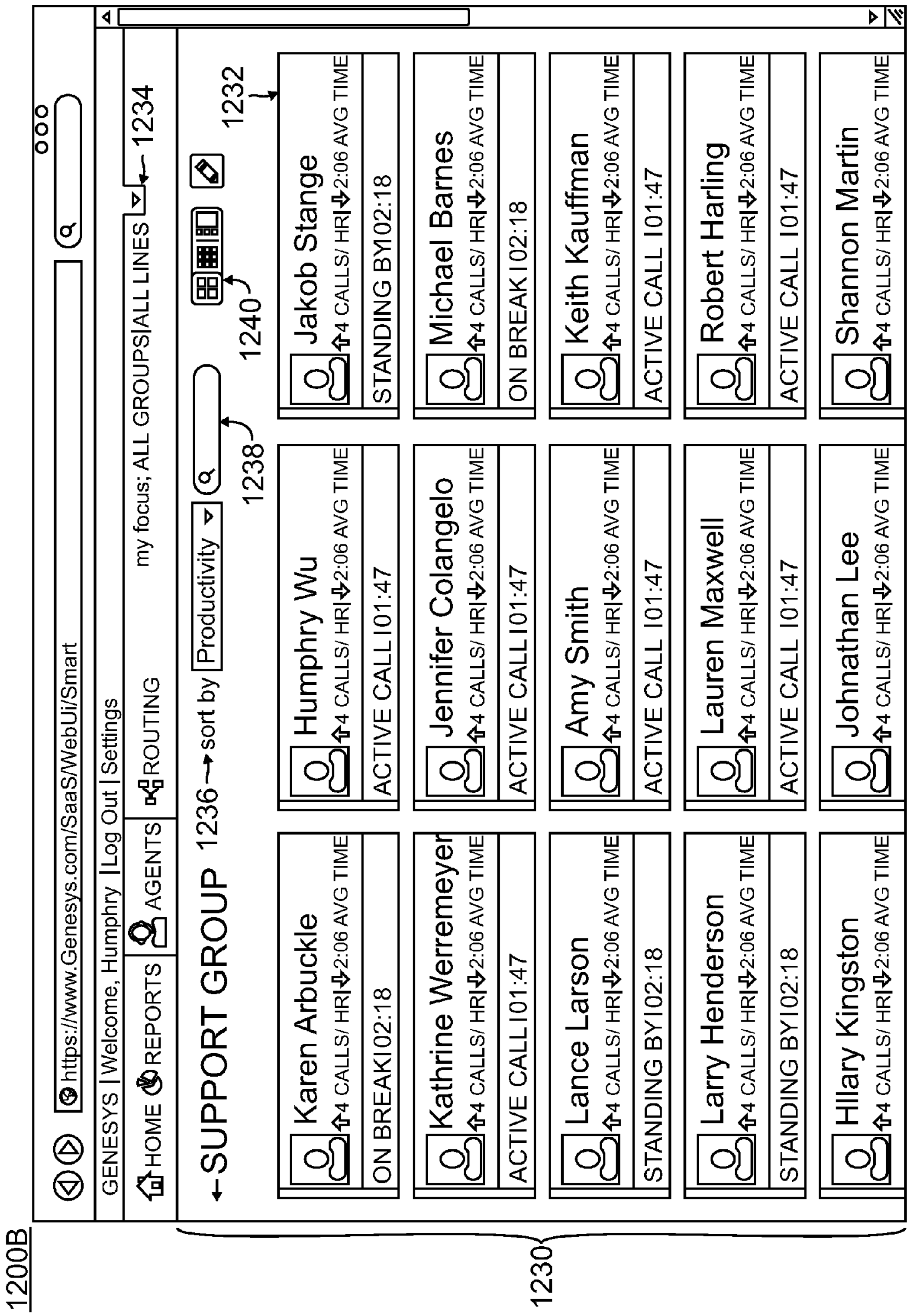
FIGS. 31-32 are screens shots of a UI page rendered when an agents dashboard is selected from the agent groups dashboard according to one embodiment of the invention.
Figure 32:
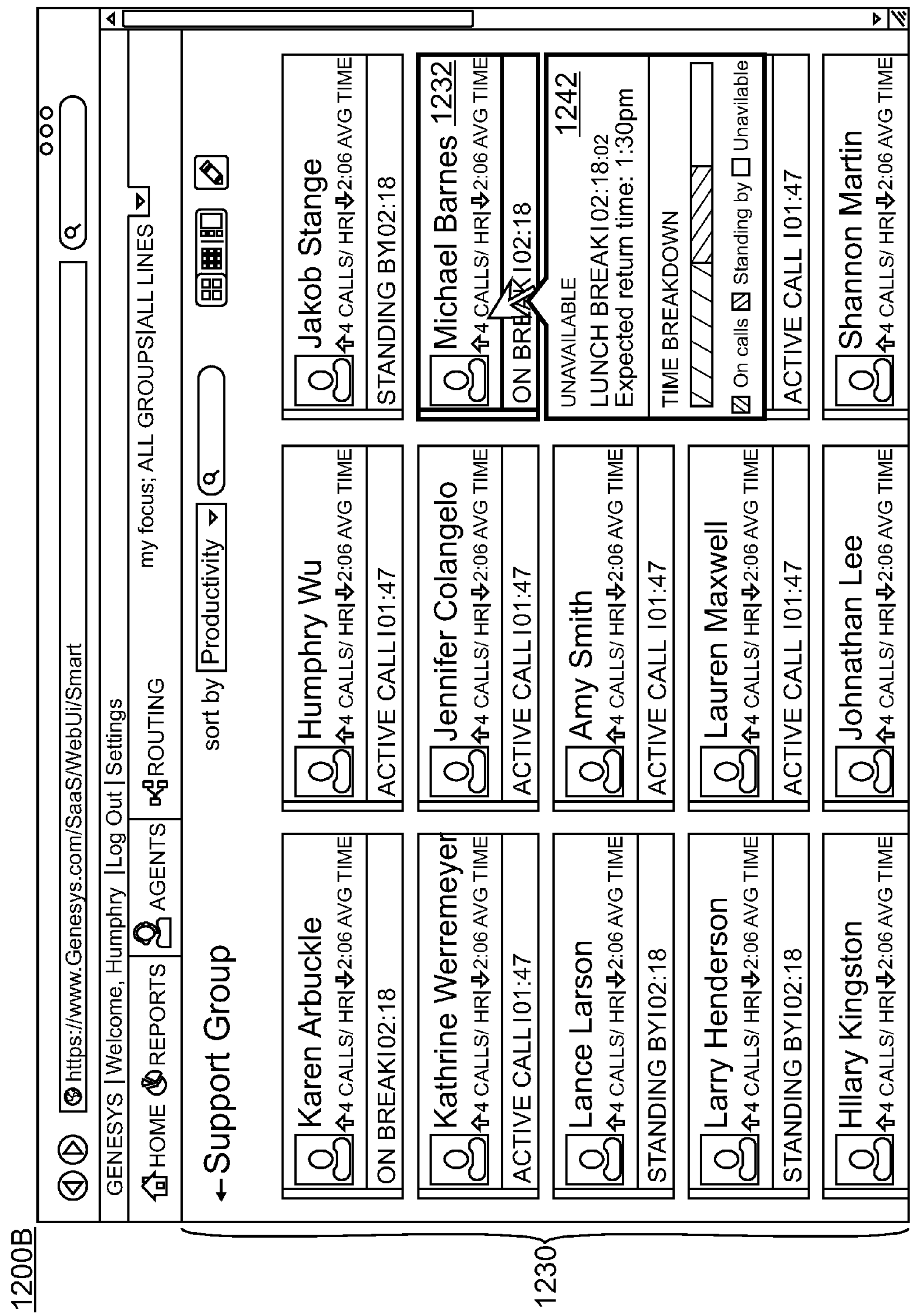

FIGS. 31-32 are screen shots of an agents dashboard UI 1200B according to one embodiment of the invention. The agents dashboard UI 1200B may include an agents library 1230 having agent widgets 1232. According to one embodiment, the agent widgets 1232 respectively represent individual agents associated with a contact center.

The agent widgets 1232 displayed in the agent library 1230 may be customized. For example, the agent widgets 1232 may be filtered by group type or line association (e.g., by selecting the filter option 1234). Agent widgets 1232 may be arranged according to a particular metric by selecting the sort option 1236. A particular agent may be found, for example, by typing a search in the search field 1238. Also, the number of agent widgets 1232 displayed in a widow may be customized by selecting the view option 1240.

Each agent widget 1232 may display information corresponding to the associated agent. For example, the agent widget 1232 may display the agent's name, the status of the agent, and/or relevant metrics. The displayed information may be presented in various ways; for example, the status may be displayed via a color-coded banner, a metric may be displayed with a text dialog or graphs, and trends may be displayed with arrows. A person of ordinary skill in the art would recognize that the agent widgets 1232 are not limited to these examples, and that the agent widgets 1232 may display any suitable information relevant to agents of a contact center.

According to one or more embodiments, the type and manner of information displayed on the agent widgets 1232 are chosen to effectively and efficiently communicate the status of the particular agent associated with the agent widget to a contact center worker. To this end, the agent widgets 1232 are customizable. For example, the agent widgets 1232 may be customized to display a more relevant sub-set of information associated with an agent.

While the agent widgets 1232, according to one embodiment, are configured to display a particular sub-set of information, additional information may be displayed. For example, as shown in FIG. 32, a pop-up window 1242 (or tool-top) may be rendered to display additional information associated with a particular agent. According to one embodiment, a contact center worker hovers a cursor over a particular agent widget 1232, which invokes an agent information pop-up script of the specialized application 52 to render the pop-up window 1242 to display further information associated with the particular agent. Additional information related to the particular agent may be displayed, for example, in another UI page.

Figure 33:
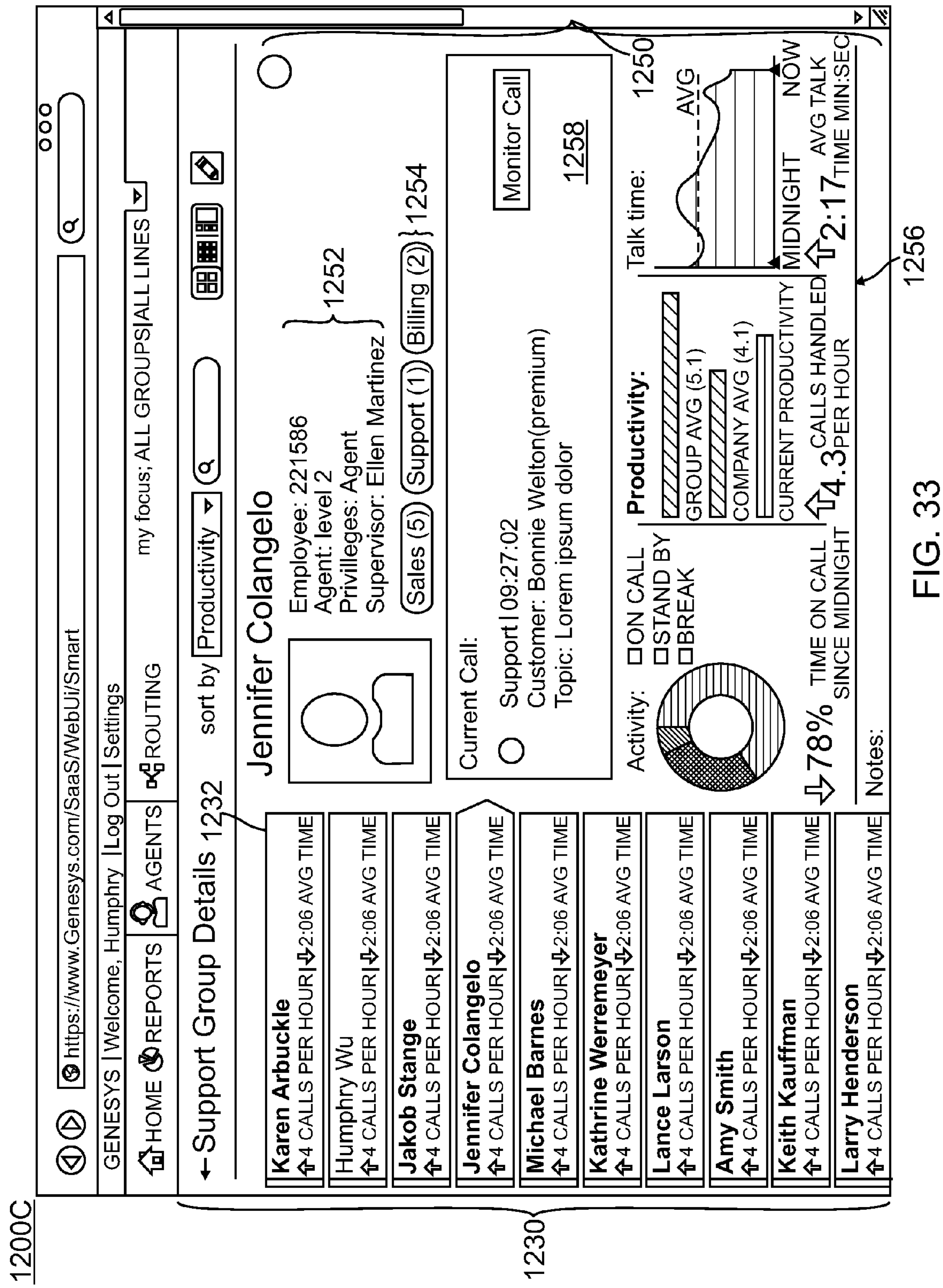
FIGS. 33-34 are screen shots of a UI page rendered when an agent details dashboard is selected from the agents dashboard according to one embodiment of the invention.
Figure 34:
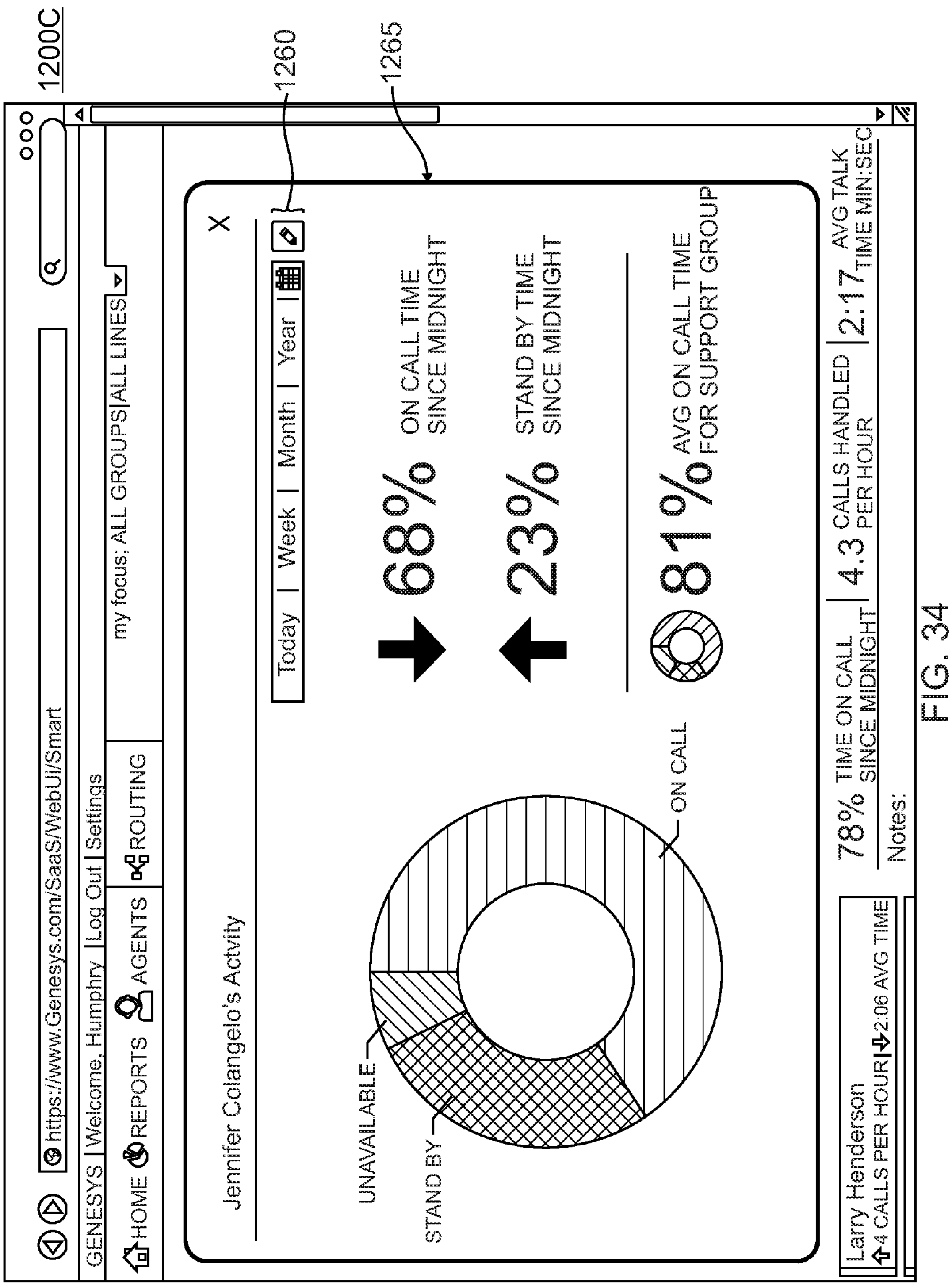

FIGS. 33 and 34 are screen shots of a UI page 1200C rendered for displaying additional information related to a particular agent. FIGS. 33-34 are screen shots of an agent details dashboard UI 1200C according to one embodiment. The agent details dashboard UI 1200C may be rendered by the specialized application 52 when a contact center worker selects an agent widget 1232 in the agents dashboard UI 1200B.

The agent details dashboard UI 1200C may include an agent details window 1250 displaying information of a particular agent of the contact center. For example, the agent window 1250 may display agent identification information 1252. Agent identification information may include the agents name, an employee number, job title, privilege information, supervisor information, and the like. The agent window 1250, according to one embodiment, shows the agent skills (or tags) associated with the agent in the tag listing 1254. The tag listing may indicate the number of interactions (currently or during a set period) handled by the agent that are associated with the particular tag.

The agent window 1250 may include an agent report window 1256. The agent report window 1256, according to one embodiment, includes reports associated with the particular agent. For example, the agent report window 1256 may include visual depictions (e.g., charts, graphs, trends, text, etc.) of relevant contact center metrics associated with the particular agent. Examples of reports that may be included in the agent report window 1256 include, but are not limited to, an activity report, a productivity report, and a talk time report. These reports may indicate real-time or historical information.

The activity report may include a segmented circle chart proportionally showing the activity of the agent including time on call, time on standby, and time on break, and include a text display of the percentage of time on call for a predefined period of time (e.g., since midnight) together with a color-coded arrow indicating the trend. The productivity report may include a bar graph showing the calls handled per hour by group average, company average, and the agent's current calls per hour, and a text display showing the number of calls handled per hour together with a color-coded trend arrow. The talk time report may include a graph of average talk time for the agent during a predefined time period (e.g., since midnight), and a text of the current average talk time together with a color-coded trend arrow.

Information other than or in addition to that displayed in the report window 1256 may be presented as well. For example, as shown in FIG. 34, a pop-up window 1265 may display further information regarding the agent. The pop-up window 1265 in FIG. 34 displays additional information relevant to the agent's activity. The pop-up window 1265 may be invoked by selecting one of the reports from the agent report window 1256 (e.g., the activity report).

According to one embodiment, the pop-up window 1265 is customizable. The time period for the information being displayed may be configured by the time period widget 1260. The information displayed may be filtered according to a particular agent group that the agent is a member of.

An agent may be monitored via the monitoring widget 1258. The monitoring widget may include an option for monitoring an active interaction (e.g., a phone call) and viewing detailed information regarding the active interaction (e.g., duration, topic, customer information).

To select a different agent for display, the contact center worker may navigate back to the agent dashboard UI 1200B or the agent groups dashboard UI 1200A and make another selection, however, embodiments of the present invention are not limited thereto. For example, the agent details dashboard UI 1200C may display (e.g., as a sidebar) the agents library 1230, and one of the agent widgets 1232 may be selected from the agents library.

B. Routing Dashboard UI with Heatflow Monitoring

Hereinafter, the routing dashboard UI 1400 (FIG. 25) is described in detail with reference to FIGS. 35A-36.

Figure 35A:
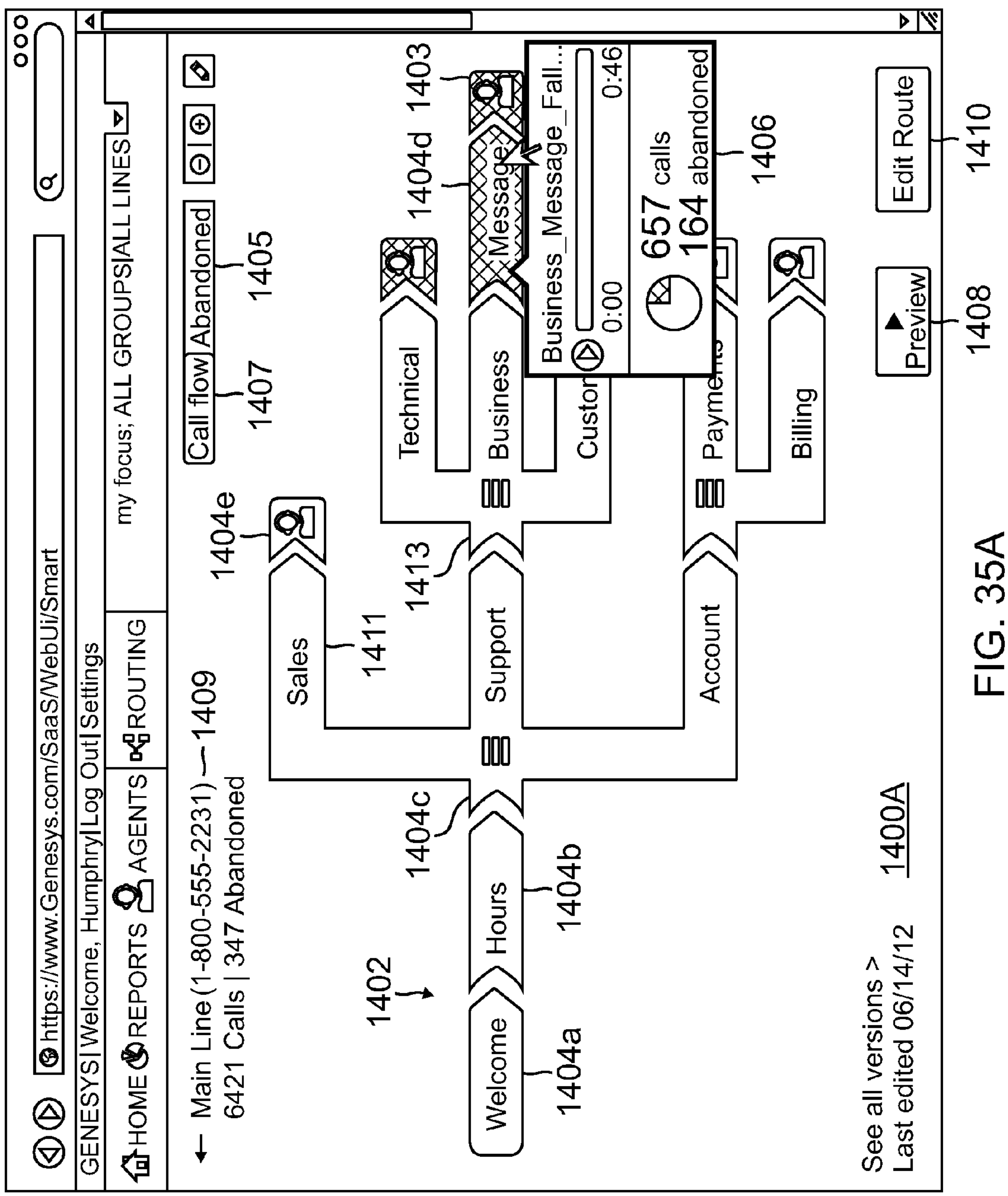
FIG. 35A is a screen shot of a UI page rendered by a specialized application when a user selects a routing window for more detailed information according to an embodiment of the invention.
Figure 36:
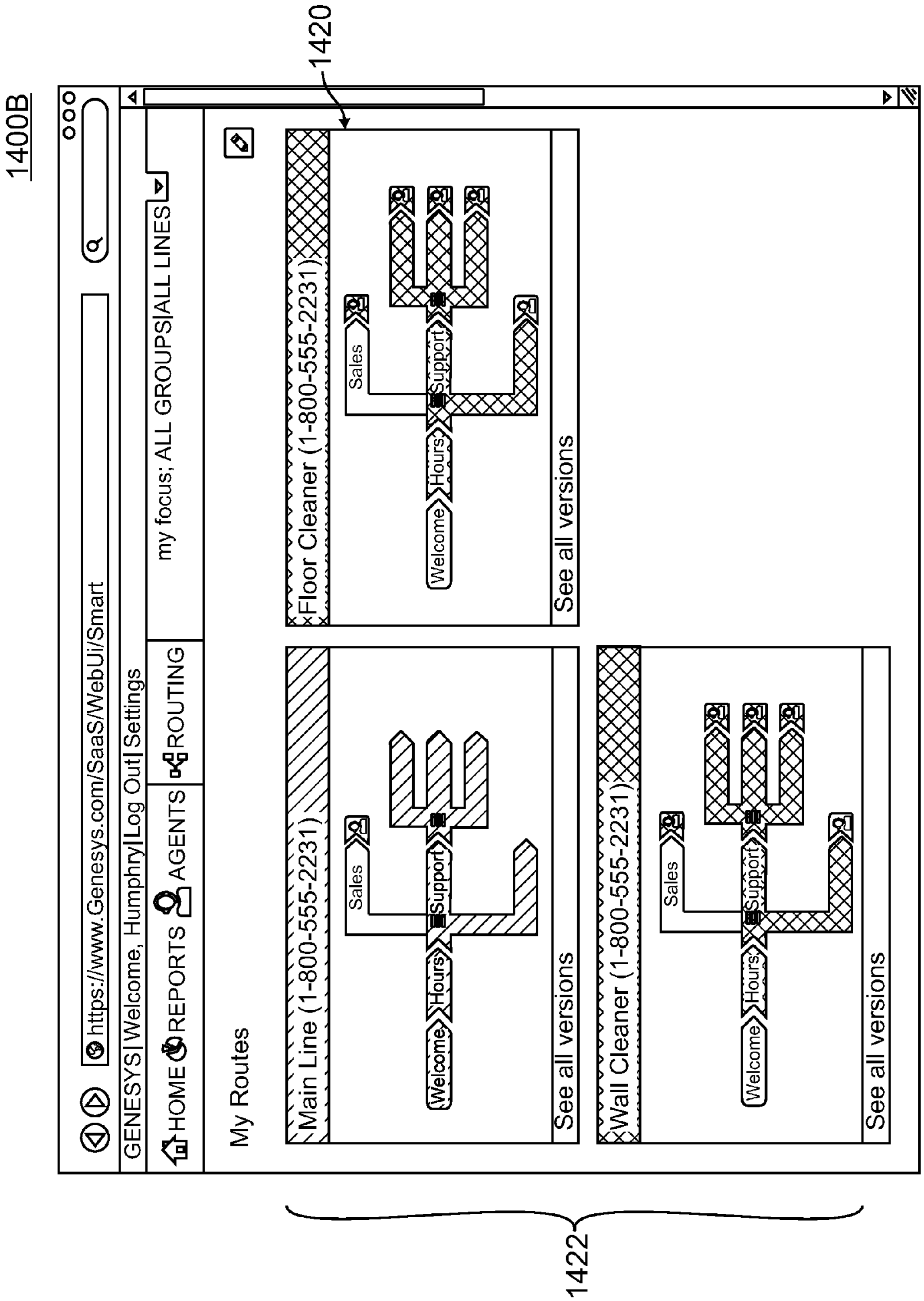
FIG. 36 is a screen shot of an exemplary UT page rendered when a contact center has multiple lines and multiple routing strategies according to one embodiment of the invention.

FIG. 35A is a screen shot of a UI page 1400A rendered by the specialized application 52 in response to a user selection of the routing window 1006A (FIG. 26) according to an embodiment of the invention. The UI page 1400A, according to one embodiment, provides visualization of the routing strategy configured for a particular route point. The route point may be, for example, a directory number 1409.

According to one embodiment, the routing strategy is visualized as a routing diagram 1402. The routing diagram may be described as a routing tree. According to one embodiment, the routing tree 1402 is composed of basic building blocks such as, for example, a root node 1404*a*, conditional operation node 1404*b*, branch node 1404*c*, other intermediary nodes 1404*d* (e.g. message node), and end nodes (also referred to as route-to-points) 1404*e*. The various nodes may also be referred to as blocks 1404. The routing tree 1402 and blocks 1404 according to one embodiment are similar to the routing strategy diagram 262 and blocks 264, previously described (e.g. with respect to FIG. 11). Accordingly, some aspects or features of the routing tree 1402 and the blocks 1404 are described by way of reference to the previously described routing strategy diagram 262 and the blocks 264. For example, the "Preview" button 1408 and the "Edit Route" button 1410 serve similar functions as the "Preview" button 402 and the "Edit Route" button 404 previously described.

According to one embodiment, each of the blocks 1404 represent a particular routing logic, and when coupled together in a particular order (i.e., as the routing tree 1402), visually represent and efficiently communicate (at-a-glance) the routing strategy (or at least, a portion thereof) for the contact center so that a user can easily visualize how an inbound interaction to the route point will flow from the moment it is received until it is routed to a route-to-point 1404*e*.

According to one embodiment, an inbound call to the directory telephone number 1409 is received by the SIP server 44, and the SIP server invokes the orchestration server 42 to retrieve the routing strategy configured for the directory number. According to one embodiment, the routing strategy is implemented via SCXML code. The exemplary routing strategy corresponding to the routing diagram 1402 of FIG. 35A first invokes routing logic associated with the "welcome" root node 1404. The routing logic associated with the "welcome" root node 1404 invokes the media server 46 to first play a welcome message configured for this portion of the routing strategy.

The exemplary routing strategy next invokes routing logic associated with an "hours" conditional node 1404*b*. Such logic checks the time of receipt of the interaction against the hours configured for this particular block to take appropriate action based on whether it is business hours or not. The exemplary routing strategy next invokes routing logic associated with a "sales, support, account" branch node 1404*c* to cause the media server to play various menu options and prompt the user to select one of those options. According to one embodiment, selection of the "sales" option causes the routing strategy to identify a skill set associated with the option and route the interaction to an agent group (represented via end-node 1404*e*) having the identified skill set. Selection of the "support" and "account" options invoke logic associated with additional branch nodes for prompting further input from the caller.

In addition to visually depicting the flow of interactions through the contact center, the routing diagram 1402 provides visual or audible cues of conditions (e.g., errors, issues, rates, volumes, amounts, etc.) of the contact center based on real-time or historical data. For example, the specialized application may indicate a real-time condition by a visual cue (color, animation, change of icon, flashing) of the routing diagram 1402, audible cue (beep, alert, or announcement), and/or the like. The cues may be customized to represent a variety of conditions.

Assuming that visual cues are associated with particular colors, the specialized application executes a color propagation rule to determine which blocks of the routing diagram are to be colored, and in which color, for informing the user of a current monitored condition of the contact center. Depending on the type of data that is to be monitored, the coloring may represent different types of information. In this regard, the UI page 1400A displays various visualization options 1405, 1407 that a user may select to visualize how the contact center operates with respect to criteria associated with the selected visualization option. For example, in response to the specialized application detecting actuation of a call flow option 1407, the specialized application applies colors the routing diagram 1402 to provide visual cues as to how an actual number of interactions through a particular node, such as, for example, the sales branch node 1411, compares to a number of interactions forecast for that node. The comparison may be done at particular intervals, such as, for example, every 15 minutes, based on data gathered during that interval. In this regard, the specialized application communicates with the statistics server 50, orchestration server 42, and/or database server 48 to obtain the actual and forecast data. The specialized application may color code the particular branch based on the comparison. The type of color that is used may depend on the threshold that is satisfied. According to one embodiment, the specialized application identifies multiple thresholds for a particular node 1404, and color codes one or more blocks based on the configured color propagation rule based on the threshold that is satisfied. For example, a block may be colored to provide a warning visualization (e.g. a yellow color code) in response satisfying a warning threshold, or colored to provide an alert visualization (e.g. a red color code) in response to satisfying an alert threshold. For example, the color propagation rule may cause the sales branch 1411 to be colored in red if the actual number of interactions flowing through that branch exceeds the forecast number of interactions expected for the agent group (represented via the end node 1404*e*) scheduled to handle interactions for that branch.

According to another example, instead of providing visual cues based on a number of interactions, an average handling time may be used as the metric for providing visual cues relating to agent performance. In this regard, the specialized logic obtains an average handling time (AHT) for a particular agent group (e.g. agent group associated with the sales branch 1411), compares the measured AHT against the forecast AHT for the same group, and color codes the appropriate nodes based on the comparison. For example, the sales branch 1411 and end node 1404*e* may be colored in yellow if the actual AHT approaches the forecast AHT. The color may change to red if the actual AHT exceeds the forecast AHT. In this regard, the visual cues may be for identifying branches that do not comply with a defined service level. However, visual cues may also be provided from a business perspective rather than a service level perspective. From a business perspective, a long AHT may be good for business as it leads to more sales opportunities. Thus, from a business perspective, the color of the sales branch 1411 may remain green indicating a good business level despite the long AHT.

In another example, in response to the specialized application detecting actuation of an abandonment option 1405, the specialized application applies colors to the routing diagram 1402 to provide visual cues as to how an actual number of abandoned interactions at a particular node compares to a forecast number of abandoned interactions for that node. For example, a block colored with a green color may indicate a low rate of abandonment associated with the block, whereas a yellow color may indicate a moderate rate, and a red color may indicate a high rate.

In the exemplary embodiment, a "technical, business, customer" branch node 1413 of the routing diagram is colored in green indicating no problems relating to abandoned calls, whereas the "message" block 1404*d* and associated end node 1403, are colored in yellow. The message block may be associated with routing logic which invokes the media server 46 to play a message which may indicate, for example, a current wait time, or the fact that there are currently no agents in the business department to answer the call. Callers may abandon the call in response to such a message. If the measured number of abandoned calls in response to such a message satisfies a warning threshold, the specialized logic may be configured to color the message block in yellow.

A contact center worker may selectively observe additional information regarding a color-coded block. For example, as shown in FIG. 35A, the contact center worker may hover a cursor over a particular block, such as, for example, the message block 1401. In response to detecting that the cursor is hovering, or paused, over the particular block, the specialized application may display a tool-tip 1406 with additional information associated with the block. The information may be, for example, dynamic information that changes based on contact center performance, such as, for example, call received vs. calls abandoned. The information may also be static information, or a mix of static and dynamic information. According to one embodiment, the tool-tip is a small pop-up window that disappears once the cursor is no longer paused over the block. In this manner, more detailed information may bubble-up via the tool-tip by merely hovering over the block, and quickly disappear when no longer hovered over the block. The particular block 1404 may also be selected to generate a new UI page that provides the detailed information, allowing a user to drill-down on such detailed information.

Other types of conditions that may be displayed by the routing diagram 1402 include, but are not limited to, a heat flow (e.g., total call volume, processing capacity of a particular branch, agent availability, or agent capacity), average/maximum call time, average/maximum wait time, average speed of answer, average/maximum occupancy rate, performance, quality of service, and the like. Any other metric that may be analyzed for providing visual cues is contemplated by the embodiments of the present invention. For example, an agent group node such as end node 1404*e* may be colored in red if a particular agent within the agent group is underperforming. For example, the agent may have a particularly high AHT, or may be sitting idle for an extended period of time. According to one embodiment, hovering over the end node that represents the agent group may invoke a tool-tip 1406 displaying details on the particular agent that is causing the node to be colored in red.

The specialized application may select one of various color propagation rules to determine how to color the blocks to provide the appropriate visual cues to a user. According to one embodiment, the color propagation rule may cause color coding of only the affected node without propagating the color to the root node. If the node is a branch node, such as nodes 1404*c* and 1413, the color propagation rule may cause color coding of only the affected branch (e.g. the sales branch 1411) instead of the entire node (sales, support, and account node 1404*c*). Alternatively, the entire node may be colored based on the color of the most severe branch.

In another embodiment, the color propagation rule may cause the color to be propagated to the root node 1404*a*. According to this embodiment, the nodes are color-coded iteratively from the affected node to the root node by setting the color of a parent node to be the color of the most severe child node. According to one embodiment, color is propagated to the root node when the monitored condition is average waiting time. For example, if an average waiting time in the sales branch node 1411 is higher than forecast, the sales branch node 1411 may be colored in red. In addition, the "hours" conditional node 1404*b* is also colored in red as it inherits the color of the most severe branch (here, the sales branch 1411). The "welcome" root node 1404*a* is also colored in red.

In addition to basic building blocks such as a root node 1404*a*, conditional nodes 1404*b*, branching nodes 1404*c*, and end nodes 1404*e*, the specialized application may provide a macro block which is composed of two or more basic building blocks for representing all or a portion of a routing strategy. For example, a "support" macro block may be composed of various basic building blocks for representing a routing strategy that routes an interaction to a "support" agent group. A library of such macro blocks and basic building blocks may be provided for a user to generate complex routing strategies. According to one embodiment, the color of a macro block may be the color of the most severe node included in the macro block. A user may hover a cursor over the macro block to visualize and obtain data on the specific node that causes the macro block to take the particular color.

According to one embodiment, the visual cues allow a contact center worker to quickly identify areas of the contact center that may need attention. For example, in response to the message block 1404*d* having a high abandonment rate, the contact center worker may be alerted via the visual cues that the routing strategy associated with that branch may need attention (e.g., need reconfiguration or additional agents assigned to the branch). According to one embodiment, the specialized application 52 identifies likely causes of the displayed conditions through contact center models, statistical analyses, queue system theory, and the like (e.g., employing the Erlang A, B, or C formulas).

According to one aspect of the present invention, the specialized application 52 may offer suggested solutions to the observed issues. For example, if a call abandonment rate in the sales branch is high, the specialized application may suggest associating an auxiliary agent group with that branch or that the calls be routed to voicemail sooner. In another example, if the heat flow is red for a particular branch of the routing strategy diagram due to an unusually high call volume to a particular agent group (e.g. agents trained to process new credit card applications), a recommendation may be made to a contact center administrator to add more agents to that particular agent group or to focus agents to that particular agent group (e.g., remove agents who are in the particular agent group from other agent groups if the other agent groups would not be adversely affected). These suggestions may be based on best practices, historical data, contact center models, queue system theory, and the like, accessible to the specialized application for analysis.

Figure 35B:
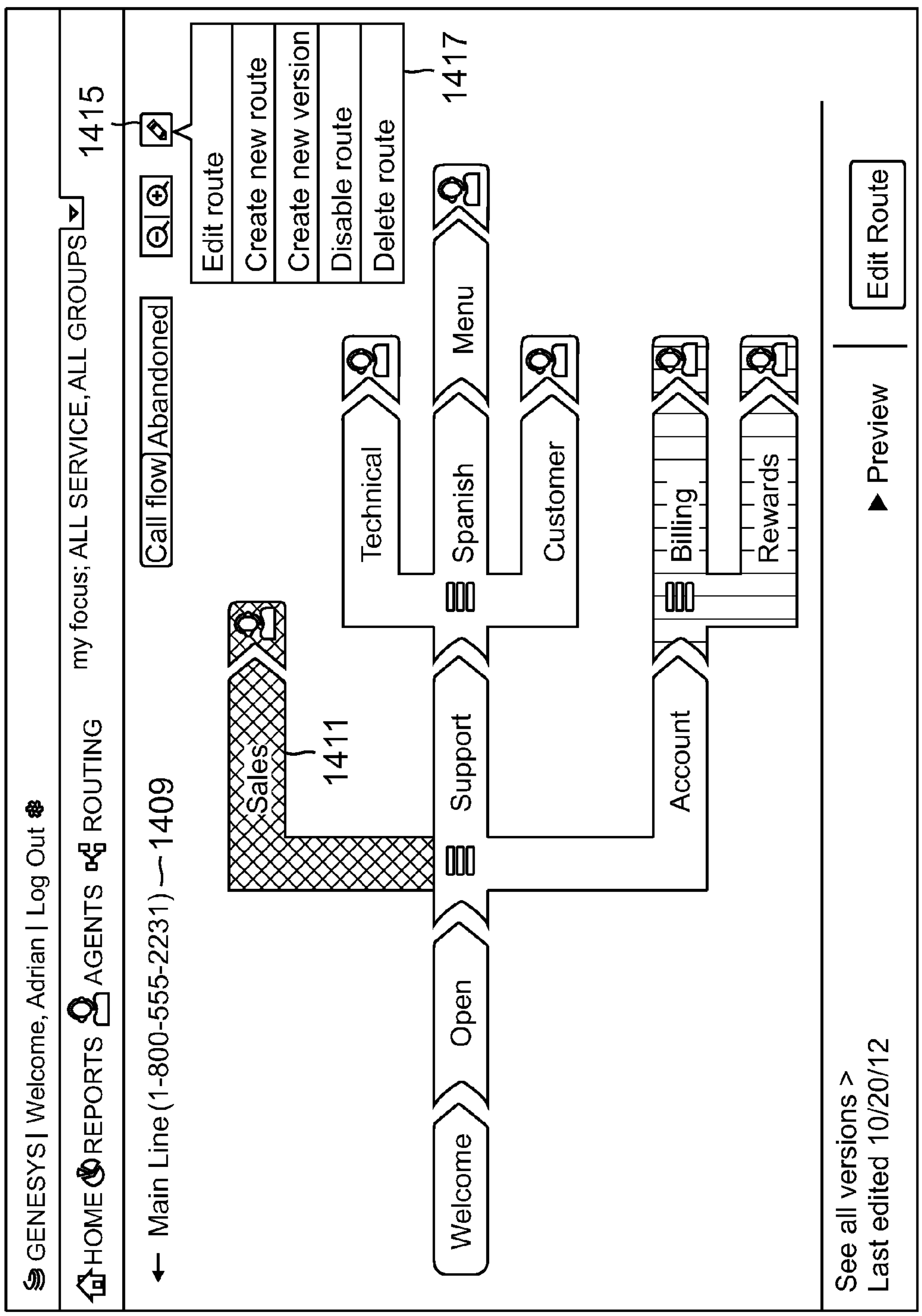
FIGS. 35B-35C are exemplary screen shots of an action that the contact center worker may take in response to a warning visual cue according to one embodiment of the invention.
Figure 35C:
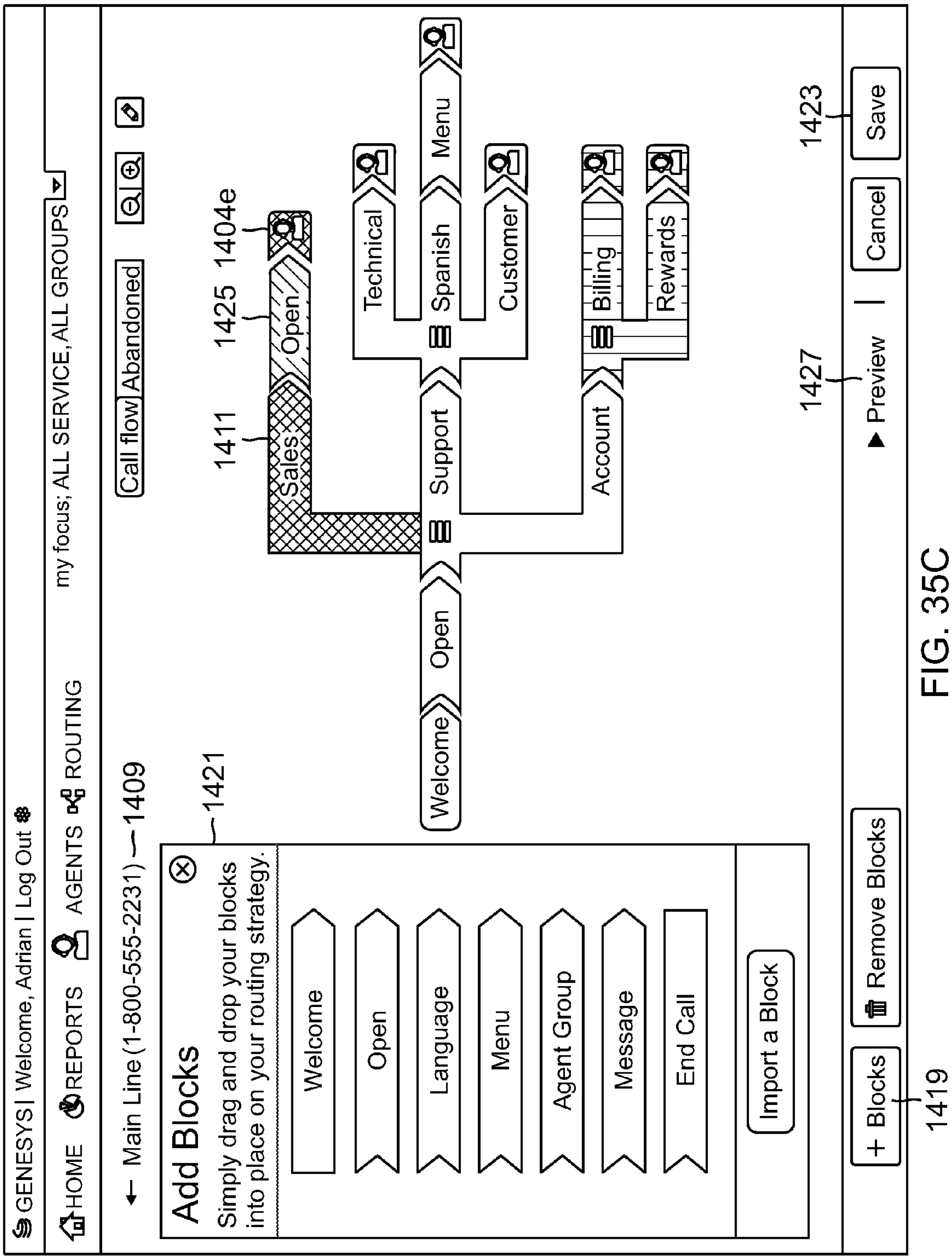

FIGS. 35B-35C are exemplary screen shots of an action that the contact center worker may take in response to determining a moderate abandonment rate in the sale branch 1411 as depicted by a yellow sales branch 1411 and corresponding end node 1404*e*. In response to such a visual cue, the worker invokes an edit option 1415 which causes the specialized application to display a menu of edits 1417 that the worker may take, including editing the route, creating a new route, creating a new version, disabling the route, and deleting the route. In response to the worker selecting the option to create a new version and further invoking an "add block" option 1419 (FIG. 35C), the specialized application causes display of a menu of various routing blocks 1421 that may be added to the existing routing diagram. In the illustrated example, the worker selects an open condition block 1425 for causing the routing strategy to check for the configured business hours prior to routing the call to the end node 1404*e*. According to one embodiment, the addition of the block activates the corresponding SCXML logic of the routing strategy.

Selection of a "preview" option 1427 causes the specialized application to play a preview of the modified routing strategy based on, for example, current metrics, historical metrics, or a combination of both. Appropriate visual cues are provided during the preview mode so that the worker may easily determine whether the modification is expected to solve a current problem. If the worker decides to keep the modified route, he actuates a "save" option 1423 to cause the specialized application to save the modified routing strategy as, for example, a new version of the prior routing strategy. In this regard, the user may enter a name of the routing strategy. The specialized application then saves the routing strategy in association with the route point 1409 in a mass storage device, along with a date in which the particular version was last edited. The saving of various versions allows a contact center to quickly revert to an older version of a routing strategy if a current version is not desirable.

According to one embodiment, a version of a routing strategy that is desired to be tested over a period of time may be invoked for shadow testing in addition to an active version of the routing strategy. This may be desirable if the contact center wants to compare behaviors of different routing strategies concurrently based on current data, and transition to a better performing strategy based on such comparison. In this regard, the routing strategies that are being tested act as if they were active strategies, and generate performance data based on current interactions and conditions. If a particular tested strategy provides to be better performing over a period of time, the contact center may transition to the tested strategy.

According to one embodiment, the threshold(s) used for a particular analysis for triggering particular visual cues may be statically configured and stored, for example, in the configuration server 41. The thresholds may also be adjusted via a threshold slider.

Figure 35D:
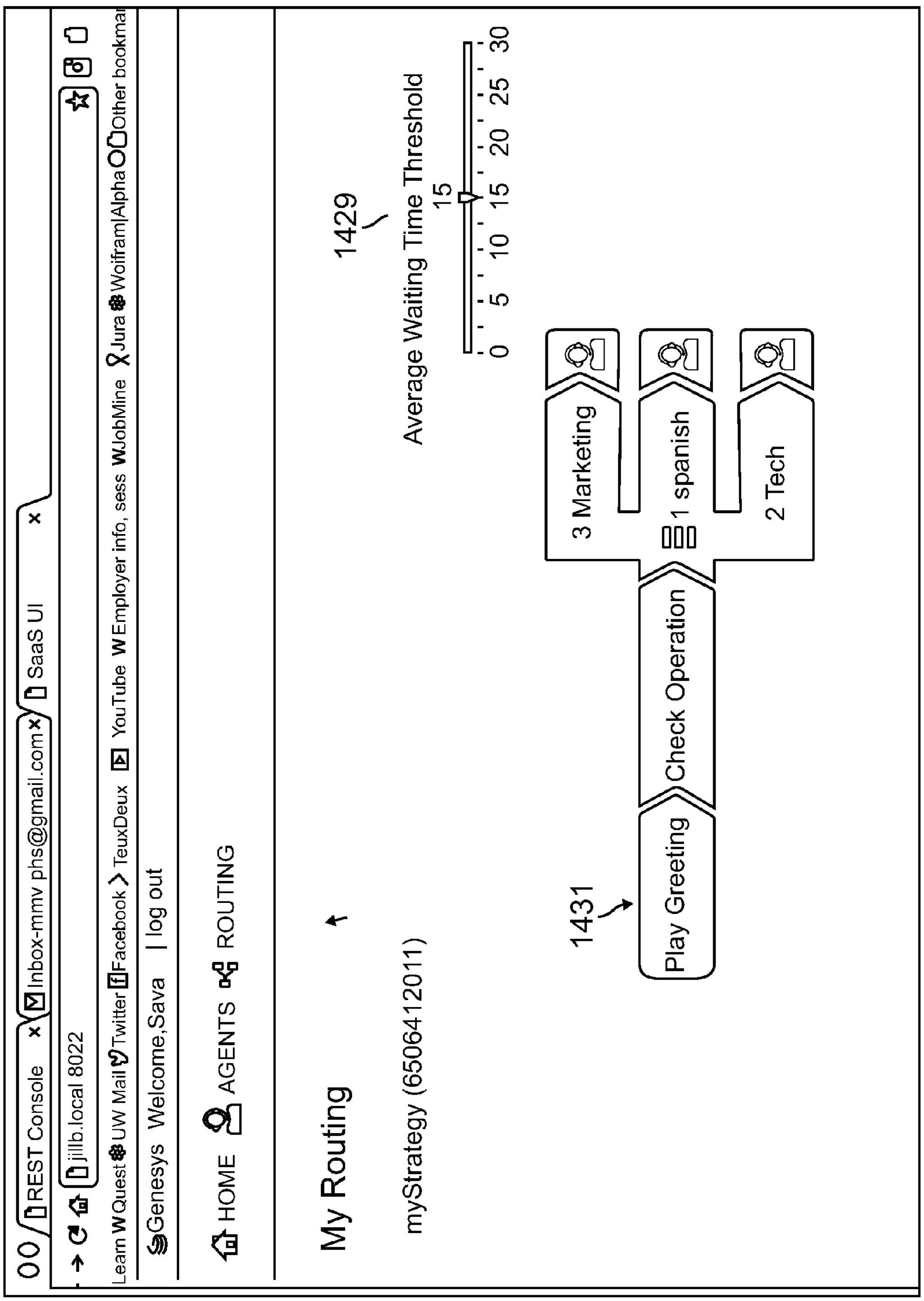
FIG. 35D is a screenshot of a current routing diagram with a threshold slider according to one embodiment of the invention.

FIG. 35D is a screenshot of a current routing diagram with a threshold slider 1429 according to one embodiment of the invention. The threshold may be dynamically adjusted by moving the threshold slider 1429 from one value to another to dynamically visualize the effect of a monitored condition based on the movement of the slider. For example, if the monitored condition is average waiting time, a user may move the slider to increase or decrease the average waiting time threshold. Based on such adjustment of the threshold and further based on current measured statistics, the specialized application modifies the visual cues provided by the various blocks of the routing diagram. For example, increasing the average waiting time threshold may cause more blocks of the routing diagram to turn green, indicating that customers are not, on average, waiting more than the set threshold waiting time.

Embodiments of the present invention apply to contact centers having one phone line and one routing strategy as well as contact centers having multiple phone lines and multiple routing strategies. FIG. 36 is a screen shot of an exemplary UI page 1400B rendered when a contact center has multiple lines and multiple routing strategies. According to one embodiment, the contact center user may navigate among the routing strategies of the various lines 1422 by invoking a thumbnail view 1420 of the various routing strategies.

Accordingly, one or more embodiments of the invention provide an intuitive experience for the contact center administrator, for example, by displaying the contact center routing logic as a birds-eye-view of interactions flowing through the contact center, to aid the contact center administrator with the (re)configuration and monitoring of the contact center without the need of highly skilled IT personnel or extensive pre-acquired knowledge of best practices for call center operations or set up.

C. Reporting Dashboard UI with Triangle Visualization

Hereinafter, the reporting dashboard UI 1600 is described in detail with reference to FIGS. 37A-39. The reporting dashboard UI may be invoked by selecting the report widow 1008 from the home dashboard 1002. According to one embodiment, selecting the home dashboard invokes a reporting dashboard UI script of the specialized application 52 which renders a UI page of the reporting dashboard UI. For example, a main reporting dashboard UI may be rendered.

Figure 37A:
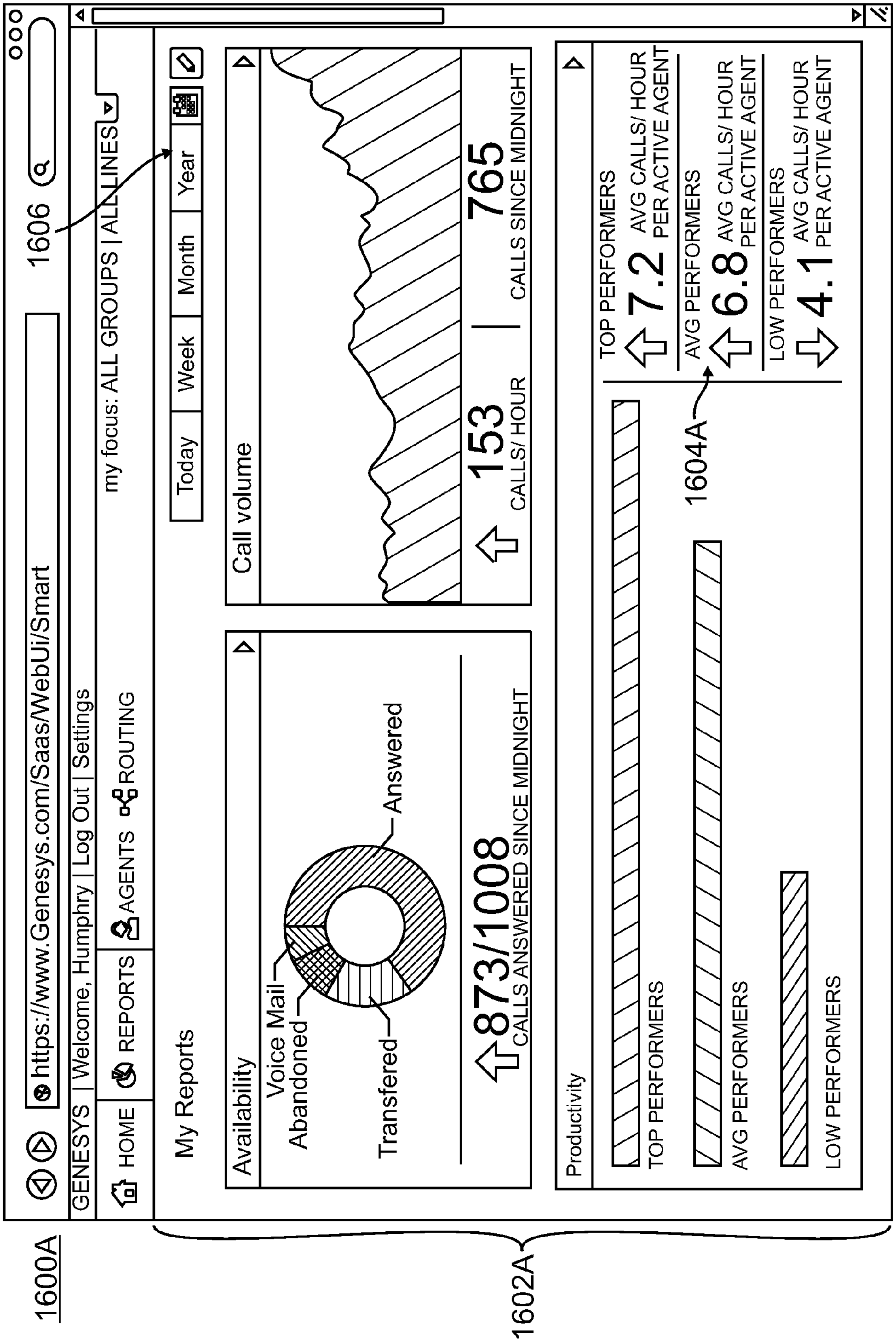
FIGS. 37A-38 are screen shots of a UT page rendered when a reporting dashboard is selected from the home dashboard according to one embodiment of the invention.
Figure 37B:
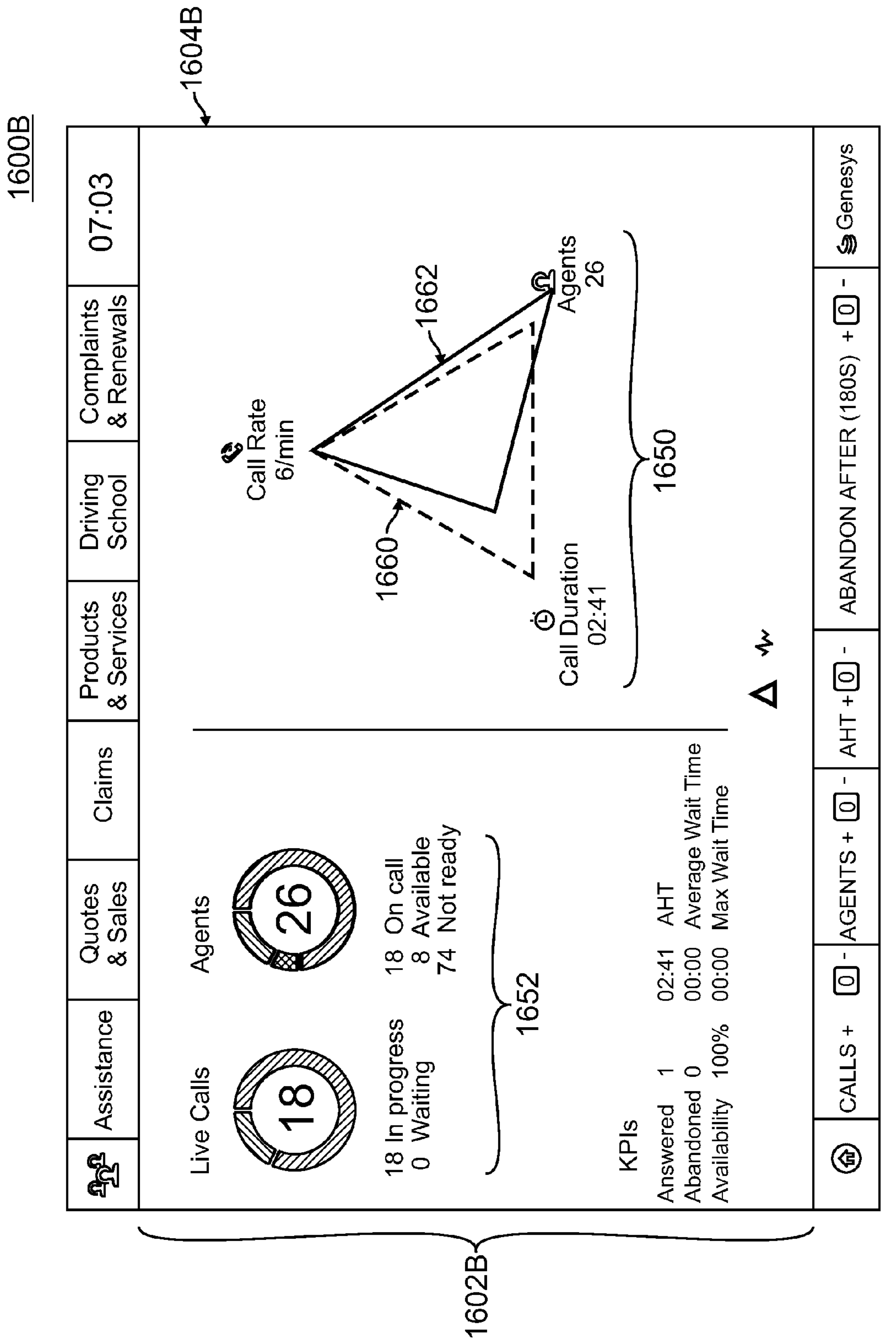
Figure 37C:
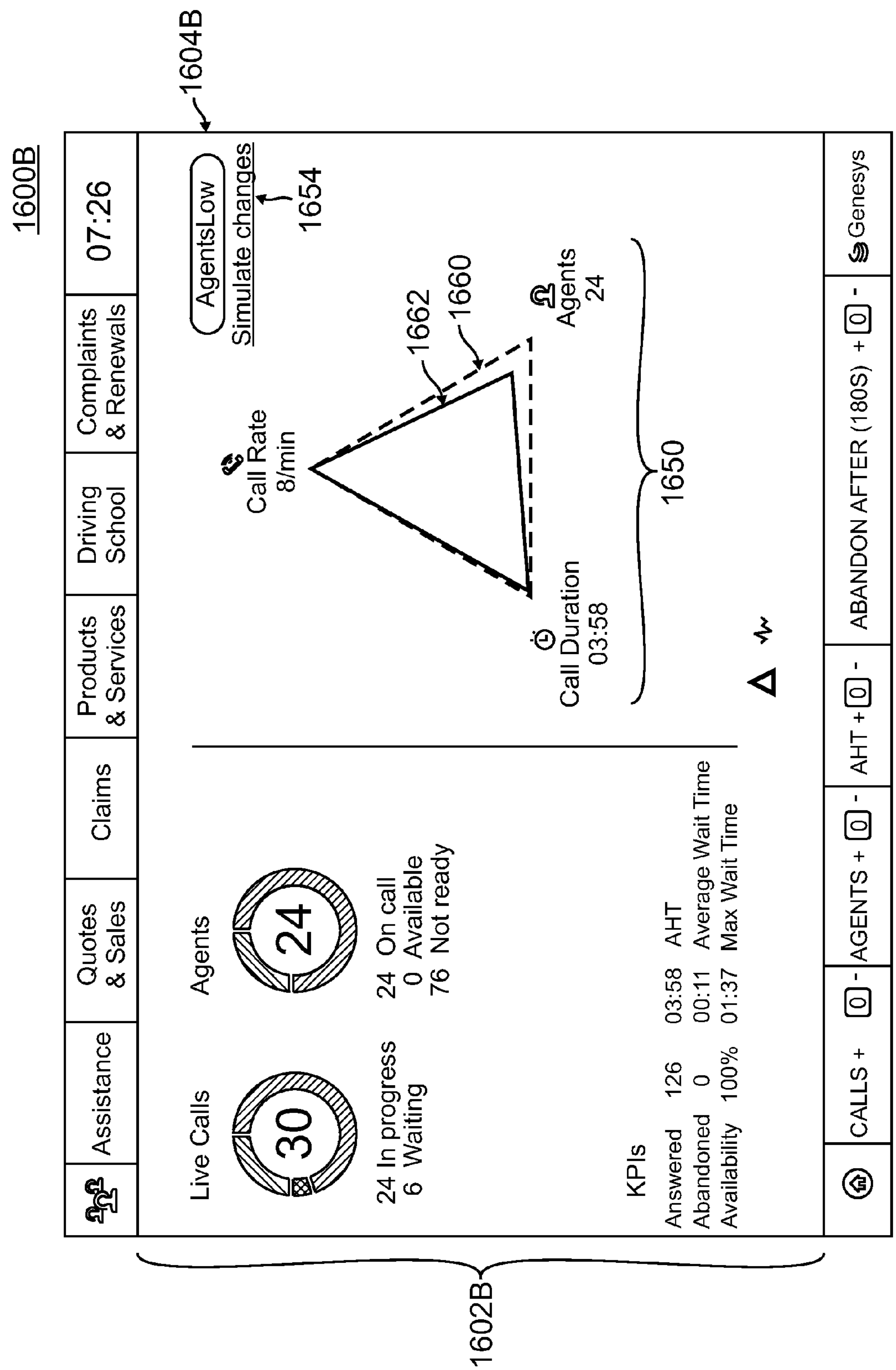
Figure 37D:
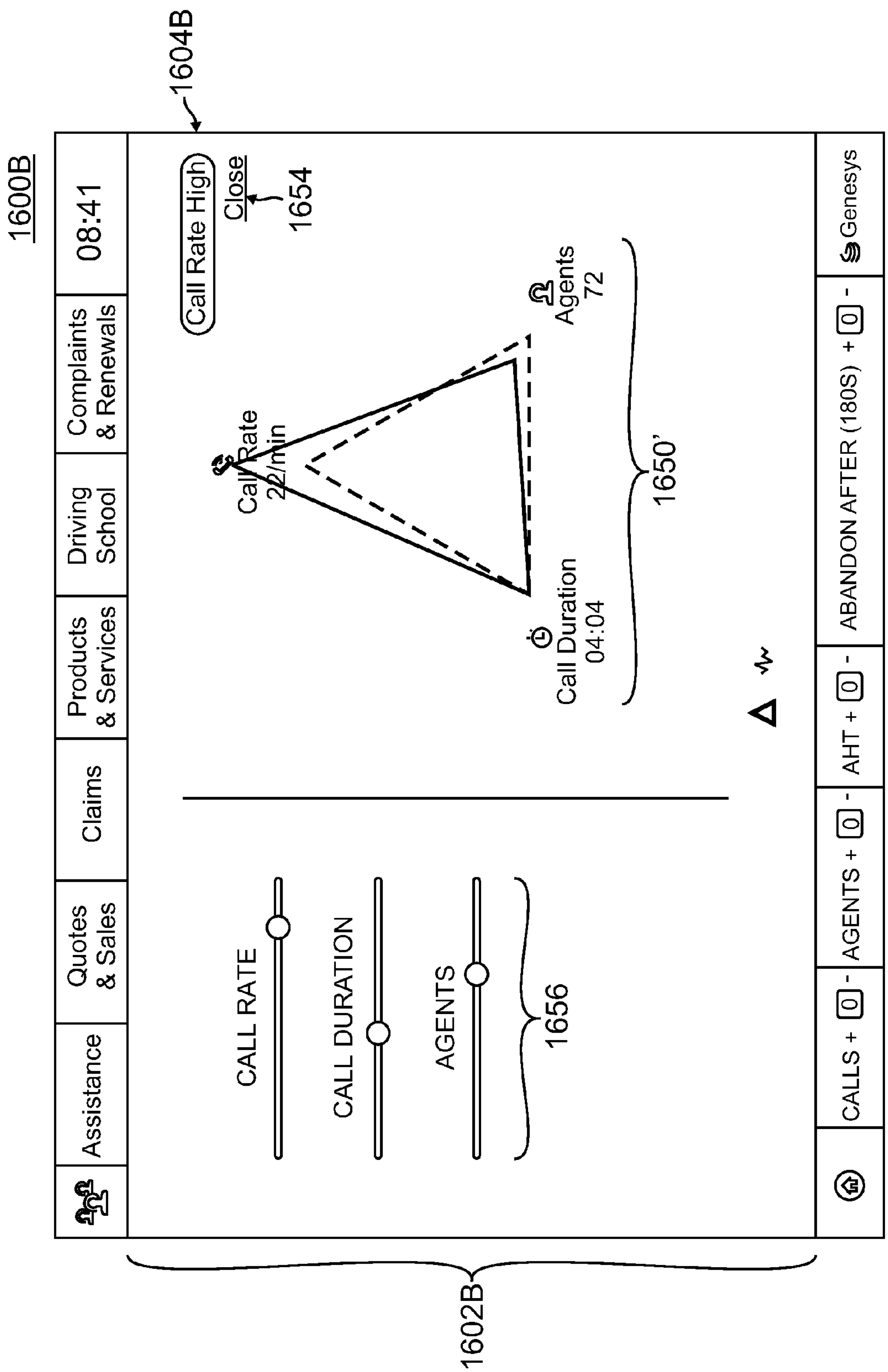
Figure 38:
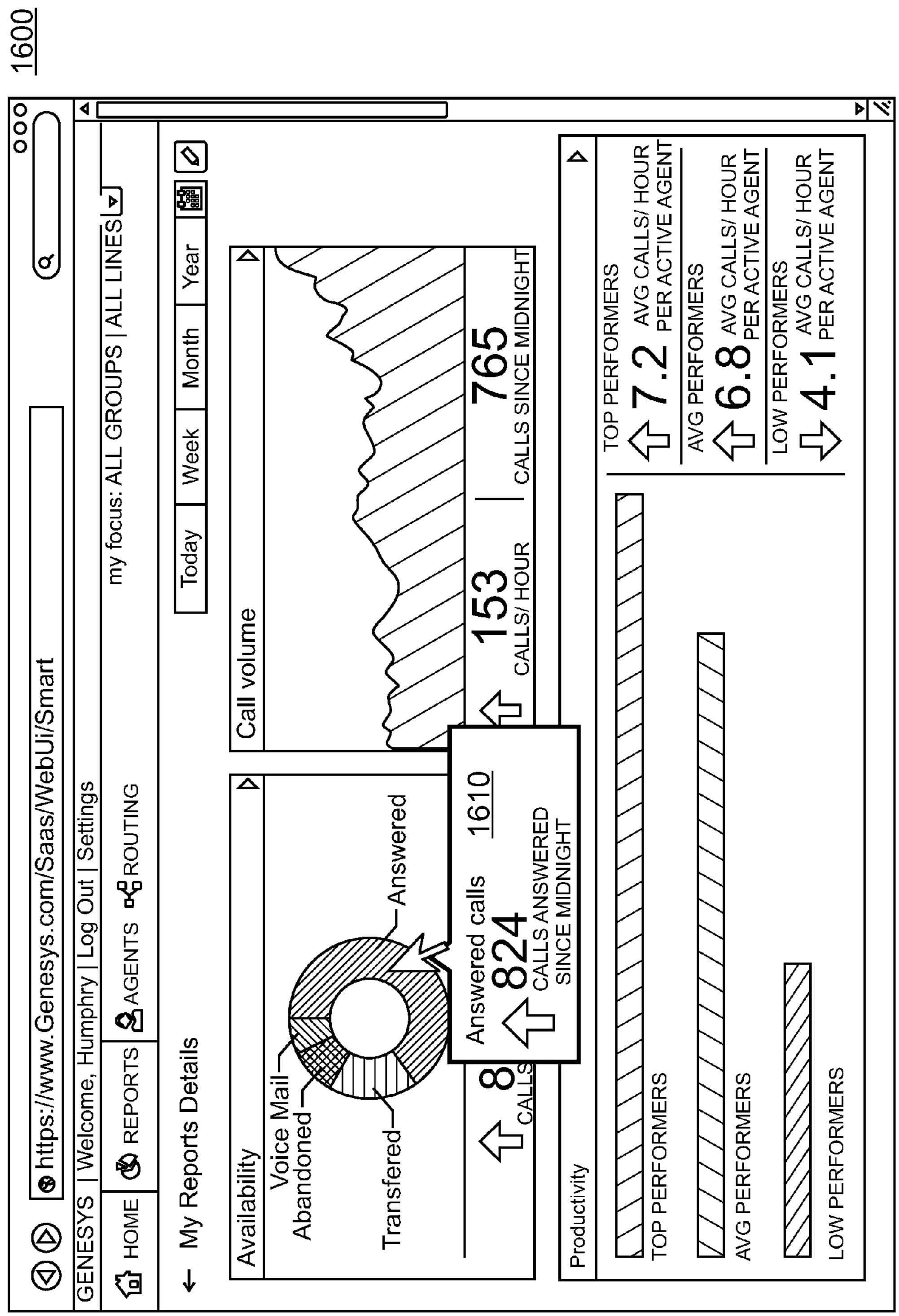

FIGS. 37A-38 are screen shots of a main reporting dashboard UI according to one or more embodiments. Referring to FIG. 37A, the main reporting dashboard UI 1600A includes a report display window 1602A including report widgets 1604A and a time widget 1606. According to one embodiment, the report display window 1602A corresponds to the report workspace 602 describe above in connection with the report management option 206. Here, the report display window 1602A displays the report widgets 1604A in the same arrangement and configuration as the report widgets 604 of the report workspace.

Similar to the report widgets 604 described above, the report widgets 1604A in the report display window 1602A are configured to effectively and efficiently communicate contact center metrics to a contact center worker. As described above, the call center metrics may be any suitable metric relevant to a contact center, and the metrics may be displayed through various means including, charts, graphs, icons, color alerts, text fields, etc.

The time widget 1606 includes options for changing the relevant time period of the data displayed. For example, the time widget 1606 may include a day, week, month, year, and calendar option. According to one embodiment, the selection of one of these option changes the data being displayed in the report widgets 1606. For example, selecting the week option may change the display of an availability window to display data relating to calls received in the current week instead of call received since midnight. Selecting the calendar option of the time widget 1606, may allow for data to be displayed relating to a historical time period. For example, a day or a date range may be selected and the data displayed in the report widgets 1604A may be changed to correspond to the particular day or date range selected.

In FIG. 37A, the report widgets are shown to include an availability widget, a call volume widget, and a productivity widget. Of course, a person of ordinary skill in the art would recognize that the report display window is not limited to these types of report widgets. For example, FIGS. 37B-37D show screenshots of a main reporting dashboard 1600B including a report widget 1604B having a health visualizer 1650 displayed in a report display window 1602B.

The health visualizer 1650 is a report visualization tool provided for effectively and efficiently communicating the overall health of the contact center to a contact center worker. According to one embodiment, the health visualizer 1650 displays the interrelationship of a plurality of contact center metrics to indicate the overall health of the contact center. In the embodiment of FIGS. 37B-D, the health visualizer 1650 is rendered as a triangle, however, a person of ordinary skill in the art should recognize that the features of the health visualizer 1650 may be extended to other shapes and other geometric objects.

The health visualizer 1650, according to one embodiment, displays the overall health of the contact center by displaying the interrelationship and status of a plurality of (e.g., three) contact center metrics. In the present embodiment, the contact center metrics include the number of agents, call rate, and call duration. As described above, the health visualizer 1650 of the present embodiment is implemented as a triangle. Here, each of the contact center metrics is displayed as a vertex of the triangle.

According to one embodiment, the health visualizer 1650 indicates the health of the contact center by quickly showing whether or not relevant health indicators (or metrics) are within acceptable bounds. The health visualizer 1650 may indicate whether or not the relevant health indicators are within acceptable bounds via two triangles 1660 and 1662. The first triangle 1660 may be of a predefined shape and may indicate the bounds of a healthy contact center. The second triangle 1662 may continually adjust its shape according to real-time conditions of the contact center.

Points of the triangle may be associated with icons related to the health indicators. The icons may be rendered such that a contact center worker can quickly differentiate between the multiple health indicators. Real-time data may displayed with the health indicators; for example, value of the number of agents, call rate, and call duration may be displayed. A report display 1652 may be included in the report widget 1604B. The report display 1652 may provide a display of relevant contact center metrics.

According to one embodiment, the bounds of the first triangle 1660 are defined according to a contact center health formula. For example, the bounds of the first triangle may be defined according to an Erlang C formula, which includes the call rate, the call duration, and the number of agents as variables. According to one embodiment, the contact center health formula is set to a constant (or a constant range) that represents a healthy contact center. The bounds for the first triangle may be derived according to the contact center health formula and one or more of historical information, call center configuration, call center resources, and industry best practices.

According to one embodiment, the second triangle 1662 continually adjusts to correspond to real time contact center health indicators. For example, when the number of agents increases, the leg of the triangle associated with the number of agents may extend. As described above, the contact center health indicators may be interrelated. Accordingly, in one embodiment, the shape of the second triangle 1662 adjusts to indicate that interdependency. For example, when the number of agents increases, the leg indicating the number of agents may increase, which may also affect the leg indicating call duration. For example, the call duration leg may increase as agents may be able to spend more time with a customer for example, trying to make an upsell.

The health of the contact center may be readily displayed by comparing the first triangle 1660 to the second triangle 1662. According to one embodiment, the greater the difference between the two triangles, the less optimal or less healthy the contact center is. Here, a healthy contact center that is running optimally may be indicated by the first triangle 1660 and the second triangle 1662 overlapping. In this scenario, the contact center is operating efficiently because all agents are being effectively utilized and interactions are being processed timely.

When the first triangle 1660 and the second triangle 1662 do not overlap, this may be an indication that the contact center is not running optimally; however, this does not necessarily mean that the contact center is unhealthy. For example, as shown in FIG. 37B, the number of agents may exceed the number of live calls. Here, while the contact center may not be optimally operating (e.g., agents are under-utilized), the level of service or efficiency may be within an acceptable range. In this scenario, the second triangle 1662 may be represented as deviating from the shape of the first triangle 1660 to indicate the inefficiency or lower level of service; however, the health visualizer 1650 may further indicate that this is not a major problem. In one embodiment, the health visualizer 1650 may color-code the second triangle 1650 to indicate when the contact center is operating with an acceptable inefficiency or an acceptable lower level of service.

When, however, the contact center is operating under non-optimal conditions and also outside of an acceptable operating range, the second triangle 1662 may be represented as deviating from the shape of the first triangle 1660 and the health visualizer 1650 may provide another indicator to alert the contact center worker to the unhealthy condition. In one embodiment, the health visualizer 1650 displays the second triangle 1662 in a contrasting color from the first triangle 1660 to indicate an unhealthy contact center.

According to one embodiment, the main reporting dashboard UI 1600B may include a status alert 1604B to provide further information on the health of the contact center. For example, as shown in FIG. 37C, when the health visualizer 1650 indicates that the contact center is unhealthy, the status alert 1604B may be rendered to further indicate that the contact center is unhealthy. According to one embodiment, the status alert 1604 indicates (e.g., via text), the likely root cause of the contact center health issue. The root cause may be ascertained according to call center heath formulas (e.g., Erlang formulas), call center history, call center resources, industry best practices, or combinations thereof.

When the contact center is unhealthy, the contact center worker may desire to correct the root cause of the issue. However, as described above, contact center parameters are interrelated, and thus, there may be many ways to address contact center issues. Furthermore, different methods of correction may be more or less effective, efficient, expensive, or practical to implement. Also, due to the complexities of a contact center, it may not be intuitive to the contact center worker assigned to implement the changes what the likely effects of a particular change might be. Accordingly, it is desirable to have a mechanism for simulating changes to the contact center to develop a strategy to improve the health of the contact center.

According to the embodiment of FIG. 37D, the main reporting dashboard UI 1600B includes a simulation mode option 1654. When a contact center worker selects the simulation option 1654, the main reporting dashboard UI 1600B may execute a simulation mode, and provide a simulated health visualizer 1650' and a parameter tool bar 1656. According to one embodiment, the simulation mode enables the contact center worker to model the effects of changes made to parameters of the contact center. For example, the contact center worker may use the parameter tool bard 1656 to see if adding more agents would place the contact center back into healthy and optimal operation.

Once the contact center worker has decided upon a plan of action to address the contact center health issues, the contact center worker may execute the plan of action using the contact center dashboard of an embodiment of the present invention.

Figure 61:
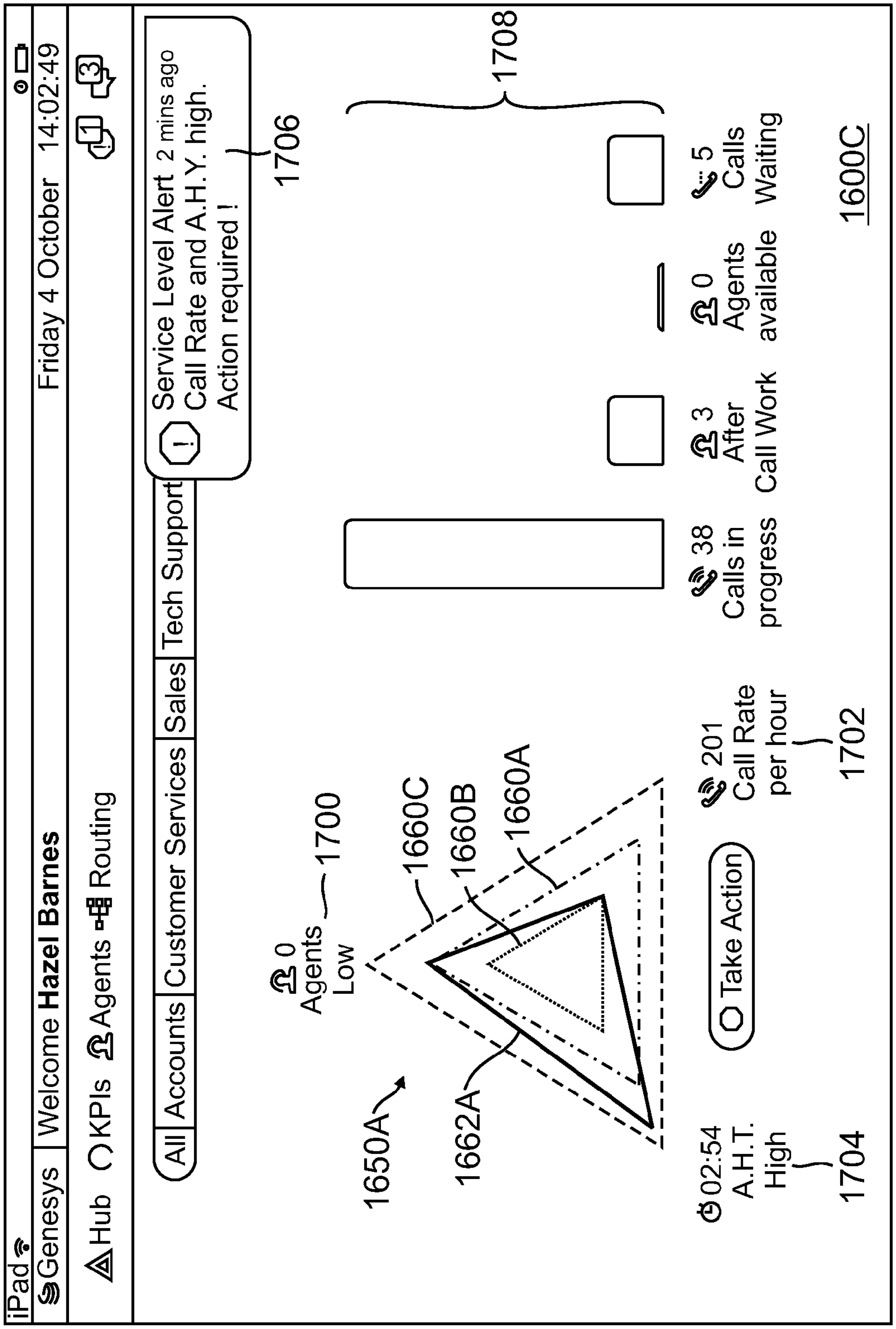
FIG. 61 is a screenshot of a reporting dashboard UI according to another embodiment of the invention.

FIG. 61 is a screenshot of a reporting dashboard UI 1600C according to another embodiment of the invention. The reporting dashboard UI may be used, for example, by an intra-day manager managing the workforce for a contact center. According to this embodiment, a performance visualizer 1650A, which may be similar to the health visualizer 1650 of FIGS. 37B-37D, is provided for displaying forecast or scheduled contact center metrics against actual contact center metrics. The reference metric may be those used for workforce management, such as, for example, number of agents or occupancy 1700, call rate or interaction volume 1702, and average handle time (AHT) 1704. Other metrics may also be visualized together or separately from the exemplary metrics shown in FIG. 61, such as, for example, abandonment rate, occupancy rate, average hold time, and the like.

According to one embodiment, the performance visualizer 1650A displays forecast and scheduled (collectively referred to as "predicted" or "anticipated") contact center metrics via a 2D reference triangle 1660A, and current metrics as a 2D current triangle 1662A. The triangles may be updated on a periodic basis, such as, for example, every 15 minutes. In embodiments where more than three metrics are to be visualized at a time, the performance visualizer 1650A may allow the visualization of such metrics using other geometric shapes, such as, for example, quadrants (for visualizing four metrics), pentagons (for visualizing five metrics), and the like.

According to one embodiment, the reference triangle 1660A is normalized to a common scale and displayed as an equilateral triangle. According to this embodiment, the reference triangle does not vary in shape regardless of what the underlying predicted metrics might be. Also, in some embodiments, the reference triangle 1660A may be color coded to depict the kind of prediction that was used to generate the reference triangle 1660A. For example, if at the planning/forecast stage it was predicted that the contact center would be understaffed at a particular time period, the reference triangle may be displayed in a particular color (e.g. yellow) to inform the intra-day manager of this fact during that time period. Thus, if KPIs are not met during this time due to, for example, delays in answering inbound calls, this will not be a surprise to the manager.

According to one embodiment, instead of a single reference triangle 1660A, two or more other reference triangles may also be displayed. For example, a lower bound reference triangle 1660B and an upper bound reference triangle 1660C may be shown if the predicted measurements are provided as a range of values instead of a single discrete value. For example, if 40 to 50 calls are predicted for a particular time interval, the interaction volume point 1702 may reflect 40 calls for the lower bound reference triangle 1660B, and 50 calls for the upper bound reference triangle. Reference triangle 1660A may also be shown in addition to the lower and upper bound references triangles as, for example, an average of the lower and upper bounds.

According to one embodiment, the current triangle 1662A is also normalized to the common scale used by the reference triangle, and overlaid on top of the reference triangle. The shape of the current triangle varies based on the actual measurements captured by, for example, the statistics server 50. Such measurements may be updated, for example, every 15 minutes. According to one embodiment, the display of the reference triangle remains constant, and the display of the current triangle is updated based on the updated measurements to show, for example, a change in deviation between the reference triangle and the current triangle.

When the current measurements deviate from the predicted measurements, the current triangle 1662A deviates from the reference triangle. By overlaying the two triangles, a user can get a quick view as to where the deviations occurred. The visualization of the deviation may also alert the user that KPIs have or have not been met. For example, if the current number of agents is less than the scheduled number of agents, the number of calls is more than the predicted number of calls, and/or AHT is higher than predicted, the resulting deviation in the current triangle should quickly inform the user that KPIs are not being met. An alert may then be display to prompt an administrator to take action. According to one embodiment, an alert message 1706 is displayed by the reporting dashboard UI 1600C that indicates what kind of deviation has occurred, and for which metric. A list of various possible options to correct the deviation may be suggested via a suggestion window (not shown), together with an estimated benefit of applying the option. A possible option when call rate is high and there are no more available agents may be to enable the skills of certain agents (e.g. agents with multiple or cross-skills) so that those agents are now available to handle the high volume of calls, transfer outbound agents to handle inbound calls, and/or divert the calls to other affiliated contact centers. Another option may be to adjust the routing strategy to send a higher percentage of calls to an interactive media response (IMR) server including, for example, an interactive voice response system (IVR). Yet another option may be to send notifications to agents to shorten their calls, and suppress suggestions to cross-sell/upsell.

According to one embodiment, a learning module may be invoked to learn from history and suggest corrective actions that were successful in the past. The learning module may be configured to not only suggest actions based on historical knowledge, but also prioritize/rank the actions for the user. The priority assigned to a suggested action may be based on success in the past to correct a similar deviation in the past for this particular contact center and/or particular date and time, or based on historical knowledge of other contact centers.

Certain types of deviations may quickly inform the user that KPIs are met or even exceeded. This may happen, for example, if the current number of agents is more than the scheduled number of agents, the number of calls is less than the predicted number of calls, and/or AHT is lower than predicted. Thus, not all deviations are bad in terms of KPIs that relate to a customer's particular experience and thus, an alert may not be needed in these types of situations. However, an overstaffed contact center or agents with a low occupancy rate may not be desirable from the perspective of the contact center, resulting in low KPI from the perspective of the contact center. Thus, it may be desirable to provide suggestions to bring the contact center to a more balanced state even when customer KPIs are being exceeded. For example, a suggestion in light of excess capacity in the actual number of agents may be made to disable multi-skill for a certain number of agents, occupy certain agents to handle back-office work or other tasks, prompt agents to do more cross-sell or upsell during a current call, and/or the like.

In addition to the triangles, certain key performance indicators (KPIs) may also be shown, such as, for example, service levels. In one example, a service level is met is 80% of calls are serviced in 20 seconds, abandonment rate is less than 5%, or occupancy is more than 80%. A percentage of calls that meet the service level may be displayed as, for example, a bar in area 1708 along with other contact center data.

Figure 62A:
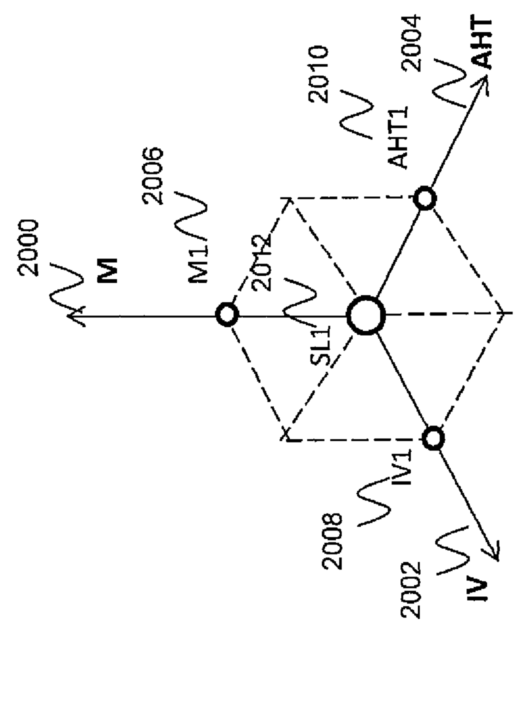
FIG. 62A is a schematic diagram of a 3D graph for generating either a reference or actual triangle according to one embodiment of the invention.

FIG. 62A is a schematic diagram of a 3D graph for generating either a reference or actual triangle according to one embodiment of the invention. The 3D graph includes three axes oriented in way so that an agent axis 2000 is centered and vertical. An interaction volume (IV) axis 2002, and an AHT axis 2004 project away from the agent axis 2000 at the same angle. According to one embodiment, the axes are nonlinear. A point is placed on each axis based on the predicted or calculated value. In the illustrated example, agent 2006, IV 2008, and AHT 2010 values are shown on the agent axis 2000, IV axis 2002, and AHT axis, respectively. A service level 2012 may also be calculated as a function of the agent, IV, and AHT, and shown on the graph.

Figure 62B:
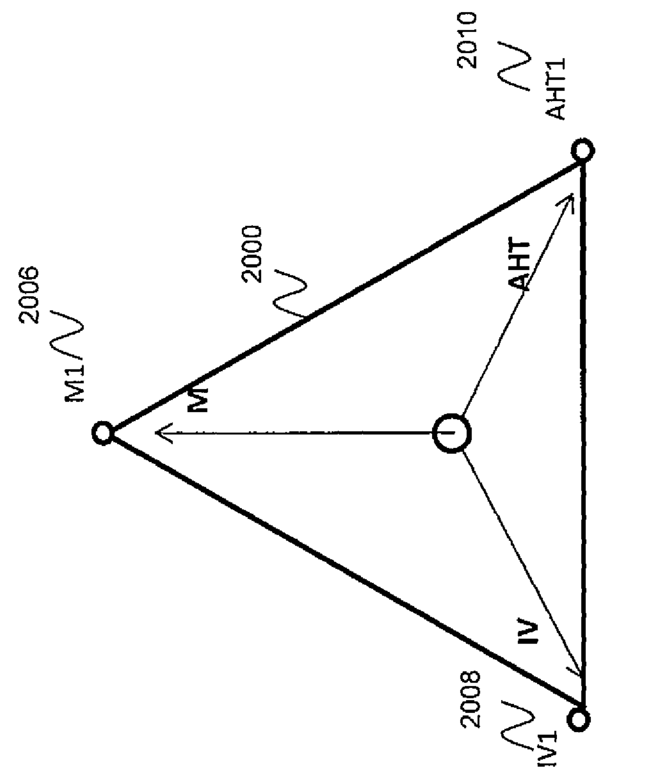
FIG. 62B is a schematic diagram of a triangle generated from the 3D graph of FIG. 62A.

FIG. 62B is a schematic diagram of a triangle 2100 generated from the 3D graph of FIG. 62A. The triangle 2100 may be a reference triangle or an actual triangle. In generating the triangle, the three axes of the 3D graph are removed, and the agent, IV, and AHT values are connected to form the legs of the triangle.

Figure 63:
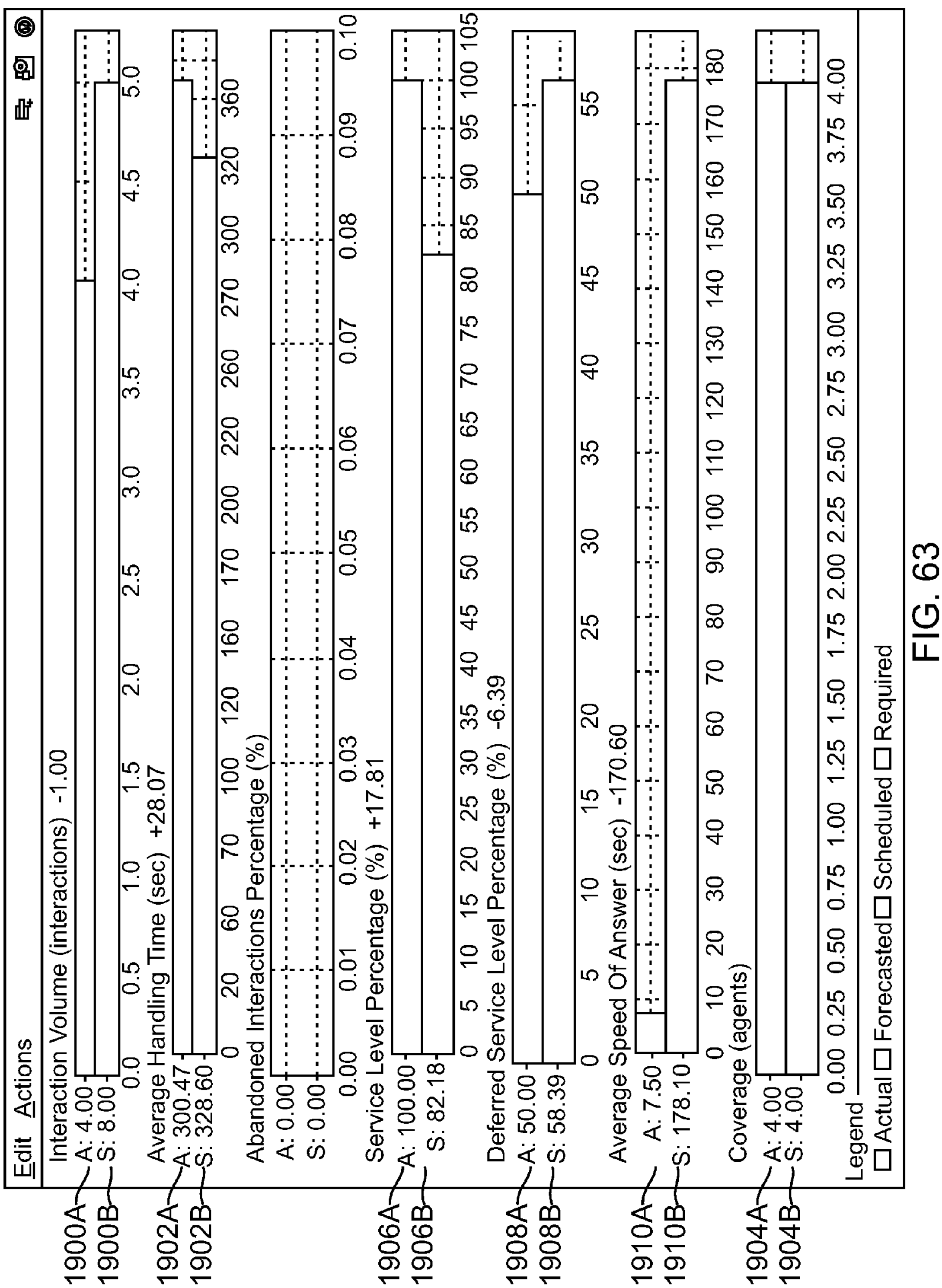
FIG. 63 is a screenshot of a monitoring UI for monitoring and capturing how a contact center is performing against what has been forecast and scheduled.

FIG. 63 is a screenshot of a monitoring UI for monitoring and capturing how a contact center is performing against what has been forecast and scheduled. According to one embodiment, the monitoring UI is updated periodically, such as, for example, every 15 minutes. According to one embodiment, the actual performance data is visualized via the actual triangle 1662A of FIG. 61, and the forecast/scheduled data is visualized via the reference triangle 1660A.

In one example, the monitoring UI displays an actual IV 1900A against a forecast IV 1900B; actual AHT 1902A against forecast AHT 1902B; and actual coverage (agents) 1904A against scheduled coverage 1904B. The monitoring UI may also display different types of KPIs, such as, for example, actual service level percentage 1906A displayed against forecast service level percentage 1906B for real-time interactions; and actual deferred service level percentage 1908A displayed against forecast deferred service level percentage 1908B for non-real time interactions such as, for example, emails. Actual average speed of answer 1910A may also be displayed against forecast average speed of answer 1910.

The various predicted values may be calculated according to well know algorithms such as, for example, Erlang A, B, or C formulas.

According to one embodiment, the actual and predicted agent, IV, and AHT data is used to generate the actual and reference triangles 1662A, 1660A respectively.

Referring now to FIG. 38, information additional to or other than the information initially displayed in the report display window 1602 may be presented to the contact center worker via the reporting dashboard. For example, additional information relevant to a particular report widget 1604 may be displayed in a pop-up window (or tool-tip) 1610. A detailed report may also be generated.

Figure 39:
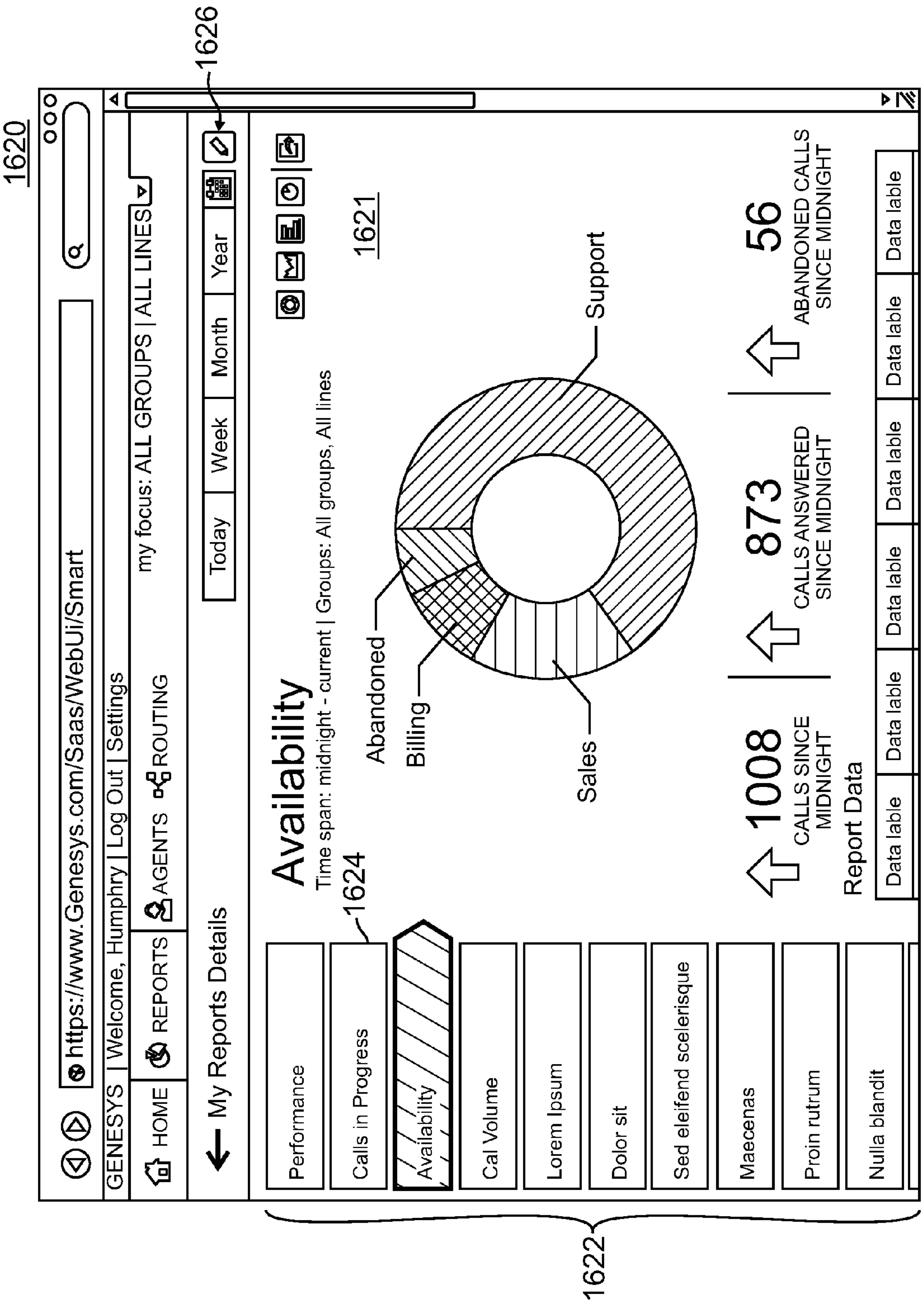
FIG. 39 is a screen shot of a UI page rendered when a report details dashboard is selected from the reporting dashboard according to one embodiment of the invention.

FIG. 39 is a screenshot of a detailed report dashboard UI 1620 according to one embodiment. The detailed report dashboard UI 1620 may be invoked from the report dashboard UI 1600, for example, by selecting a particular report widget 1604 for detailed display. In one embodiment, a detailed report script of the specialized application 52 renders the detailed report dashboard UI 1620.

The detailed report dashboard UI 1620, according to one embodiment, displays detailed information relevant to a particular report (e.g., information additional to the information displayed in the report widget 1604). The detailed report dashboard UI 1620 may include a detailed report window 1621 displaying detailed information relevant to a particular report. The detailed report widow 1621 may display the information via any suitable display means including, but not limited to, charts, graphs, icons, lists, text fields, color-coding, trends, etc.

The detailed report dashboard UI 1620 may be configured to display information relevant to one detailed report at a time (but is not limited thereto). Additional detailed reports may be selected by, for example, navigating back to the report dashboard 1600 or by selecting another report from the detailed report menu 1622.

The relevant time period displayed in the detailed report may be changed via a time widget 1626.

D. Agent Control Dashboard UI

Hereinafter, an agent control dashboard UI 1800 according to one or more embodiments of the present invention is described in connection with FIGS. 40-50. FIGS. 40-50 are screenshots of an agent control dashboard according to one embodiment. According to one aspect of the invention, agents of a contact center may execute their duties and monitor their performance via an agent control dashboard UI. According to one embodiment, the agent control dashboard UI may be rendered by the specialized application 52.

Figure 40A:
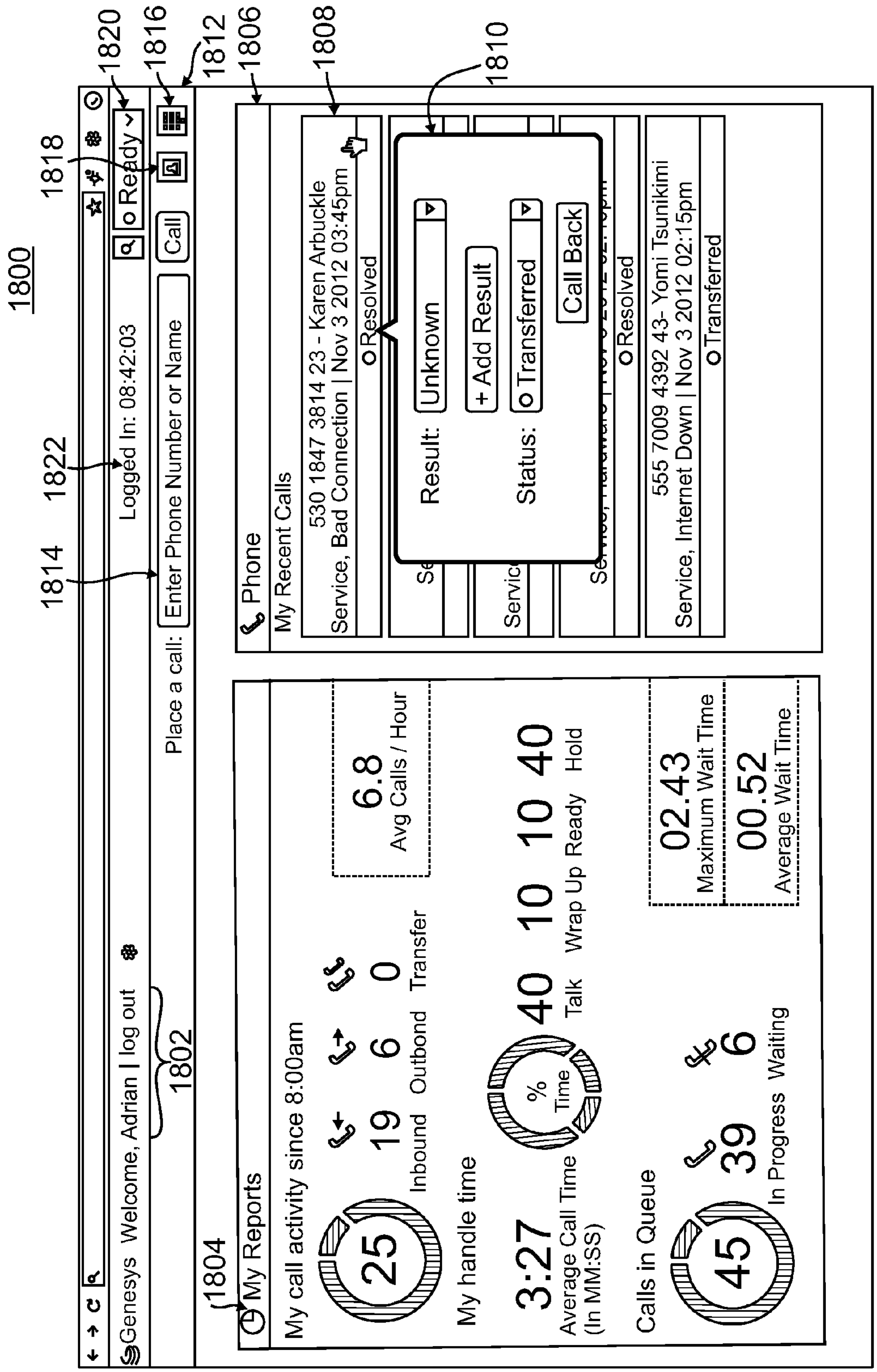
FIGS. 40A-50 are screens shots of a UI page rendered when an agent dashboard is selected from the home dashboard according to one embodiment of the invention.

FIG. 40A is a screen shot of an agent control dashboard UI 1800 according to one embodiment. The agent control dashboard UI 1800 of FIG. 40A is an interaction workspace for an agent of a contact center. Agents in a contact center perform a variety of tasks, including, but not limited to, processing interactions (e.g., receiving or making phone calls to customers or participating in a chat session), after interaction work, and background work. According to one embodiment, the agent control dashboard provides the workspace for the agents to perform their assigned tasks, monitor their performance, and monitor the status (or health) of the contact center.

The agent control dashboard UI 1800 may include a log-in menu 1802. Each agent of a contact center can be assigned a particular user name and password. By using, for example, the log-in menu 1802, a particular agent may log into their account to bring up their personalized agent control dashboard. According to one embodiment, an administrator of a contact center may control access to features or permissions for the agents of a contact center. Accordingly, the features available to a particular agent through their personalized agent control dashboard may vary agent to agent. Agent access, permissions, set-up, etc. may be controlled via the agents dashboard UI 1200. An agent may view her time logged in via a display 1822.

The agent control dashboard UI 1800, according to one embodiment, is part of a larger integrated contact center monitoring and management system. Accordingly, as the agent interacts with the contact center via the agent control dashboard UI 1800, the agent's activity and status is fed back into the larger integrated system for use in, for example, implementing routing strategies and monitoring the contact center. In one embodiment, the specialized application 52 monitors the agent's interactions and activity, for example, to determine whether or not the agent is available to receive an interaction (e.g., a call).

In the embodiment of FIG. 40A, the agent may actively set her status via the status menu 1820. When the agent selects the status menu 1820, a drop down menu may be displayed listing a plurality of predefined statuses (e.g., ready, not ready, do not disturb, after call work, training, lunch, break, consulting, away from desk, etc.) The status menu 1820 may include (e.g., initially include) default status indicators, which may be those identified by industry best practices. According to one embodiment, a contact center worker may add or remove custom status indicators to the status menu 1820 for selection by the agent. The status indicators may be color coded to aid quick selection and at-a-glance recognition of status.

The status selected by the agent via the status menu 1820, according to one embodiment, is used by the contact center to route interactions, for monitoring, and for generating reports.

When the agent first logs on, the status may default to "not ready." At this point, the contact center logic may recognize that the agent is logged in (e.g., for its agent count) but may not route an interaction to the agent. When the agent is ready to receive calls, the agent may change her status via the status menu 1820 to "ready". This status is recognized by the contact center logic, and interactions will now be routed to the agent according to the configured routing logic.

Agent status may be used for performance evaluation and monitoring. For example, by analyzing the time an agent spends in after call work, a supervisor may be able to ascertain the agents work efficiency.

According to one embodiment, an agent's status automatically changes depending on the agent's activity. For example, the agent status may automatically switch to after call work when a call ends.

Figure 40B:
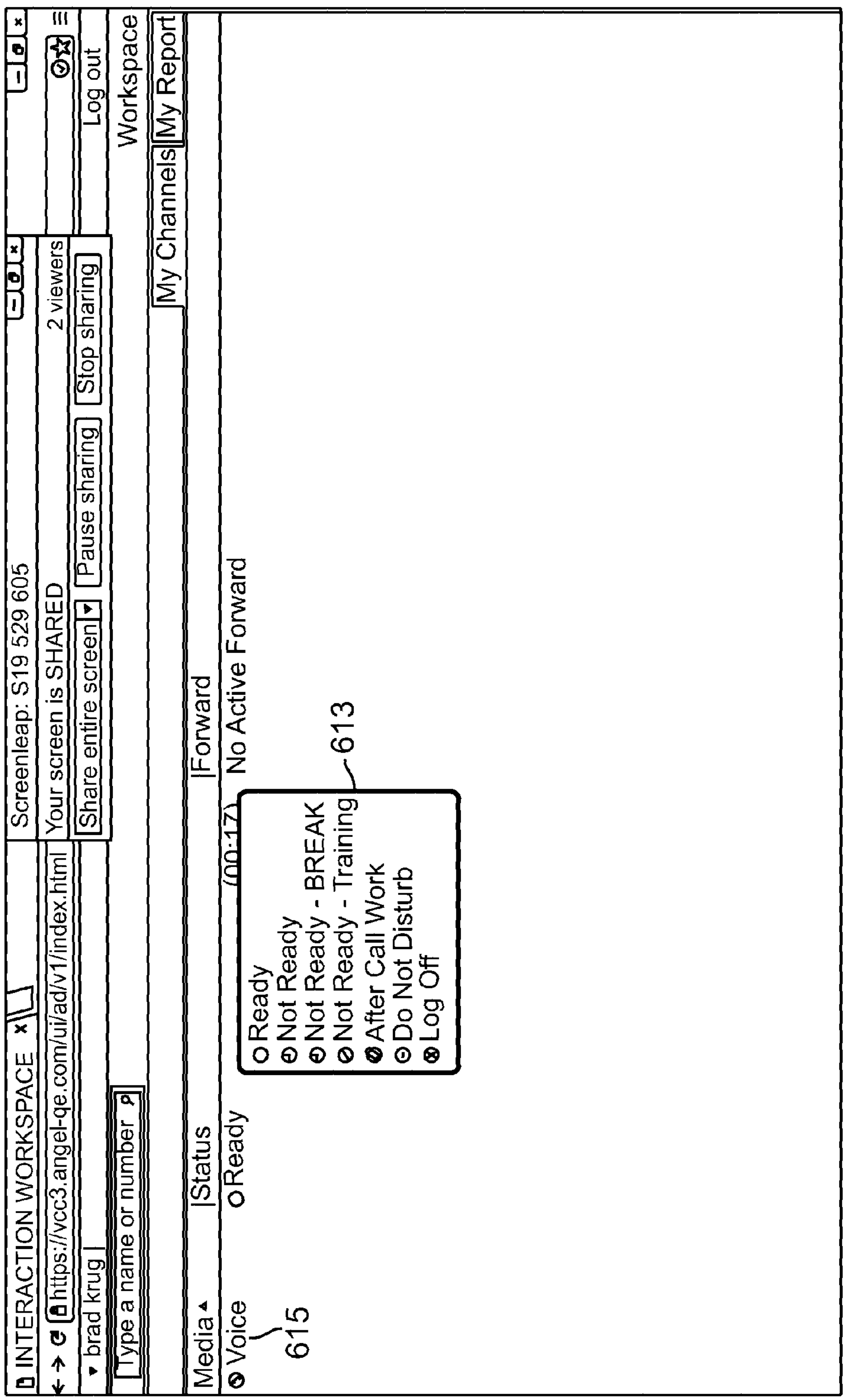

An agent may also manually select his or her status by selecting the appropriate status from a status menu 613 as shown in FIG. 40B. The status may also be set for a specific type of interaction channel such as, for example, a voice channel 615. Other interaction media other than the voice channel (e.g. email, chat, and the like) may also be displayed along with agent status information.

According to one embodiment, the agent control dashboard UI includes a report panel 1804 and a phone panel 1806. The report panel 1804 may display a variety of reports relevant to the contact center and the agent. These reports may display contact center and/or agent metrics via any suitable information display means (e.g., charts, tables, graphs, etc.) to enable effective and efficient communication of the personal performance of an agent (or agent group) and/or the status (or health) of the contact center to the agent.

According to one embodiment, the report panel 1804 may display a report of an agent's call activity for a relevant time period, an agent's call handle time, and/or a status of calls of the contact center.

The report of the agent's call activity may include a display of the number and type of calls handled and the average calls per hour during a relevant time period. This information may be displayed with a segmented circle chart that includes color-coded segments indicating the proportions particular types of calls (e.g., inbound, outbound, transfer, etc.). A listing of the number of calls per type may be associated with icons for visually distinguishing the types of calls (e.g., allowing for quick understanding of the report), and the total number of calls may be displayed in the center of the segmented circle chart. The relevant time period may be the working day (e.g., since 8:00 AM).

The report for the agent's call handle time may include a display of the average call time and a display the proportion of time that the agent is in predefined states (e.g., talk, wrap up, ready, hold, etc.). The average call handling time may be the average amount of time the agent spends on a call (or any other interaction type). The average handling time may be displayed as a numeric display of minutes and seconds, and may be for a predefined time period (e.g., the working day, the week, etc.). The proportion of time spent in the predefined states may be displayed with a segmented circle chart that includes color-coded segments indicating the percent of time spent in each state and that may be accompanied by a numeric display of these percentages.

The calls (or interactions) in queue report may include a display of the number and status of calls in queue and the maximum and average wait time of calls in the queue. The calls in the queue may be correspond to the entire contact center, a line (or lines) of the call center, an agent group (or groups), or an agent, but is not limited thereto.

In the exemplary embodiment of FIG. 40A, the calls in queue are for the entire contact center. Here, the proportion of calls in the queue that are in predefined states may be displayed via a segmented circle chart that includes color-coded segments indicating the proportion of the calls in the predefined states. A listing of the number of calls per state may be associated with icons for visually distinguishing the status of calls (e.g., allowing for quick understanding of the report), and the total number of calls in queue may be displayed in the center of the segmented circle chart. According to one embodiment, the calls in queue report relates to the real-time status of the contact center.

As described above in connection with the reporting dashboard UI, more information than that initially displayed in a report may be accessed by the agent. For example, the agent may hover over a particular report or click on the report to receive additional information relevant to the report.

While the report panel 1804 has been described in connection with exemplary reports, the present invention is not limited thereto. For example, reports may display quotas, standards, or rankings, or reports may be filtered according to agent group and account line instead of (or in addition to) being filtered by agents and contact center. According to one embodiment, an indicator (e.g., color coding or alert) may be displayed to indicate an overall health of the call center, or tips (or instructions) may be displayed to underperforming agents. A person of ordinary skill in the art should recognize that any suitable report may be displayed via any suitable means. As described above, an aspect of embodiments of the report panel is to give the agent feedback so they can easily understand (and, potentially, improve) their performance and the health of the contact center.

Embodiments of the present invention provide for the agent to customize the reports viewed and their presentation. This customization may be saved and recalled. For example, a customized agent control dashboard UI 1800 may be rendered upon an agent logging in via the log-in menu 1802.

According to one embodiment, the phone panel 1806 includes information relating to recent calls (or interactions). The phone panel 1806 may include a plurality of recent call blocks 1808, each displaying information associated with a particular call handled by the agent. The recent call blocks 1808 may display call identification information (e.g., number, name, date, and time), a call summary (e.g., agent group/line/account association and call topic), and call disposition (or result) (e.g., resolved, transferred, or call-back). According to one embodiment, the call disposition indicator is color-coded by disposition type for easily communicating the disposition to the agent.

Additional information relating to a call may be accessed or entered by selecting a particular recent call block 1808. For example, in FIG. 40A, a recent call pop-up 1810 may be rendered when a particular recent call block 1808 is selected (e.g., by hovering a cursor over the recent call block 1808). According to one embodiment, the agent enters (and associates) information relating to the previous call via the recent call pup-up 1810. For example, the agent may enter the result and disposition of the call (e.g., via drop down menus). The agent may call back the person associated with the recent call via the recent call pop-up 1810.

The agent control dashboard UI 1800 may include a phone call widget 1812. The phone call widget 1812 may include a look-up field 1814, a dial pad 1816, and an address book 1818, but is not limited thereto. The agent may use the phone call widget 1812 to place a telephone call (or otherwise initiate an interaction). When the agent directs a call to be placed via the phone call widget 1812, according to one embodiment, the specialized application 52 may execute the call via a soft phone (e.g., a voice-over-IP call), a hard phone (e.g., a general land-line phone), or any other suitable device. Phone calls (or interactions) may be directed toward any contact, e.g., an outside contact (e.g., customer or client), a contact center worker (e.g., an agent or supervisor), a skill group, an account line, or any other contactable person, group, entity, etc.

Figure 41:
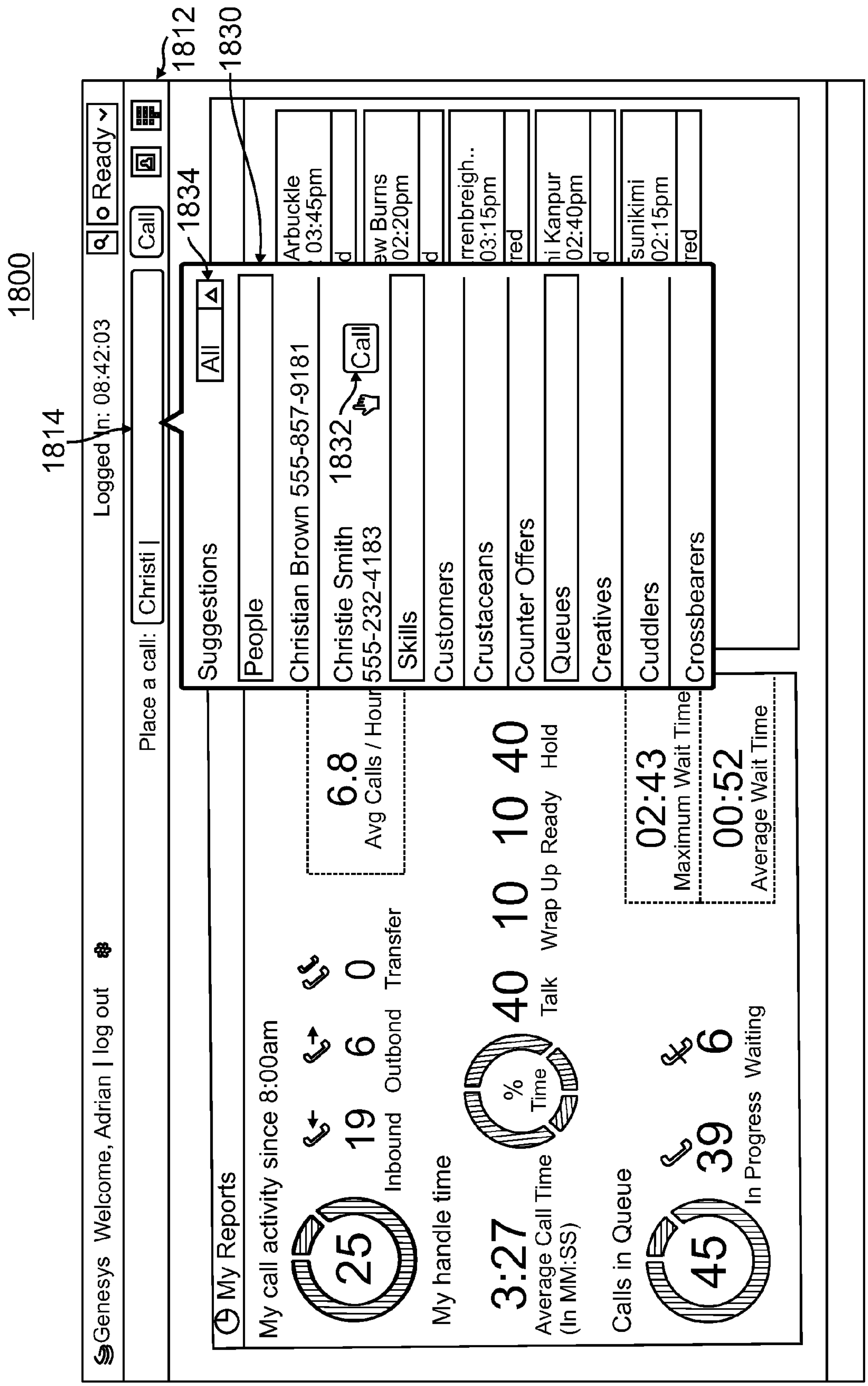

Referring to FIG. 41, the agent may search or directly enter a contact to interact with via the look-up field 1814. According to one embodiment, the look up field 1814 provides a text entry field for the agent. The look-up field may perform an auto-fill (or suggestion) function. For example, when a user begins typing, the look-up field 1814 may invoke a suggestion pop-up 1830 for displaying contacts relevant to the entered characters. The contacts available for search and displayed in the suggestion pop-up 1830 may be from a saved address book. The address book may include external contacts, such as, customers, clients, or other outside individuals or entities that the agent may contact in an interaction campaign. The address book may also include internal contacts, such as, agents, queues, or skill groups.

The agent may filter the results of the search via a filter menu 1834. The filter menu 1834 may be a drop down menu, and may be for restricting the results by contact type (e.g., people, skills, queues, etc.).

The agent may initiate a call (or other interaction) via the suggestion pop-up 1830. For example, the agent may select a call button 1832 associated with a particular contact to initiate the call.

Figure 42:
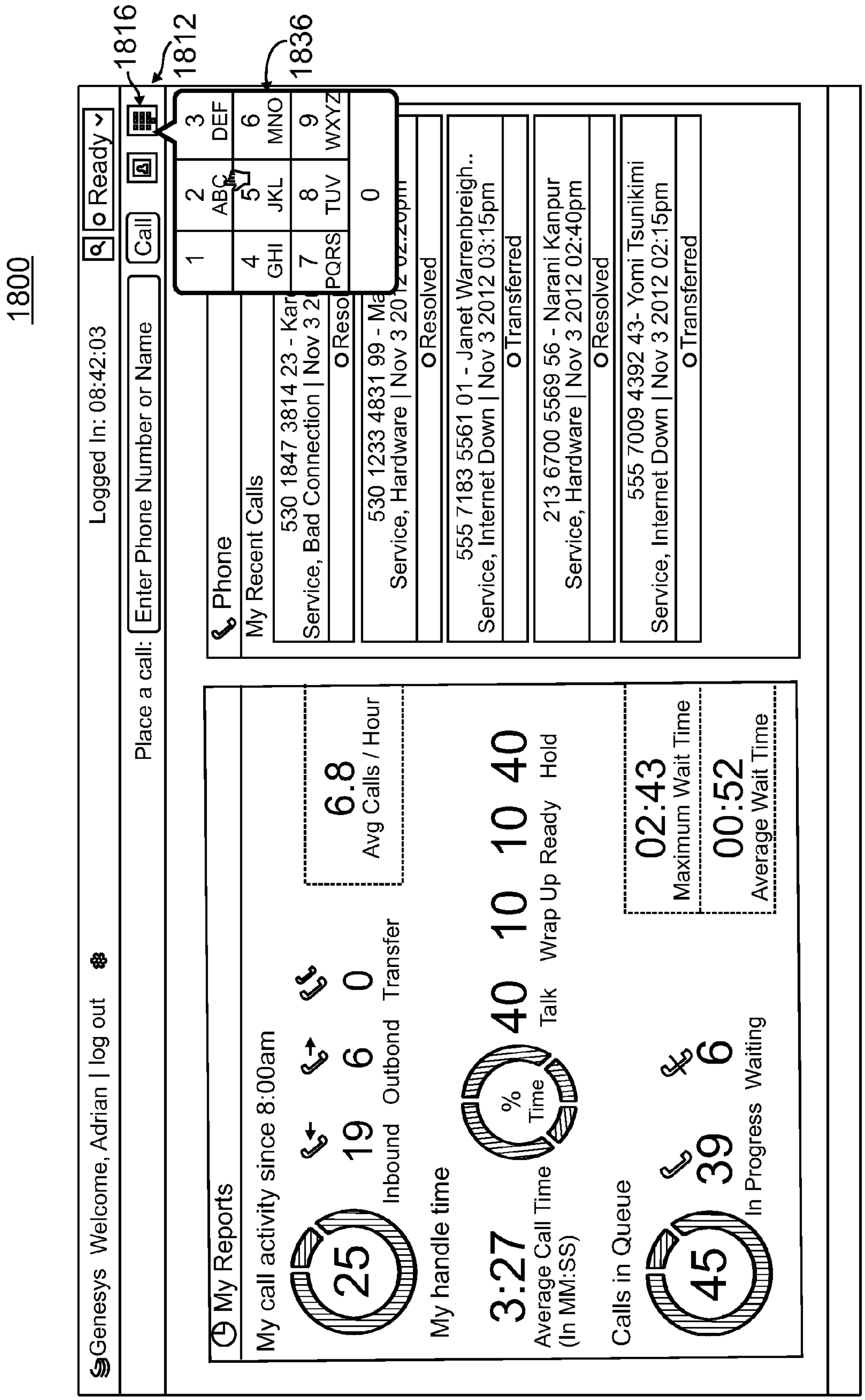

According to one embodiment, the agent may enter a specific phone number (or identification number, account number, or extension) for initiating a call (or other interaction). In the agent control dashboard UI 1800 of the present embodiment, the agent may select the dial-pad menu 1816 from the phone call widget 1812 to enter the specific number. Referring to FIG. 42, when the agent selects the dial-pad menu 1816, a dial pad 1836 is rendered in the agent control dashboard UI 1800. The agent may enter a number via the dial pad 1836.

The agent may initiate a call (or other interaction) via an address book. Referring to the embodiment of FIG. 40A, the agent may select the address book 1818 from the phone call widget 1812. According to one embodiment, selecting the address book renders a pop-up screen listing all available contacts saved in the address book; these contacts may correspond to the contacts accessible via the look-up field 1814.

According to one embodiment, the phone call widget 1812 may be utilized by the agent in a dial-out campaign.

Figure 43:
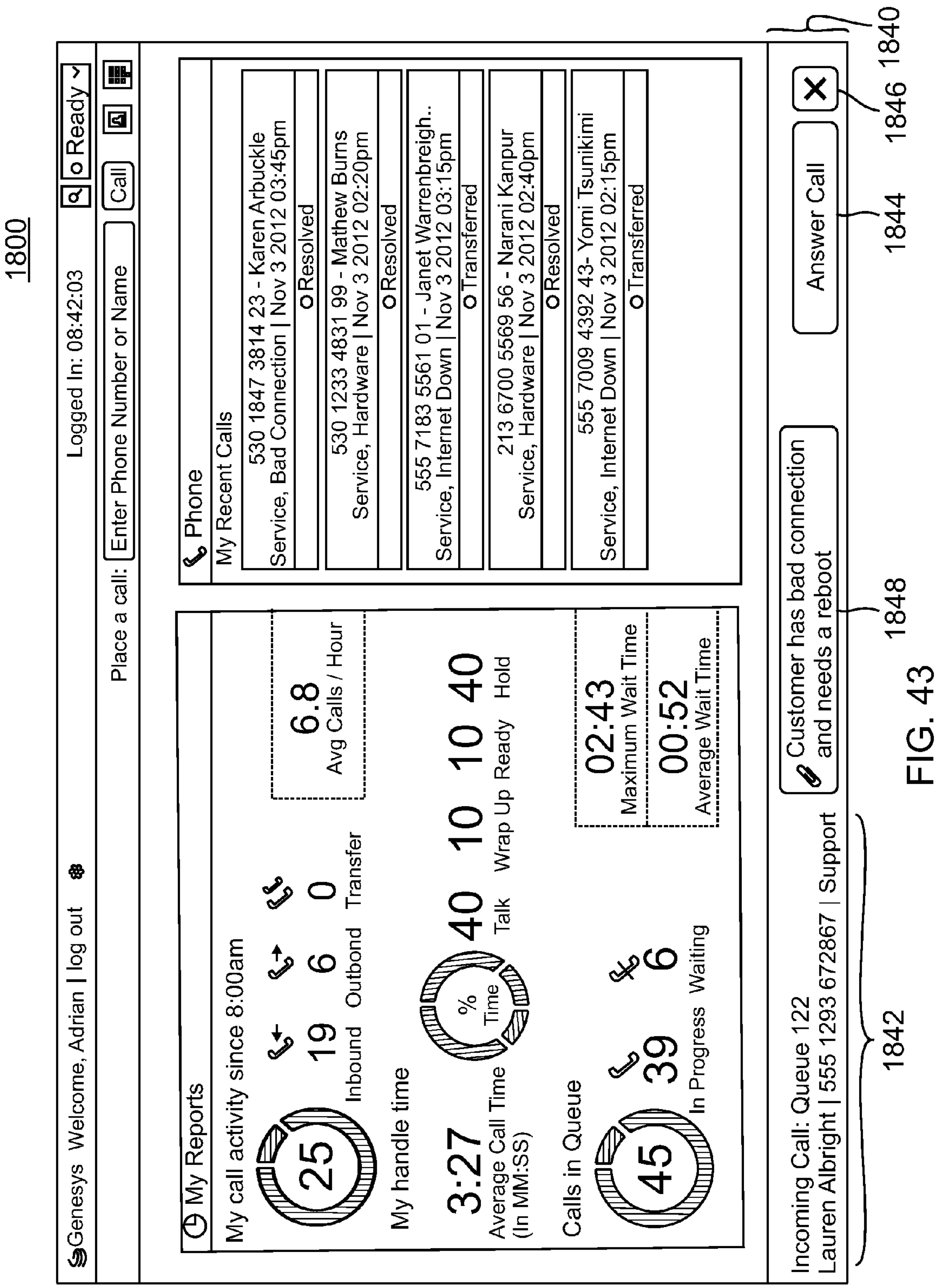
Figure 44:
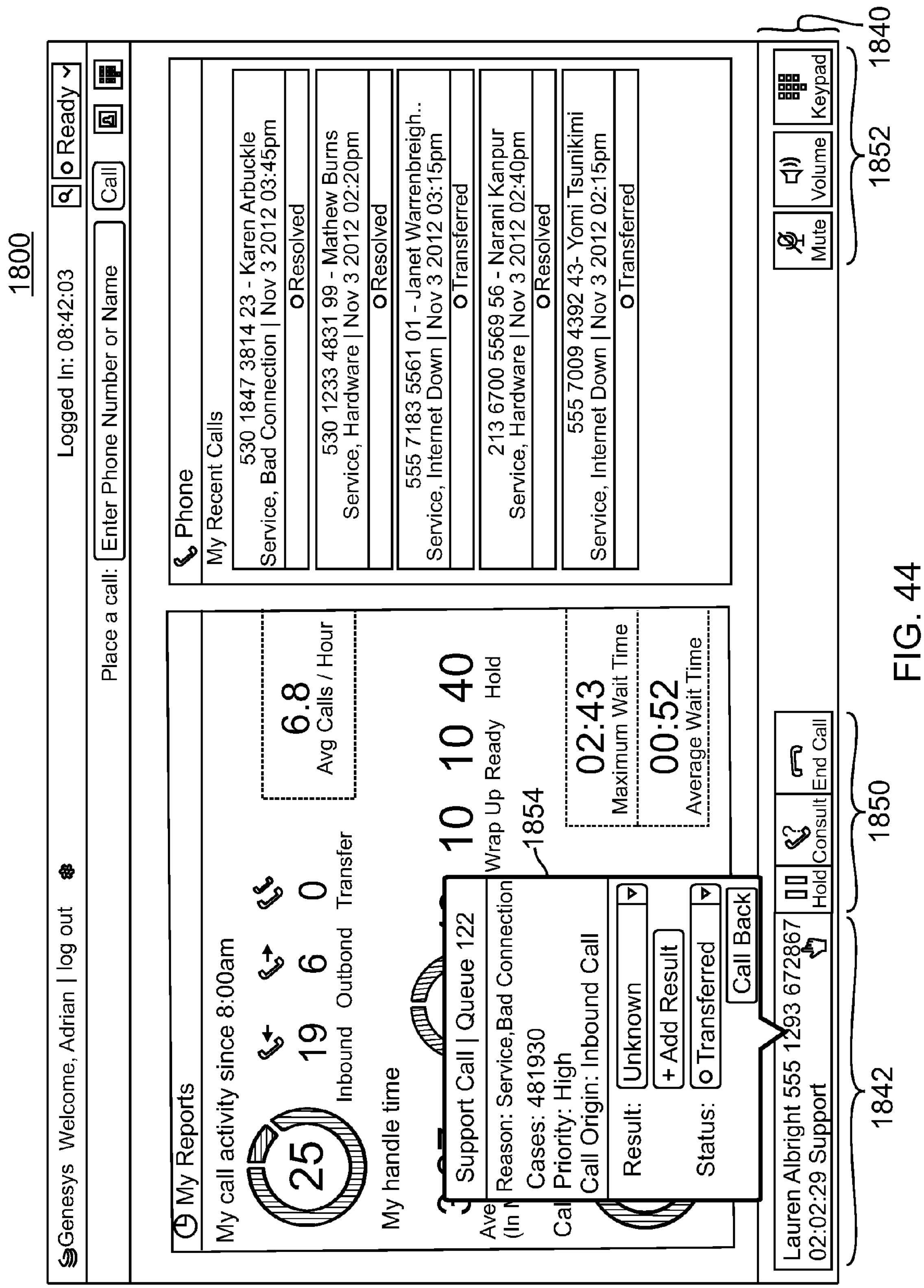

Referring now to FIG. 43, the agent control UI dashboard 1800 may include a call control widget 1840. The agent may use the call control widget 1840 to execute tasks associated with an active call (or other interaction). For example, that agent may answer, transfer, and monitor a call via the call control widget 1840. According to one embodiment, the call control widget 1840 is at the bottom of the screen.

During the operation of a contact center, interaction events (such as calls) are routed to particular agents according to the contact center's routing logic. When a particular call is routed to particular agent, the agent control UI dashboard 1800 may display call information in a call information field 1842. According to one embodiment, the call information field 1842 may display the queue information (e.g., place in queue), caller information (e.g., name and number), and call information (e.g., contact line, agent group, call topic, etc.). The call information field 1842 enables the agent to quickly understand relevant information relating to the call. The call control widget 1840 may also provide an alert for an incoming call; for example, the call widget 1840 may display a different color to visually alert the agent.

According to one embodiment, the agent may choose to answer the call by selecting the answer call option 1844 or to decline the call by selecting the decline call option 1846. However, embodiments of the present invention are not limited thereto; for example, in some embodiments, an agent may not have the option of declining the call. According to one embodiment, the answer call option 1844 may be the more frequently selected option and has a significantly larger touch area as compared to the decline call option 1846 to provide easier selection.

The agent may access or enter detailed information relating to the call via a link 1848. For example, by selecting the link 1848, another window may be rendered for displaying detailed call history associated with the contact, contact provided information, agent notes, and/or any other relevant information. The agent may enter and save information relating to the contact via the link 1848. For example, a window may be rendered for an agent to enter notes or fill out a form. According to one embodiment, the link 1848 may be selected before answering a call.

The call control widget 1840 may change (or adapt) according to the status of the call. For example, in the embodiment of FIG. 44, a call is active (e.g., answered) and the call widget 1840 now displays the call information field 1842, a call control field 1850, and a call option field 1852. Here, the call information field 1842 indicates that the call is active by displaying a color different than when the call was incoming.

The call control field 1850 includes options for handling the call. For example the call control field 1850 may include a hold option, a consult option, a call transfer option, and an end call option, but is not limited thereto. The call option field 1852 includes other call options. For example, the call option field 1852 may include a mute option, a volume option, and a keypad option, but is not limited thereto. According to one embodiment, the selection of an option is accompanied by a visual indication that the option is selected.

The agent may be able to view and/or enter call information via a pop-up 1854. For example, when the agent selects the call information field 1842, the pop-up 1854 may be rendered to display or receive information relevant to the active call. In one embodiment, the pop-up 1854 displays a reason for the call, a case number, a priority level, and a call origin, and has fields for indicating the call result(s) and call status (or disposition).

Figure 45:
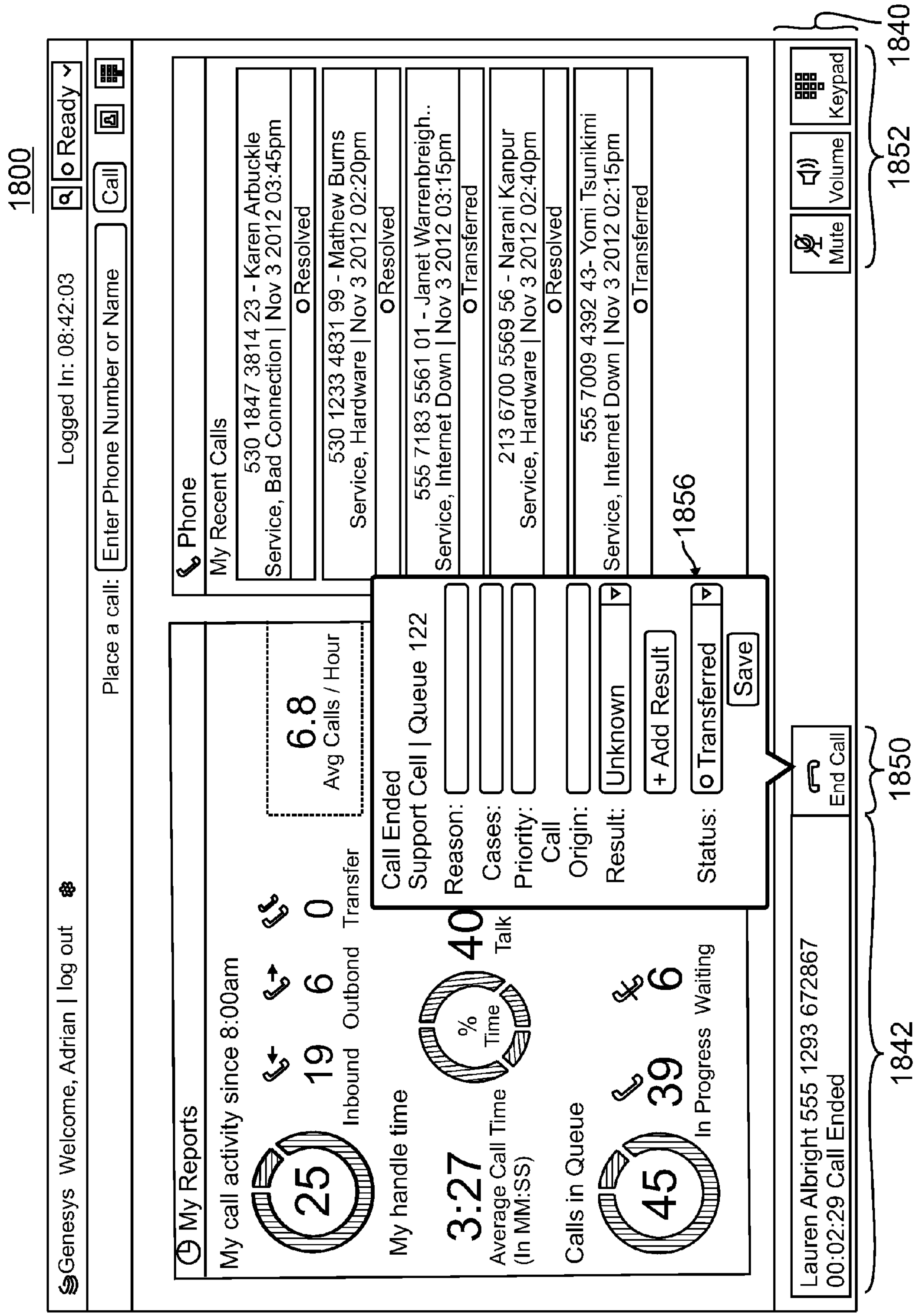

Referring now to FIG. 45, the call is in an ended call state, and the call widget 1840 has changed to reflect the change in call status. Here, the color of the call information field 1842 and the options available in the call control field 1850 have changed (embodiments of the present invention are not so limited). According to one embodiment, when a call ends, the agent is presented with a pop-up 1856 for entering call information. For example, the agent may enter a call reason, a case identifier, a priority level, a call origin, call results, and call status. One or more fields of the call information may be auto-populated by the specialized application 52. The information saved via the pop-up 1856 may correspond to the information made available in the phone panel 1806.

During processing an interaction (e.g., a phone call) the agent may wish to transfer the interaction, have a consultation, or initiate a conference. The agent control dashboard UI 1800 according to one embodiment enables these features.

Figure 46:
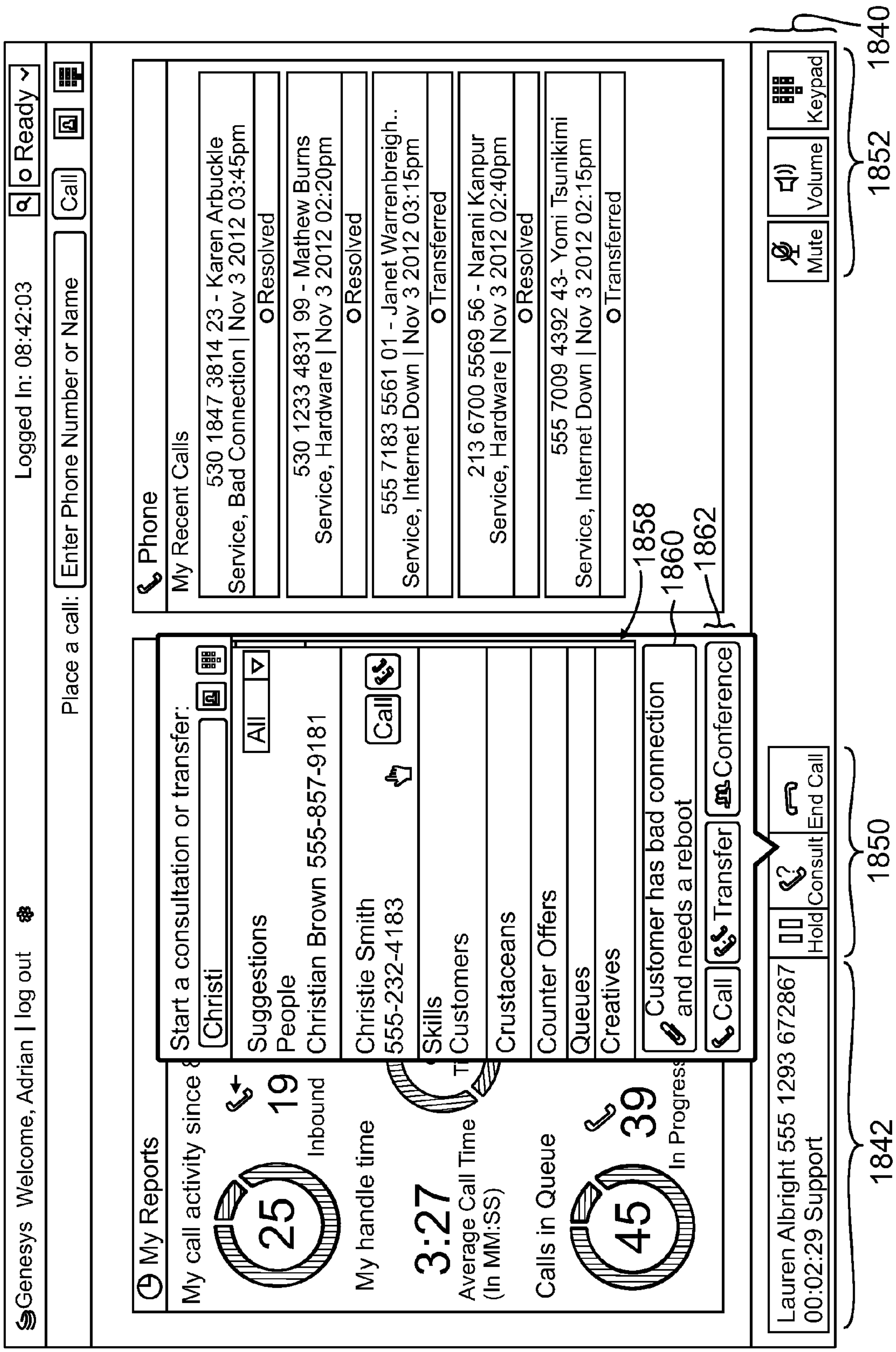

Referring to FIG. 46, the call is in an active state and the agent has selected the consult option from the call control field 1850. In the present embodiment, a consult pop-up 1858 is rendered (e.g., by the specialized application 52) when the consult option is selected. The consult pop-up window provides options for transferring a call, consulting with another agent, or having a conference.

According to one embodiment, transferring involves a transfer of the call to another agent. A transferred call may no longer be handled by the transferring agent (however it may come back). A transfer may be blind or after a consult. That is, the person receiving the transferred call may be aware or unaware that a call is being transferred to them. The agent may receive a message indicating a successful transfer.

A consult according to one embodiment is a call between an agent and another individual (e.g., another agent) where the contact (e.g., the customer) is placed on hold. An agent may use the consult feature, for example, to alert another agent of an incoming transfer or to seek advice. A conference call according to one embodiment is a call between more than two people, such as, the agent, the contact, and one other individual (e.g., another agent).

The agent may enter or review call information via the link 1860. According to one embodiment, selecting the link 1860 renders a pop-window for viewing or entering call information. The call information may be used, for example, by a new agent that is receiving the transferred call or to share information during a consult.

To select the other individual or entity to transfer, consult, or conference with, the consult pop-up 1858 may include a contact entry and look up feature. The contact entry and look up feature, according to one embodiment may be implemented in a similar manner as the phone call widget 1812. Once a contact is select, the agent may select from the consult control menu 1862 to select between transferring, consulting, or conferencing.

Figure 47:
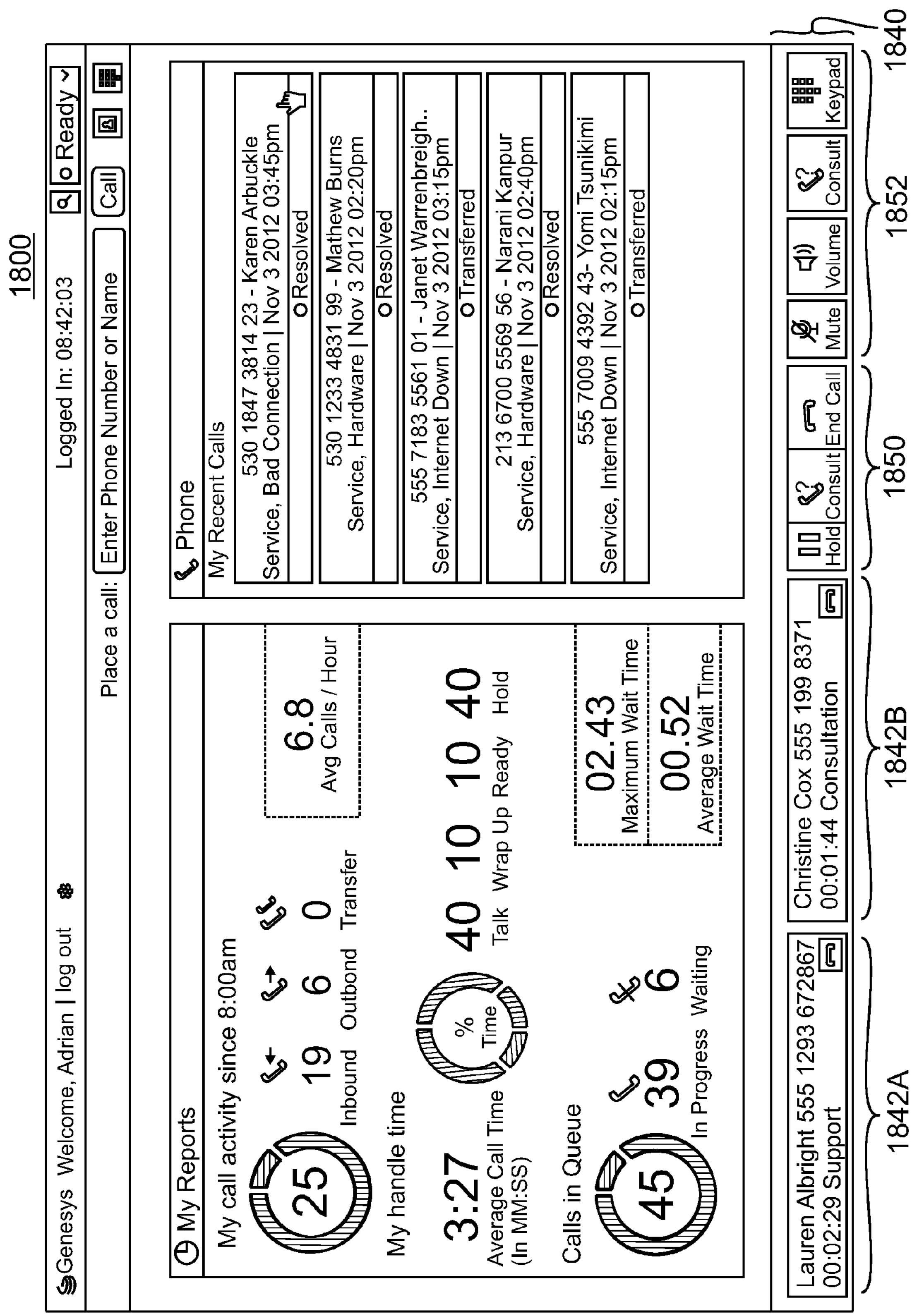

FIG. 47 is an embodiment of the user control dashboard UI 1800 according to one embodiment where the status of the call is "in conference." Here, the call control widget 1840 has changed to display information relevant to the conference. For example, the call control widget 1840 of the present embodiment displays a contact information field 1842A and a consultant information field 1842B. The contact information field 1842A displays information relating to the individual having the contact event being processed by the agent and the consultant information field 1842B displays information relating to a third party brought in for a conference. In the present embodiment, both the contact information field 1842A and the consultant information field 1842B are displayed as active. Here, this represents that all are presently participating in the conference. According to one embodiment, if the contact information field 1842A indicated an on-hold status, this would indicate that the agent is in a private consultation with the consultant.

The contact information field 1842A may display the duration of the interaction. The consultant information field 1842B may display the duration of the consultation.

According to one embodiment, the agent may process multiple interactions (e.g., calls). For example, the agent may have transferred a previous caller (e.g., to an IVR menu or to another agent) that is expected to return, may be actively processing a call, and may have a call in queue. In the embodiment shown in FIG. 48, the agent control dashboard UI 1800 enables control of multiple interactions via the call widget 1840.

Figure 48:
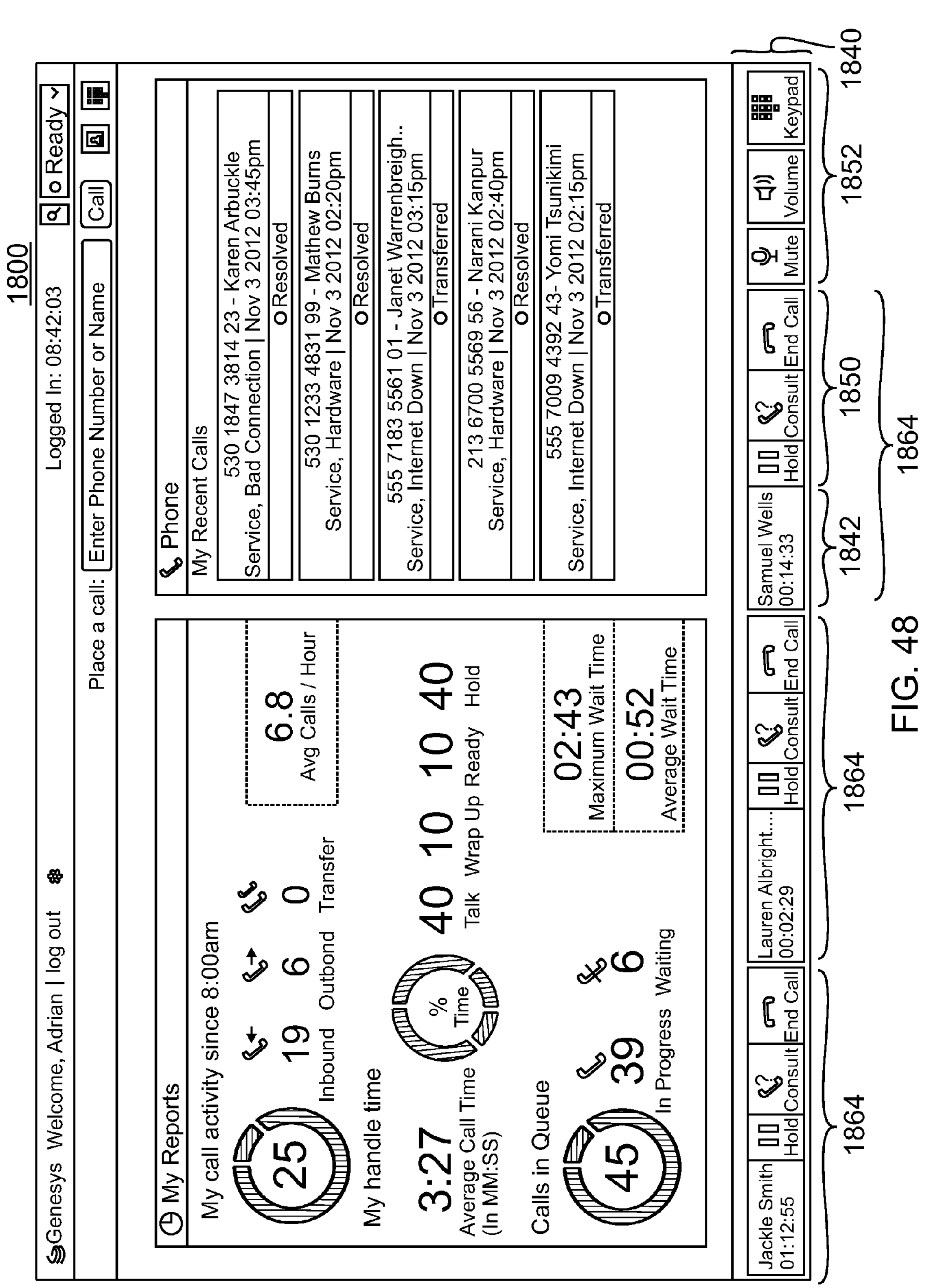

The call widget 1840 of FIG. 48 shows multiple call blocks 1864. Each call block may include a call information field 1842 and a call control field 1850. The user may control and interact with the multiple calls via the call control widget 1840. According to one embodiment, only the control field 1850 of the active call is enabled for selection by the agent.

While performing assigned tasks, the agent may require access to other applications. According to one embodiment, the agent control dashboard UI 1800 is adaptable (or responsive) to enable display in different screen areas. This feature enables the agent to view and access other applications while still having access to the agent control dashboard UI 1800.

Figure 49:
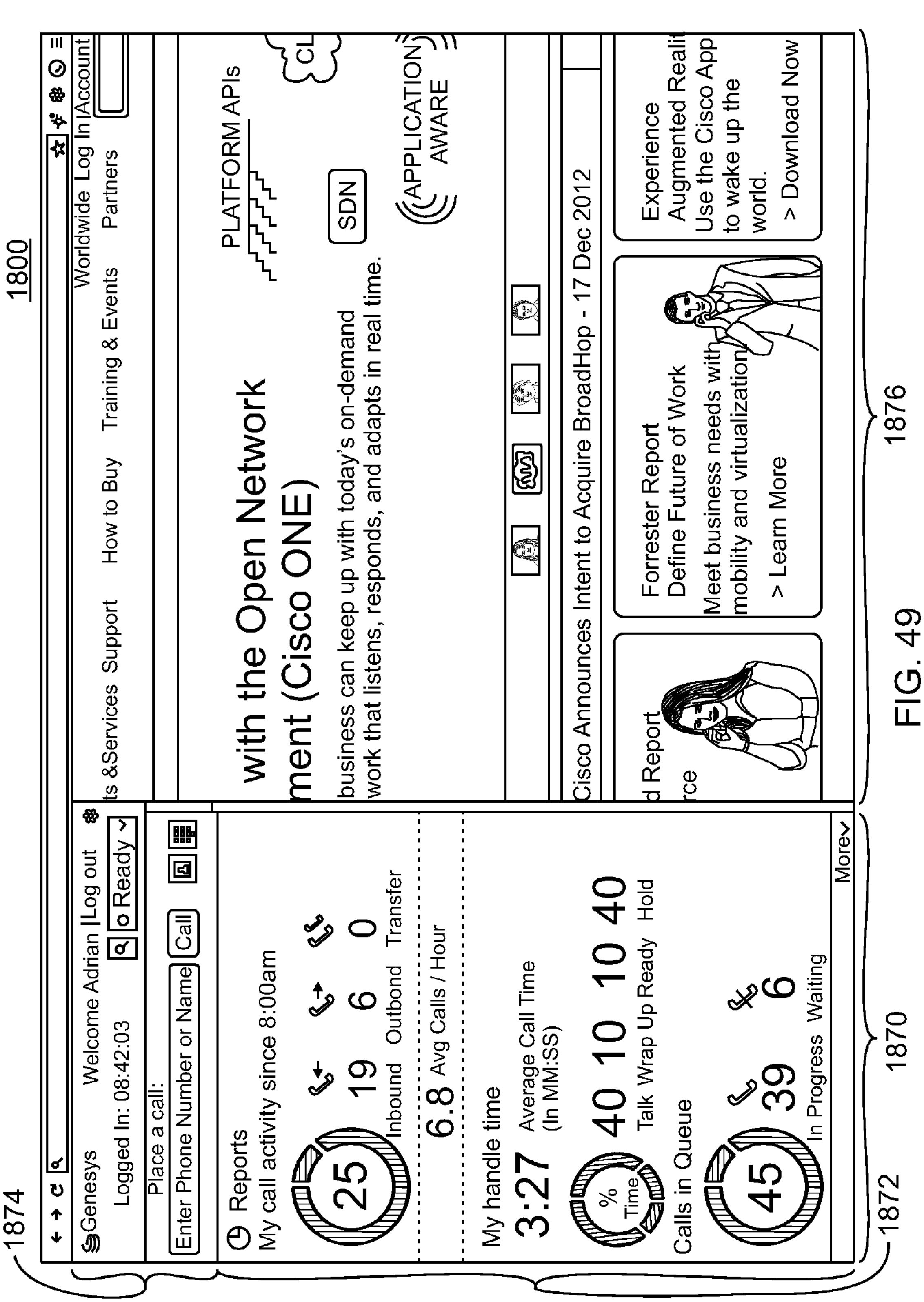
Figure 50:
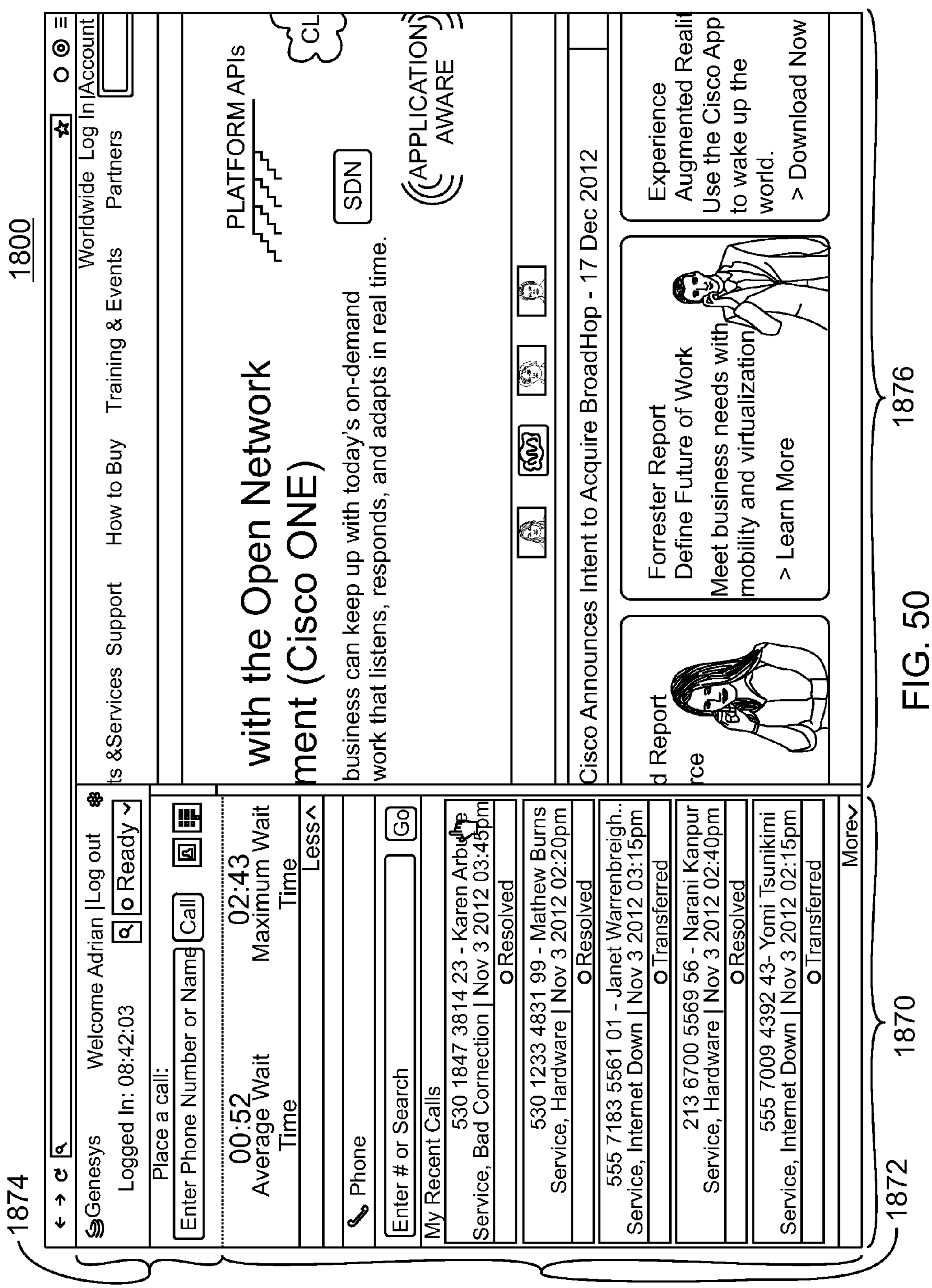

Referring to the embodiments of FIGS. 49 and 50, the agent control dashboard UI 1800 is shown in a reduced widow leaving an available screen space for interaction with other applications. The agent dashboard UI 1800 according to one embodiment is responsive to the screenspace; for example, the agent dashboard UI 1800 may be variously resized and still suitably enable monitoring and control by the agent.

In one embodiment, the dashboard window 1870 is adjacent to an auxiliary window 1876. The dashboard window 1870 displays the contents of the agent control dashboard UI 1800 and the auxiliary window 1876 provides screen space for another application. According to one embodiment the dashboard widow 1870 is configured to be always on top.

The dashboard window may include a main window 1872 and a locked window 1874. According to one embodiment, the main widow displays the report panel 1804 and the phone panel 1806. As described above, the agent control dashboard UI is responsive. Accordingly, the display is reconfigured to accommodate the available screen space. For example, the agent control dashboard may allow for scrolling to enable view of all features.

In one embodiment, the report panel 1804 and the phone panel 1806 are resized and reconfigured such that one of the panels may be viewed (e.g., viewed in its entirety) at a time. Here, the agent may scroll up or down to view the other panel.

The locked window 1874 according to one embodiment includes controls that are locked in position in the agent control dashboard UI 1800. For example, a phone call widget 1812 may be fixed at an upper portion of the dashboard widow 1870. Here, scrolling of the main widow would not alter display of the locked window 1874. According to one embodiment, multiple locked windows 1874 may be displayed in the dashboard window 1870. For example, the call control widget 1840 may be locked to the bottom of the dashboard window 1870.

Accordingly, embodiments of the agent control dashboard UI 1800 display agent metrics and contact center controls in a highly accessible and straightforward manner to enable intuitive and efficient self-monitoring and execution of contact center tasks.

Accordingly the dashboard UI (including the agent dashboard UI, the routing dashboard UI, the routing dashboard UI, and the agent control dashboard UI) of embodiments of the present invention provide an efficient and intuitive mechanism for configuring, monitoring, and managing a contact center.

E. Ubiquitous Dashboard

According to one embodiment of the invention, each agent or supervisor (collectively referred to as an agent) may have a ubiquitous dashboard that organizes, in a single UI, different types of metrics that may be needed by the agent in performing his duties. The metrics may be disparate metrics from different sources and may provide different types of information about the contact center. Such metrics may typically be provided via different UIs. According to an embodiment of the present invention, the agent need not switch from UI to UI in order to view the different types of metrics. Instead, such metrics are provided via different display widgets on the single ubiquitous dashboard.

Figure 64:
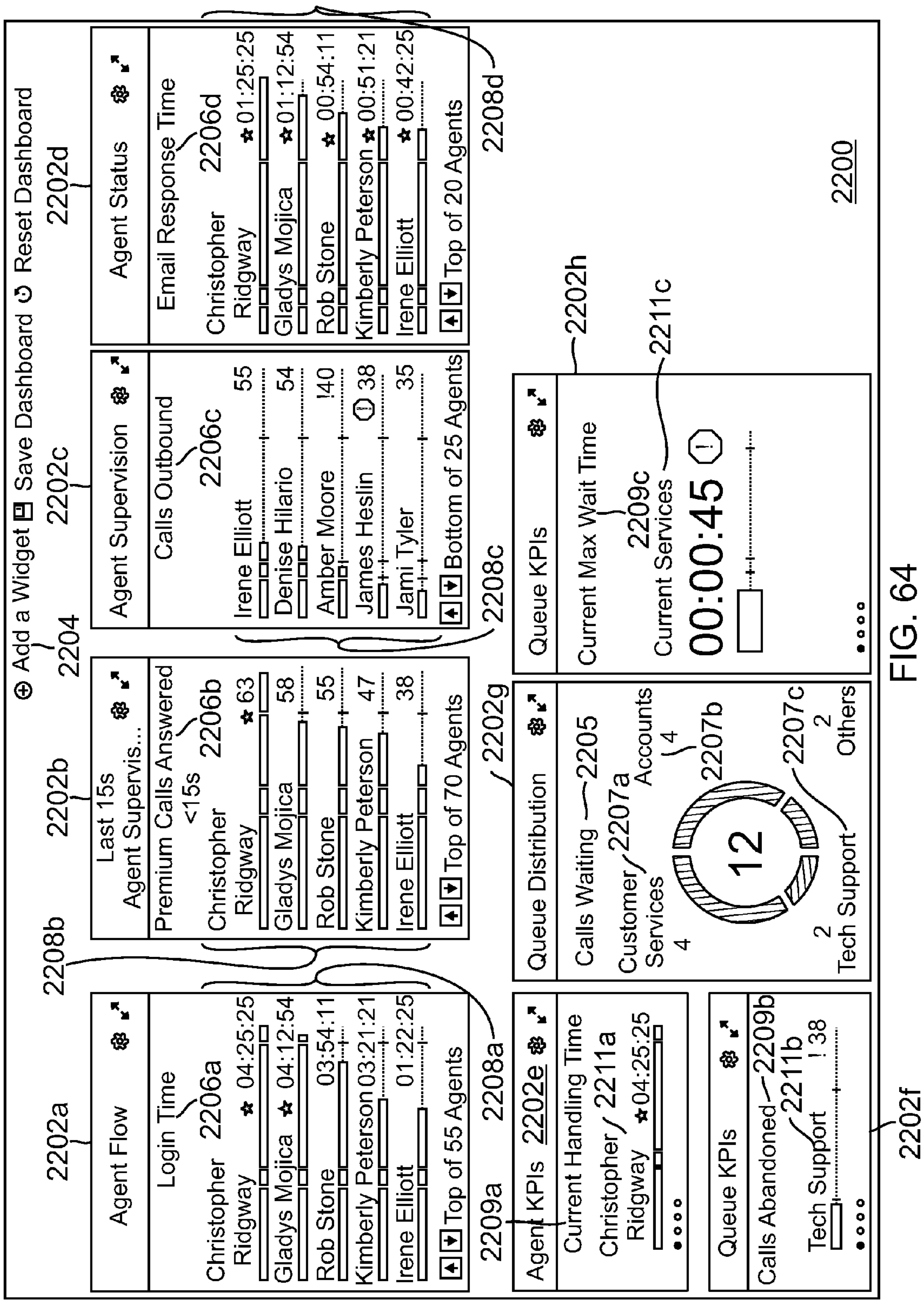
FIG. 64 is a screenshot of a UI providing a ubiquitous dashboard according to one embodiment of the invention.

FIG. 64 is a screenshot of a UI providing a ubiquitous dashboard 2200 according to one embodiment of the invention. According to one embodiment, the dashboard 2200 is accessible over a wide area network and displayed via a web browser. The dashboard 2200 provides at-a-glance views of real-time contact center metrics/statistics provided by the statistics server 50. Although real-time contact center metrics/statistics is used as an example, a person of skill in the art should recognize that other types of data or functionality may be provided by the ubiquitous dashboard.

According to one embodiment, the ubiquitous dashboard 2200 organizes the various statistics/metrics into one or more minimized widgets 2202*a*-2202*h*. According to one embodiment, the minimized widgets display statistics that would otherwise be provided by invoking separate UI applications. The widgets may also be maximized to display other types of details not viewable through the minimized widgets.

According to one embodiment, a user may have as many or as little widgets as he desires, and the widgets may be organized to appear in any location of the dashboard as desired by the user. In this regard, the user may move any widget to any location on the dashboard by merely clicking and dragging the widget to the desired location. This allows more flexibility than some standard dashboards that, although capable of displaying different types of metrics, the metrics appear in predefined windows that are located in predefined locations of the dashboard.

Each minimized widget is associated with a display type such, as for example, a list display, donut display, and KPI display. In the example of FIG. 64, widgets 2202*a*-2202*d* are list widgets providing a list display. A list widget displays one statistic for many objects. For example, list widget 2202*a* provides a "login time" statistics 2206*a*; list widget 2202*b* provides a "premium calls answered time (<15 s)" statistics 2206*b*; list widget 2202*c* provides a "calls outbound" statistics 2206*c*; and list widget 2202*d* provides an "email response time" statistics. The objects to which those statistics relate to are specific agent objects 2208*a*-2208*d*.

Widget 2202*g* is a donut widget, providing a donut display. A donut widget displays one statistic for three objects. Donut widget 2202*g* provides a "calls waiting" statistics 2205 for various agent group objects 2207*a*-2207*c*.

Widgets 2202*e*, 2202*f*, and 2202*h* are KPI widgets providing KPI displays. A KPI widget displays multiple statistics for a single object. According to one embodiment a KPI widget is available for individual objects, not objects by group. In the example of FIG. 64, KPI widget 2202*e* automatically rotates through its configured statistics, including a “current handling time” statistic 2209*a*, for a specific agent 2211*a*. Similarly, KPI widget 2202*f* automatically rotates through its configured statistics, including a “calls abandoned” statistics 2209*b*, for a “technical support” agent group 2211*b*. KPI widget 2202*h* also automatically rotates through its configured statistics, including a “call max wait time statistics” 2209*c*, for a “customer services” agent group 2211*c*.

A user may customize his ubiquitous dashboard 2200 by adding, cloning, editing, and/or removing widgets according to his needs as dictated by his job responsibilities. A default set of widgets may be provided initially for the agent based on the particular group, department, or team to which the agent belongs. The agent may then customize the widgets based on the agent's specific job. For example, if a first agent is a supervisor who only supervises other agents, the first agent may have included in his or her customized UI, a “login time” widget that allows the first agent to monitor the login time of the agents that he supervises. If a second agent is also a supervisor, but has the added task of training agents, the second agent's UI may differ from the first agent's UI in that the second agent may include, in addition to the “login time” widget, widgets with data that may be desirable for training, such as, for example, statistics of trainees, and upcoming classes that the second agent is responsible for teaching.

According to one embodiment the agent may select an add option 2204 for adding widgets and customizing them for his personal use. Upon selection of the add option 2204, the UI prompts the user to either select an existing widget template for editing or cloning, or create a new template from which a new widget is to be created.

FIGS. 65A-65G are screenshots of screens displayed for creating a new template according to one embodiment of the invention. The template may then be used as a basis for generating a minimized widget.

Figure 65A:
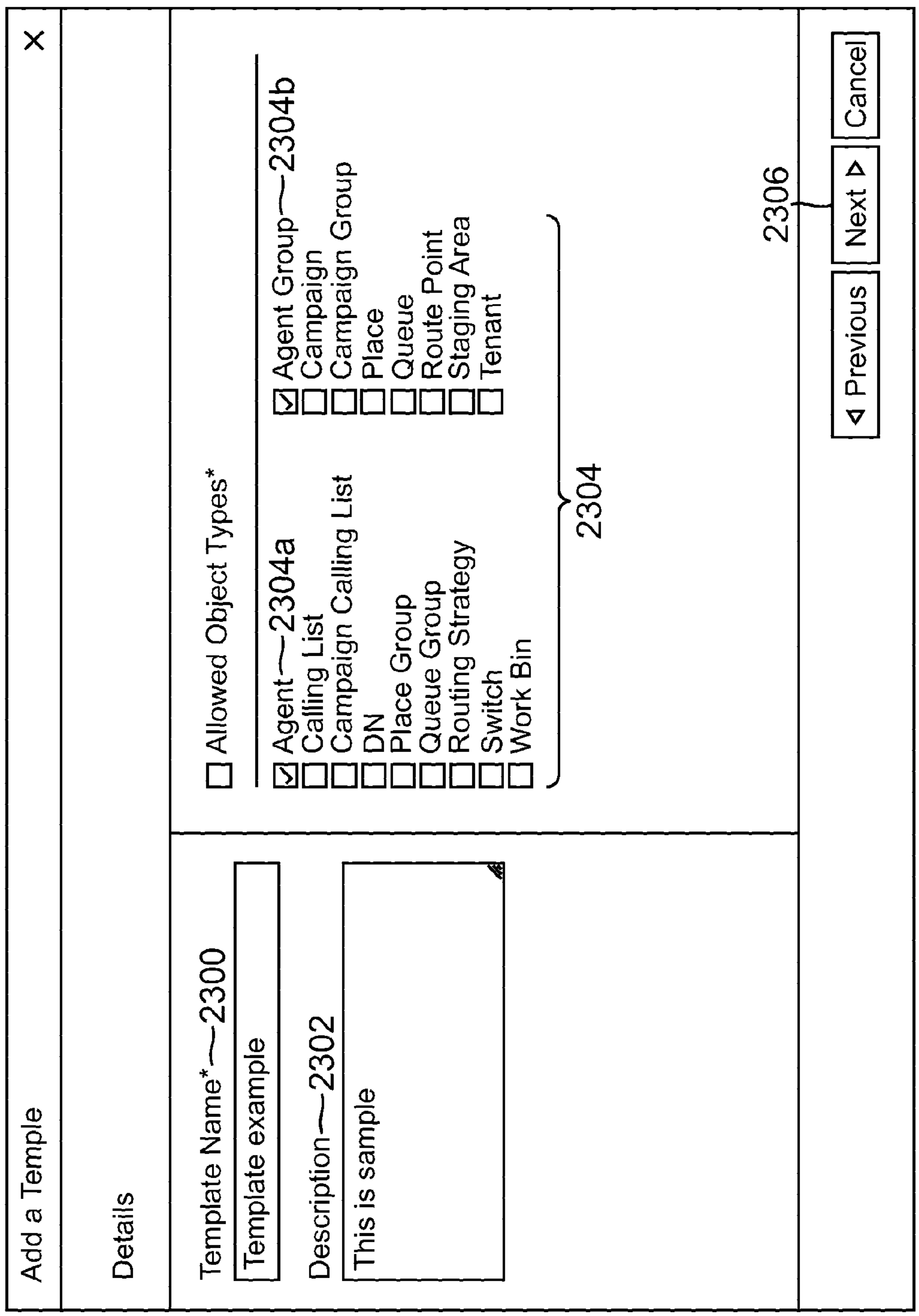
FIGS. 65A-65G are screenshots of screens displayed for creating a new template according to one embodiment of the invention.
Figure 65B:
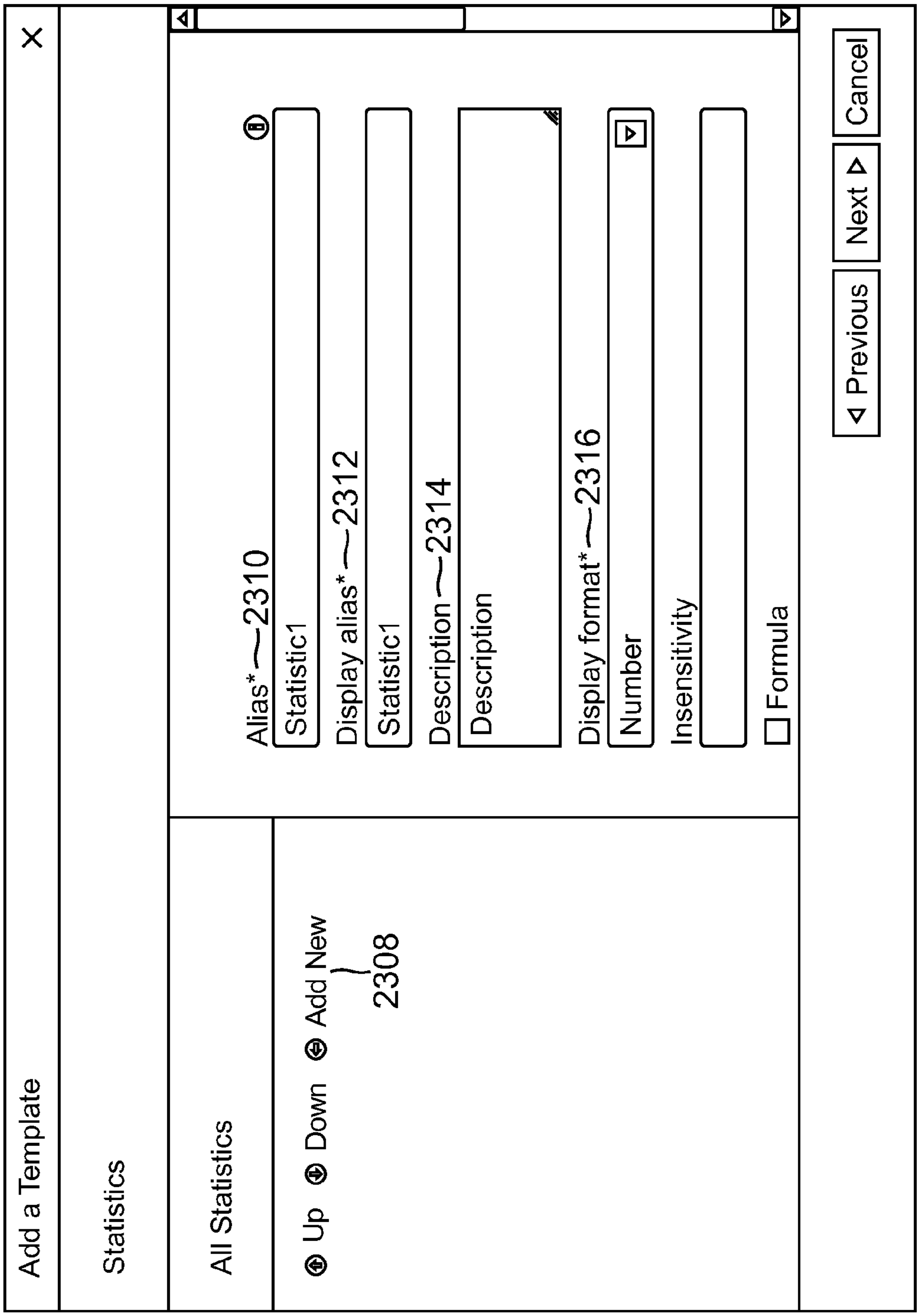
Figure 65C:
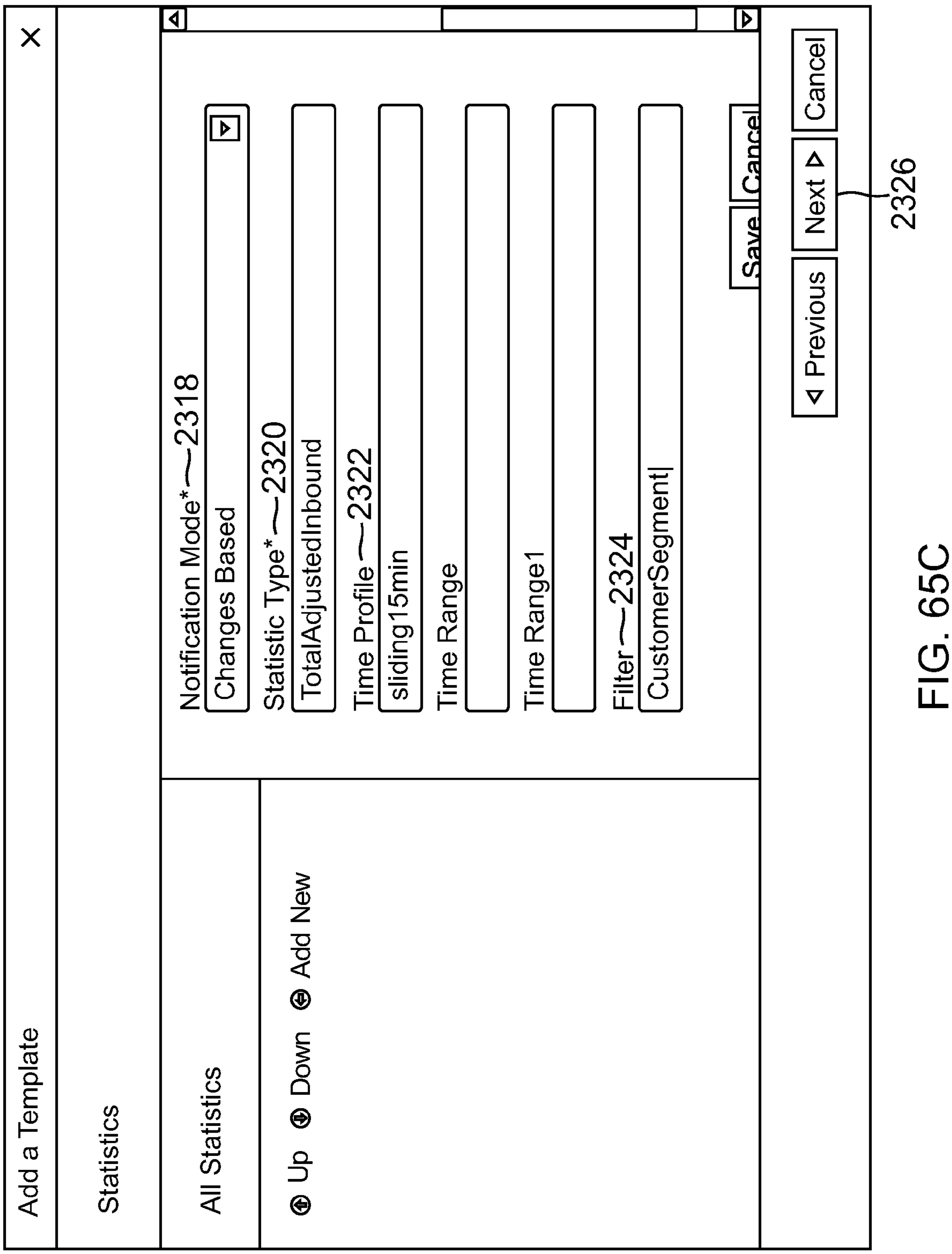

A template name field 2300 prompts a user to enter a name for the new template, and a description field 2302 prompts the user to enter a description for the template. The user then selects among a list of different type of objects 2304 that is allowed for this template. In the example of FIG. 65A, “agent” 2304*a* and “agent group” 2304*b* objects are selected. Thus, when a user generates a widget based on the template, he identifies individual agents or agent groups for displaying statistics for the identified agents or agent groups. Actuation of a “next” option 2306 causes display of a screen for selecting or adding a type of statistics for the selected object(s). In the example of FIGS. 65B-65C, a new type of statistics is added by selecting an add option 2308 and providing in an alias field 2310 a desired name for the statistics. A display alias and a description of the statistics are also added via a display alias field 2312 and description field 2314, respectively. A display format field 2316 provides a choice of time, number, integer, percent, and string for controlling the formatting of the value of the particular statistics in the widget.

A notification mode field 2318 allows a user to specify how the customized UI is to be updated when certain values change in the statistics server 50. For example, a “change based” notification updates the UI every time there is a change is the value of the particular statistics. A “time based” notification updates the UI every given interval (e.g. every 5 seconds). A “reset based” notification updates the UI right before the particular statistics is reset to 0.

In configuring the new statistics for the new template, the user further selects via a statistics type field 2320, a type of statistics available from the statistics server 50. According to one embodiment, a recommendation logic employed by the customized UI or some other server such as, for example, the statistics server 50, may be configured to make recommendation on the type of statistics based on, for example, recognition of other statistics selected by the user. For example, if the user has selected a “login time” statistics, the recommendation logic may be configured to recommend other statistics that may also be desirable to be displayed together with the selected statistics such as, for example, after-call wrap-up (ACW) time. ACW time specifies the amount of time an agent is spending in a post-call processing (e.g. writing notes).

According to one embodiment, the recommendation logic maintains an association mapping of each statistics configured in the statistics server 50, to other statistics also configured in the statistics server 50. Weights may be assigned to each association for determining how related one statistics is to another. A determination of how related two statistics are to one another may be based on how often the two statistics appear together in, for example, an existing template. This may be particularly useful for contact centers with a high number of statistics that a user could potentially add to a widget.

According to one embodiment, statistics that are most highly correlated to a selected statistics may be displayed together and/or highlighted visually. The recommended statistics may also be bubbled up towards a top of a list or appear in a separate “recommended” category.

Figure 65D:
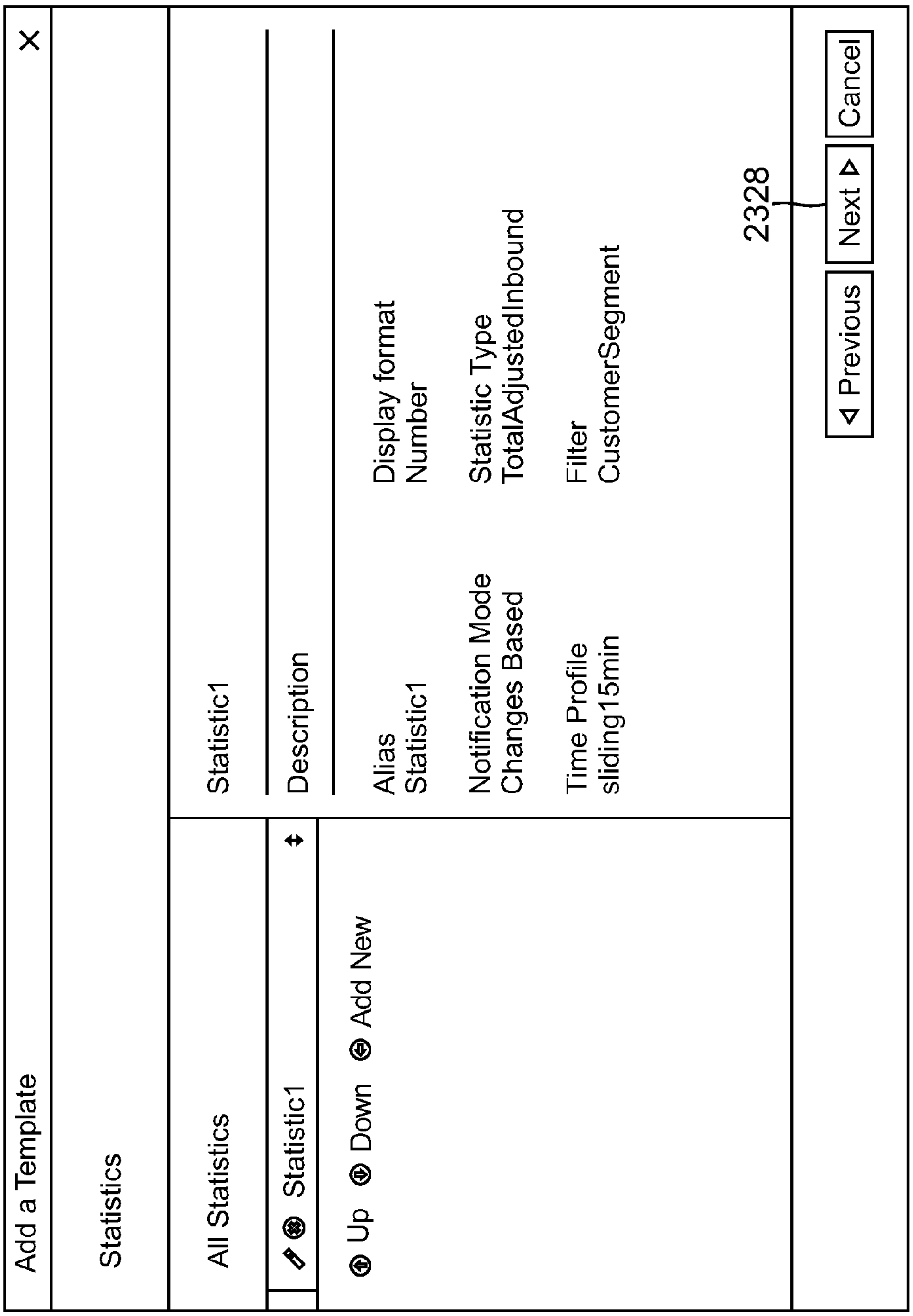

A filter field 2324*b* allows the user to specify an expression that defines conditions for excluding call and non-call related activity based on certain criteria specified in a logical condition. Selection of a next option 2326 provides configuration details of the new statistics that is added to the template and selectable when creating a widget from the template, as is shown in FIG. 65D. Selection of a next option 2328 provides a screen for selecting display options for the widget to be created from the template.

Figure 65E:
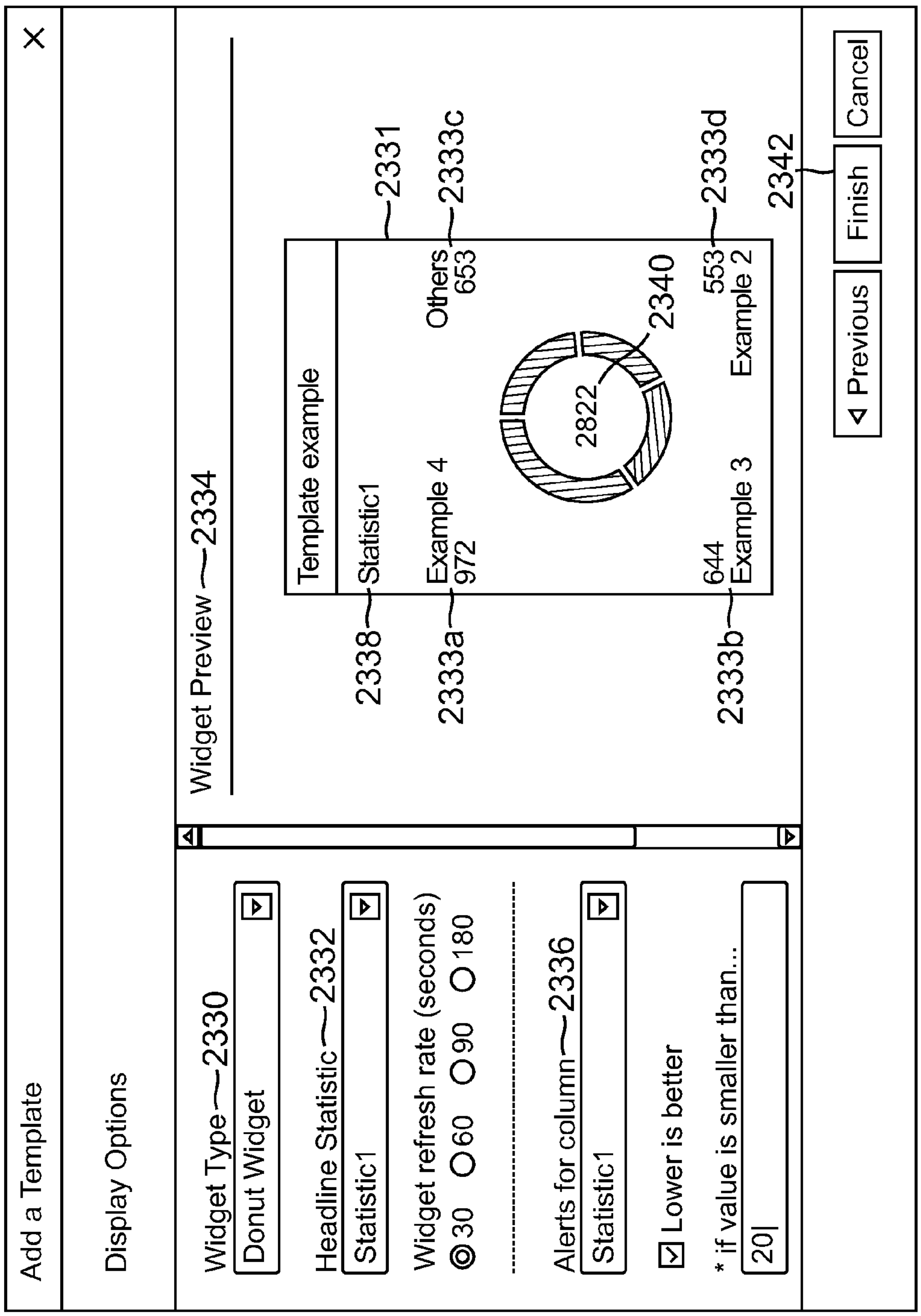

FIG. 65E is a screenshot of a screen for selecting the display options according to one embodiment of the invention. A widget type field 2330 prompts the user to select among various types of displays for the widget to be created based on the template, including a list display, donut display, and KPI display. In the illustrated example, a donut display is selected for generating a donut widget 2331. A headline statistics field 2332 prompts the user to select amongst the various configured statistics, the statistics that is to be displayed as a headline in a headline section 2338 of the donut widget 2331. In the illustrated example, the headline statistics that is displayed is the newly configured statistics from the steps in FIGS. 65B-65D.

An alerts field 2336 prompts the user to identify the statistics that should be monitored for providing alerts. In the illustrated example, the newly configured statistics is monitored for providing alerts.

A widget preview 2334 portion of the screen provides a preview of the donut widget 2331 that may be created based on the newly created template. As shown in the example of FIG. 65, the display alias of the headline statistics is shown prominently in the headline section 2338 of the widget along with the corresponding statistics in the center 2340 of the donut display. The center number is a sum of the same type of statistics calculated for three different objects 2333*a*-

2333*d* for which the headline statistics is to be displayed. Once created upon selection of a finish option 2342, the template is then available for creating a widget.

Figure 65F:
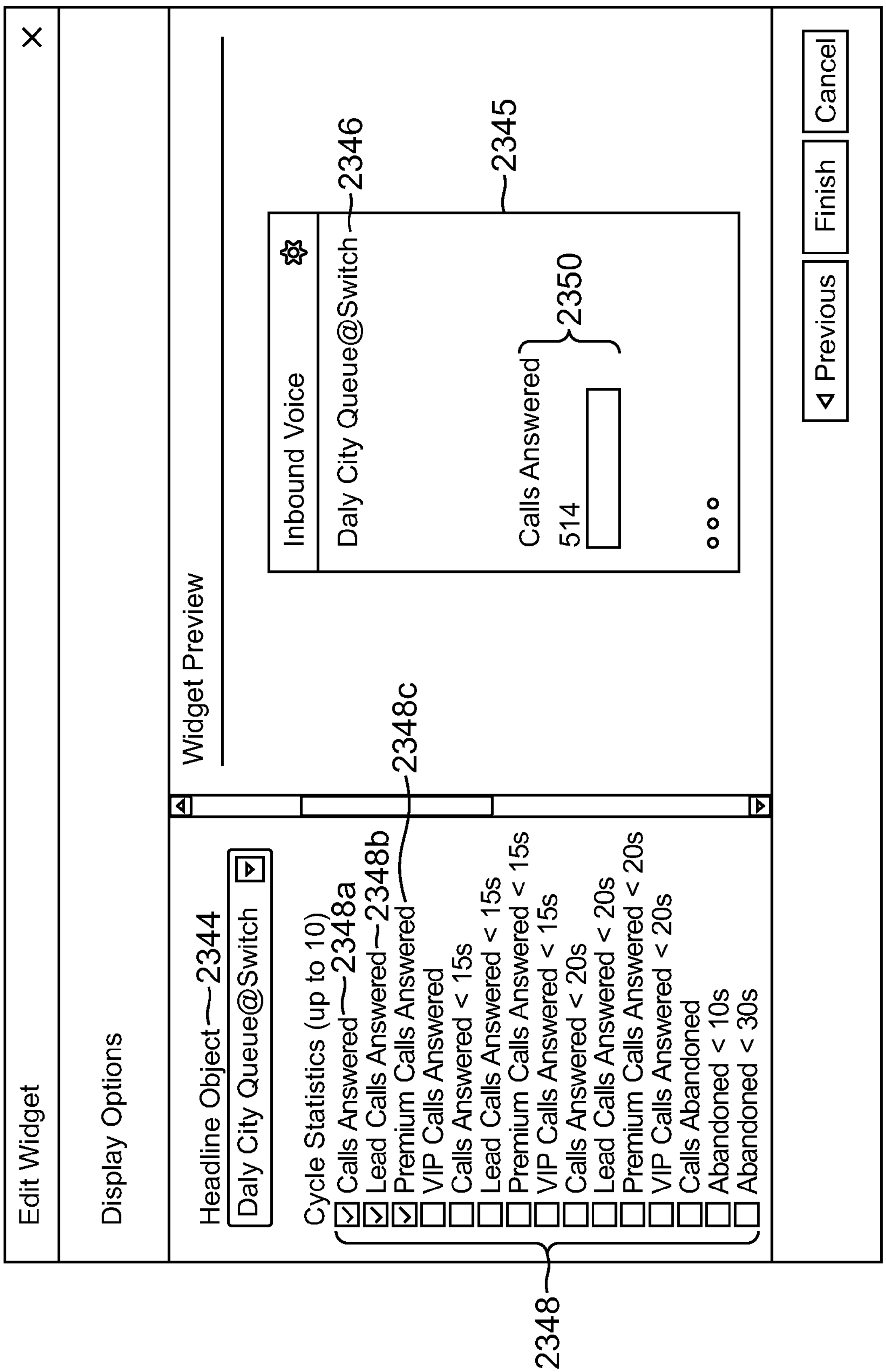

FIG. 65F is a screenshot of a screen for configuring a KPI widget 2345 according to one embodiment of the invention. In configuring the KPI widget, the customized UI prompts the user to select, among other things, a single headline object 2344 for which statistics is to be displayed. The selected headline object is displayed in a headline section 2346 of the KPI widget 2345. The specific statistics that are to be displayed for the headline object is selected from a list of statistics configured for the template. According to one embodiment, for a KPI display, the selected statistics are rotated through and displayed one by one in a rotating statistics section 2350 of the KPI widget 2345.

According to one embodiment, selection of a particular statistics may cause automatic selection of other statistics related to the selected statistics. For example, if the user selects a call answered statistics 2348*a*, the UI may automatically select/recommend (e.g. via a checkmark) a "lead calls answered" statistics 2348*b*, and "premium calls answered" statistics 2348*c*. The recommended statistics 2348*b*, 2348*c* may bubble up to the top and be displayed together with the explicitly selected statistics. The user may deselect one or more of those recommended statistics that he does not want to display via the widget, and/or expressly select one or more statistics that are not automatically recommended, but that the user desires to display via the widget.

Figure 65G:
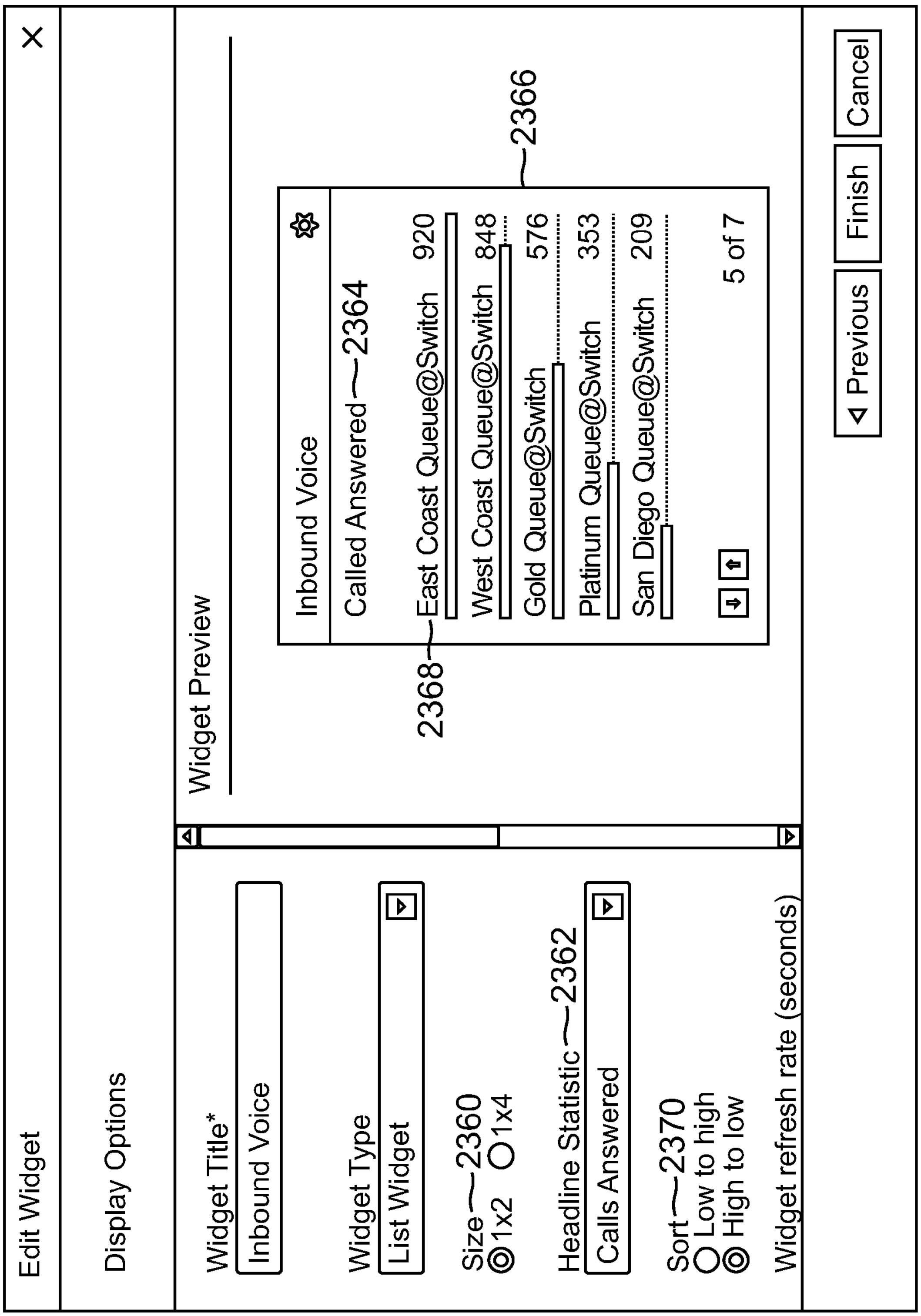

FIG. 65G is a screenshot of a screen for configuring a list widget 2366 according to one embodiment of the invention. The list widget displays one statistic for many objects. In configuring the list widget 2366, the customized UI prompts the user to select, among other things, a display size 2360 of each of the objects 2368. The statistics that is displayed in the minimized list widget for each of the objects is selected via a headline statistics 2362 field. The name of the selected headline statistics is displayed in a headline section 2364 of the list widget 2366. The user may sort the display order of the various objects 2368 from low to high, or high to low, by selecting a desired sort option 2370. According to one embodiment, the user also selects other types of statistics that may be displayed when the list widget is maximized.

Figure 66:
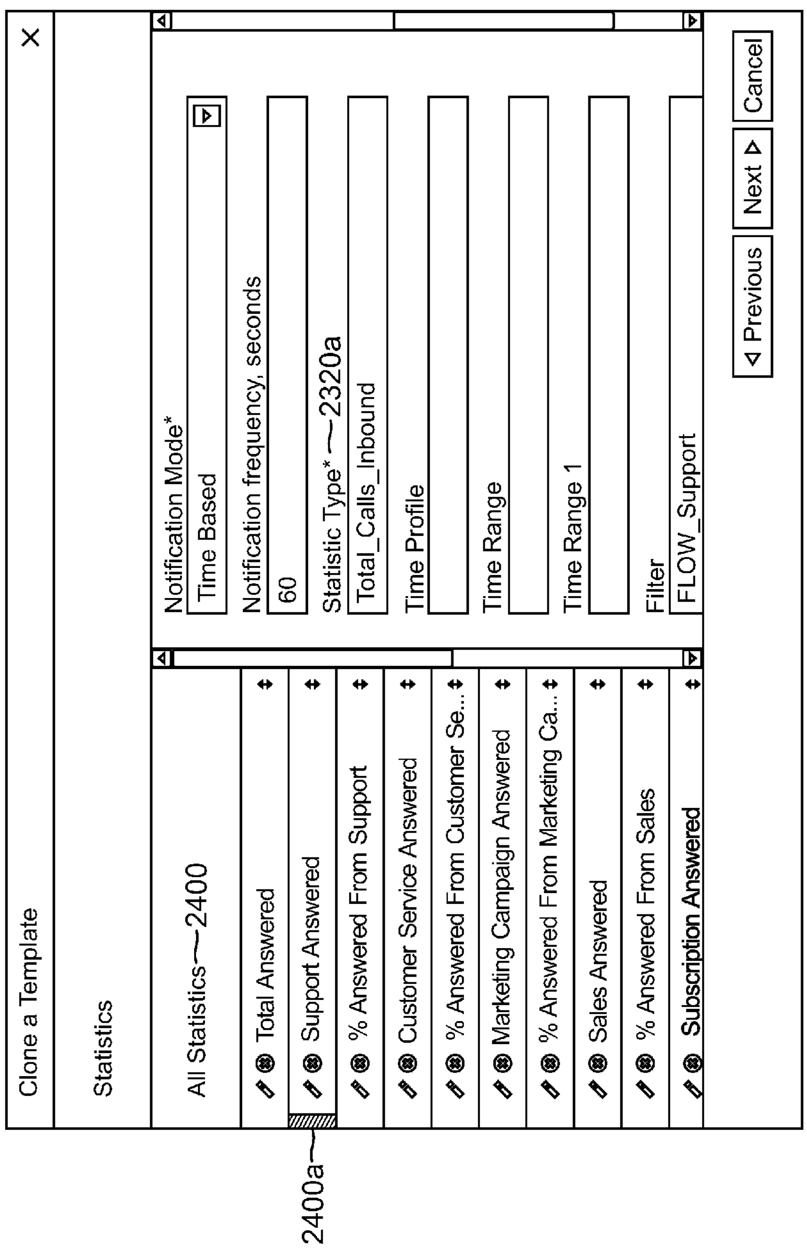
FIG. 66 is a screenshot of an existing template according to one embodiment of the invention.

A user may also select amongst existing templates to generate a widget from the selected template. Selection of a desired template and an edit option causes display of an existing template with data already populated. FIG. 66 is a screenshot of an existing template according to one embodiment of the invention. A statistics section 2400 displays an alias name for each statistics selected for the particular template. Selection of a particular statistic in the statistics section 2400 provides configuration details on the selected statistics. For example, selection of a "support answered" statistics displays configuration information such as, for example, a statistics type 2320*a*.

Figure 67:
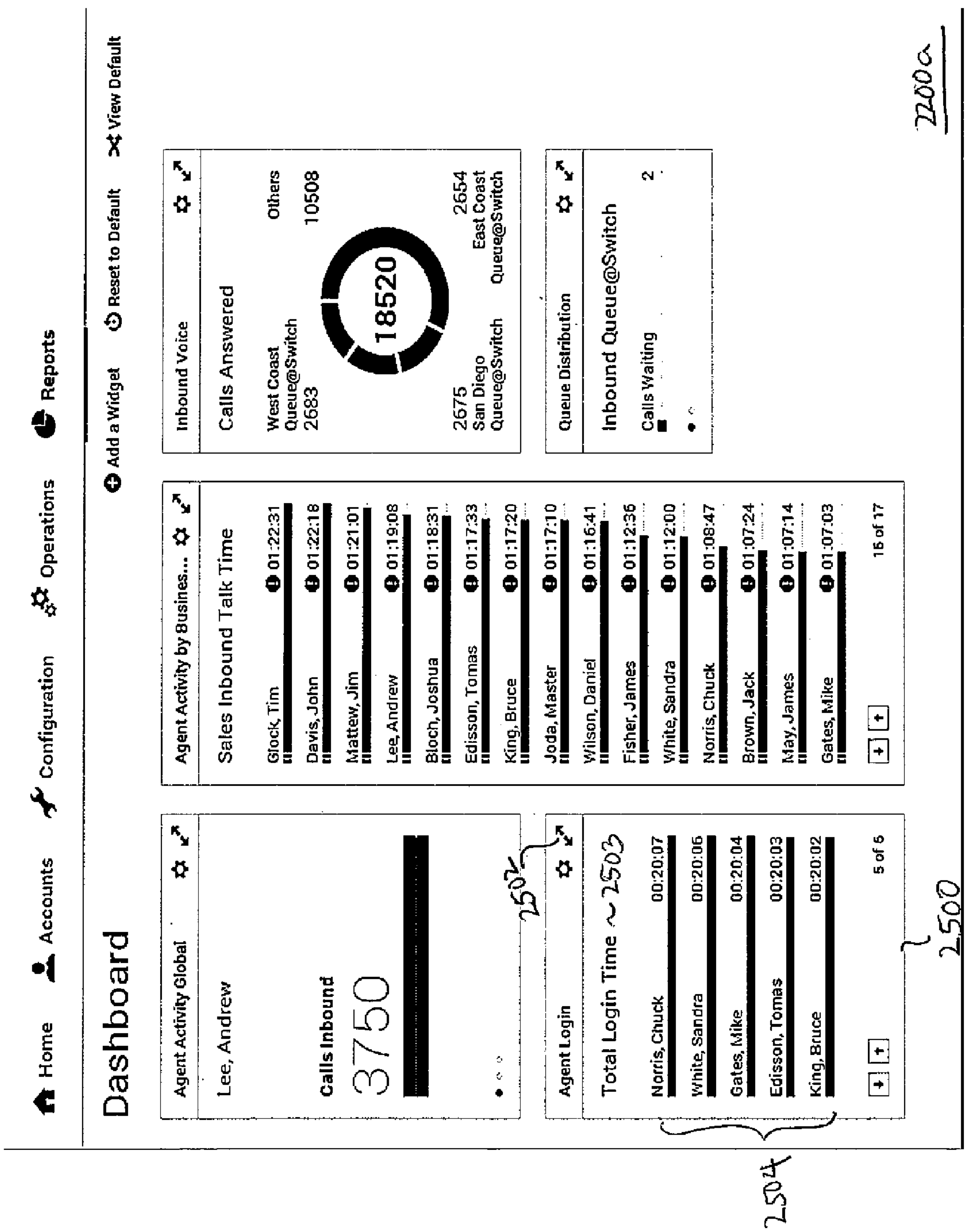
FIG. 67 is a screenshot of another example of a ubiquitous dashboard according to one embodiment of the invention.

FIG. 67 is a screenshot of another example of a ubiquitous dashboard 2200*a* according to one embodiment of the invention. The ubiquitous dashboard includes different minimized widgets including, for example, an agent login list widget 2500. The agent login list widget 2500 displays a "total login time" headline statistics 2503 for specific agents 2504. According to one embodiment, all widgets include a minimize/maximize icon 2502 for transitioning from the minimized widget display to a maximized widget display, and vice versa. The maximized widget display provides additional details and options not viewable via the minimized widget. Once maximized, the user may choose a stacked bar view, grouped bar view, or grid view, of the additional details.

Figure 68A:
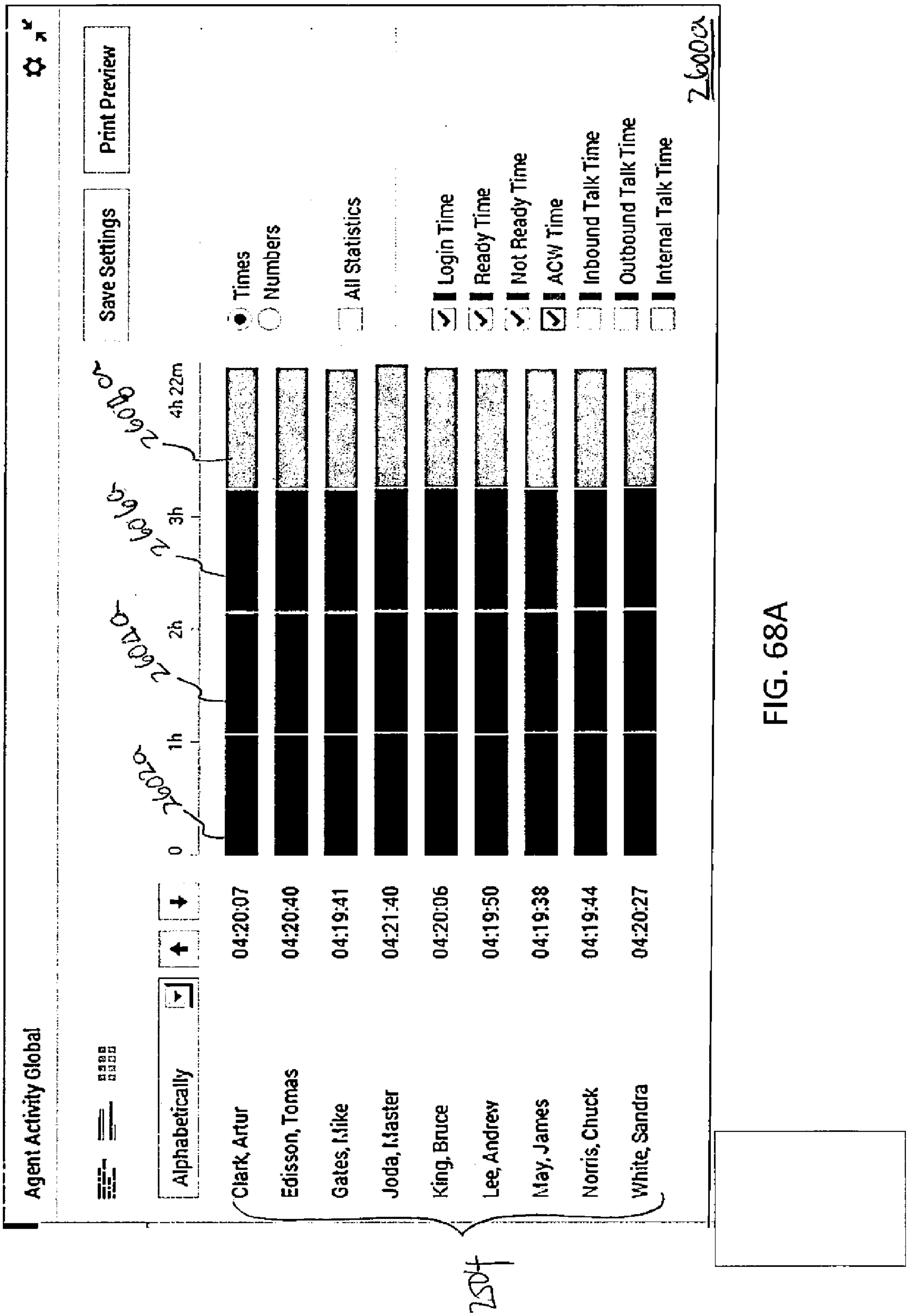
Figure 68B:
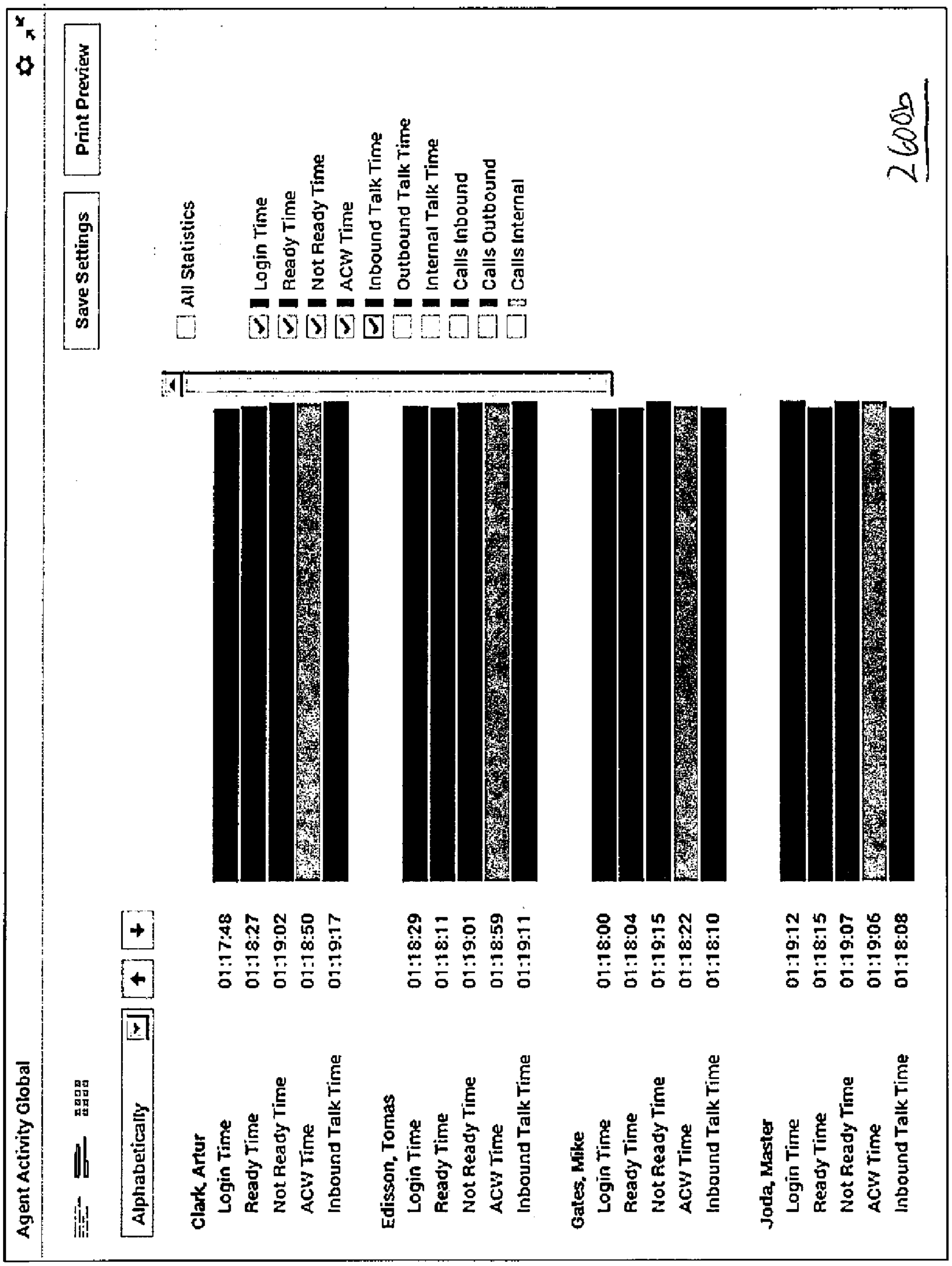

FIGS. 68A-68C are screenshots of different types of maximized views 2600*a*-2600*c* of the agent login list widget 2500 that may be displayed upon selection of the minimize/maximize icon 2502. According to one embodiment, the maximized views provide additional data associated with the agent login list widget 2500 that are not displayed in the minimized view. Such additional data may be configured by the user when generating the widget via a template. Selection of the same minimize/maximize icon 2502 while the widget is displayed according to the maximized view may cause the widget to revert back to the minimized view on the dashboard.

FIG. 68A is a screenshot of the maximized widget 2600*a* providing stacked bar view according to one embodiment of the invention. In this view, statistics (in addition or in lieu of the headline statistics 2503) are displayed for each agent via side-to-side bars, such as a login time bar 2602*a*, ready time bar 2602*b*, not ready time bar 2602*c*, and ACW time bar 2602*d*. The bars for each agent are stacked one above the other for providing a visual indication as to how each agent compares for each type of statistics, with another agent. The agent objects may be sorted in any desired order including an alphabetical order, ascending order, descending order, and the like.

FIG. 68B is a screenshot of the maximized widget 2600*b* providing grouped bar view according to one embodiment of the invention. Different type of statistics are also shown in this view, but the bars depicting the various statistics for each agent are grouped and stacked one above the other for visually depicting how an agent's performance in one area compares with the agent's performance in another area.

FIG. 68C is a screenshot of the maximized widget 2600*c* providing grid view according to one embodiment of the invention. According to this view, the various statistics selected for the widget are displayed in a grid format.

III. UI Integrated with Third Party Web Platform

FIGS. 51-59 are screen shots of various example graphical user interface screens rendered by the specialized application 52 running on the third party web platform 20 according to one embodiment of the invention. A person of skill in the art should recognize that the graphical user interface may also be provided by the web server 40 in the remote computing environment 24 in instances where a tenant user accesses the web server 40 directly without invoking the third party platform 20. According to one embodiment, the graphical user interface may be used to recommend routing strategies to contact centers according to, e.g., industry best practices. The graphical user interface may also be used for guiding a contact center user step-by-step in configuring a routing strategy according to the specific contact center's business needs. In this regard, when a contact center worker logs in and indicates that contact center setup is desired, the specialized application 52 renders a UI page with various options for configuring the contact center. Such options may include, for example, a user management option 102, skills management option 104, routing configuration option 106, and media management option 108.

Figure 51:
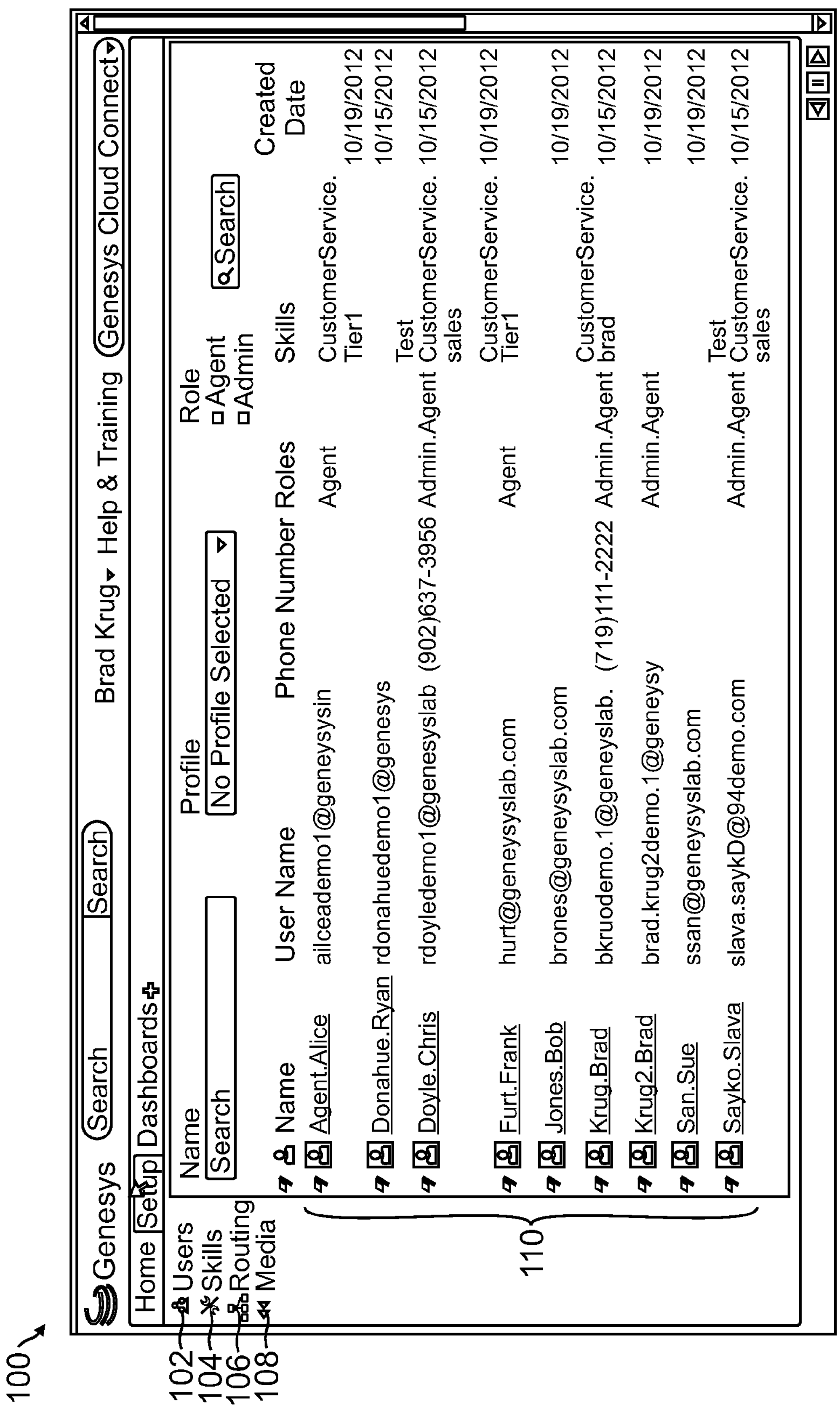
FIGS. 51-59 are screen shots of various example graphical user interface screens rendered by a specialized application running on a third party web platform according to one embodiment of the invention.

FIG. 51 is a screen shot of a UI page 100 rendered upon selection of the user management option 102. Selection of the user management option causes display of registered users 110 of the third party web portal. According to one embodiment, the users of the third party web portal may be enabled as users or administrators of the specialized application 52. In one embodiment, the users correspond to agents 11 of a contact center. Furthermore, profile information of the registered users 110 of the third party web portal may be migrated into the specialized application 52 for editing such profile information to add data that is relevant for a contact center setting. Editing the profile information of a particular user starts by selecting the user from the list of registered users 110.

According to one embodiment, the third party web portal is a customer relationship management portal for a particular business entity, and the users thereof are sales or customer service representatives for the particular business entity. The third party web portal may provide the representatives with customer profiles or account histories, or may allow for tracking and managing a marketing campaign, customer communications, or other information relevant to the particular business entity's sales process. According to an aspect of embodiments of the present invention, data corresponding to the users of the third party web portal is easily integrated with the specialized application 52 so that the user data may be used by the specialized application 52 without having to reenter the user data.

Figure 52:
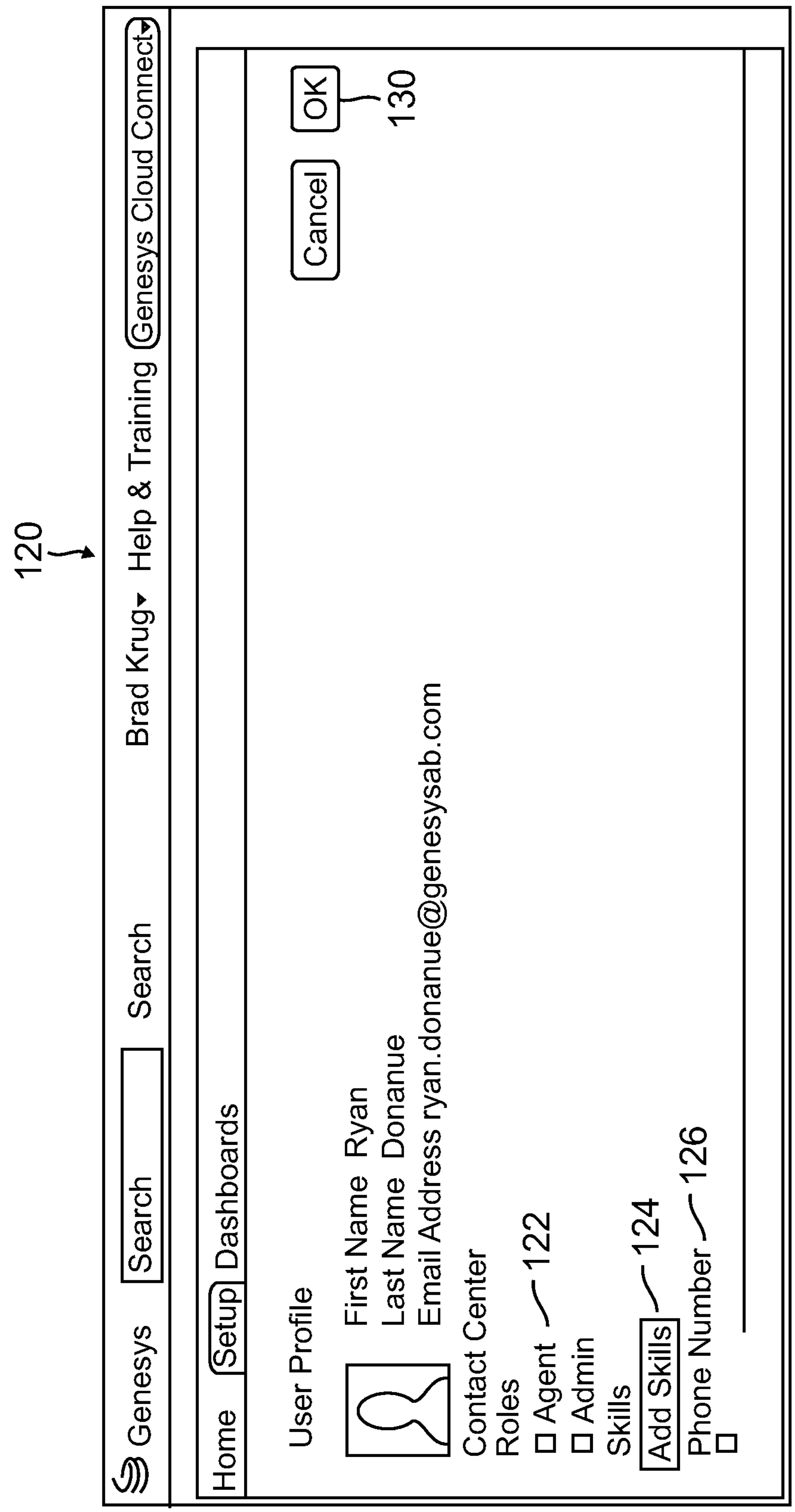

FIG. 52 is a screen shot of a UI page 120 rendered upon selection of a particular registered user according to one embodiment of the invention. Selection of the particular user causes the specialized application 52 to retrieve the user's profile information from the third party database. In addition to fields typically provided by the third party database, the specialized application further renders profile options relevant to contact centers that may be set for the user. Such profile options relate, without limitation, to the user's role 122, skills 124, and provisioned phone number for the user 116 (e.g. agent's phone number for routing calls). Setting the additional profile data for the user and selecting a save option 130 causes storing of the profile data in a contact center database managed by one of the database servers 48. If the user is to be disabled as a user of the specialized application 52, a deactivate user option causes removal of such user from the contact center database. In this manner, the specialized application 52 allows retrieval of profile information of users set up in the third party database for adding additional profile information for those users and enabling such users in the specialized application.

Figure 53:
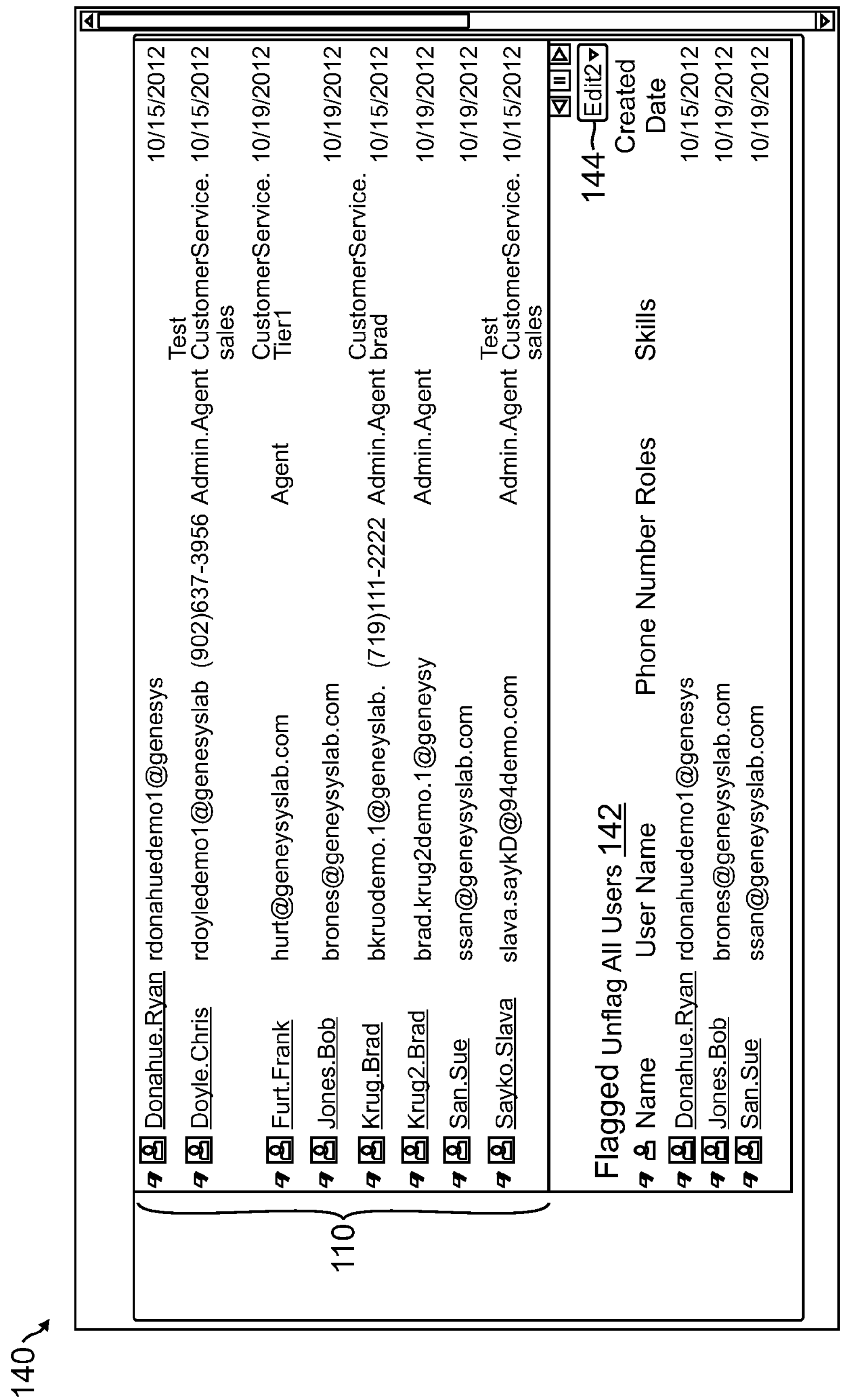

FIG. 53 is a screen shot of a UI page 140 rendered upon selection of more than one of the registered users 110 according to one embodiment of the invention. Selection of multiple users causes the specialized application 52 to flag such users and display them in a separate window 142. The separate window provides an edit option 144 with various operations (e.g. assign roles, phone numbers, skills, etc.) which, when selected, causes the operation to be performed on the selected users concurrently. That is, the specialized application 52 may allow for bulk editing of registered users 110.

Figure 54:
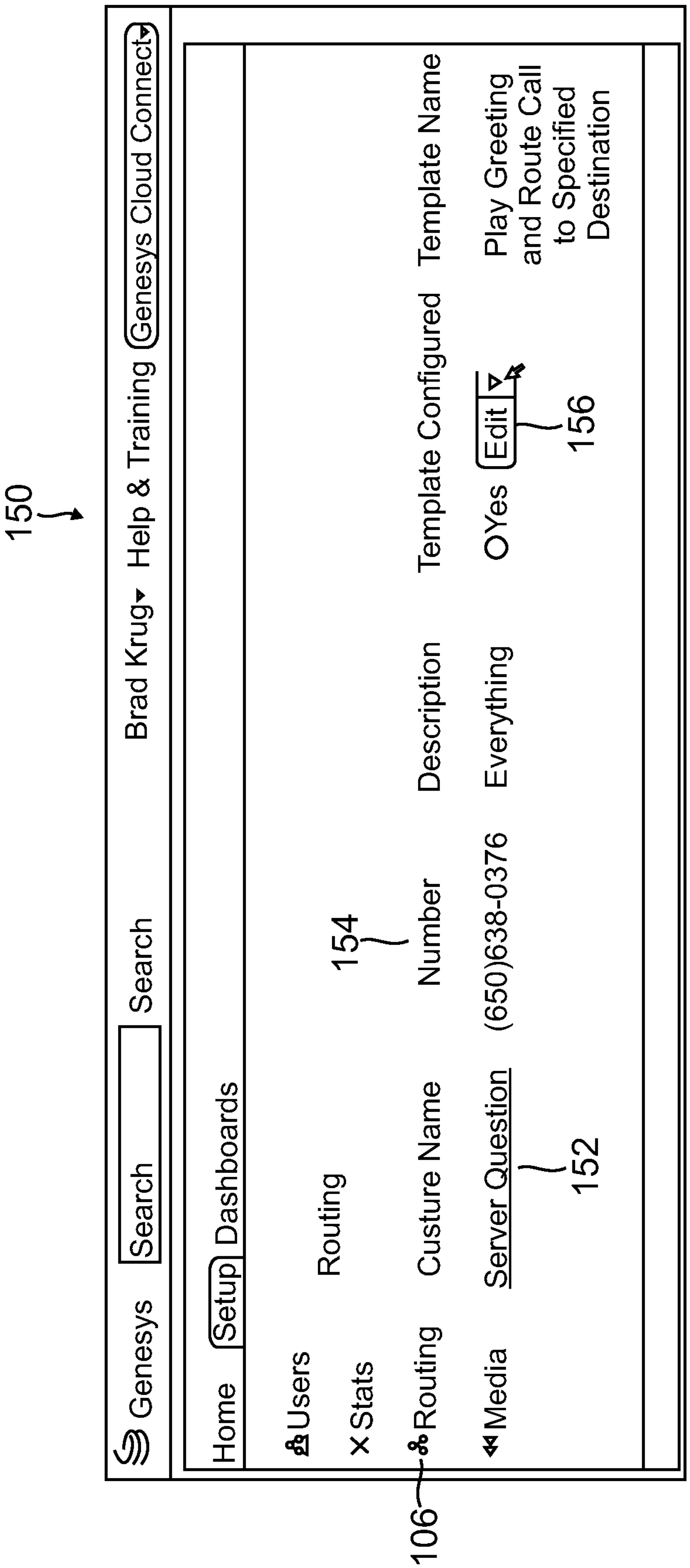

FIG. 54 is a screen shot of a UI page 150 rendered upon selection of the routing option 106 according to one embodiment of the invention. Selection of the routing option causes display of available queues that may be selected for defining or redefining a routing logic for the queue. In this regard, a queue is an entry point to a contact center. All incoming end user 14 calls arrive at a queue. According to one embodiment, a queue is identified by a queue name 152 and phone number 154.

In one embodiment, a contact center may have one or more queues associated with it, where each queue is associated with a single phone number. For example, there may be several phone numbers that an end customer 14 may call to reach the contact center. Each phone number may reach, for example, a different sub-unit of the contact center (e.g. credit card division, mortgage division, personal accounts division, and the like) or a particular registered user 110. However, embodiments of the present invention are not limited thereto, for example each queue may be associated with multiple phone numbers or multiple phone numbers may be associated with one queue.

According to one embodiment, each queue is associated with a routing template, which in turn is associated with a routing strategy/logic. A drop down template box 156 allows an administrator to configure and/or reconfigure the routing strategy assigned to the queue. Upon user indication to edit or assign a routing template to a particular queue, the web server retrieves and displays a plurality of templates that an administrator may pick and choose based on the business' needs.

Figure 55:
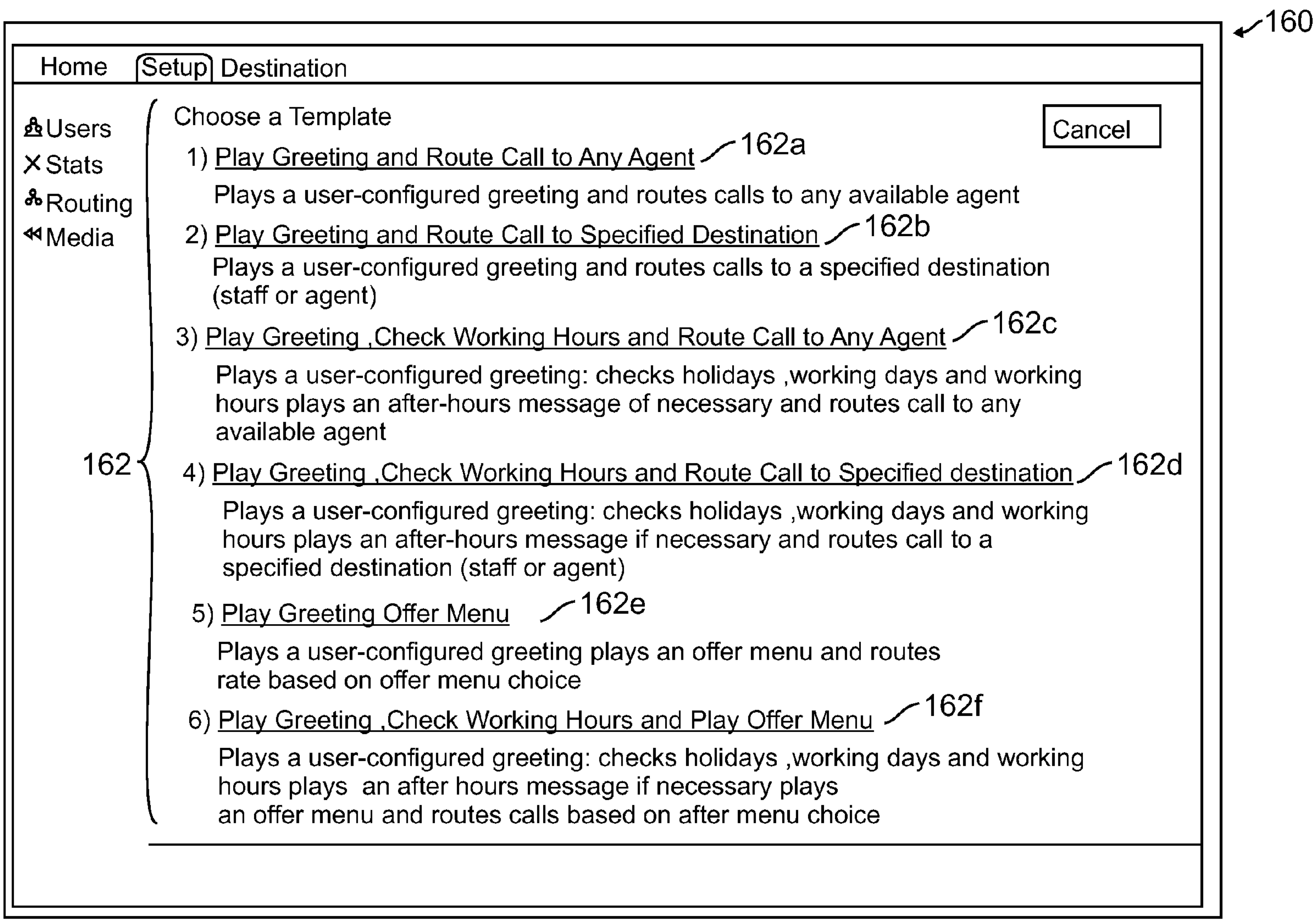

FIG. 55 is a screen shot of a UI page 160 displaying a library of different routing templates 162 available for selection by a administrator according to one embodiment of the invention. According to one embodiment, the routing templates that are initially displayed for user selection may depend on the profile information of the contact center that is to be configured with the desired business logic. For example, routing templates may be organized in the mass storage device managed by the database servers 48 according to various industry verticals (e.g. finance, retail, medical, etc.) and the types of templates displayed to the user may depend on the industry vertical identified in the contact center's profile information. Routing templates may also be categorized according to other criteria, such as, for example, contact center size. Other categories and sub-categories that may be used to organize and recommend routing templates will be evident to a person of skill in the art.

According to one embodiment, routing templates also vary by complexity. A user may select a particular level of complexity desired (e.g. via a complexity slider), and depending on the level selected, a different template may be selected. For example, a general template may trigger one or more sub-templates that provide added routing complexity. Alternatively, different parameters within a single template may be enabled or disabled based on the level of complexity that is selected.

In the example depicted in FIG. 55, different templates with different routing complexities are displayed selection by a user. For example, the template with least complexity is template 162*a* where a call is routed to any available agent after playing a user-configured greeting, followed by templates 162*b* thru 162 *e*.

In more detail, template 162*b* routes a call to a user-specified agent or skill group after playing a user-configured greeting. Template 162*c* plays a user-configured greeting and then checks user-configured holidays, working days, working hours, and the like, prior to routing a call to any available agent. Template 162*d* plays a user-configured greeting and then checks user-configured holidays, working days, working hours, and the like, prior to routing a call to a user-specified agent or skill group. Template 162*e* plays a user-configured greeting, plays a user-configured offer menu, and routes calls based on the offer menu choice. Template 162*f* plays a user-configured greeting, checks user-configured holidays, working days, working hours, and the like, prior to playing an offer menu, and routes calls based on the offer menu choice. Additionally, in the templates where holidays, working days, working hours, and the like are checked, an afterhours message or a holiday message may be played prior to routing to voicemail. A person of skill in the art should recognize that the above-described templates are example templates, and other templates having different routing strategies may also be used without departing from the scope and spirit of the invention. For example, a template may include a cascaded menu option, i.e., where calls are routed to another offer menu based on a current offer menu choice.

According to one embodiment, a routing template is parameterized. In this regard, a routing template uses values of parameters to accomplish a specific action. For example, when an initial voice treatment is played to an end customer, the actual URI (Uniform Resource Identifier) of the media file is a value of one of the parameters of the template. As another example, when an interaction is routed to an agent having a particular skill, the actual skill name is a value of another parameter of the template.

Routing templates are generic. The same routing template may be used by any of various contact centers hosted by the remote computing environment. Because routing templates use parameters, different customers using the same routing template can specify different values for the parameters, customizing how their interactions are processed. Exemplary parameters relate to a greeting to be played when a call is first received, a destination to which to route the call, a type of music to be played while the call is routed to the destination, type of menu options to be provided to a caller; working hours and holidays to be checked prior to playing a particular message, any other routing action to be performed, and the like.

According to one embodiment of the invention, a routing template includes the following properties:

id;

name;

description;

routingStrategy—SCXML (State Chart Extensible Markup Language) strategy;

templateSchema—a schema (also referred to as metadata) describing what parameters this template uses and defines additional information about parameters (e.g. type). It is also used to generate the appropriate UI so users can conveniently specify values of routing parameters during the contact center's configuration process.

The metadata for a particular routing template defines parameters including names to be displayed in the graphical user interface for prompting input of a user value for the corresponding parameters, types of user input values expected for the corresponding parameters, range of values expected for the corresponding parameters, and the like. According to one embodiment, a parameter object has the following properties:

displayName—parameter name to be displayed in the UI;

description—brief description of the parameter;

type—parameter type, must be one of the types specified (e.g. a "timezone" type to describe a time zone of the contact center; a "holiday" type to describe holiday dates; a "weekdays" type to describe weekday sequences; a "working hours" type to specify working hours; a "media resource" type to describe audio, video, etc. to be used in the routing process; a "destination" type to describe a routing destination (e.g. skill, agent, etc.); and a "select action menu" type that describes an action to be performed by the routing strategy);

multiple—a Boolean value describing if this parameter is an array or not; "true" means that this parameter can hold several objects of the specified type.

According to one embodiment, metadata for a particular routing template may also define an element referred to as "block" which is a logical grouping element for a set of parameters which have something in common. Blocks may also form a tree-like structure by having a number of child blocks. Thus, metadata for a particular routing template may be described as an array of blocks. According to on embodiment, the blocks defined by the metadata may be the blocks 264 of the routing strategy diagram 262 described above in relation, for example, to FIG. 20.

According to one embodiment, each block has the following JSON (JavaScript Object Notation) representation:

block—name of this block;

type—block type, can be one of the following: "simple", "condition", "menu", "menuItem";

displayName—block name to be displayed in the UI;

description—brief description;

params—an object containing a set of user-configurable parameters to be displayed in this block; shall be in the following format: {<parameter1_name>: <parameter1_spec>, <parameter2_name>: <parameter2_spec>, . . . };

blocks—an array of child blocks (optional).

Figure 56:
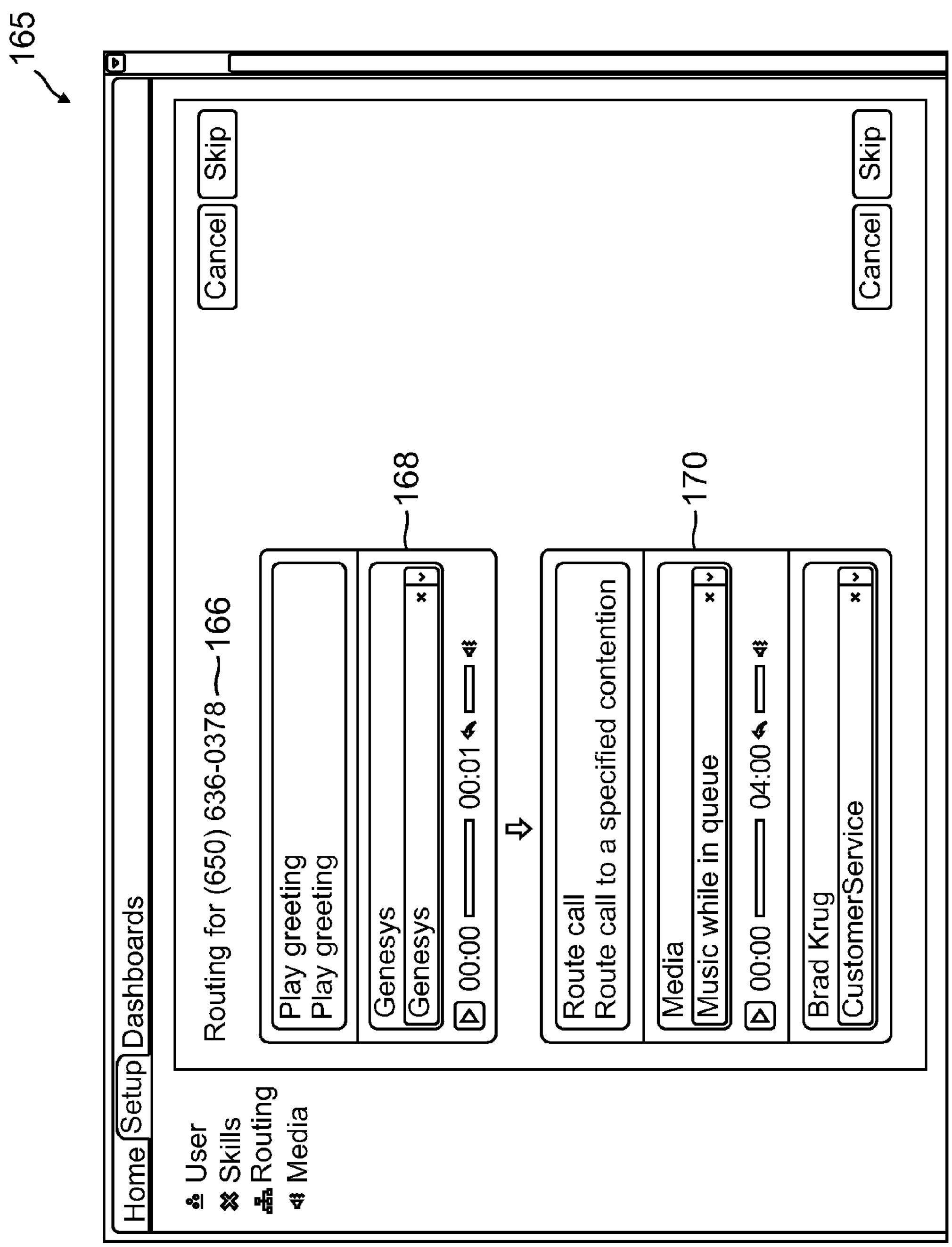

FIG. 56 is a screen shot of a UI page 165 displaying parameters for a selected routing template **162*a* based on the associated metadata according to one embodiment of the invention. A person of skill in the art will understand that the UI in FIG. 56 may be replaced with the UI described above with respect to, for example, FIG. 20. That is, the set of parameters that are to be configured could be represented as blocks 264 of a routing strategy diagram 262**. In this regard, the parameters would be linked and displayed in the routing strategy diagram so that it tracks the actual flow of an interaction to be handled by the routing strategy.

The set of parameters that are displayed may depend from the functionality that the template provides. In the illustrated example, the parameters include a play greeting parameter 168 and a route call parameter 170. In response to the displayed parameters, the contact center administrator selects a pre-recorded greeting message to be played when an interaction is initially answered, and music to be played while the interaction is waiting to be routed to an available agent.

The parameters in the UI page 165 of FIG. 56 are rendered based on the following metadata:

```
[{
 "block": "greeting",
 "type": "simple",
 "displayName": "Play greeting",
 "description": "Play greeting",
 "params": {
  "greetingMessage": {
   "displayName": "Greeting message",
   "description": "Select greeting message",
   "type": "media",
   "multiple": false
  }
 }
},{
 "block": "routing",
 "type": "simple",
 "displayName": "Route call",
 "description": "Route call to any available agent",
 "params": {
  "musicWhileWaiting": {
   "displayName": "Music while waiting",
   "description": "Select music while waiting",
   "type": "media",
```

-continued

```
        "multiple": false
      }
    }
  }]
```

The values of the parameters that are stored based on inputs provided in response to the parameters displayed in FIG. 56 may be as follows:

```
routingParams = {
"greetingMessage": {
  "id": "f3ab8s-484556",
  "displayName": "Greeting Message",
  "uri": "system/media-resources/f3ab8s-484556",
  "mediaUri": "system/media-resources/f3ab8s-484556.wav"
},
"musicWhileWaiting": {
  "id": "f3ab8s-484556",
  "displayName": "Music While Waiting",
  "uri": "system/media-resources/f3ab8s-484556",
  "mediaUri": "system/media-resources/f3ab8s-484556.wav"
```

As described above, the UT page 165 displays the parameters that relate to the specific template selected. Accordingly, and depending on the template selected, the user may be prompted to enter working holidays, working days, working hours, and the like, select an action to take when outside working times, enter a particular agent or skill group to route to, select a voice prompt to play at a specific step of processing a call, specify an action to take when a particular digit is entered from the user's telephone device, or enter any other parameter value associated with a routing operation of a template.

According to one embodiment, the user may specify another virtual queue to route to, for example, in response to a selection of a menu item. Here the other virtual queue may relate to another template (e.g., another template type), another department of the business entity, another phone number, and the like.

Figure 57:
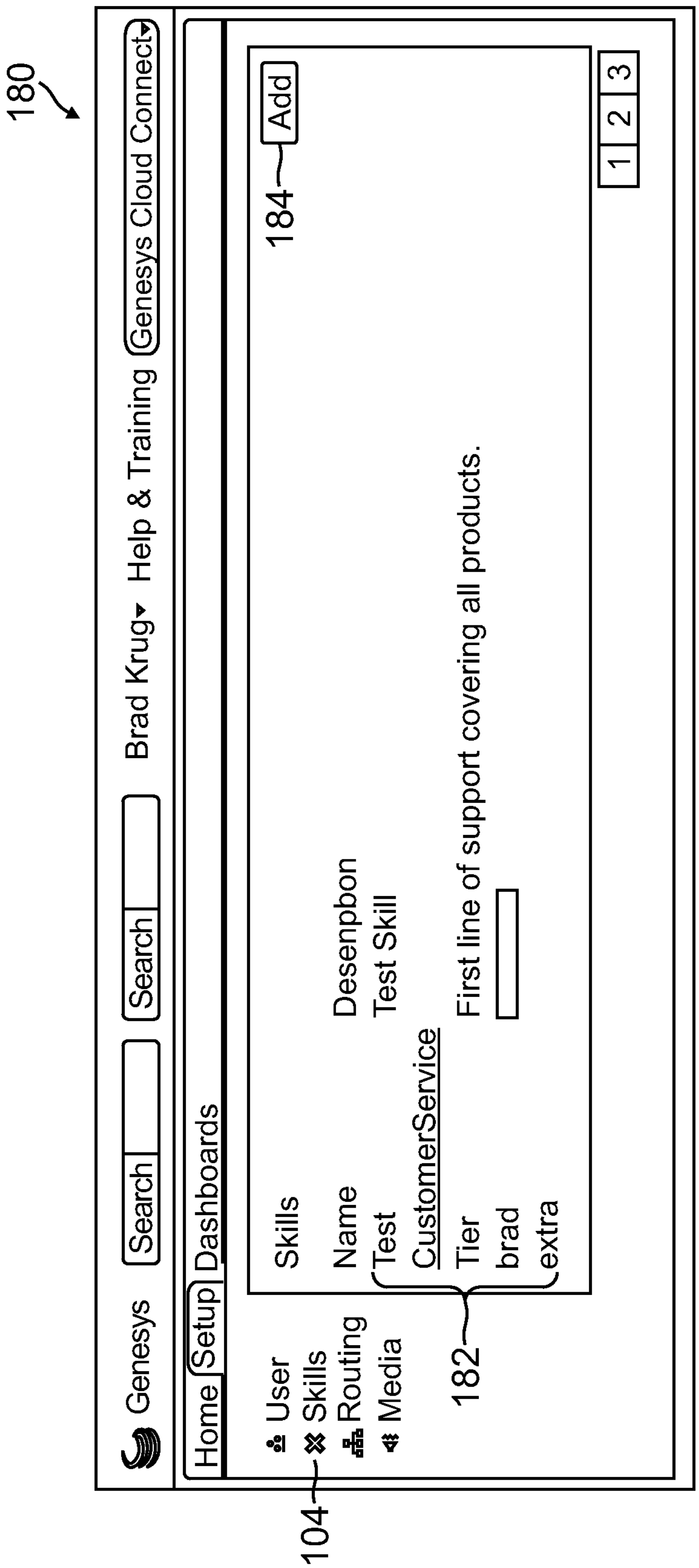

FIG. 57 is a screen shot of a UI page 180 displaying a library of different skill groups 182 available for association with registered users 110 and routing strategies according to one embodiment of the invention. The administrator may create skill groups 182 by selecting the add option 184. When creating skill groups 182, the specialized application 52 may prompt for a skill name and skill description. According to one embodiment, after a skill group 182 is saved in the skill group library, the administrator may assign particular registered users 110 (e.g., agents 11) to the skill group 182 by entering the skill name in the skill field 124 of the particular registered user's profile, and the administrator may enter the skill group 182 in the parameter field for routing to a particular skill group 182 when configuring the routing strategy.

Figure 58:
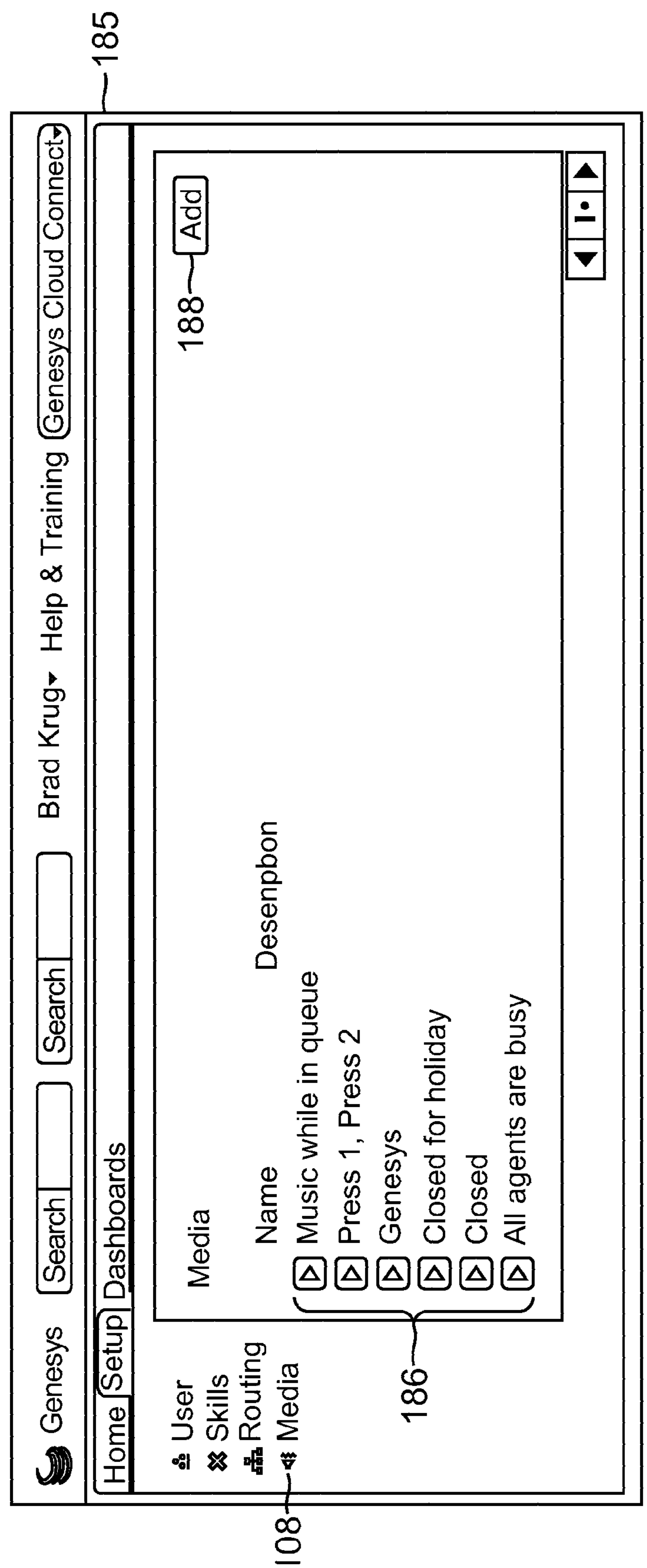

FIG. 58 is a screen shot of a UI page 185 displaying a library of different media files 186 available for selection when configuring the parameters of the selected routing strategy according to one embodiment of the invention. The media files 186 may be provided by or stored at the media server 46. According to one embodiment, the administrator may add new media files by selecting the add option 188. Newly added media files may be stored at the media server 46 for subsequent selection from the media file library. The administrator may preview the media files by clicking a play icon associated with the media file 186.

According to an aspect of one or more embodiments of the present invention, an administrator of a contact center can configure a contact center by enabling registered users of a third party web portal as agents of the contact center, assigning the enabled registered users to skill groups, associating phone number(s) with the enabled registered users and the contact center, and configuring a routing strategy from one of the available routing strategy templates. After configuring the contact center, the contact center may be instantiated in a remote computing environment to receive and handle contact interactions (e.g., calls).

Figure 59:
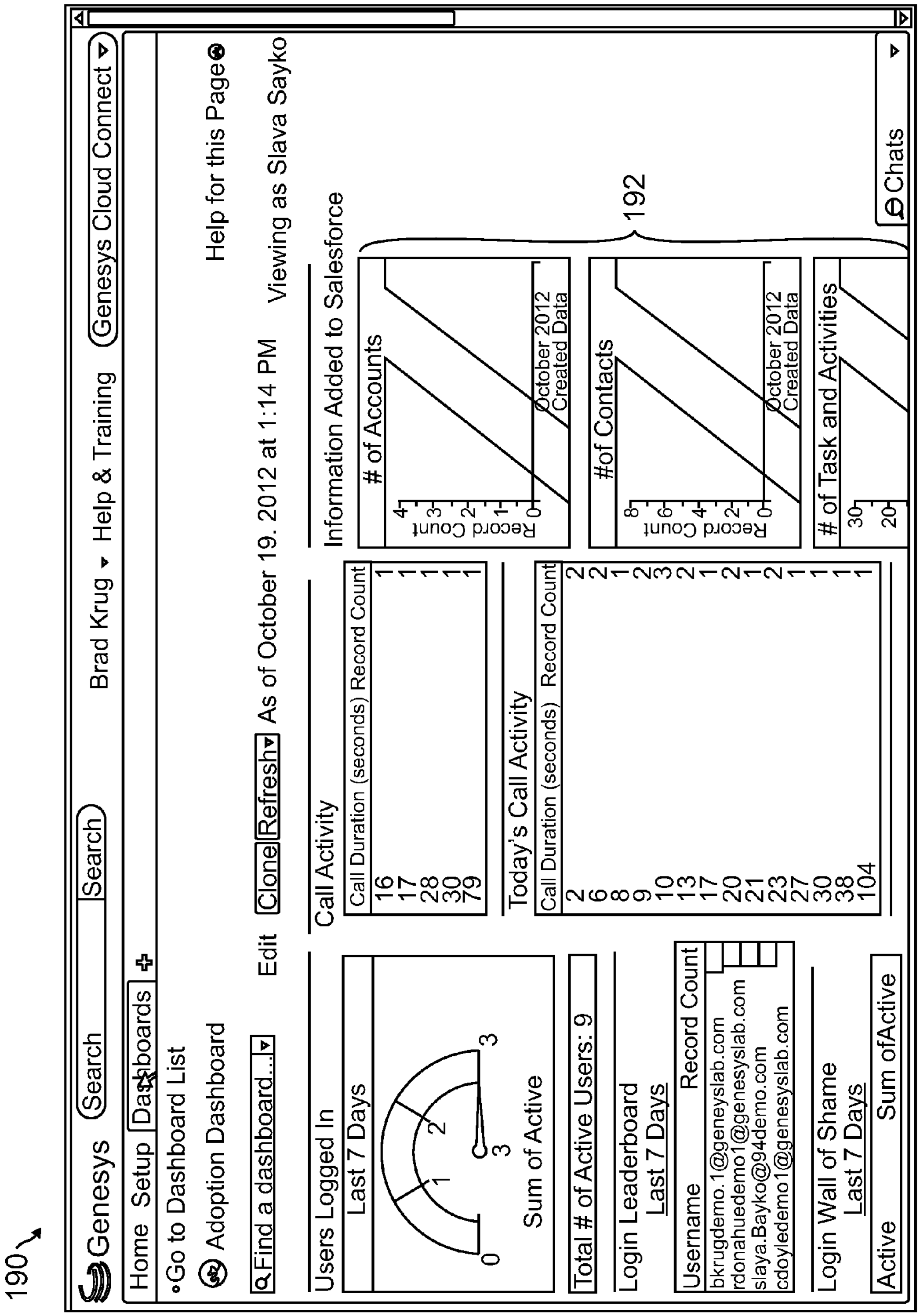

FIG. 59 is a screen shot of an exemplary UI page 190 displaying a dashboard 192 for an administrator to monitor activity of an operating contact center. According to one embodiment, the dashboard is generated by the specialized application 52. The dashboard may include real-time and historical data associated with a particular contact center. Additionally, the dashboard may include data from the third party web portal. The dashboard may present the contact center data using configurable charts and graphs, such that the administrator may readily and easily understand the status of the contact center. Information displayed on the dashboard may include, but is not limited to, number of users logged in, a historical login record, call activity, call duration, call time, hold time, and sales information.

Figure 60:
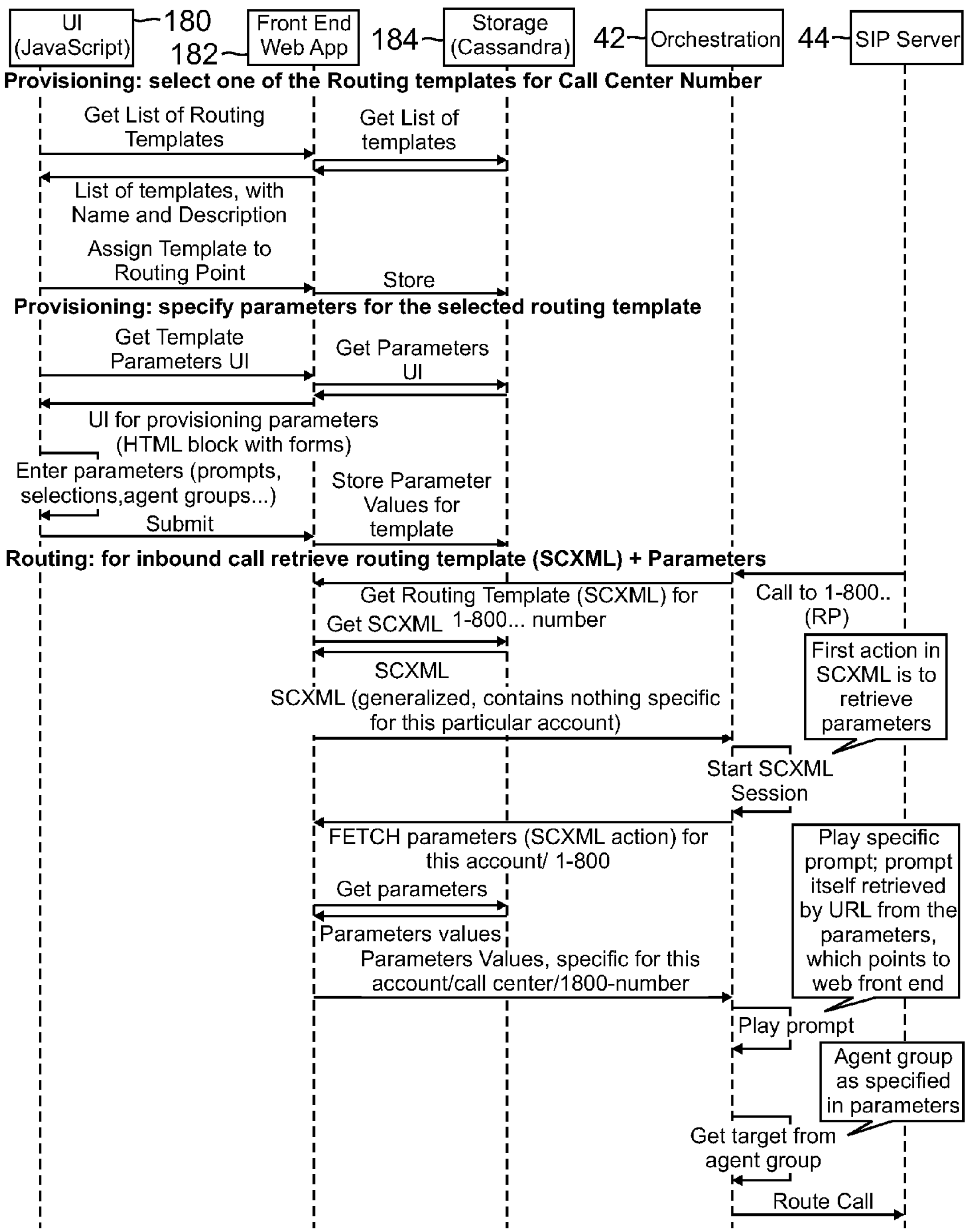
FIG. 60 is a signaling flow diagram illustrating a processing sequence for configuring a routing logic for a contact center, and for routing an inbound call based on the configured routing logic according to one embodiment of the invention.

FIG. 60 is a signaling flow diagram illustrating a processing sequence for configuring a routing logic for a contact center, and for routing an inbound call based on the configured routing logic according to one embodiment of the invention.

In order to configure a routing logic for a contact center, a contact center user utilizes a UI 180 displayed on the user's web browser 51 (FIG. 2) to request a list of routing templates to a web application 182 running on the web server 40. According to one embodiment, the UI is provided by the specialized software 52 (FIG. 2) running on the third party web platform 20. The web application 182 in turn submits the request to a mass storage device 184 managed by the corresponding database server 48 (FIG. 1). The retrieved list of routing templates are provided for display to the UI 180. The UI receives user selection of a particular routing template along with identification of a queue/routing point to which the routing template should be assigned. The assignment of the selected routing template to the routing point is stored in the mass storage device 184.

The UI 180 further transmits a request to retrieve parameters from the associated metadata file. In response, the web application 182 retrieves the associated metadata file and generates a display based on the parameters specified in the file. The contact center user assigns the desired values for the displayed parameters and submits them to the web application 182 which is turn stores the values in the mass storage device 184. According to one embodiment, the values of the parameters may be links for accessing media or other objects assigned to the parameters.

Once the parameters for the selected routing template are specified, all incoming calls to the associated queue are processed according to the corresponding routing strategy.

A call routing processing sequence begins with the call coming in to a routing point (e.g. a queue associated with a telephone number). The SIP server 44 receives the call and distributes a call event to the orchestration server 42 which queries the web application 182 to retrieve the routing template strategy specified for the queue. The SCXML code for implementing the routing strategy is retrieved from the mass storage device 184 and forwarded to the web application 182. The web application 182 transmits a request to the orchestration server 42 to execute the routing strategy via the SCXML code. According to one embodiment, the SCXML code that implements the routing strategy includes an initial action that is invoked by the orchestration server 42 to obtain actual values of the routing template parameters (or parameters as defined by the blocks of a routing diagram 262. The executing of the initial action causes a request to be transmitted to the web application 182 to fetch the values of the parameters that have been stored for the particular queue (or route point). The parameter values are returned to the orchestration server 42. The orchestration server then executes the routing strategy using the retrieved parameter values. This may include for example, playing a specific voice prompt. The voice prompt may be retrieved via a URL specified for a corresponding parameter. A specific agent from an agent group may also be selected based on corresponding parameter values. Once the agent is selected, a request is transmitted to the SIP server 44 to route the call to the selected agent.

According to one embodiment of the invention, the use of templates or other graphical user interfaces for recommending routing strategies according to industry best practices, and for guiding a user step-by-step in configuring a routing strategy according to the specific contact center's business needs are extended to other configuration activities performed during an initial deployment of a contact center, as well as after the contact center has been deployed. For example, when a new contact center is to be deployed initially, a contact center user may select from various predefined configuration templates for being guided through the configuration process. The configuration templates may be organized in the mass storage device managed by the database servers 48 according to various industry verticals (e.g. finance, retail, medical, etc.). The configuration templates may also be categorized according to other criteria, such as, for example, contact center size. Other categories and sub-categories that may be used to organize and/or recommend the configuration templates will be evident to a person of skill in the art.

According to one embodiment, the configuration templates include parameters that are included for configuring a contact center according to the relevant industry's best practices. For example, a best practice for a contact center in the finance industry may be to have two 800 numbers for reaching the contact center. The template classified under the finance category may thus prompt the contact center user to pick two 800 numbers for the contact center for storing as values for the corresponding parameters. In another example, a best industry practice for a contact center that is identified to reside in California may be to set up both English and Spanish skills for its agents. In yet another example, a best industry practice for a contact center in the finance industry may be to have a separate queue for banking, a separate queue for mortgage, and the like. The contact center user may thus be prompted to input information (e.g. telephone numbers) to be associated with each of the recommended queues.

According to one embodiment, certain customization may be allowed to the contact center user beyond what is recommended via the configuration (or routing) templates. For example, if the template prompts for particular predefined queues, but the contact center desires to set up a queue that is not defined by the template, the template is flexible enough to allow the user to enter such a customized queue. For example, the template may include an "enter other queue" parameter which the user may select to provide a queue name, number, and the like.

According to one embodiment, the selected configuration template and associated values are stored in the mass storage device managed by the database servers 48 and provided to the configuration server 41 for automatic deployment of the contact center. In deploying a contact center, the configuration server instantiates a virtual machine for the contact center 41 in the remote computing environment and allocates resources (e.g. computing infrastructure) to the virtual machine commensurate to contact center needs as identified via the configuration parameters. If the contact center's needs change, and more or less resources are required, the configuration server 41 dynamically instantiates a new virtual machine, at runtime, according to the modified needs, migrates contact center data from the first virtual machine to the new virtual machine, and makes all other necessary updates to ensure that calls are routed to the new virtual machine.

In addition to automatically allocating physical resources during the configuration process, the configuration server 41 further automatically configures the relevant servers (e.g. SIP, media, etc.) and takes other actions deduced as being necessary based on the parameters explicitly identified. For example, if a contact center in the finance industry has a credit card queue enabled, special security features may automatically be set up in handling calls directed to this queue.

Although the examples used for the various embodiments are focused on voice interactions, a person of skill in the art should recognize that the embodiments may extend to other types of interactions including, without limitation, any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

A person of ordinary skill in the art should recognize that the graphical user interfaces described in the various embodiments of the present invention may be provided by, for example, the third-party web platform 20, the web server 40, one or more servers of the remote computing environment 24, or in end user devices such as, for example, agent devices (computers, tablets, laptops, and the like). For example, the graphical user interface may be provided by an application server on contact center premises, hosted remotely in the remote computing environment, or downloaded onto the end user devices. The graphical user interface may be accessed via an interne browser, a standalone application, or any other suitable mechanism. The graphical user interface may be adapted to run on a personal computer, smart phone, tablet, or any other suitable device having a processor and memory. According to one embodiment, the memory has stored therein instructions that cause the processor to provide the UI and related functionality described in the various embodiments. Interaction with the graphical user interface may be via a mouse, keyboard, touch input, and/or any other input device coupled to the processor as is conventional in the art.

Each of the various servers, controllers, switches, gateways, engines, applications, and/or modules in the afore-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

It is the Applicant's intention to cover by claims all such uses of the invention and those changes and modifications which could be made to the embodiments of the invention herein chosen for the purpose of disclosure without departing from the spirit and scope of the invention. For example, although templates are provided as an example of a type of UI that may help guide a user in configuring and reconfiguring a contact center, a person of skill in the art should understand that other UI mechanisms may be used in lieu or in addition of templates. For example, a wizard like interface may provide a series of dialog boxes that lead a contact center user through a series of configuration steps. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A method for monitoring and visualizing contact center routing strategies via a graphical user interface, comprising:

displaying, by a processor, a visual routing diagram graphically depicted on the graphical user interface for visually depicting a contact center routing strategy, the visual routing diagram including a plurality of visually depicted blocks each associated with logic for managing an interaction with the contact center, and each arranged according to logic of the contact center routing strategy;

monitoring, by the processor, contact center performance as interactions with the contact center are managed according to the routing strategy;

automatically identifying, by the processor, one of the plurality of blocks affected by the contact center performance;

identifying, by the processor, a threshold associated with the identified block;

determining, by the processor, whether the contact center performance satisfies the threshold; and automatically modifying a visual appearance of the identified block based on the determination.

2. The method of claim 1 further comprising:

receiving, by the processor, a user command to edit the routing diagram;

identifying, by the processor, a modification to the routing diagram;

modifying, by the processor, the routing diagram and the routing strategy in response to the modification; and storing, by the processor, the modified routing diagram and the routing strategy as new versions of respectively the routing diagram and the routing strategy.

3. The method of claim 1, wherein the threshold is dynamically adjusted via a slider, the method further comprising:

dynamically modifying, by the processor, the visual appearance of the identified block based on the dynamic adjustment of the slider.

4. The method of claim 1, wherein the monitored contact center performance is at least one of interaction flow, abandonment rate, average handling time, or average waiting time.

5. The method of claim 1, wherein the block affected by the contact center performance is associated with a particular contact center agent group.

6. The method of claim 1, wherein the threshold is based on forecast performance.

7. The method of claim 1, wherein modifying the visual appearance of the identified block includes modifying a color in which the identified block is displayed.

8. The method of claim 1, wherein the modifying the visual appearance is for alerting a user of the contact center performance.

9. The method of claim 1 further comprising:

identifying, by the processor, a user input device paused over one of the plurality of blocks of the routing diagram;

displaying, by the processor, additional information on the block as a pop-up window, wherein the pop-up window disappears when the user input device is detected to no longer be paused over the block.

10. The method of claim 9, wherein the additional information is dynamic information that changes based on the contact center performance.

11. A system for monitoring and visualizing contact center routing strategies graphical user interface, comprising:

processor; and memory, wherein the memory has stored thereon instructions that, when executed by the processor, cause the processor to:

display a visual routing diagram graphically depicted on the graphical user interface for visually depicting a contact center routing strategy, the visual routing diagram including a plurality of visually depicted blocks each associated with logic for managing an interaction with the contact center, and each arranged according to logic of the contact center routing strategy;

monitor contact center performance as interactions with the contact center are managed according to the routing strategy;

automatically identify one of the plurality of blocks affected by the contact center performance;

identify a threshold associated with the identified block;

determine whether the contact center performance satisfies the threshold; and automatically modify a visual appearance of the identified block based on the determination.

12. The system of claim 11, wherein the instructions further cause the processor to:

receive a user command to edit the routing diagram;

identify a modification to the routing diagram;

modify the routing diagram and the routing strategy in response to the modification;

store the modified routing diagram and the routing strategy as new versions of respectively the routing diagram and the routing strategy.

13. The system of claim 11, wherein the threshold is dynamically adjusted via a slider, and the instructions further cause the processor to:

dynamically modify the visual appearance of the identified block based on the dynamic adjustment of the slider.

14. The system of claim 11, wherein the monitored contact center performance is at least one of interaction flow, abandonment rate, average handling time, or average waiting time.

15. The system of claim 11, wherein the block affected by the contact center performance is associated with a particular contact center agent group.

16. The system of claim 11, wherein the threshold is based on forecast performance.

17. The system of claim 11, wherein the instructions that cause the processor to modify the visual appearance of the identified block includes program instructions that cause the processor to modify a color in which the identified block is displayed.

18. The system of claim 11, wherein the modifying the visual appearance is for alerting a user of the contact center performance.

19. The system of claim 11, wherein the instructions further cause the processor to:

identify a user input device paused over one of the plurality of blocks of the routing diagram;

display additional information on the block as a pop-up window, wherein the pop-up window disappears when the user input device is detected to no longer be paused over the block.

20. The system of claim 19, wherein the additional information is dynamic information that changes based on the contact center performance.

21. The method of claim 1, wherein the processor displays the routing diagram during executing of the routing strategy, and the modifying of the visual appearance is while the routing diagram is displayed.

* * * * *